(12) United States Patent
Reisman et al.

(10) Patent No.: US 12,436,620 B2
(45) Date of Patent: Oct. 7, 2025

(54) MULTI-STAGE GESTURES DETECTED BASED ON NEUROMUSCULAR-SIGNAL SENSORS OF A WEARABLE DEVICE TO ACTIVATE USER-INTERFACE INTERACTIONS WITH LOW-FALSE POSITIVE RATES, AND SYSTEMS AND METHODS OF USE THEREOF

(71) Applicant: Meta Platforms Technologies, LLC, Menlo Park, CA (US)

(72) Inventors: Jason Lowell Reisman, Brooklyn, NY (US); Austin Ha, Flushing, NY (US); Zaina Edelson, New York, NY (US); Adam Berenzweig, Brooklyn, NY (US); Christopher Anderson, New York, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 89 days.

(21) Appl. No.: 18/359,855

(22) Filed: Jul. 26, 2023

(65) Prior Publication Data

US 2024/0061513 A1 Feb. 22, 2024

Related U.S. Application Data

(60) Provisional application No. 63/414,884, filed on Oct. 10, 2022, provisional application No. 63/414,880, (Continued)

(51) Int. Cl.
| | |
|---|---|
| *G06F 3/0346* | (2013.01) |
| *G06F 1/16* | (2006.01) |
| *G06F 3/01* | (2006.01) |

(52) U.S. Cl.
CPC ............. *G06F 3/017* (2013.01); *G06F 1/163* (2013.01); *G06F 3/015* (2013.01); *G06F 3/0346* (2013.01)

(58) Field of Classification Search
None
See application file for complete search history.

(56) References Cited

U.S. PATENT DOCUMENTS 9,377,860 B1 * 6/2016 Weber .................... G06F 3/017
10,088,908 B1 * 10/2018 Poupyrev ............... G06V 40/28
(Continued)

OTHER PUBLICATIONS

Final Office Action mailed Jun. 5, 2024 for U.S. Appl. No. 18/364,396, filed Aug. 2, 2023, 12 pages.
(Continued)

*Primary Examiner* — Tuyetlien T Tran
(74) *Attorney, Agent, or Firm* — Morgan, Lewis & Bockius LLP

(57) ABSTRACT

The various implementations described herein include methods and systems for using a multi-stage in-air hand gesture to activate user-interface interactions in a way that ensures low-false positive rates. In one aspect, a method includes, while a gating gesture is maintained, receiving a first indication of performance of an adjustment gesture of a first magnitude directed to a user interface object associated with a plurality of values. The method further includes, in response to receiving the first indication, adjusting the user interface object to have a first state after moving through some of the plurality of values based on the first magnitude. The method also includes, after receiving an indication of a release of the gating gesture, in response to receiving a second indication of performance of the adjustment gesture, forgoing adjusting the user interface object such that the user interface object continues to have the first state.

20 Claims, 81 Drawing Sheets

Related U.S. Application Data filed on Oct. 10, 2022, provisional application No. 63/399,187, filed on Aug. 18, 2022, provisional application No. 63/399,188, filed on Aug. 18, 2022.

(56) References Cited

U.S. PATENT DOCUMENTS

| | | | | |
|---|---|---|---|---|
| 10,120,454 | B2* | 11/2018 | Steinberg | G06F 3/04842 |
| 10,488,939 | B2* | 11/2019 | Karmon | G06V 40/28 |
| 10,701,316 | B1* | 6/2020 | Cheung | H04N 7/157 |
| 11,150,730 | B1* | 10/2021 | Anderson | G06F 3/017 |
| 11,543,889 | B2* | 1/2023 | Doganis | G06F 3/017 |
| 12,189,865 | B2* | 1/2025 | Nguyen | G06F 3/04842 |
| 2004/0135819 | A1 | 7/2004 | Maa | |
| 2011/0320949 | A1* | 12/2011 | Ohki | G06F 3/017 715/863 |
| 2012/0124516 | A1* | 5/2012 | Friedman | G06F 3/017 715/810 |
| 2012/0127070 | A1 | 5/2012 | Ryoo et al. | |
| 2013/0080976 | A1 | 3/2013 | Zambrano et al. | |
| 2013/0120254 | A1* | 5/2013 | Mun | G06F 3/017 345/158 |
| 2013/0271360 | A1* | 10/2013 | MacDougall | G06F 3/017 345/156 |
| 2013/0285951 | A1* | 10/2013 | Jeon | G06F 3/0416 345/173 |
| 2013/0328763 | A1* | 12/2013 | Latta | G06F 3/017 345/156 |
| 2014/0240103 | A1* | 8/2014 | Lake | G06F 1/163 340/12.5 |
| 2015/0220149 | A1* | 8/2015 | Plagemann | G06F 3/017 715/856 |
| 2015/0248207 | A1* | 9/2015 | Dorfner | G06F 3/0488 345/174 |
| 2016/0048213 | A1* | 2/2016 | Zafiris | G06F 3/017 345/174 |
| 2016/0048215 | A1* | 2/2016 | Shin | H04M 1/724 345/156 |
| 2016/0274762 | A1* | 9/2016 | Lopez | G06T 19/006 |
| 2016/0334870 | A1* | 11/2016 | Priyantha | G06F 3/041 |
| 2016/0349927 | A1* | 12/2016 | Sun | G06F 1/1673 |
| 2017/0139568 | A1* | 5/2017 | Itani | G06V 40/28 |
| 2017/0308118 | A1 | 10/2017 | Ito | |
| 2018/0052518 | A1* | 2/2018 | Zhu | G06F 3/167 |
| 2018/0153430 | A1 | 6/2018 | Ang et al. | |
| 2018/0364853 | A1* | 12/2018 | Pahud | G06F 3/0393 |
| 2019/0033974 | A1 | 1/2019 | Mu et al. | |
| 2019/0167764 | A1* | 6/2019 | Itani | G06F 3/04812 |
| 2019/0243451 | A1 | 8/2019 | Wakuda et al. | |
| 2019/0361521 | A1 | 11/2019 | Stellmach et al. | |
| 2020/0012946 | A1* | 1/2020 | Costa | G06N 3/088 |
| 2020/0097082 | A1* | 3/2020 | Berenzweig | G06T 19/006 |
| 2020/0097083 | A1 | 3/2020 | Mao et al. | |
| 2020/0134890 | A1* | 4/2020 | Zhang | G06F 3/03545 |
| 2020/0159325 | A1 | 5/2020 | Bailey et al. | |
| 2021/0048890 | A1 | 2/2021 | Kim et al. | |
| 2021/0064132 | A1 | 3/2021 | Rubin et al. | |
| 2021/0096726 | A1* | 4/2021 | Faulkner | G06F 3/04842 |
| 2021/0117010 | A1 | 4/2021 | Rizzardini et al. | |
| 2021/0124417 | A1 | 4/2021 | Ma | |
| 2021/0240332 | A1 | 8/2021 | Walkin et al. | |
| 2021/0247896 | A1* | 8/2021 | Tanemura | G06F 3/0304 |
| 2021/0286436 | A1 | 9/2021 | Parizi et al. | |
| 2021/0318790 | A1 | 10/2021 | Palos | |
| 2021/0325972 | A1* | 10/2021 | Ahn | G06V 40/28 |
| 2021/0333884 | A1* | 10/2021 | Li | G06T 7/70 |
| 2022/0137713 | A1* | 5/2022 | Hu | G06F 3/0304 715/722 |
| 2022/0197392 | A1* | 6/2022 | Zhou | G06F 3/017 |
| 2022/0206586 | A1* | 6/2022 | Yitzhak | G02B 27/0093 |
| 2022/0206587 | A1* | 6/2022 | Da-Yuan | G06F 3/014 |
| 2022/0206588 | A1* | 6/2022 | Canberk | G06T 19/006 |
| 2022/0253144 | A1* | 8/2022 | Hu | G06Q 20/3274 |
| 2022/0269351 | A1* | 8/2022 | Wu | G06V 40/28 |
| 2023/0145592 | A1* | 5/2023 | Singh | H04N 21/42204 715/863 |
| 2023/0244320 | A1* | 8/2023 | Tang | B60K 35/28 345/156 |
| 2023/0252737 | A1* | 8/2023 | Dreyer | G06F 3/017 345/633 |
| 2023/0341932 | A1 | 10/2023 | Silva et al. | |
| 2023/0353862 | A1* | 11/2023 | Yi | H04N 23/611 |
| 2024/0094825 | A1* | 3/2024 | Chen | G06V 40/28 |
| 2024/0152256 | A1* | 5/2024 | Dascola | G06F 3/0482 |
| 2024/0338085 | A1* | 10/2024 | Zeng | G06F 3/017 |
| 2024/0427869 | A1* | 12/2024 | Paul | G06F 21/32 |

OTHER PUBLICATIONS

Advisory Action mailed Sep. 12, 2024 for U.S. Appl. No. 18/364,396, filed Aug. 2, 2023, 3 pages.
Office Action mailed Nov. 20, 2024 for U.S. Appl. No. 18/364,396, filed Aug. 2, 2023, 11 pages.
European Search Report for European Patent Application No. 23191848.3 dated Dec. 22, 2023, 06 pages.
European Search Report for European Patent Application No. 23191852.5 dated Dec. 14, 2023, 08 pages.
Non-Final Office Action mailed Feb. 15, 2024 for U.S. Appl. No. 18/364,396, filed Aug. 2, 2023, 10 pages.
Notice of Allowance mailed Mar. 14, 2025 for U.S. Appl. No. 18/364,396, filed Aug. 2, 2023, 11 pages.
Notice of Allowance mailed Mar. 28, 2025 for U.S. Appl. No. 18/364,396, filed Aug. 2, 2023, 3 pages.

* cited by examiner

MULTI-STAGE GESTURES DETECTED BASED ON NEUROMUSCULAR-SIGNAL SENSORS OF A WEARABLE DEVICE TO ACTIVATE USER-INTERFACE INTERACTIONS WITH LOW-FALSE POSITIVE RATES, AND SYSTEMS AND METHODS OF USE THEREOF

PRIORITY AND RELATED APPLICATIONS

This application claims priority to:
U.S. Provisional Patent Application No. 63/399,187, entitled "Navigating a User Interface Using In-Air Gestures Detected Via Neuromuscular-Signal Sensors of a Wearable Device, and Systems and Methods of Use Thereof" filed Aug. 18, 2022;
U.S. Provisional Patent Application No. 63/399,188, entitled "Multi-Stage Gestures Detected Based on Neuromuscular-Signal Sensors of a Wearable Device to Activate User-Interface Interactions with Low-False Positive Rates, and Systems and Methods of Use Thereof" filed Aug. 18, 2022;
U.S. Provisional Patent Application No. 63/414,880, entitled "Multi-Stage Gestures Detected Based on Neuromuscular-Signal Sensors of a Wearable Device to Activate User-Interface Interactions with Low-False Positive Rates, and Systems and Methods of Use Thereof" filed Oct. 10, 2022; and
U.S. Provisional Patent Application No. 63/414,884, entitled "Navigating a User Interface Using In-Air Gestures Detected Via Neuromuscular-Signal Sensors of a Wearable Device, and Systems and Methods of Use Thereof" filed Oct. 10, 2022,
each of which is hereby incorporated by reference in its entirety.

TECHNICAL FIELD

The present disclosure relates generally to wearable devices (e.g., wrist-wearable devices and head-wearable devices) and methods for detecting different types of gestures using wearable devices, and more particularly wearable devices configured to detect neuromuscular-based signals corresponding to multi-stage in-air gestures (e.g., gestures performed in distinct stages by a user's digits without contacting any electronic devices, thereby helping to ensure low-false positive rates by, for instance, having a priming gesture at a first stage of the multi-stage gesture trigger a gesture interaction, followed by a control stage with a control gesture at a last stage of the multi-stage gesture).

BACKGROUND

Users typically carry a number of electronic devices to assist them in their daily lives. For example, users carry smartphones, smartwatches, and other electronic devices that help make the users' days run more smoothly, e.g., by allowing them to send messages and emails, and to capture images and take notes. In order to perform certain operations on these devices (such as taking a photo or sending an email), a user may need to perform multiple operations on the display or keyboard of the device. Additionally, many devices require a user to open/setup their device and physically interact with it, which takes away from the user's experience and can lead to inefficient man-machine interfaces that waste limited computing and power resources, particularly for wearable devices. Further, devices that are responsive to user gestures suffer from false positives where the devices respond to inadvertent user gestures, which also takes away from the user's experience and can also lead to inefficient man-machine interfaces that waste limited computing and power resources, particularly for wearable devices. These potential issues can occur in the context of gestures detected based on neuromuscular signals as a user's movement of their hands during daily interactions can falsely trigger gesture sequences that were unintended.

As such, it would be desirable to address one or more of the above-identified issues, drawbacks, or areas for further exploration.

SUMMARY

As discussed above, there is a need for a wearable device that can detect multi-stage in-air gestures to control an electronic device without needing to physically interact with the electronic device or require a large open space for user gestures. In particular, by splitting gesture sequences into priming and control stages, with the priming stage used to trigger a gesture sequence and the control stage used to confirm an intention to proceed with that gesture sequence, users are provided with an intuitive, easy-to-remember way to use in-air hand gestures to control wearable devices with a low rate of false positives (e.g., a false positive rate of less than 4%). In one example, a priming gesture can include a press-and-hold of the user's middle finger and thumb (which can then cause activation of a user interface, such as by causing display of a menu of options, followed by a navigation gesture that can include rotational movement of a user's wrist to move between the menu of options, followed by a control gesture (e.g., release of the press-and-hold gesture) to cause execution of a command associated with a currently in-focus option when the control gesture is received. As this one example shows, a user is provided with the ability to prime gesture interactions, such that if an unintended gesture interaction is primed, they are easily able to back out of that gesture sequence should that sequence have been unintentionally activated.

The systems (e.g., wearable devices) and methods described herein address at least some of the above-mentioned drawbacks by allowing a user to efficiently interact with a user interface using gestures detected by the one or more wearable devices (e.g., a wrist-wearable device) that include sensors for detecting gestures performed by the user. The sensors at the wearable devices can include electromyography (EMG) sensors (e.g., to detect muscular responses), inertial measurement unit (IMU) sensors, and time-of-flight sensors (e.g., to detect spatial distances).

As described herein, a multi-stage in-air gesture performed by the user can correspond to an operation to control one or more wearable devices (e.g., a head-wearable device, wrist-wearable device, smartphone, and/or intermediary device). For example, a pinch gesture (e.g., using the thumb and the pinky) performed by the user at a wrist-wearable device can cause the presentation of a menu on a head-wearable device. Furthermore, releasing that gesture could select a user interface element within the menu.

The wearable devices described herein, after receiving or detecting the user's multi-stage in-air gestures, can provide data to a computing device which causes the computing device to perform operations at a head-wearable device or other electronic device. The computing device can be another wearable device or an intermediary device (e.g., a smartphone). In some instances, the wearable device (or an intermediary device) is configured to cause operations to be performed at other electronic devices, such as a smartphone.

In this way, a multi-stage in-air gesture performed by the user can directly cause operations to be performed to control one or more electronic devices. Other multi-stage in-air gestures performed by the user can perform automatic operations, either at a head-wearable device, or at another electronic device. For example, a multi-stage in-air gesture (e.g., a pinch, tap, and snap gesture) performed by the user can initiate an automatic operation such as capturing a photo or video. In this example, the use of multiple stages for the gesture prevents the user from unintentionally capturing images when the user inadvertently performs a pinch, tap, or snap gesture, or performs the gesture as part of an activity unrelated to photo taking.

As an illustrative example, suppose a person, Robin, is walking in a park and wants to quickly capture an image of a nearby bird before it flies away. Conventionally, Robin would need to pull out her mobile phone or other imaging device to take the photo. Additionally, after Robin retrieves her mobile phone or camera, she will need to perform a plurality of operations to take the photo. During this process, the bird may be startled and fly away before Robin can capture the image.

A system described herein allows Robin to quickly capture an image without needing to perform a plurality of operations at a user interface or make large gestures (that may startle the bird). In this example, Robin can take a photo and/or navigate a user-interface with small in-air gestures that are detected by sensors at one or more wearable devices. This approach to image capture is quick and efficient for Robin and can save energy at the wearable devices (e.g., a display is not required, nor is navigation of multiple graphical user interfaces). The photo can be displayed to Robin on a head-wearable device, the wrist-wearable device, a smartphone, and/or any other intermediary device. In this way, Robin is provided a hands-free method of capturing the image quickly and efficiently.

Suppose Robin can capture the image of a bird by performing a tap gesture (e.g., tapping one finger on another finger). While the tap gesture is convenient and easy for Robin to perform, this can cause an additional problem of accidently capturing inadvertent photos due to the ease of the gesture. However, if Robin instead uses a multi-stage in-air gesture such as a pinch, followed by a tap, then followed by a snap, Robin would be able to capture an image quickly and efficiently, whilst avoiding accidental photos. Using multi-stage in-air gestures also eliminates the Robin needing to perform a plurality of operational steps on a graphical user interface to capture the image.

To continue the example, suppose that after capturing an image, Robin wants to send the captured image to a friend. Conventionally, Robin would need use a smartphone or other intermediary device to send the captured image. Additionally, Robin would likely need to perform a plurality of operational steps on a graphical user interface to send the email. With the system described herein, Robin could use another in-air hand gesture to send the captured image without needing to utilize another electronic device such as a smartphone and/or laptop. In this example, Robin could perform the multi-stage in-air gesture to share the captured image with her friend without navigating multiple menus and/or graphical user interfaces on a smartphone or other intermediary device.

These improvements allow for the wearable devices to be designed such that they are comfortable, functional, practical, and socially acceptable for day-to-day use. Further, these improvements allow users to interact with wearable devices and/or user interface without requiring direct physical contact with any of the devices. Further, the user can also use specify certain multi-stage in-air gestures to modify which electronic device is being interacted with. All this furthers the goal of getting more users to adopt emerging technologies in the artificial-reality (AR and VR) spaces for more use cases, especially beyond just gaming uses in large open spaces.

Further, the systems and methods described herein can allow for a more efficient and simplified man-machine interface, because they can provide a user with a means for interacting with electronic devices and digital mediums without inconveniencing the user or requiring the user to physically interact with any electronic devices. Therefore, the improvements simplify the user interface by providing fewer visual elements and simplify user input for interacting with such interfaces. For example, a single operation, as described herein, is capable of being executed by at least a multi-stage in-air gesture, and each variation of multi-stage in-air gesture can have its own independent operation, further defining the potential modes of interaction available to the user. Therefore, the user can execute more operations without dealing with the inconvenience of scrolling through menus or user interface elements. Some of the gestures and operations described herein can be performed without any user interfaces being displayed, which allows users to interact with digital technology more seamlessly as they perform their daily tasks in the physical world.

In accordance with some embodiments, a method is provided for using a multi-stage in-air hand gesture detected at a wrist wearable device to activate user-interface interactions. The method includes receiving, via one or more sensors of a wrist-wearable device worn by a user, data generated from performance of a multi-stage in-air hand gesture by the user. The method also includes, in accordance with a determination that a first stage of the multi-stage in-air hand gesture is a priming gesture, activating a user interface, and in accordance with a determination that a second stage of the multi-stage in-air hand gesture is a control gesture received within a predefined threshold amount of time of the priming gesture, executing a command for the user interface that corresponds to the control gesture.

In accordance with some embodiments, a method is provided for using a gating in-air hand gesture for interacting with a user interface. The method includes while a gating in-air hand gesture is maintained, receiving a first indication of performance of an adjustment in-air hand gesture of a first magnitude, the adjustment in-air hand gesture of the first magnitude being directed to a user interface object presented via a head-wearable device, the user interface object associated with a plurality of values. The method also includes, in response to receiving the first indication of the performance of the adjustment in-air hand gesture of the first magnitude, adjusting the user interface object to have a first state after moving through some of the plurality of values based on the first magnitude. The method further includes, after receiving an indication of a release of the gating in-air hand gesture, in response to receiving a second indication of performance of the adjustment in-air hand gesture, forgoing adjusting the user interface object such that the user interface object continues to have the first state. The method also includes, while the gating in-air hand gesture is again maintained, receiving a third indication of performance of the adjustment in-air hand gesture of a second magnitude, distinct from the first magnitude, the adjustment in-air hand gesture of the second magnitude being directed to the user interface object while it has the first state. The method additionally includes, in response to receiving the third indication of the performance of the adjustment in-air hand gesture of the second magnitude, adjusting the user interface object to move through more of the plurality of values based on the second magnitude such that the user interface object has a second state, distinct from the first state.

In accordance with some embodiments, a method is provided for using a multi-stage in-air hand gesture for user-interface interactions. The method includes receiving, via one or more sensors of a wrist-wearable device worn by a user, data generated from performance of a multi-stage in-air hand gesture by the user. The method also includes, in accordance with a determination that a first stage of the multi-stage in-air hand gesture is a priming gesture, identifying an initial position of a body part of the user. The method further includes, in accordance with a determination that a second stage of the multi-stage in-air hand gesture is a navigation gesture, navigating through a user interface based on a change in position of the body part from the initial position during performance of the navigation gesture, wherein a navigation speed is based on the change in position of the body part.

In some embodiments, a computing device (e.g., a wrist-wearable device or a head-wearable device, or an intermediary device, such as a smartphone or desktop or laptop computer that can be configured to coordinate operations at the wrist-wearable device and the head-wearable device) includes one or more processors, memory, a display (in some embodiments, the display can be optional, such as for certain example intermediary devices that can coordinate operations at the wrist-wearable device and the head-wearable device, and thus have ample processing and power resources, but need not have its own display), and one or more programs stored in the memory. The programs are configured for execution by the one or more processors. The one or more programs include instructions for performing (or causing performance of) any of the methods described herein (e.g., including methods 800, 850, and 1600 that are described in detail below).

In some embodiments, a non-transitory computer-readable storage medium stores one or more programs configured for execution by a computing device (e.g., a wrist-wearable device or a head-wearable device, or an intermediary device, such as a smartphone or desktop or laptop computer that can be configured to coordinate operations at the wrist-wearable device and the head-wearable device) having one or more processors, memory, and a display (in some embodiments, the display can be optional, such as for certain example intermediary devices that can coordinate operations at the wrist-wearable device and the head-wearable device, and thus have ample processing and power resources, but need not have its own display). The one or more programs include instructions for performing (or causing performance of) any of the methods described herein (e.g., including methods 800, 850, and 1600 that are described in detail below).

Thus, methods, systems, and computer-readable storage media are disclosed for neuromuscular-signal-based detection of in-air hand gestures. Such methods and systems may complement or replace conventional methods for gesture detection.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 16A, 16B-1, 16B-2, and 16C illustrate example artificial-reality systems in accordance with some embodiments.

In accordance with common practice, the various features illustrated in the drawings are not necessarily drawn to scale, and like reference numerals can be used to denote like features throughout the specification and figures.

DETAILED DESCRIPTION

Embodiments of this disclosure may include or be implemented in conjunction with various types or embodiments of artificial-reality systems. Artificial reality constitutes a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems include a near-eye display (NED), which provides visibility into the real world or that visually immerses a user in an artificial reality. While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user, devices worn by one or more other users, and/or any other suitable external system.

As an example, suppose Robin wants to open a video player application to play audiovisual content via her augmented reality glasses. Conventionally, Robin would need to manipulate buttons on her glasses, or pull out a connected electronic device and navigate on a touch display or keyboard to open the video player application. Additionally, Robin would likely need to perform multiple discrete steps to find and open the application. Furthermore, if Robin is in a public space, it may be socially unacceptable to use voice commands or large gestures to open the application. With the systems described here, Robin could use a single multi-stage in-air hand gesture present a menu, navigate to the video player application within the menu, and open it. For example, performing a pinch gesture could display the menu, movement of the wrist could allow navigation through the menu, and releasing the pinch could activate the icon for the video player application. The gestures in this example are small and unobtrusive, not requiring an open space for Robin to maneuver or manipulation of handheld devices.

Figure 1A:
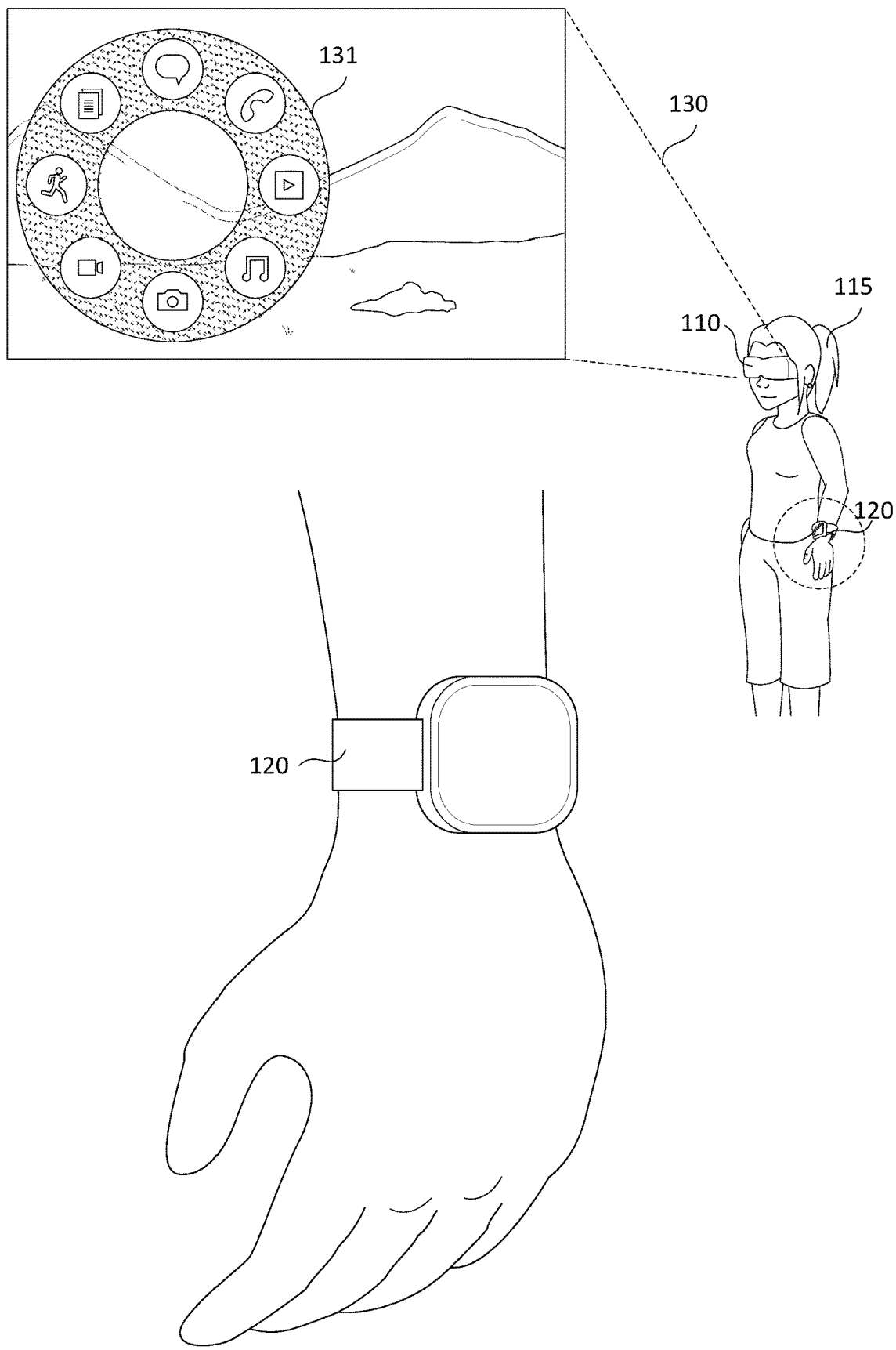
FIGS. 1A-1F illustrate an example user scenario of interacting with an artificial-reality system (e.g., including at least a virtual reality headset and a wrist-wearable device) in accordance with some embodiments.

FIGS. 1A-1F illustrate an example user scenario of interacting with an artificial-reality system in accordance with some embodiments. The user 115 in FIG. 1A is wearing a head-wearable device 110 (e.g., a virtual reality headset) and a wrist-wearable device 120 (e.g., a smartwatch). In some embodiments, the wrist-wearable device 120 is an instance of the wrist-wearable device 6000. In some embodiments, the head-wearable device 110 is an instance of the augmented-reality system 7000. The user 115 in FIG. 1A is viewing a scene 130 that includes a radial menu 131. In the example of FIG. 1A, the user 115 is not performing a gesture.

Figure 1B:
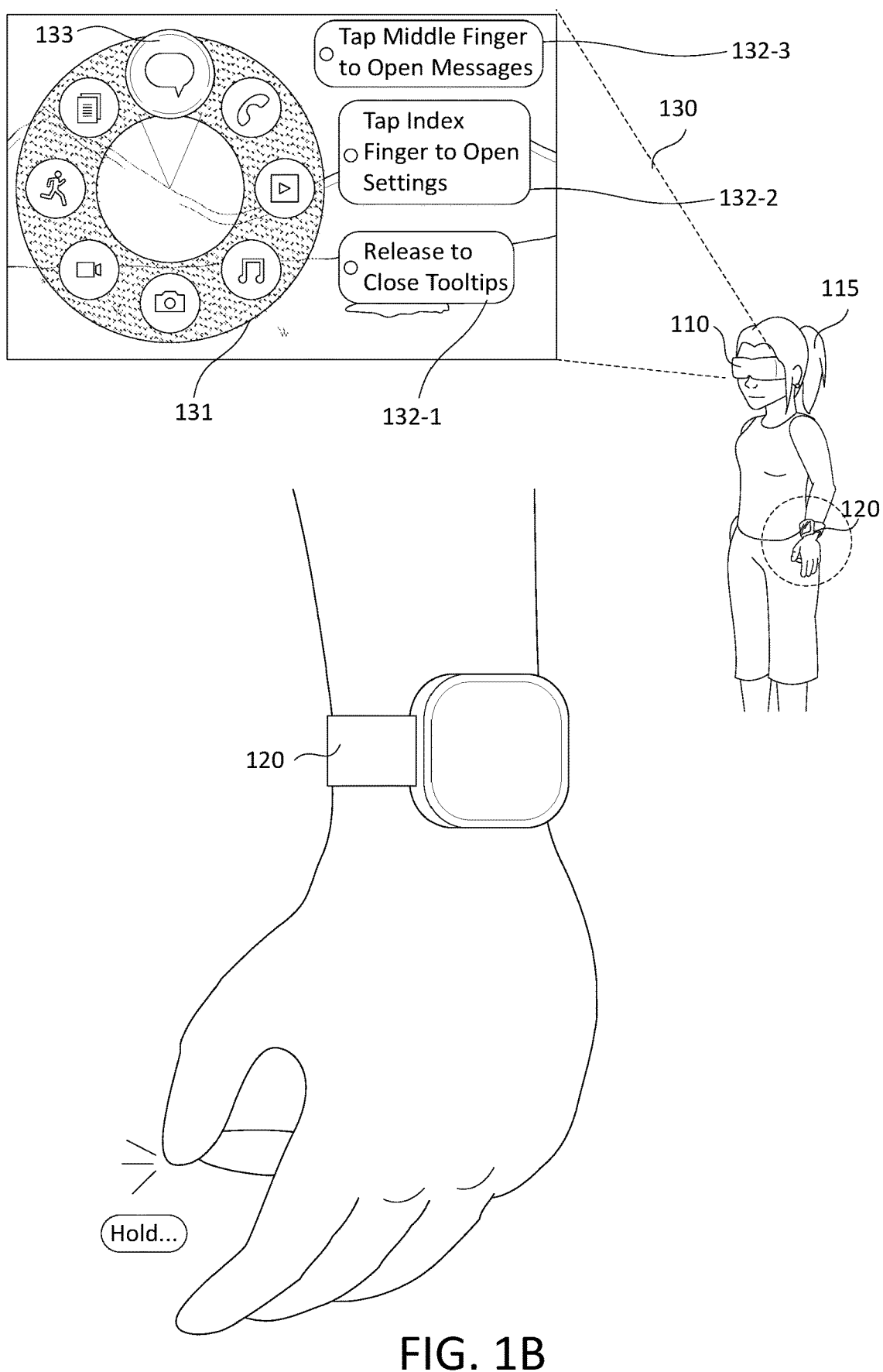

FIG. 1B shows the user 115 performing a pinch gesture (e.g., a priming gesture) that involves the user's pinkie finger contacting the thumb. FIG. 1B further shows the scene 130 updating (responsive to the pinch gesture) to include multiple options (e.g., tooltips) for interacting with a user interface element 133 (e.g., corresponding to a messenger application) on the radial menu 131. In the example of FIG. 1B, the options include an option 132-1 for closing the tooltips (by releasing the pinch gesture), an option 132-2 for opening a settings menu (by tapping the index finger to the pinch), and an option 132-3 for opening messages (by tapping the middle finger to the pinch).

Figure 1C:
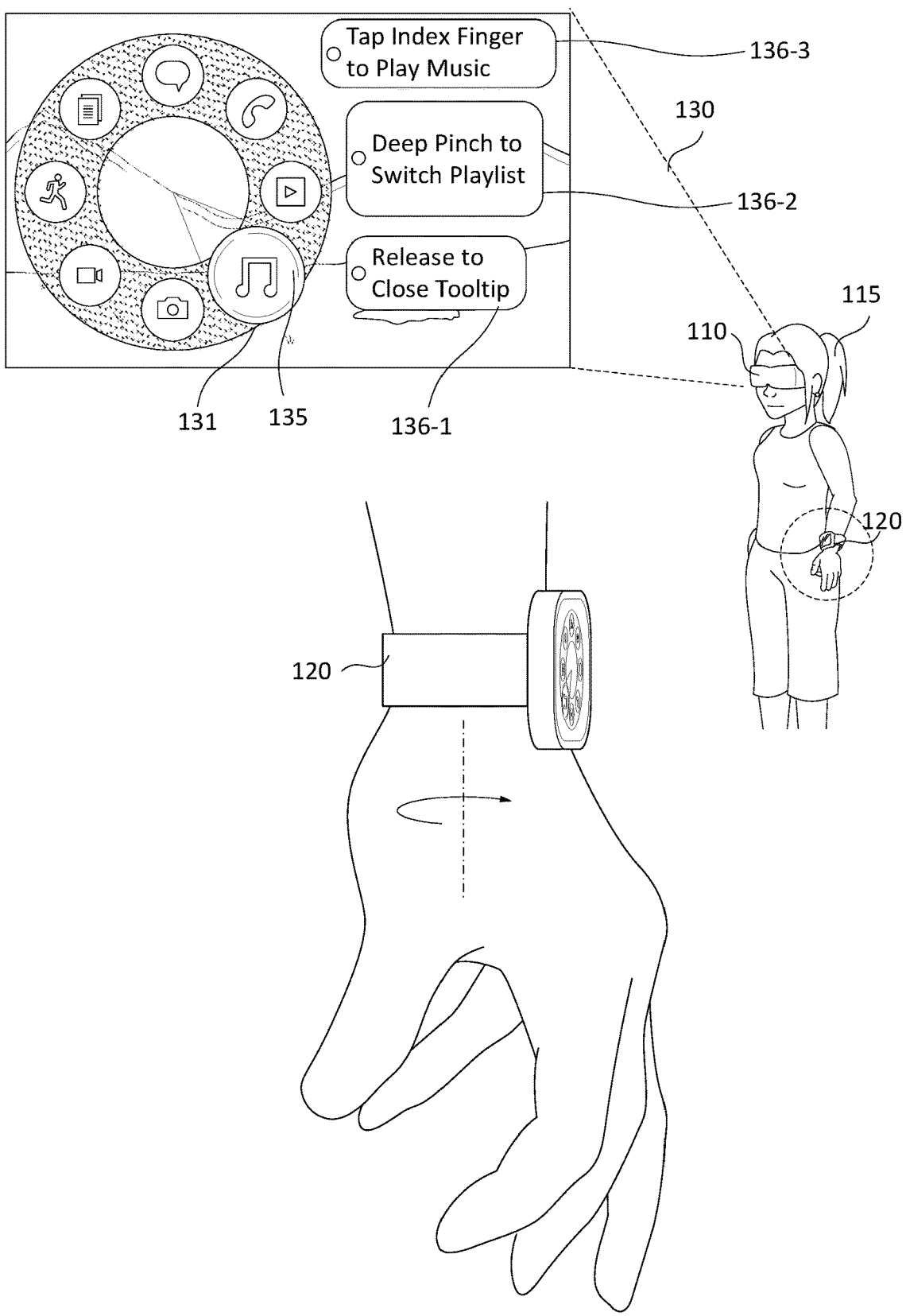

FIG. 1C shows the user 115 rotating their wrist (e.g., a navigation gesture) while maintaining the pinch gesture from FIG. 1B. FIG. 1C further shows selection of a user interface element 135 (e.g., a music application) within the radial menu 131 in accordance with wrist rotation. The options 136 shown in FIG. 1C correspond to interactions with the user interface element 135, and include an option 136-1 for closing the tooltips (by releasing the pinch gesture), an option 136-2 for switching the playlist (by increasing a force of the pinch gesture to meet certain criteria), and an option 136-3 for playing music (by tapping the index finger to the pinch).

Figure 1D:
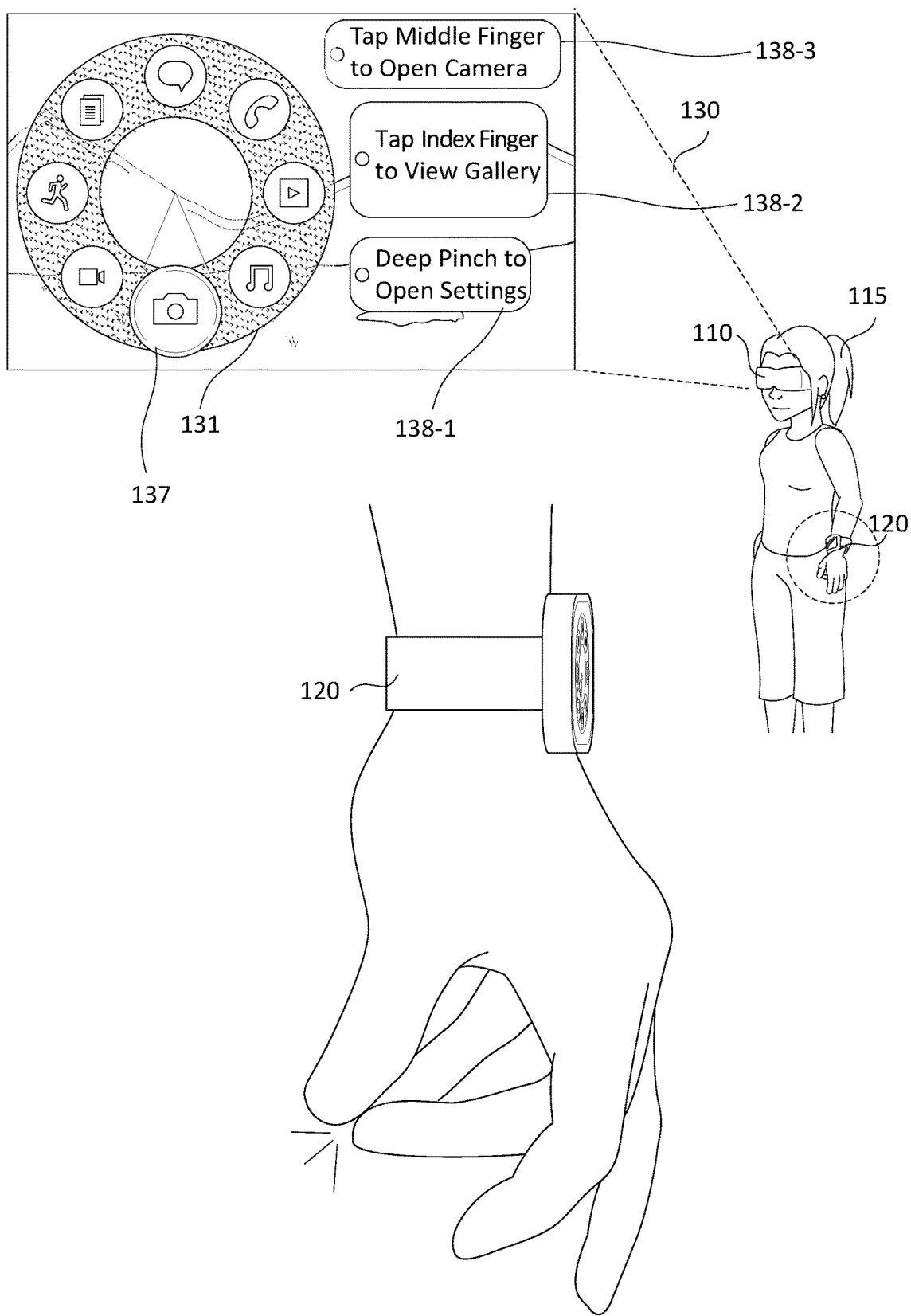

FIG. 1D shows selection of a user interface element 137 (e.g., a camera application) within the radial menu 131 in accordance with wrist rotation. The options 138 shown in FIG. 1D correspond to interactions with the user interface element 137, and include an option 138-1 for opening a settings menu (by increasing a force of the pinch gesture to meet certain criteria), an option 138-2 for viewing the user's gallery of images (by tapping the index finger to the pinch), and an option 138-3 for opening the camera capture mode (by tapping the middle finger to the pinch). FIG. 1D further shows the user 115 tapping their middle finger to the pinch to open the camera in capture mode (e.g., a control gesture).

Figure 1E:
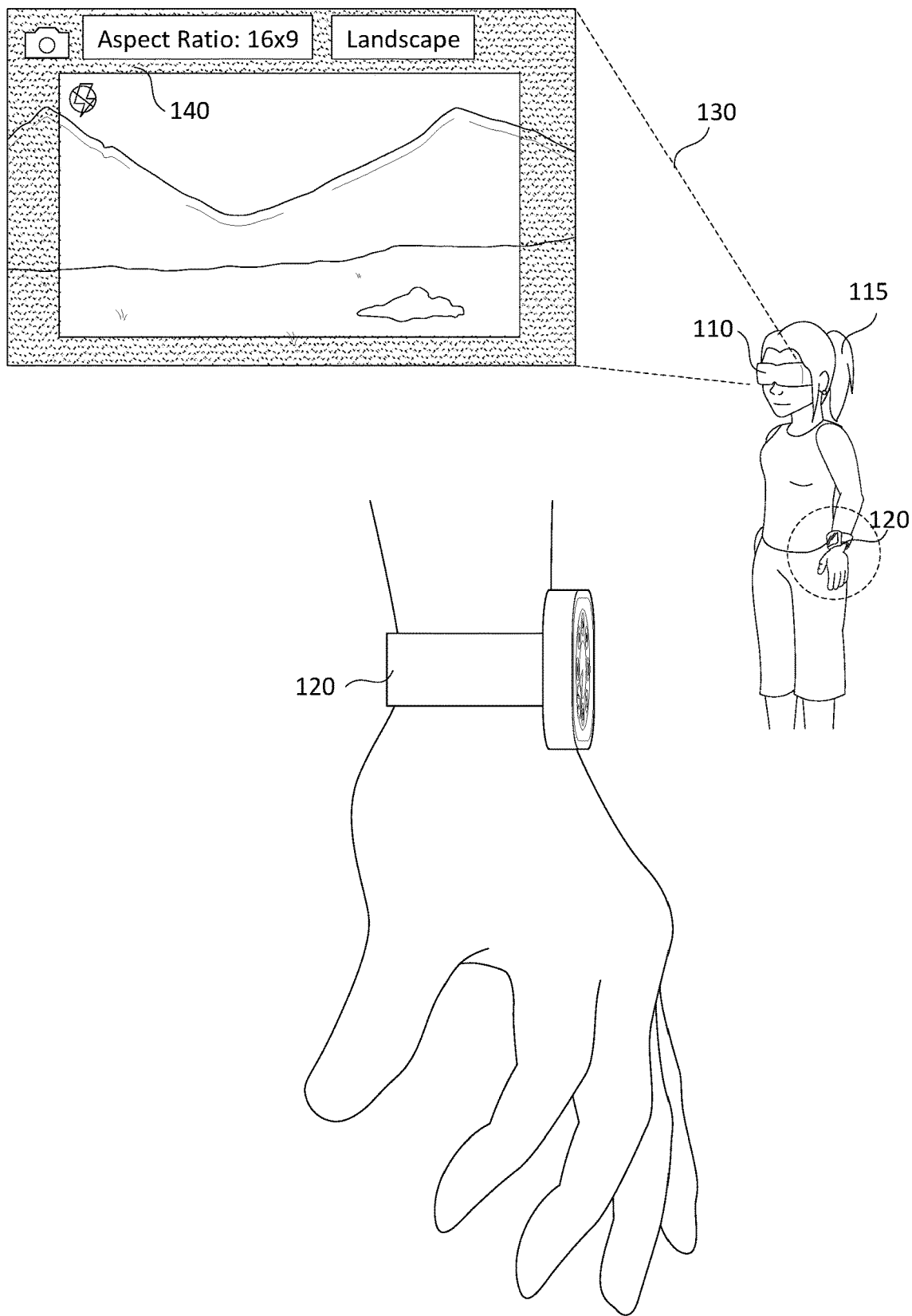

The user 115 in FIG. 1E is viewing the scene 130 with the camera application user interface 140 active (e.g., the camera application is active and in capture mode). In the example of FIG. 1E, the user 115 is not performing a gesture (e.g., has released the pinch gesture). In some embodiments, the radial menu 131 is no longer displayed in accordance with the user performing the tap gesture in FIG. 1D (e.g., a completion of a multi-stage gesture). In some embodiments, the radial menu 131 is no longer displayed in accordance with the user releasing the pinch gesture (e.g., the middle tap in FIG. 1D opens the camera user interface 140 and releasing the pinch gesture closes the radial menu 131).

Figure 1F:
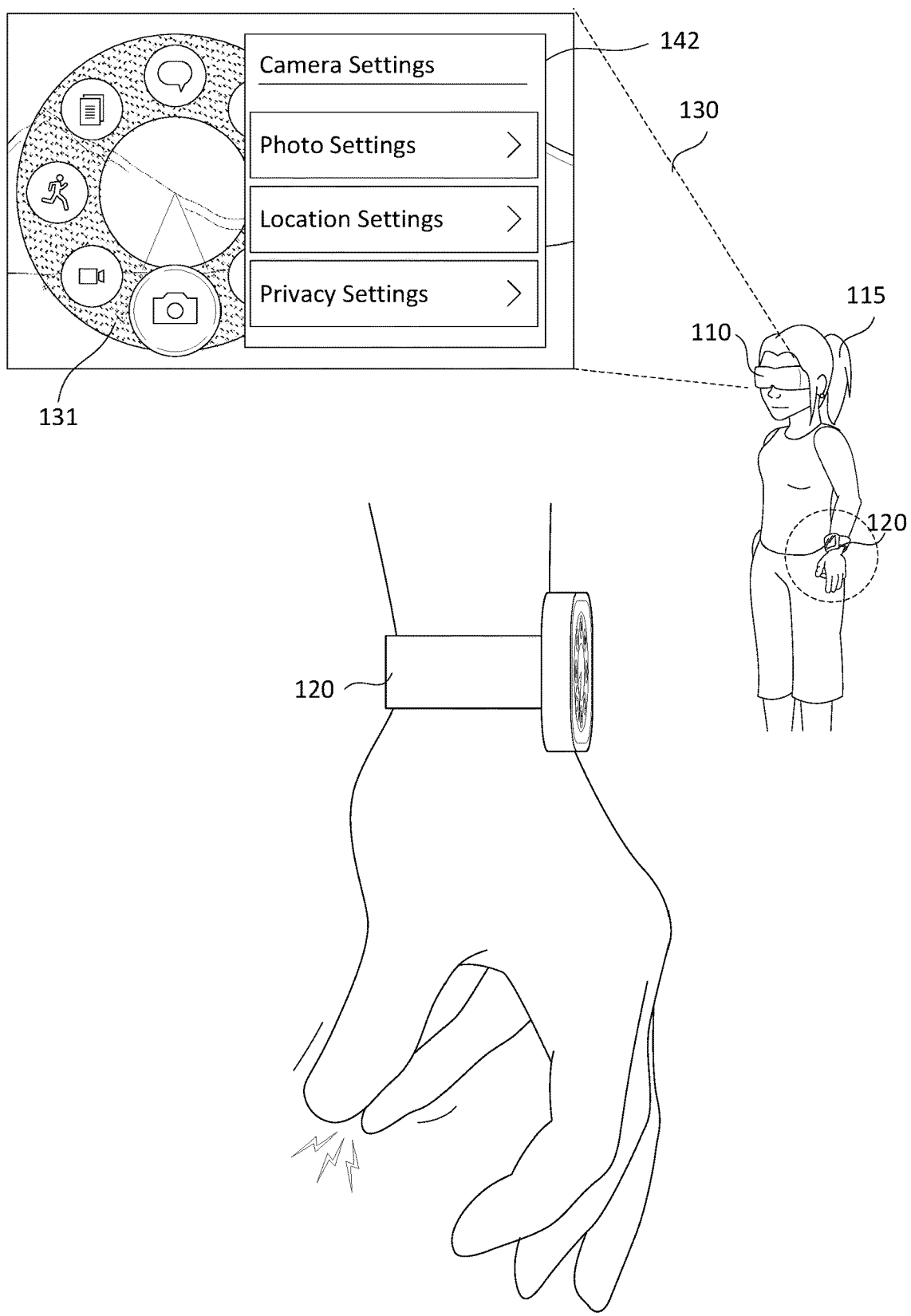

FIG. 1F illustrates an alternative from FIG. 1D where the user is performing a deep pinch (having a corresponding force that meets one or more predefined criteria) instead of tapping their middle finger. The user 115 in FIG. 1F is viewing the scene 130 with the camera settings user interface 142 active (e.g., the camera settings user interface is a menu with multiple settings options). In the example of FIG. 1F, the user 115 is maintaining the pinch gesture and the radial menu 131 is still displayed (behind the settings user interface 142). In some embodiments, the radial menu 131 is no longer displayed in accordance with the user performing the deep pinch gesture (e.g., the deep pinch gesture is a control gesture, and the radial menu ceases to be displayed in response to a control gesture being performed). Although FIGS. 1A-1F are shown as being performed by the user 115 wearing the head-wearable device 110, in some embodiments, the user 115 is wearing a different type of display (e.g., AR glasses or lenses) and in some embodiments, the user 115 is interacting with a user interface on a non-wearable display (e.g., a television or monitor display).

In some embodiments, the wrist-wearable device 120 and/or the head-wearable device 110 provides visual, audio, and/or haptic feedback to the user to indicate that a performed gesture stage has been detected (e.g., distinct feedback provided in response to each type of gesture).

Figure 2A:
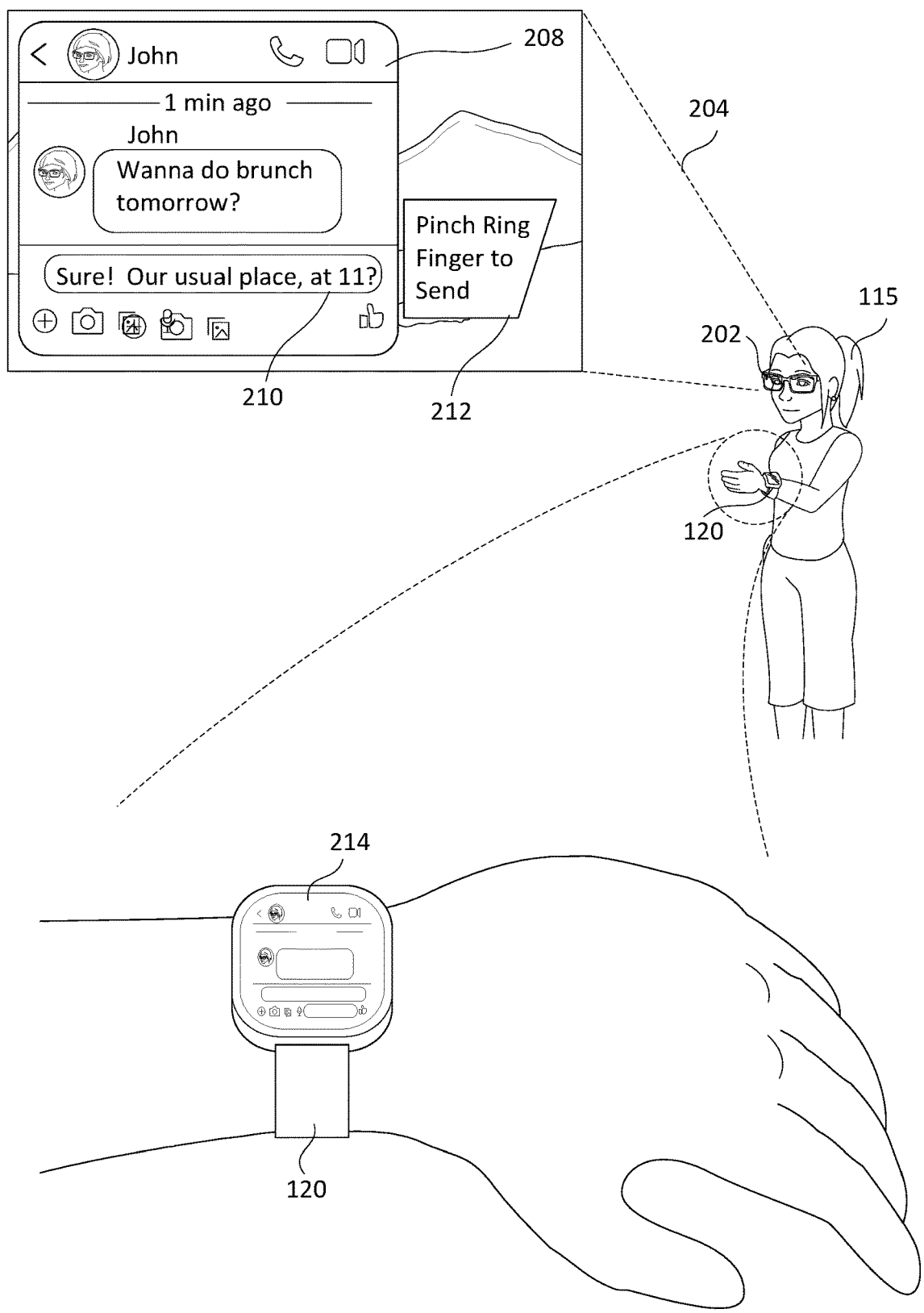
FIGS. 2A-2C illustrate another example user scenario of interacting with an artificial-reality system (e.g., including at least augmented-reality glasses and a wrist-wearable device) in accordance with some embodiments.
Figure 2B:
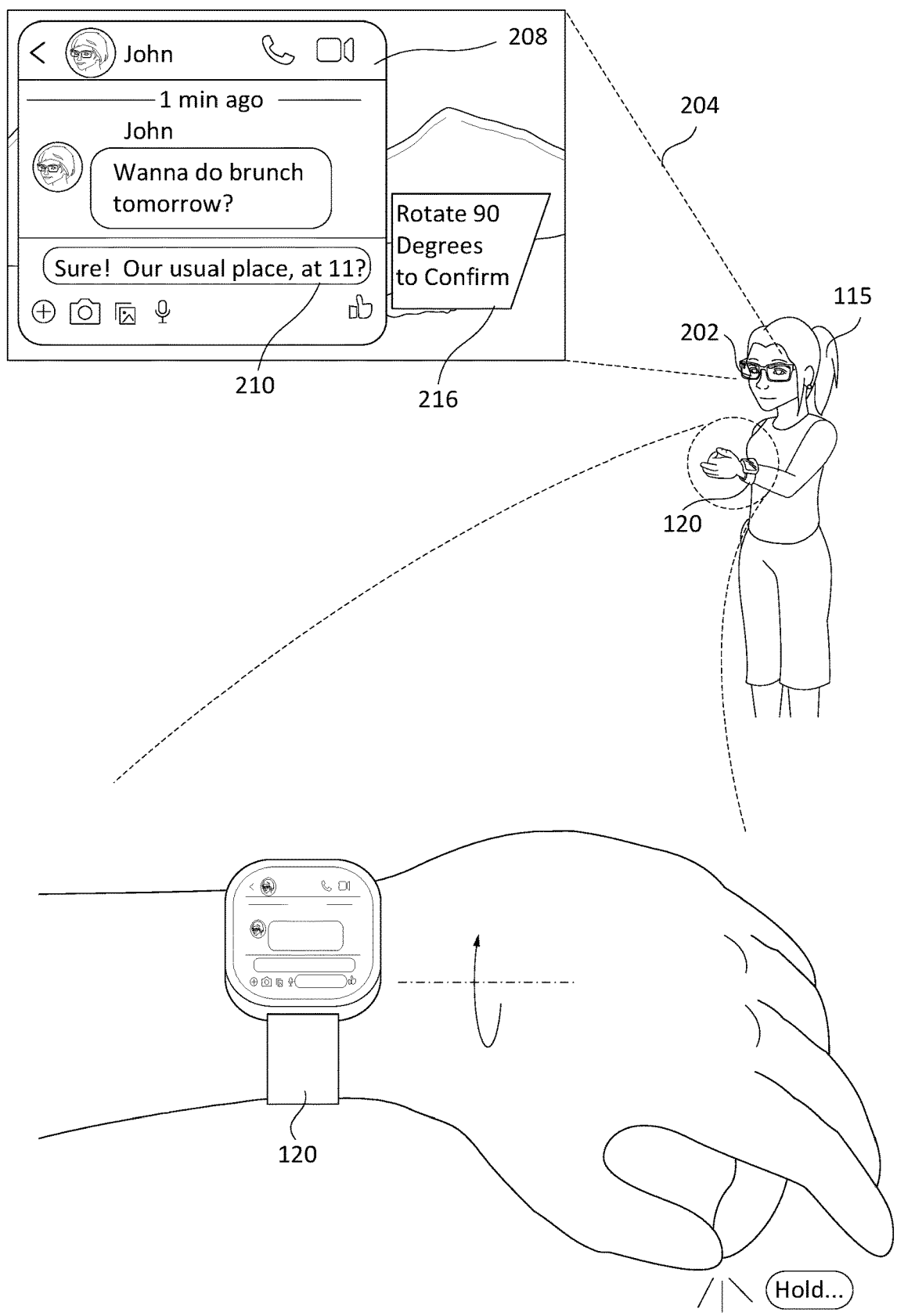
Figure 2C:
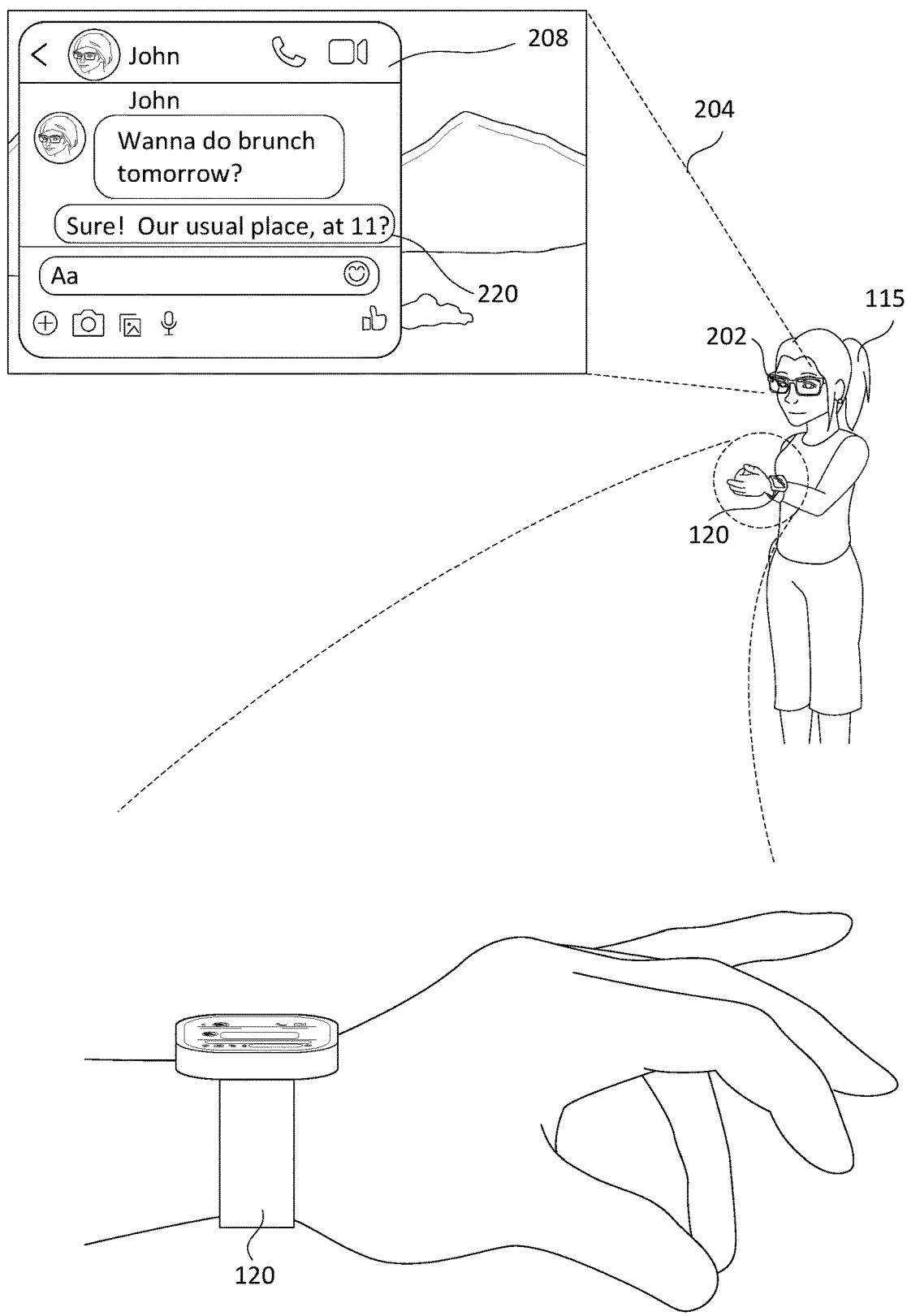

FIGS. 2A-2C illustrate another example user scenario of interacting with an artificial-reality system in accordance with some embodiments. The user 115 in FIG. 2A is wearing a head-wearable device 202 (e.g., augmented reality glasses) and a wrist-wearable device 120 (e.g., a smartwatch). In some embodiments, the head-wearable device 202 is an instance of the augmented-reality system 7000. The user 115 in FIG. 2A is viewing a scene 204 that includes a communication interface 208 with a user message 210 and a notification 212. The notification 212 indicates to the user that a pinch gesture would cause the user message 210 to be sent to a remote user (John). In the example of FIG. 2A, the wrist-wearable device 120 includes a display with a user interface 214 that corresponds to (duplicates) the communication interface 208 (e.g., the user can view (and optionally interact) with either the interface 208 or the interface 214). The user 115 in FIG. 2A is not performing a gesture. In some embodiments, the user 115 is presented with multiple options for actions related to the user message 210. For example, a first priming gesture, such as the ring finger pinch gesture, for sending the message 210 and a second priming gesture, such as a pinkie finger pinch gesture, for deleting the message 210.

FIG. 2B shows the user 115 performing a pinch gesture (e.g., a priming gesture) that involves the user's ring finger contacting the thumb. FIG. 2B further shows the scene 204 updating (responsive to the pinch gesture) to replace the notification 212 in FIG. 2A with a notification 216. The notification 216 indicates to the user that a rotating their wrist would confirm that they want to send the user message 210 to the remote user (John). In some embodiments, the user 115 is presented with multiple options corresponding to different control gestures associated with the priming gesture. For example, a first control gesture, such as the wrist rotation, for confirming the desire to send the message 210 and a second control gesture, such as wrist/hand shake, for displaying send options (e.g., delayed send or conditional send).

FIG. 2C shows the user 115 having rotated their wrist 90 degrees (e.g., a control gesture) while holding the pinch gesture. FIG. 2C further shows the scene 204 with (responsive to the control gesture) an updated communication interface 208 with element 220 indicating that the user message 210 has been sent to the remote user (John). While FIG. 2C shows the user 115 holding the pinch gesture (e.g., the priming gesture) while performing the wrist rotation (e.g., the control gesture), in some embodiments, the user releases the priming gesture prior to performing the control gesture. For example, performing the priming gesture triggers a timer during which the control gesture must occur to confirm the sending of the user message 210. Although FIGS. 2A-2C are shown as being performed by the user 115 wearing the head-wearable device 202, in some embodiments, the user 115 is wearing a different type of display (e.g., a VR headset), and in some embodiments, the user 115 is interacting with a user interface on a non-wearable display (e.g., a television or monitor display).

In some embodiments, the wrist-wearable device 120 and/or the head-wearable device 202 provides visual, audio, and/or haptic feedback to the user to indicate that a performed gesture stage has been detected (e.g., distinct feedback provided in response to each type of gesture).

Figure 3A:
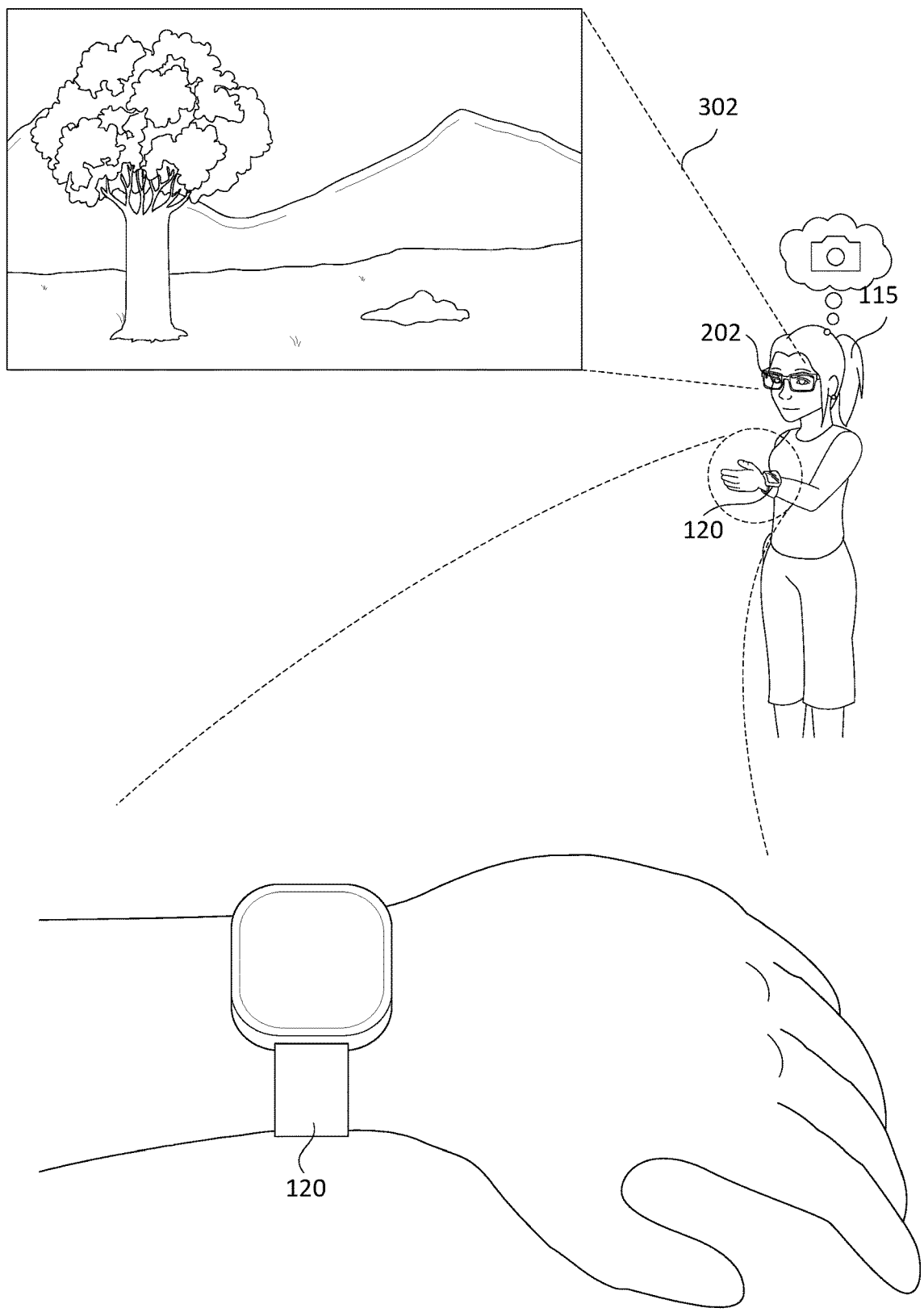
FIGS. 3A-3D illustrate another example user scenario of interacting with an artificial-reality system (e.g., including at least augmented-reality glasses and a wrist-wearable device) in accordance with some embodiments.

FIGS. 3A-3D illustrate another example user scenario of interacting with an artificial-reality system in accordance with some embodiments. The user 115 in FIG. 3A is wearing a head-wearable device 202 (e.g., augmented reality glasses) and a wrist-wearable device 120 (e.g., a smartwatch). The user 115 in FIG. 3A is viewing a scene 302 that includes scenery for which the user wishes to capture a picture. The user 115 in FIG. 3A is not performing a gesture.

Figure 3B:
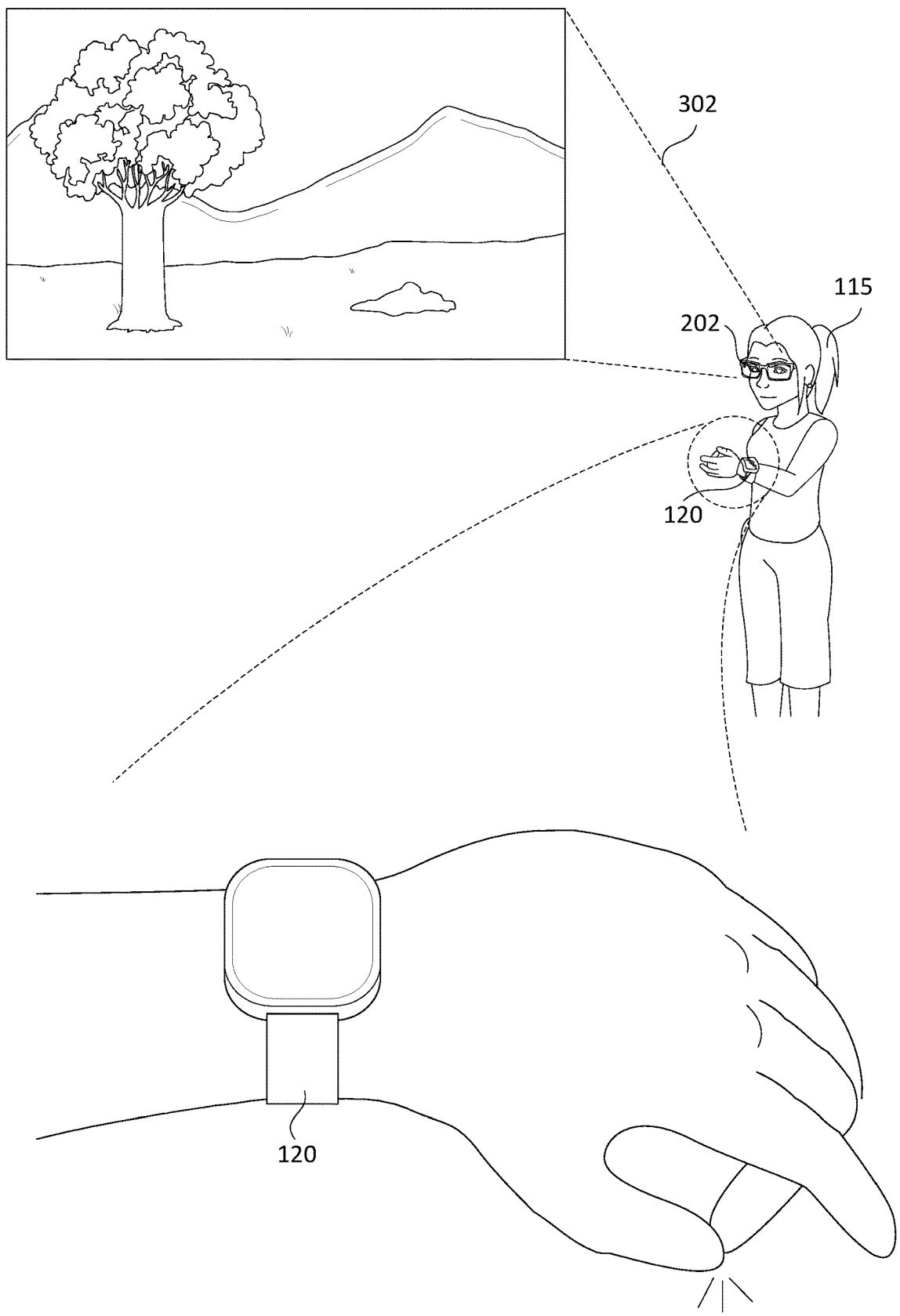

FIG. 3B shows the user 115 performing a pinch gesture (e.g., a priming gesture) that involves the user's middle finger contacting the thumb. Although FIG. 3B does not show a change to the scene 302 in response to the pinch gesture, in some embodiments, the scene 302 (and/or a display of the wrist-wearable device 120) updates to indicate to the user 115 that the pinch gesture was detected. For example, the scene 302 can update to include a tooltip on what control gestures are available given the priming gesture. As another example, the wrist-wearable device 120 and/or the head-wearable device 202 may provide visual, audio, and/or haptic feedback to the user to indicate that the pinch gesture was detected.

Figure 3C:
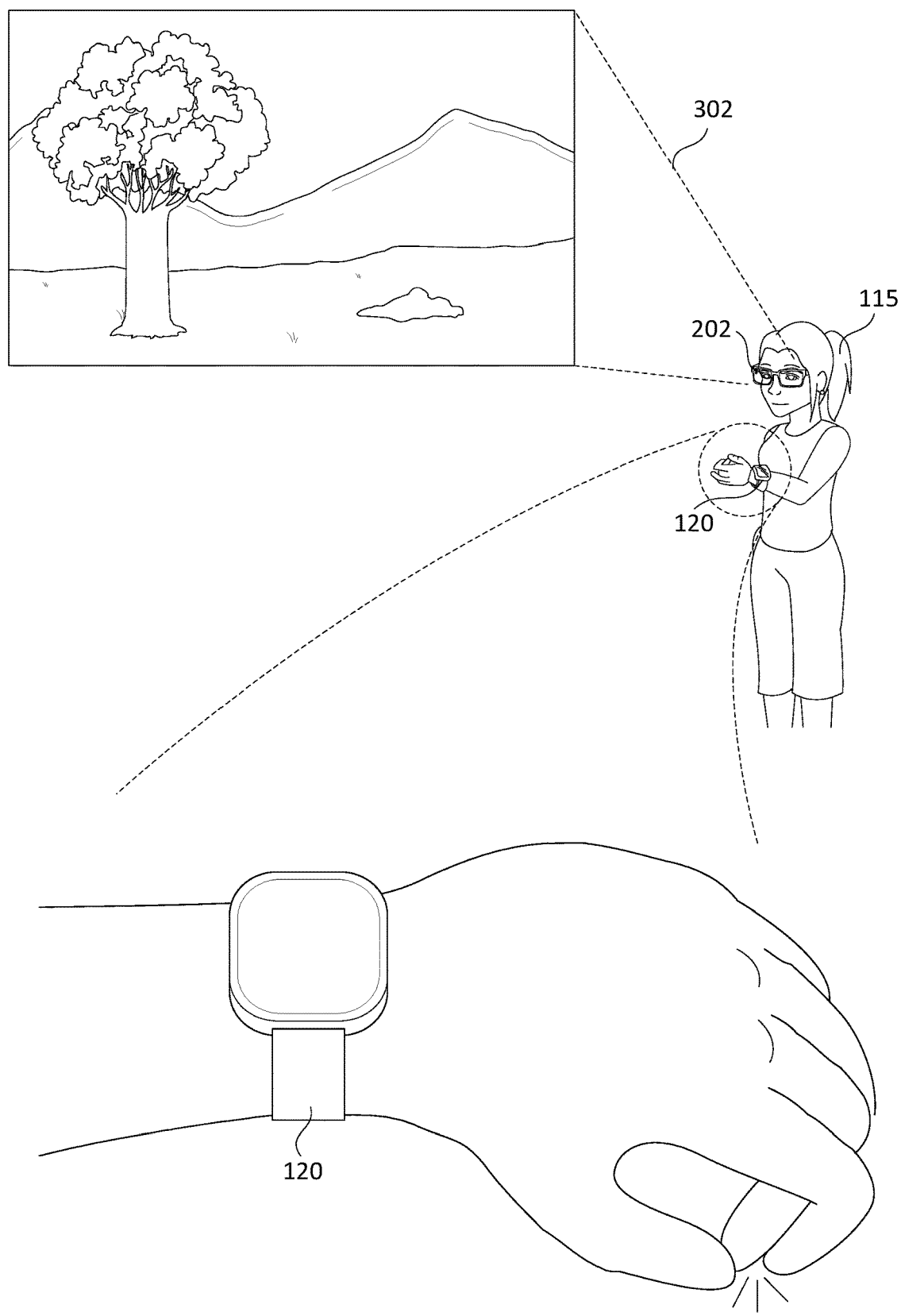

FIG. 3C shows the user 115 performing a tap gesture (e.g., a first stage of a multi-stage control gesture) that involves the user's index finger contacting the middle finger while the pinch gesture from FIG. 3B is maintained. Although FIG. 3C does not show a change to the scene 302 in response to the tap gesture, in some embodiments, the scene 302 (and/or a display of the wrist-wearable device 120) updates to indicate to the user 115 that the tap gesture was detected. For example, the scene 302 can update to include a tooltip on what control gestures are available given the priming and tap gestures. As another example, the wrist-wearable device 120 and/or the head-wearable device 202 may provide visual, audio, and/or haptic feedback to the user to indicate that the tap gesture was detected (e.g., distinct from feedback provided in response to the pinch gesture).

Figure 3D:
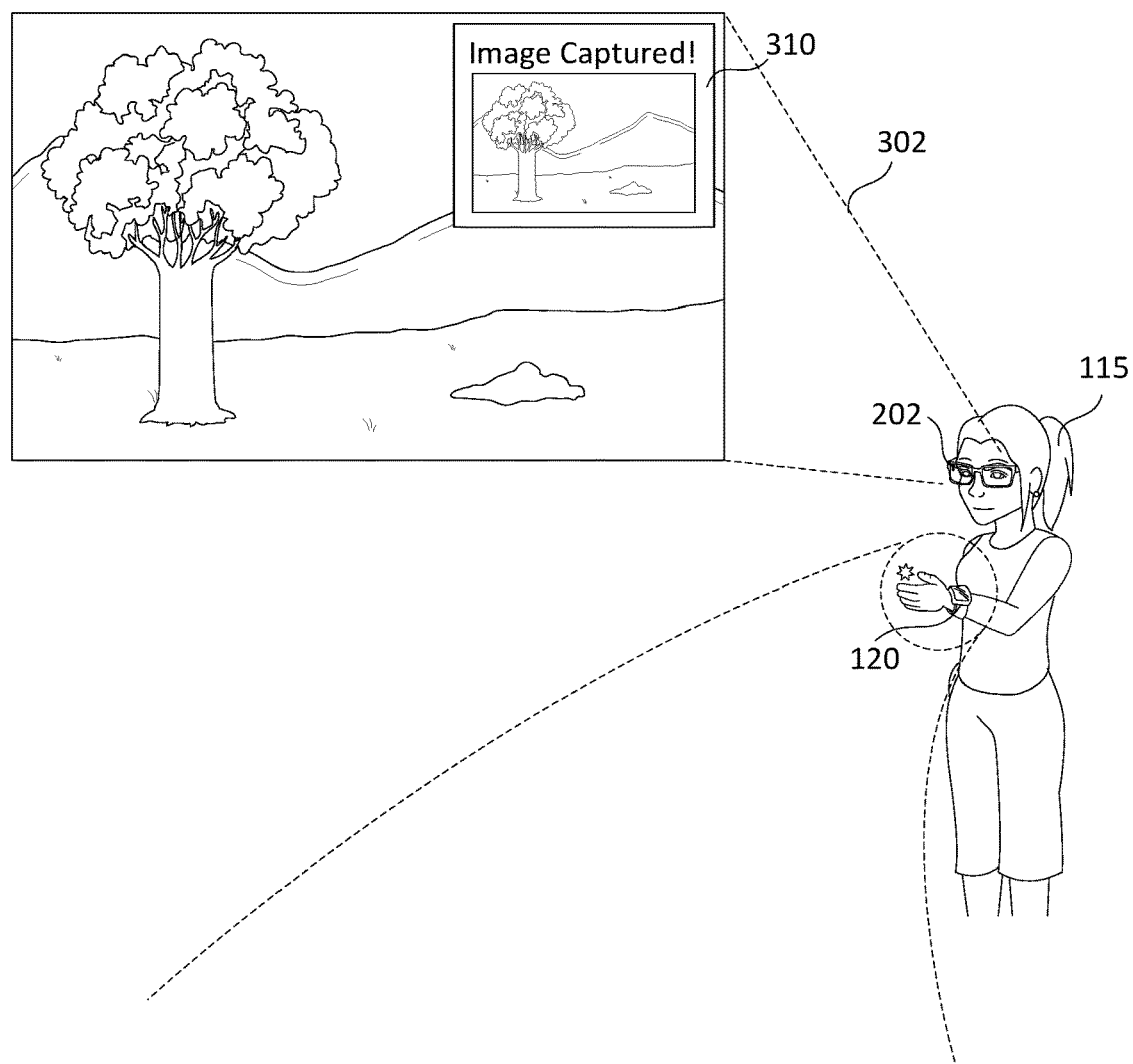
Figure 3D:
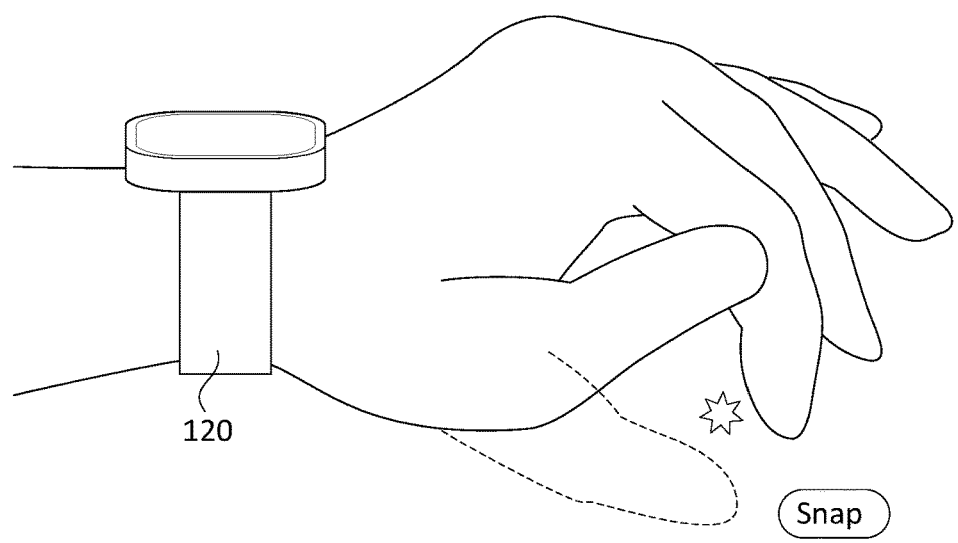

FIG. 3D shows the user 115 performing a snap gesture (e.g., a second stage of a multi-stage control gesture) that involves the user's index finger and thumb sliding against one another with sufficient force (e.g., force above a preset threshold). FIG. 3D further shows the scene 302 updating to include a user interface element 310 notifying the user 115 that an image has been captured in accordance with the multi-stage gesture. In some embodiments, the wrist-wearable device 120 notifies the user of the image capture (e.g., via an audio or visual alert).

In some embodiments, the wrist-wearable device 120 and/or the head-wearable device 202 provides visual, audio, and/or haptic feedback to the user to indicate that a performed gesture stage has been detected (e.g., distinct feedback provided in response to each type of gesture).

Figure 4A:
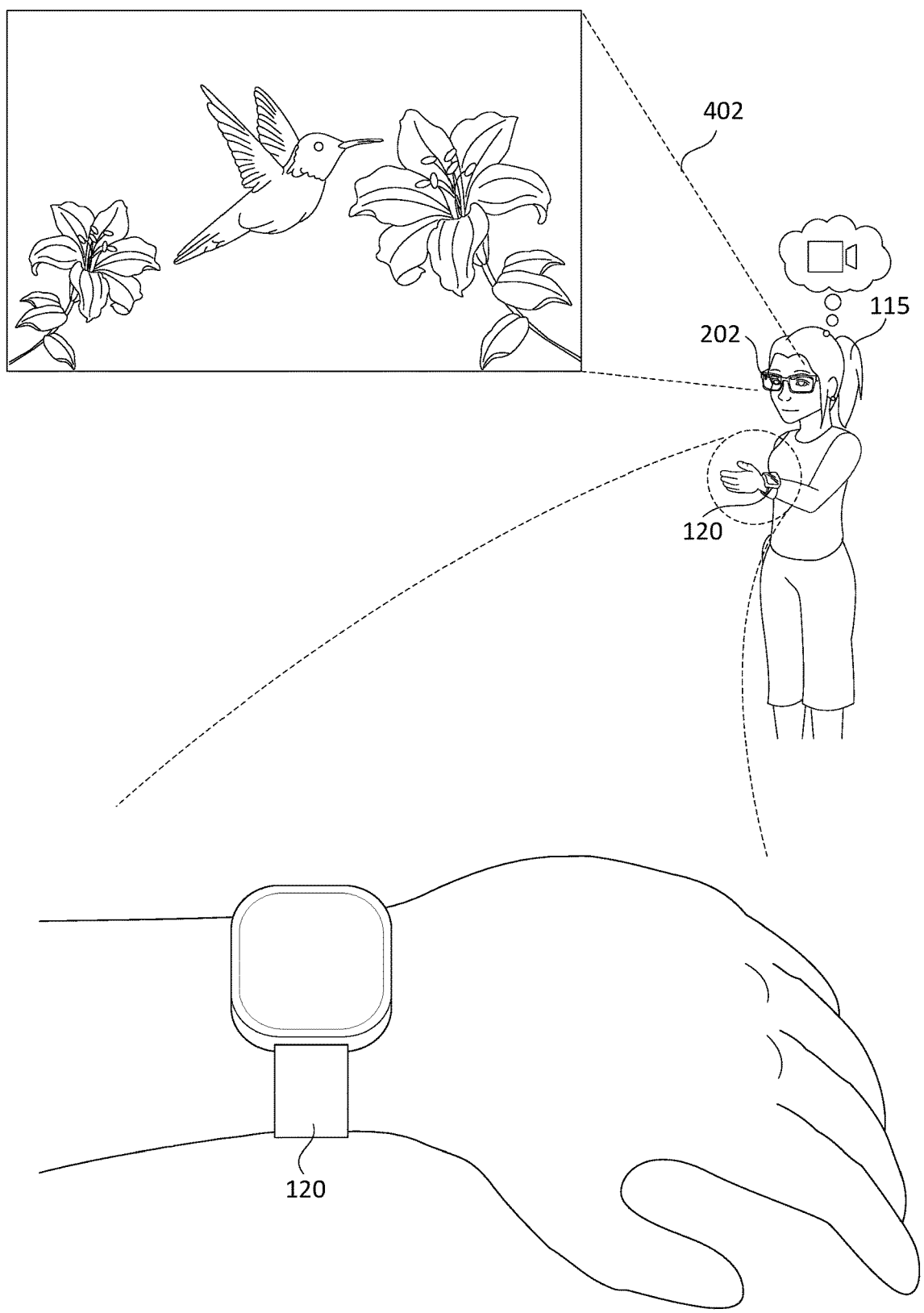
FIGS. 4A-4D illustrate another example user scenario of interacting with an artificial-reality system (e.g., including at least augmented-reality glasses and a wrist-wearable device) in accordance with some embodiments.

FIGS. 4A-4D illustrate another example user scenario of interacting with an artificial-reality system in accordance with some embodiments. The user 115 in FIG. 4A is wearing a head-wearable device 202 (e.g., augmented reality glasses) and a wrist-wearable device 120 (e.g., a smartwatch). The user 115 in FIG. 4A is viewing a scene 402 that includes a bird for which the user wishes to capture a video. The user 115 in FIG. 4A is not performing a gesture.

Figure 4B:
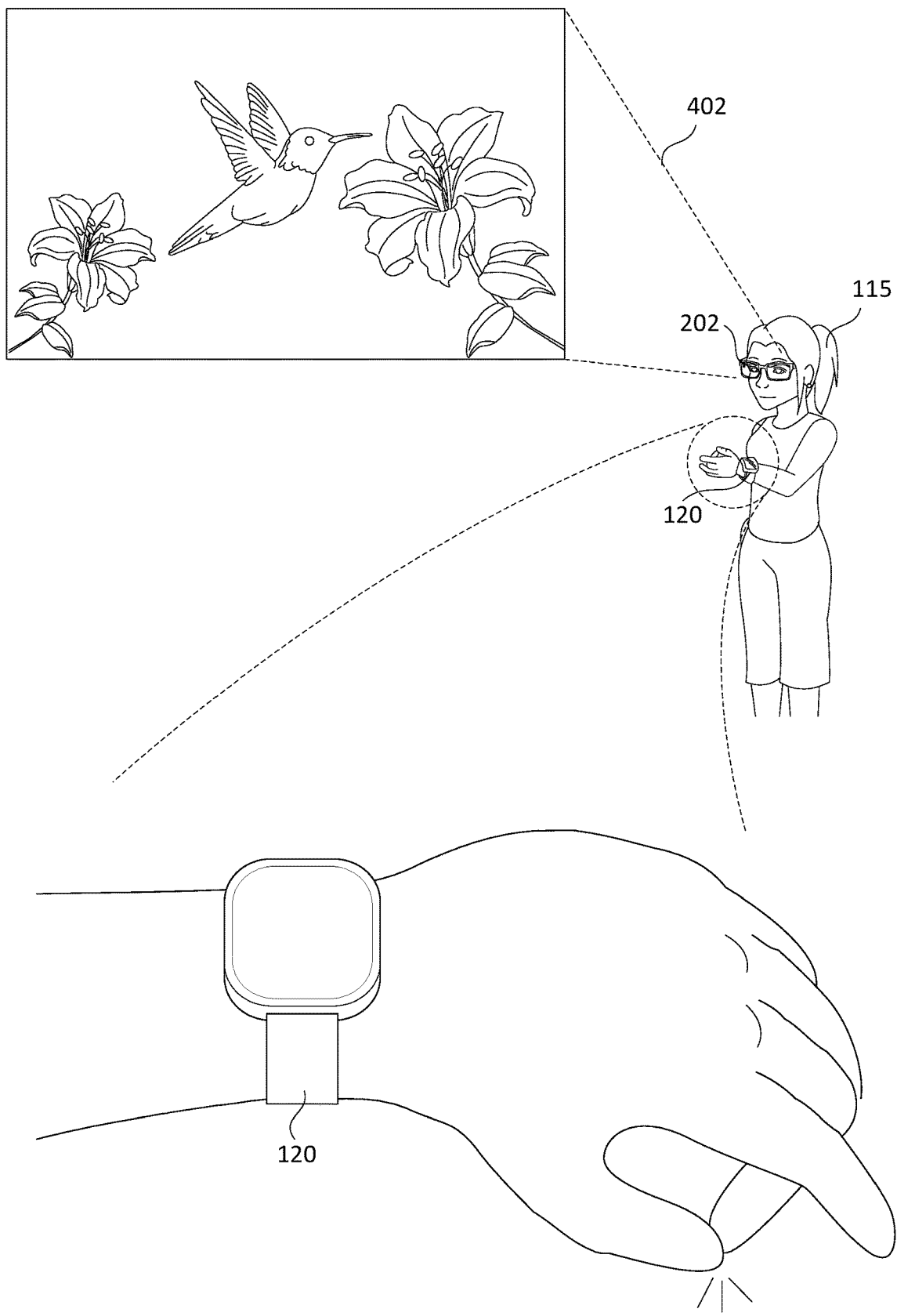

FIG. 4B shows the user 115 performing a pinch gesture (e.g., a first stage of a multi-stage priming gesture) that involves the user's middle finger contacting the thumb. Although FIG. 4B does not show a change to the scene 402 in response to the pinch gesture, in some embodiments, the scene 402 (and/or a display of the wrist-wearable device 120) updates to indicate to the user 115 that the pinch gesture was detected. For example, the scene 402 can update to include a tooltip on what control gestures are available given the priming gesture.

Figure 4C:
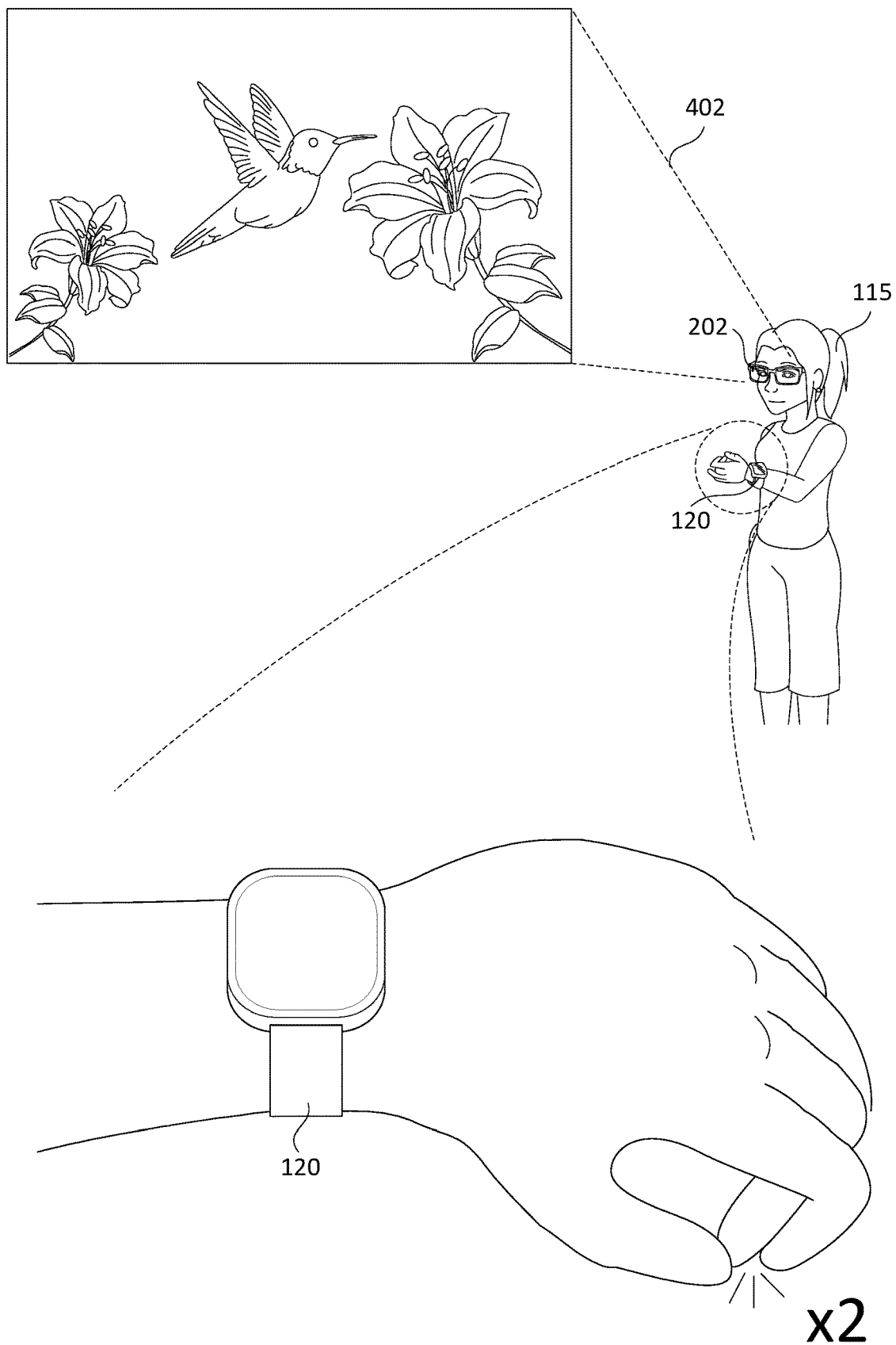

FIG. 4C shows the user 115 performing a double tap gesture (e.g., a second stage of the multi-stage priming gesture) that involves the user's index finger contacting the middle finger twice while the pinch gesture from FIG. 4B is maintained. Although FIG. 4C does not show a change to the scene 402 in response to the double tap gesture, in some embodiments, the wrist-wearable device 120 and/or the head-wearable device 202 provides visual, audio, and/or haptic feedback to the user to indicate that the double tap gesture was detected (e.g., distinct from feedback provided in response to the pinch gesture).

Figure 4D:
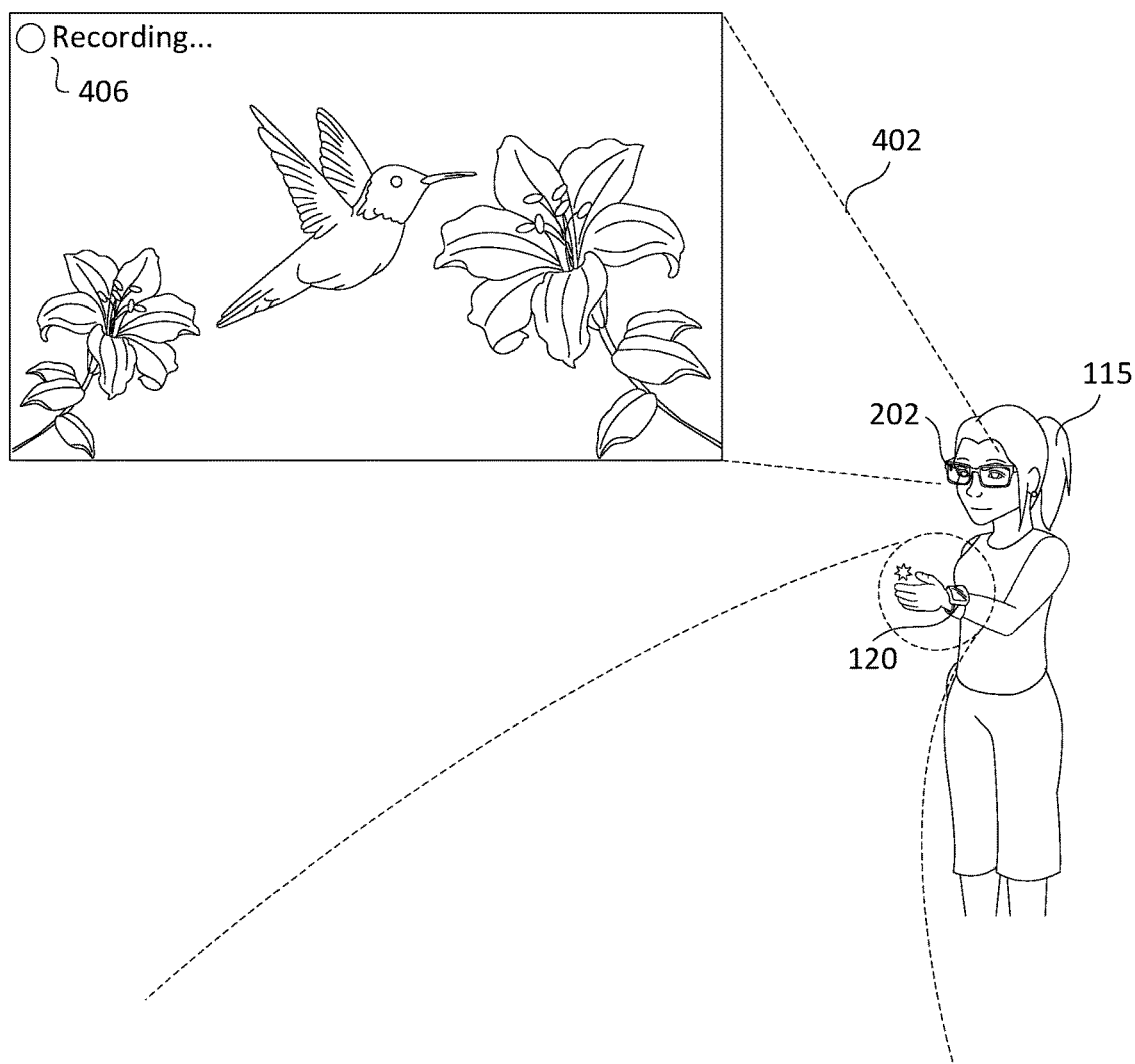
Figure 4D:
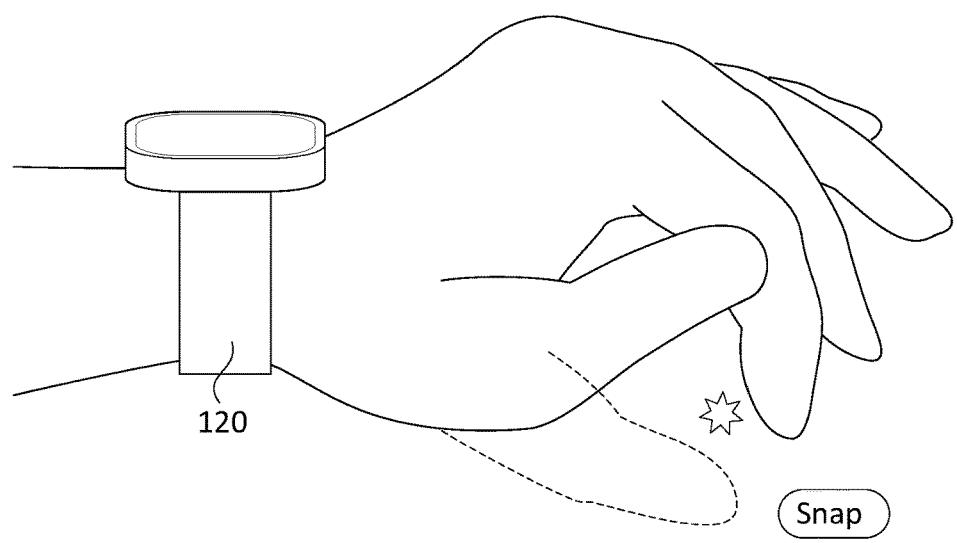

FIG. 4D shows the user 115 performing a snap gesture (e.g., a control gesture) that involves the user's index finger and thumb sliding against one another with sufficient force (e.g., force above a preset threshold). FIG. 4D further shows the scene 402 updating to include a user interface element 406 notifying the user 115 that the scene is being captured/recorded (e.g., by a camera on the head-wearable device 202). In some embodiments, the wrist-wearable device 120 and/or the head-wearable device 202 provides visual, audio, and/or haptic feedback to the user to indicate that a performed gesture stage has been detected (e.g., distinct feedback provided in response to each type of gesture).

Figure 5A:
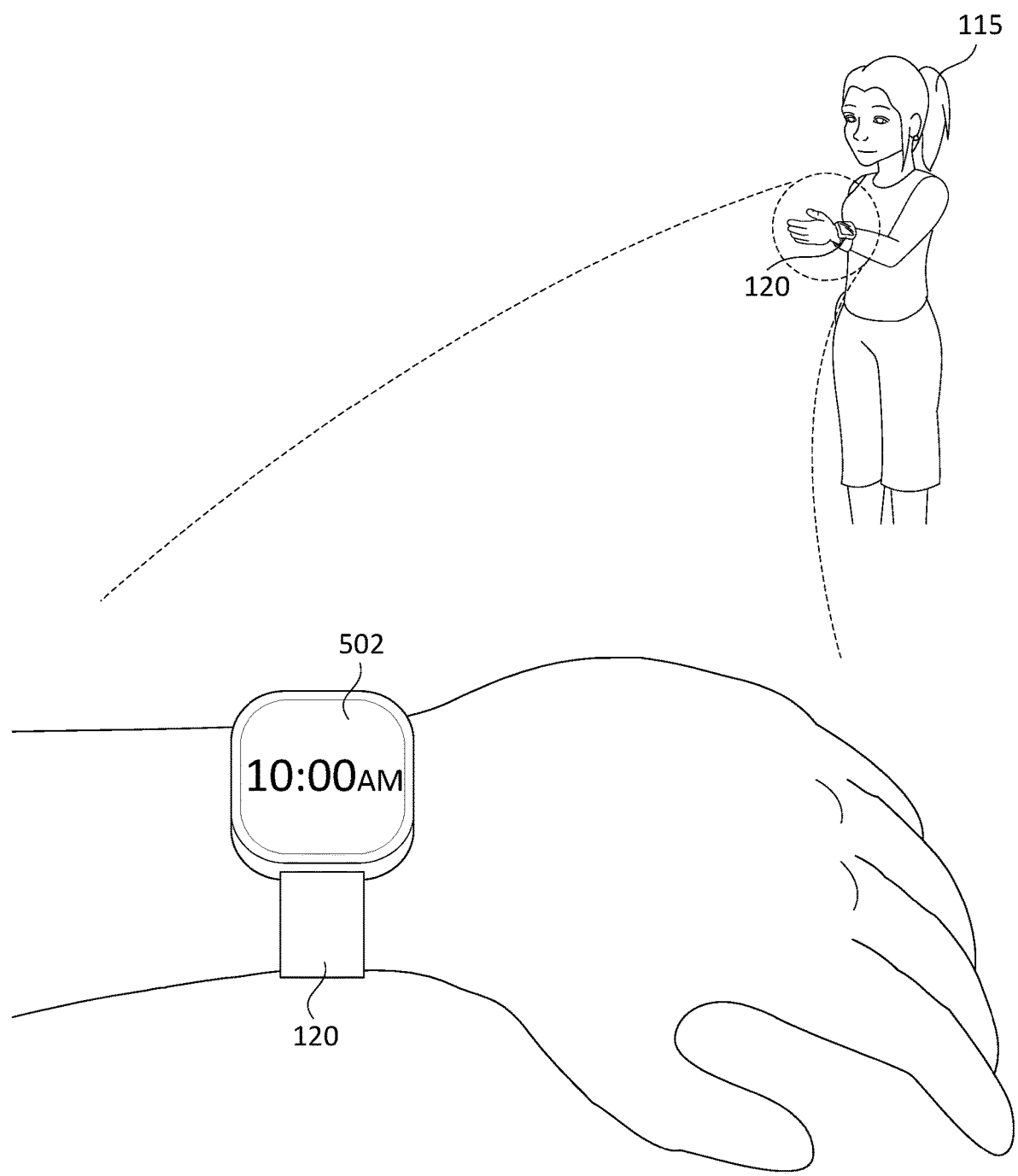
FIGS. 5A-5D illustrate an example user scenario of interacting with a wearable device in accordance with some embodiments.

FIGS. 5A-5D illustrate an example user scenario of interacting with a wearable device in accordance with some embodiments. The user 115 in FIG. 5A is wearing a wrist-wearable device 120 (e.g., a smartwatch) that includes a display 502 (e.g., showing the time of day in FIG. 5A). The user 115 in FIG. 5A is not performing a gesture.

Figure 5B:
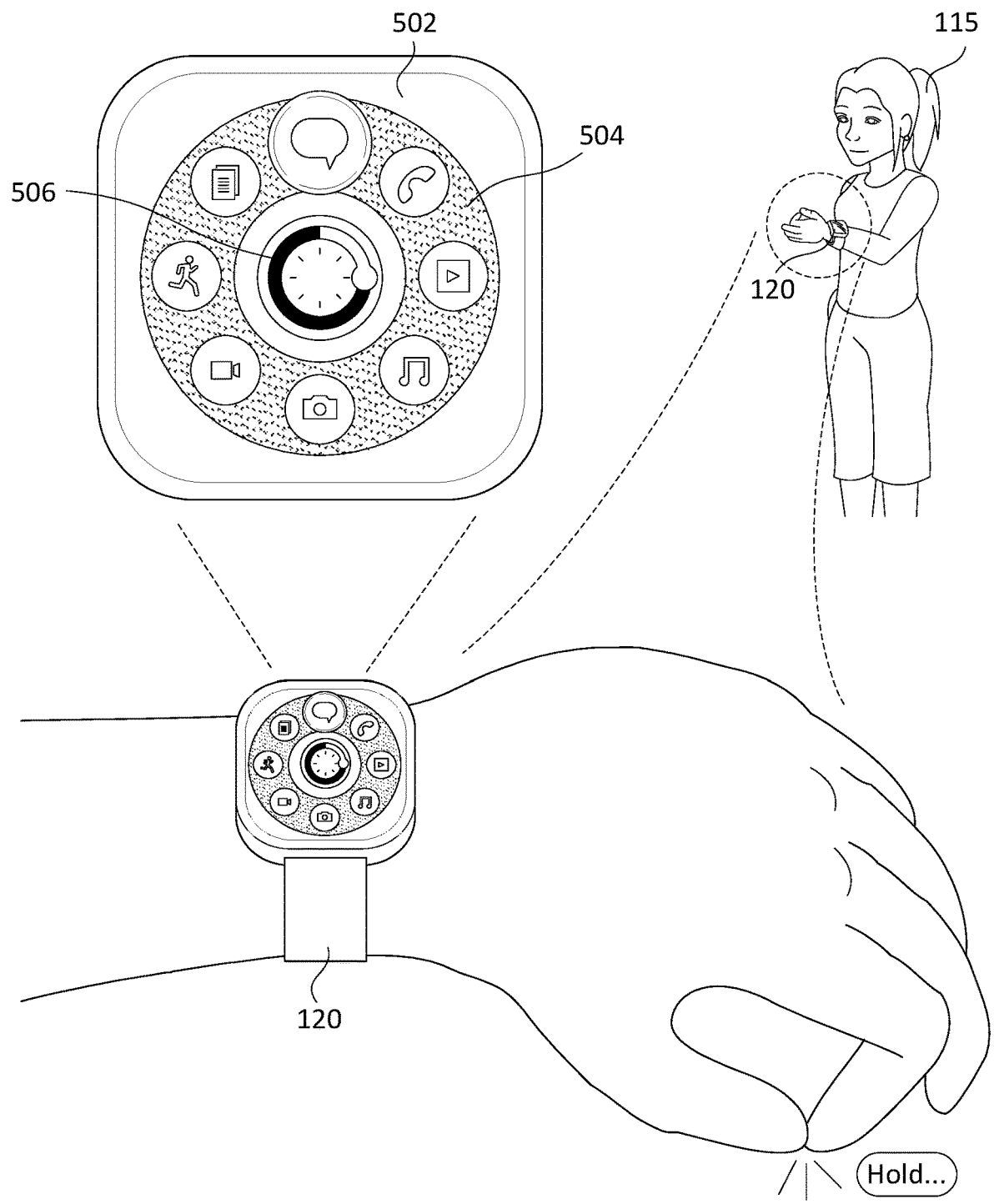

FIG. 5B shows the user 115 performing a pinch gesture (e.g., a priming gesture) that involves the user's index finger contacting the thumb. FIG. 5B further shows the display 502 updating (responsive to the pinch gesture) to present the radial menu 504. The radial menu 504 includes multiple user interface elements (icons) that correspond to different applications on the wrist-wearable device 120. The display 502 in FIG. 5B also shows a timer element 506 to indicate to the user 115 a time period (e.g., 5, 10, or 20 seconds) for inputting a control gesture.

Figure 5C:
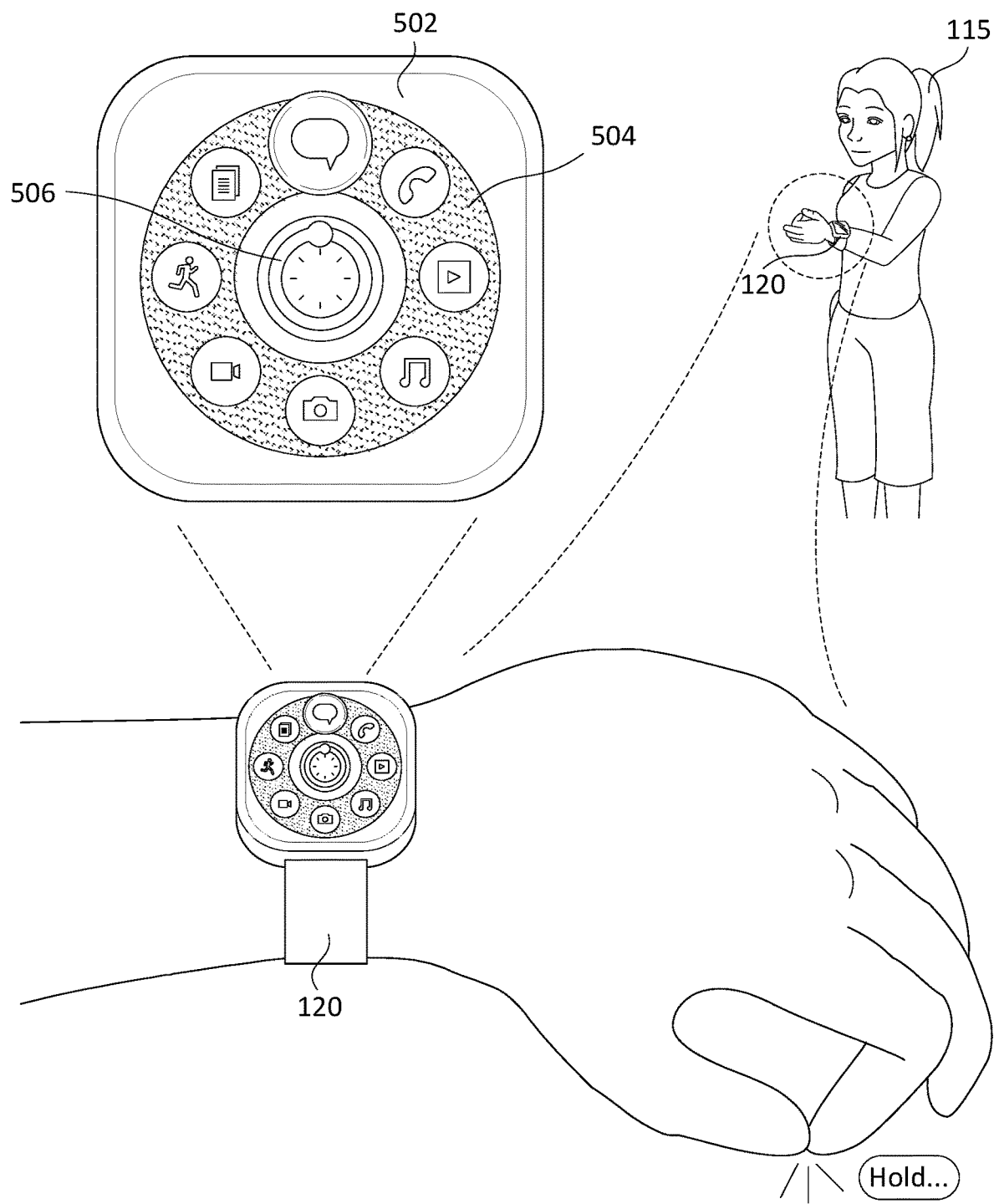

FIG. 5C shows the user 115 maintaining the pinch gesture from FIG. 5B. FIG. 5C further shows the display 502 presenting the radial menu 504 and the timer element 506. The timer element 506 in FIG. 5C indicates that the time period for inputting the control gesture has nearly expired.

Figure 5D:
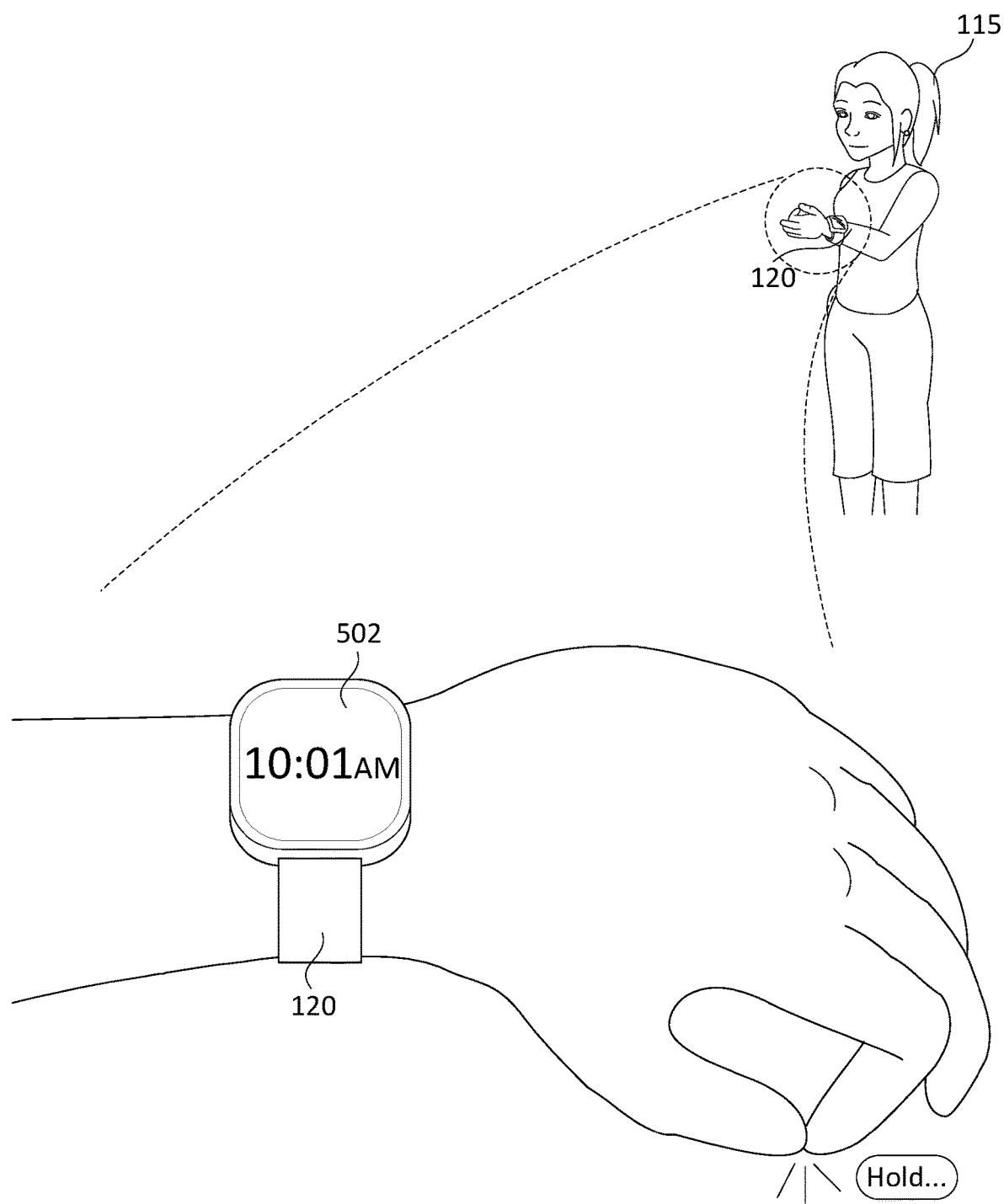

FIG. 5D shows the user 115 maintaining the pinch gesture from FIGS. 5B and 5C. FIG. 5D further shows the display 502 showing the time of day to the user 115, e.g., ceasing to present the radial menu 504 and the timer element 506 in accordance with the time period for inputting a control gesture having expired. Although FIGS. 5B-5D show the user 115 maintaining the priming gesture (e.g., the pinch gesture), in some embodiments, the user does not maintain the priming gesture (e.g., performs a snap gesture) to trigger presentation of a menu and a timer for inputting a corresponding control gesture. In some embodiments, the available multi-stage gestures for the user 115 include one or more gestures that include three or more stages. In some embodiments, detection of each stage of a multi-stage gesture resets, adds time to, or starts a new time period for inputting the control gesture.

In some embodiments, the wrist-wearable device 120 provides audio and/or haptic feedback to the user 115 to indicate that a performed gesture stage has been detected and/or provide feedback in accordance with the time period for inputting the control gesture, such as haptic feedback to indicate that the time period expired without detection of a control gesture.

Figure 6A:
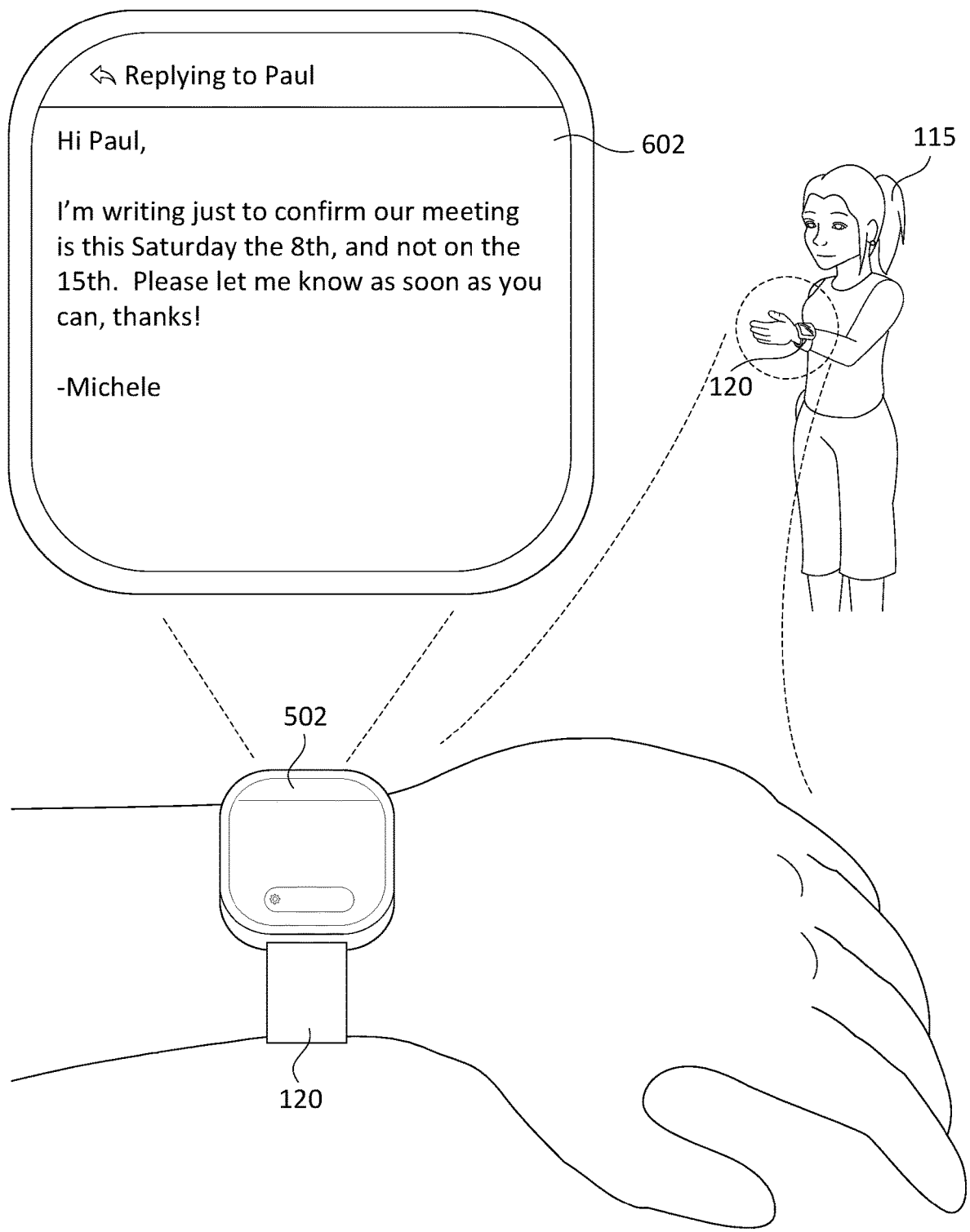
FIGS. 6A-6D illustrate another example user scenario of interacting with a wearable device in accordance with some embodiments.

FIGS. 6A-6D illustrate another example user scenario of interacting with a wearable device in accordance with some embodiments. The user 115 in FIG. 6A is wearing a wrist-wearable device 120 (e.g., a smartwatch) that includes a display 502 presenting a user interface 602 that corresponds to a messenger (e.g., e-mail) application, e.g., a message the user 115 is drafting in response to a remote user (Paul). The user 115 in FIG. 6A is not performing a gesture.

Figure 6B:
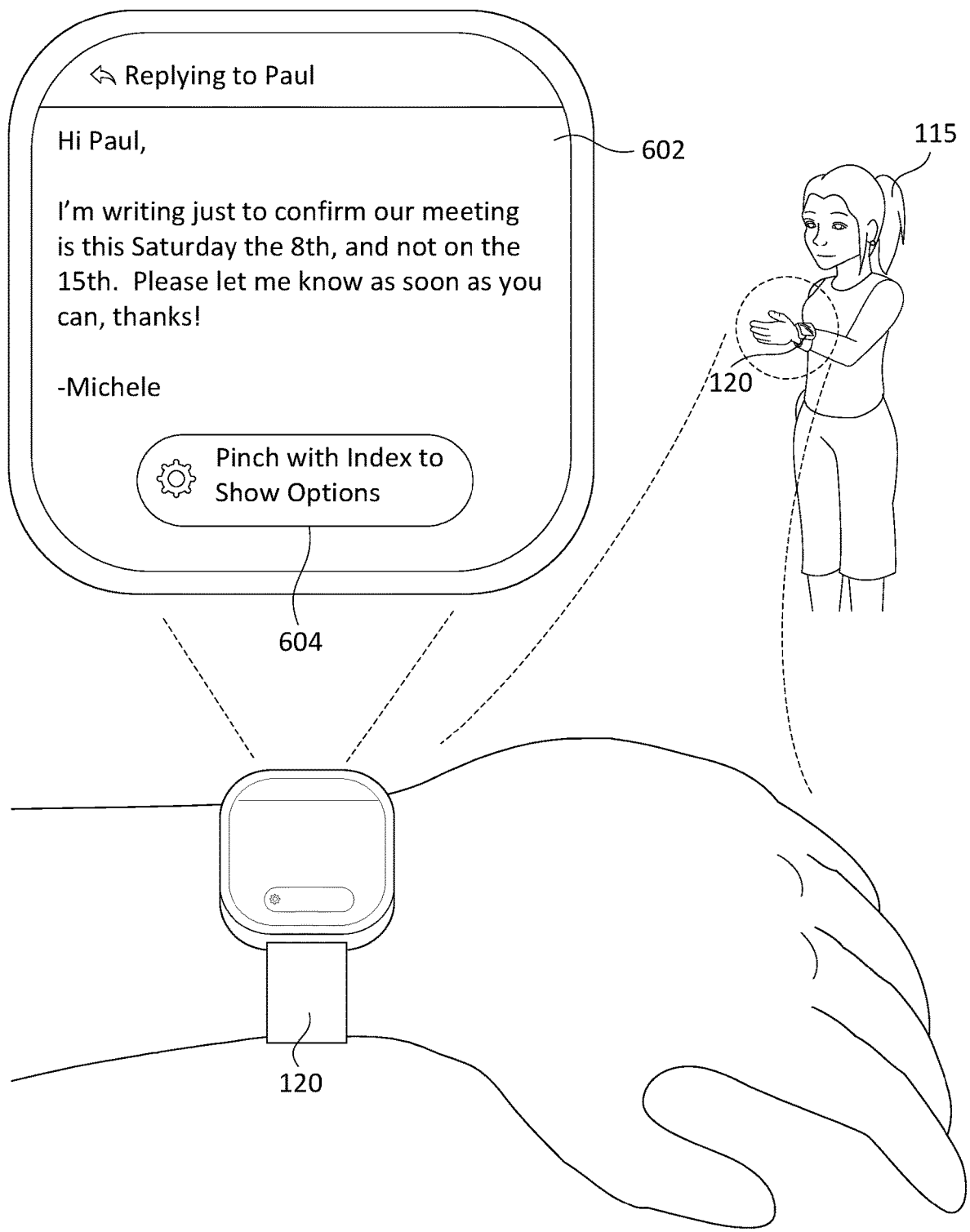

FIG. 6B shows the display 502 updating to present a notification 604 to the user 115. The notification 604 indicates to the user 115 an available gesture stage (e.g., a pinch gesture between the user's index finger and thumb) and corresponding action (e.g., presentation of available options). In some embodiments, the notification 604 is presented in response to the wrist-wearable device 120 detecting that the user 115 has stopped providing input for the reply message. In some embodiments, the notification 604 is presented in response to a voice command from the user. In some embodiments, the notification 604 is presented in response to a gesture from the user (e.g., a priming gesture).

Figure 6C:
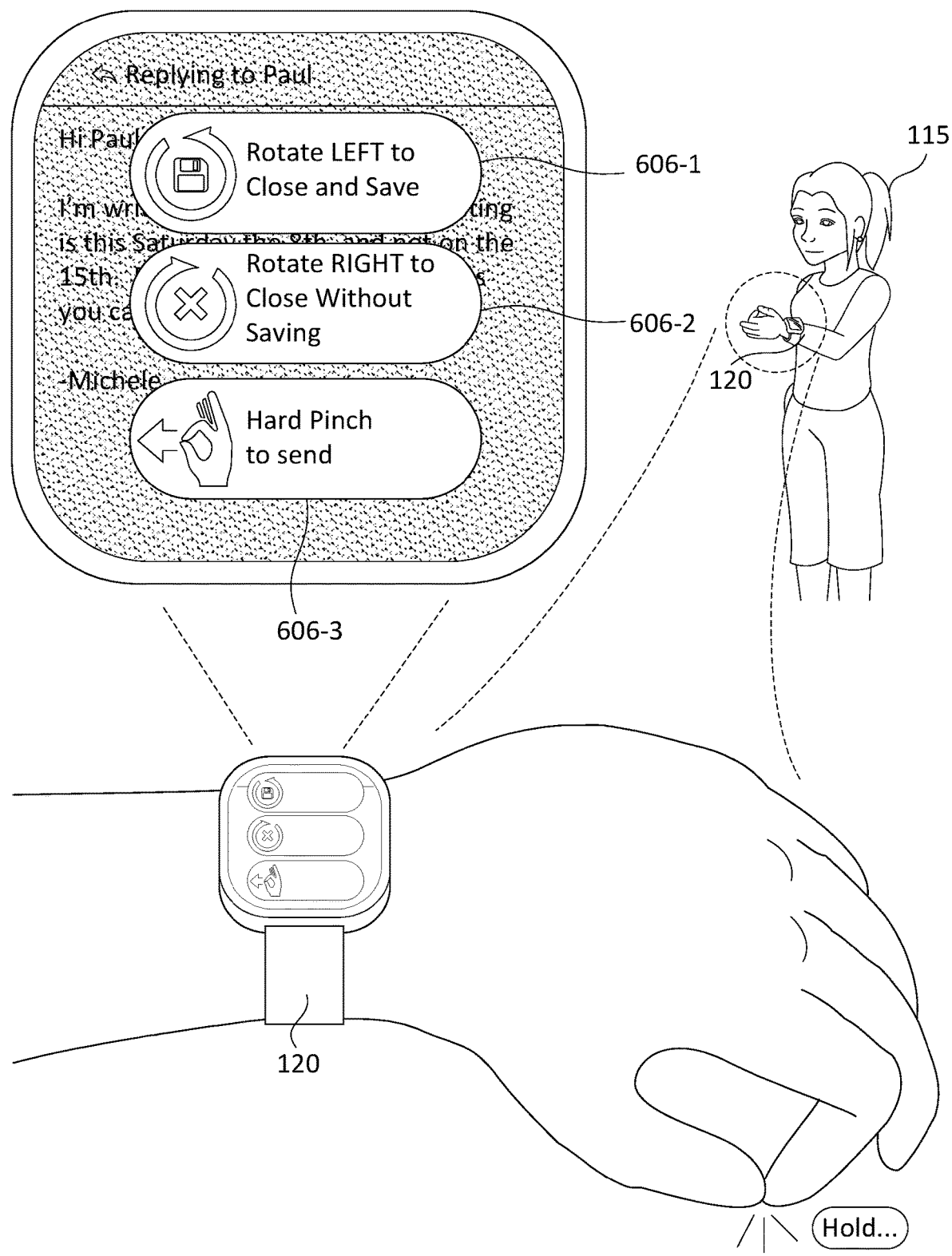

FIG. 6C shows the user 115 performing a pinch gesture (e.g., a priming gesture) that involves the user's index finger contacting the thumb. FIG. 6C further shows the display 502 updating (responsive to the pinch gesture) to present the command options 606. The command options 606 include an option 606-1 for closing and saving the message (corresponding to a left rotation of the wrist), an option 606-2 for closing the message without saving (corresponding to a right rotation of the wrist), and an option 606-3 for sending the message (corresponding to an increase in force of the pinch gesture). In some embodiments, other options are presented, such as an option for executing a spellcheck operation (e.g., corresponding to a snap gesture). In the example of FIG. 6C each option 606 corresponds to an available control gesture for the given priming gesture (the index finger pinch gesture).

Figure 6D:
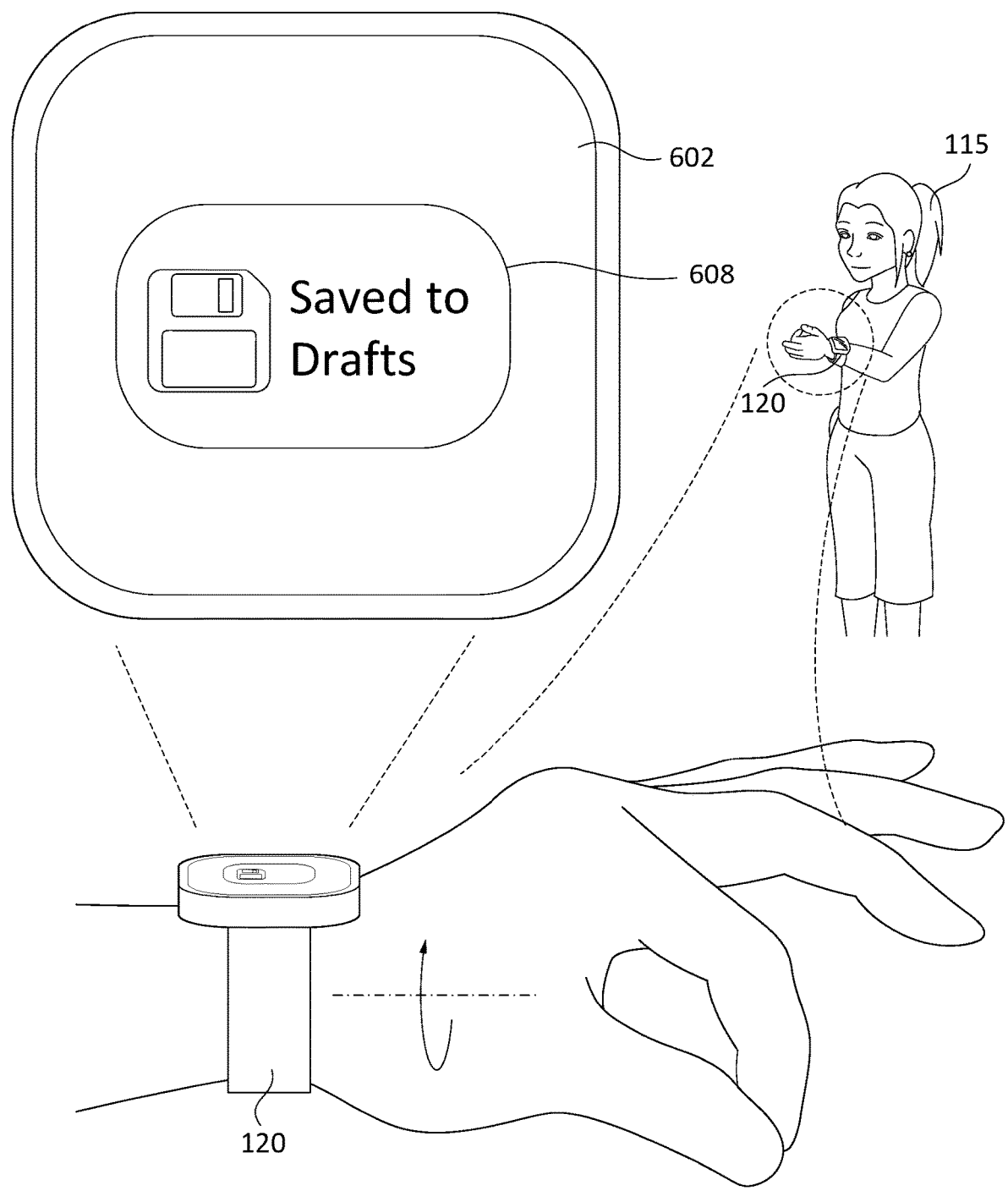

FIG. 6D shows the user 115 having rotated their wrist to the right (e.g., a control gesture) while holding the pinch gesture of FIG. 6C. FIG. 6D further shows an updated user interface 602 (responsive to the control gesture) with the notification 608 indicating to the user that the message has been saved (and closed). While FIG. 6D shows the user 115 holding the pinch gesture (e.g., the priming gesture) while performing the wrist rotation (e.g., the control gesture), in some embodiments, the user releases the priming gesture prior to performing the control gesture.

Figure 7A:
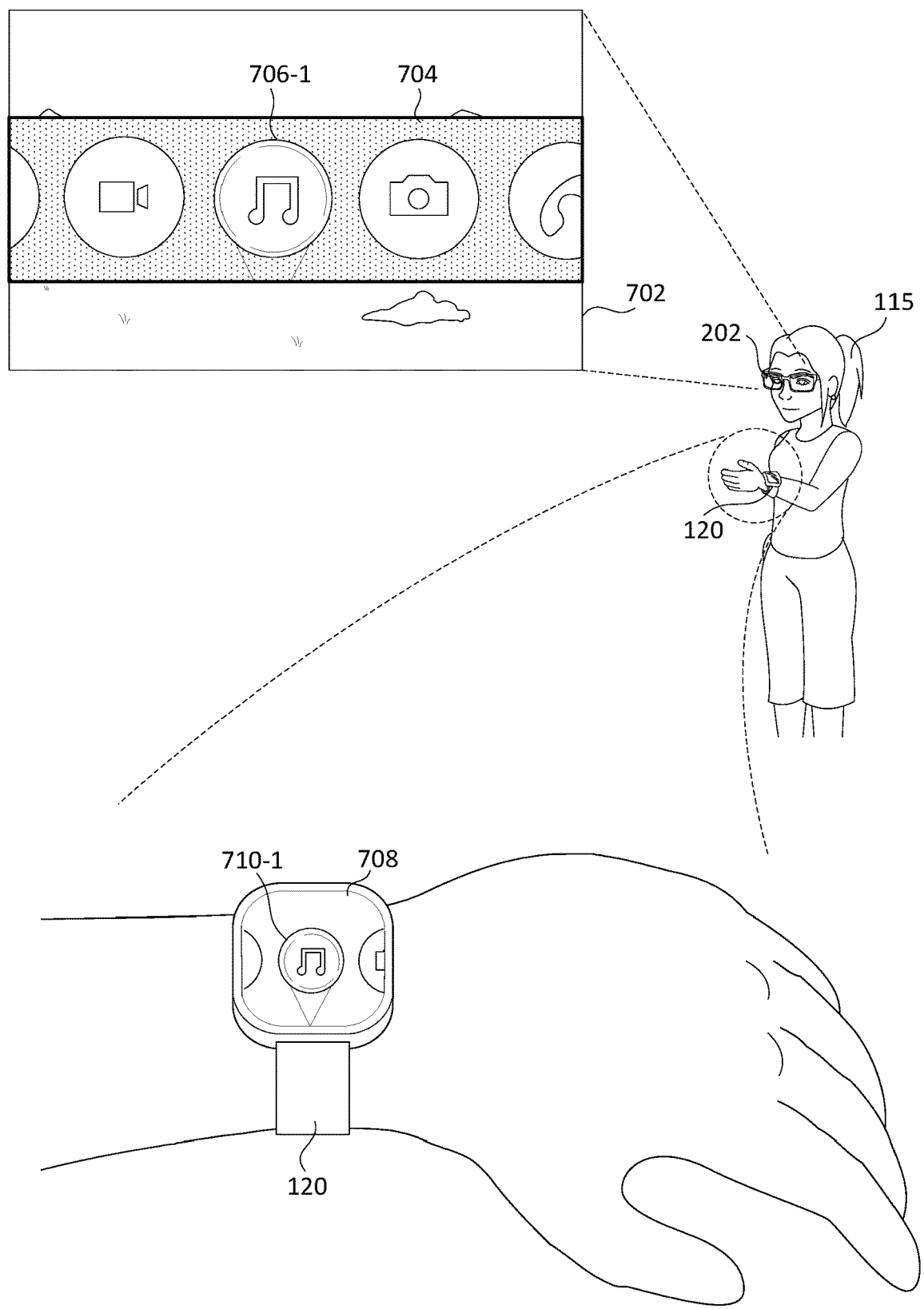
FIGS. 7A-7S illustrate another example user scenario of interacting with a wearable device in accordance with some embodiments.
Figure 7B:
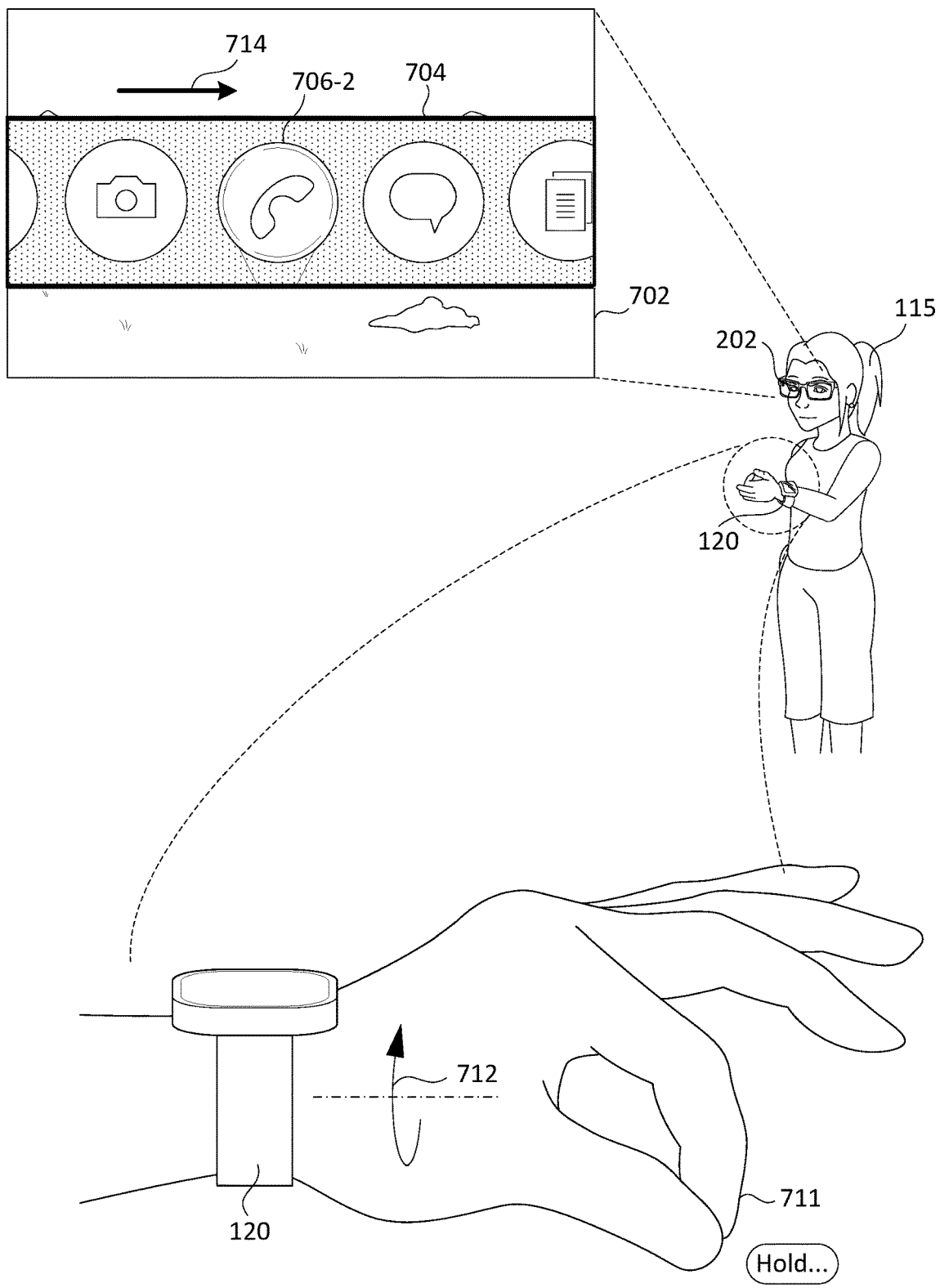
Figure 7C:
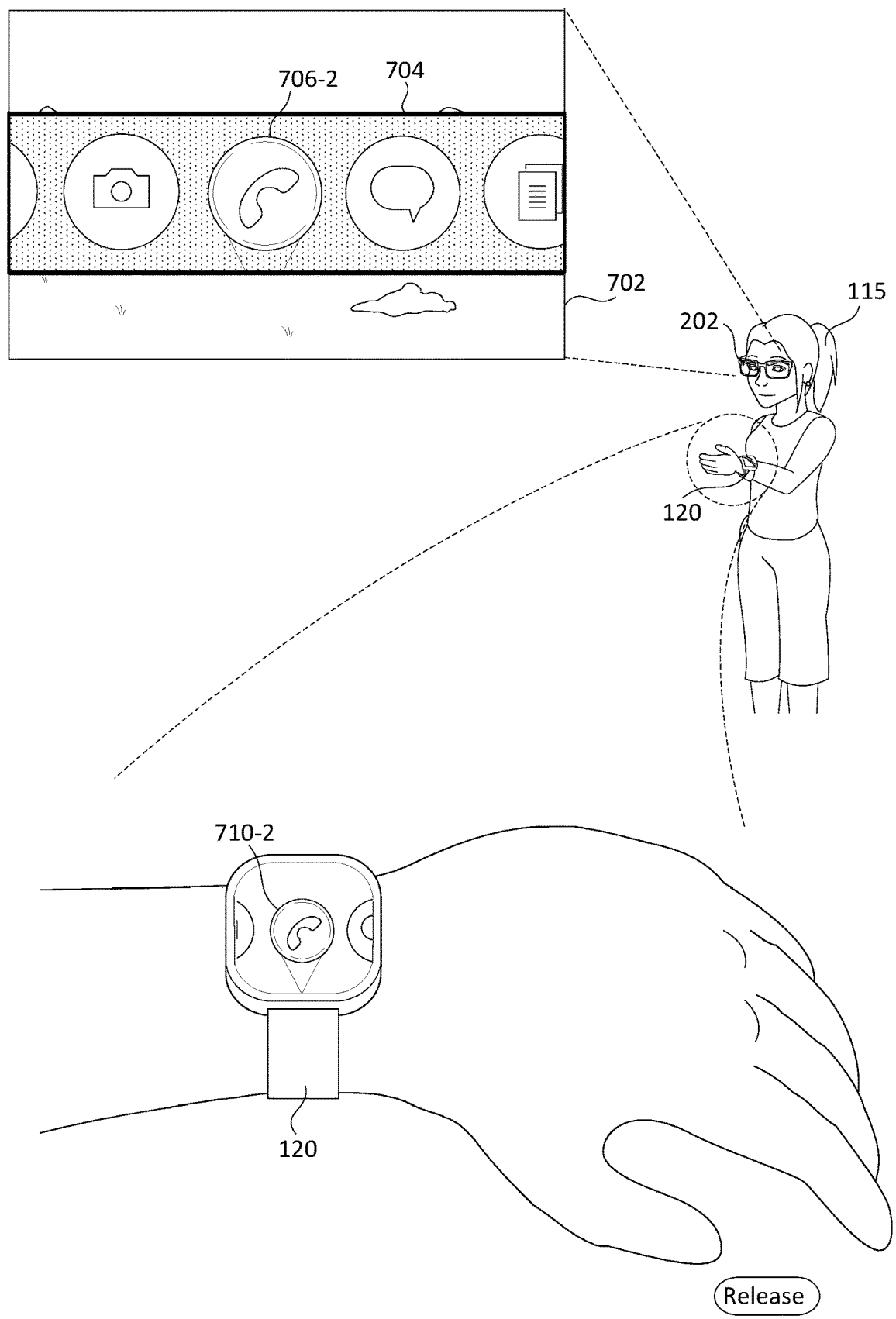
Figure 7D:
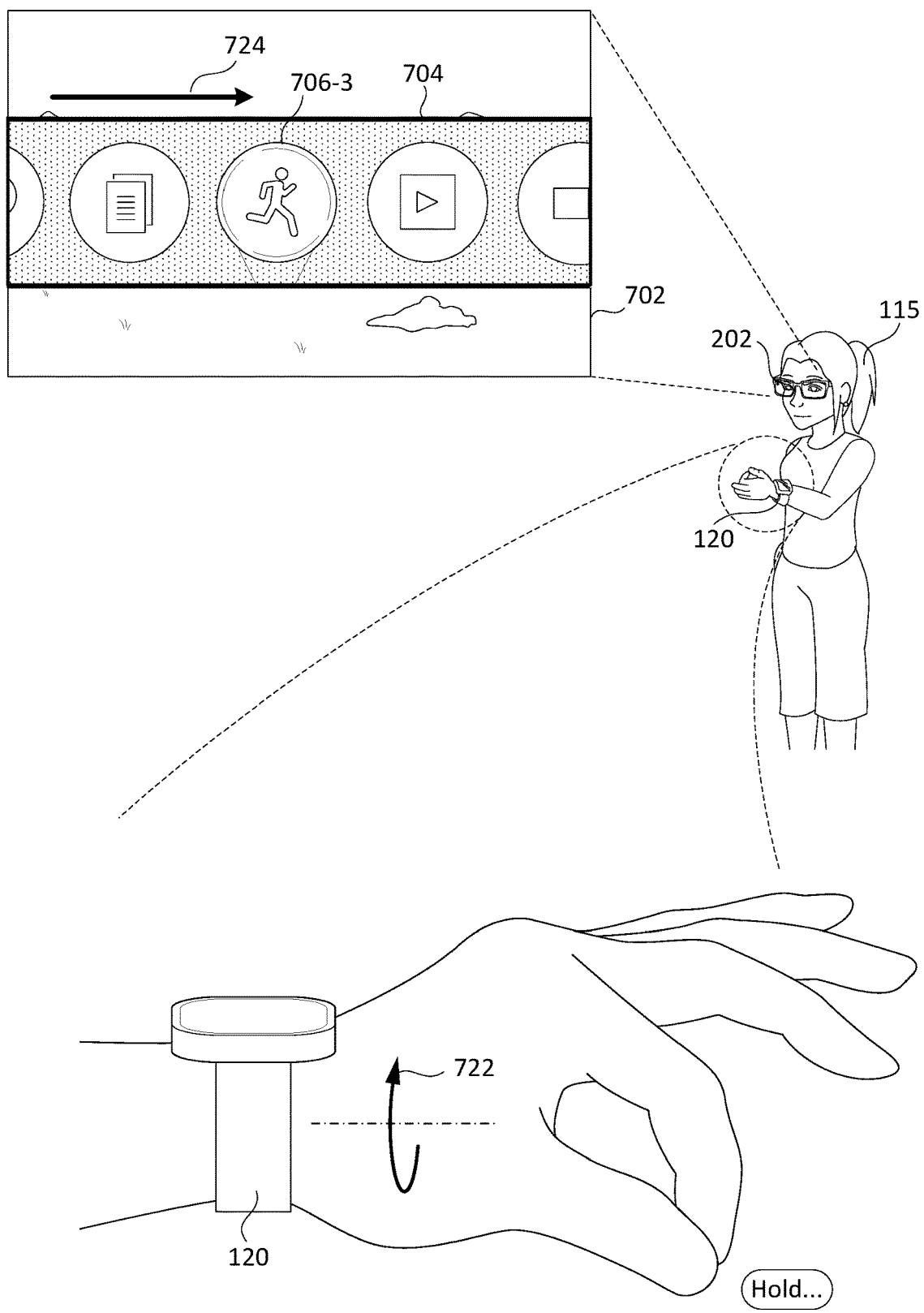
Figure 7E:
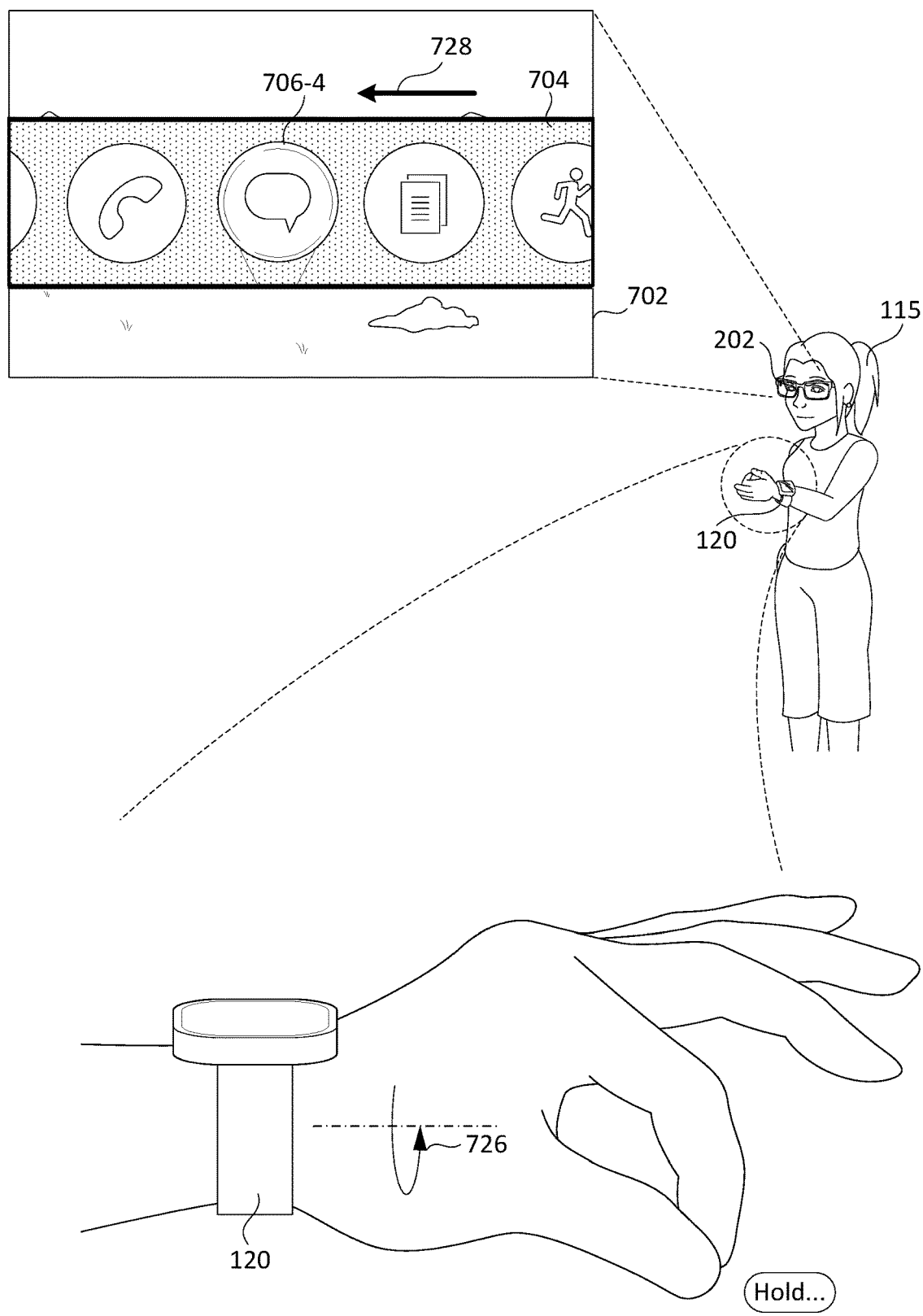
Figure 7F:
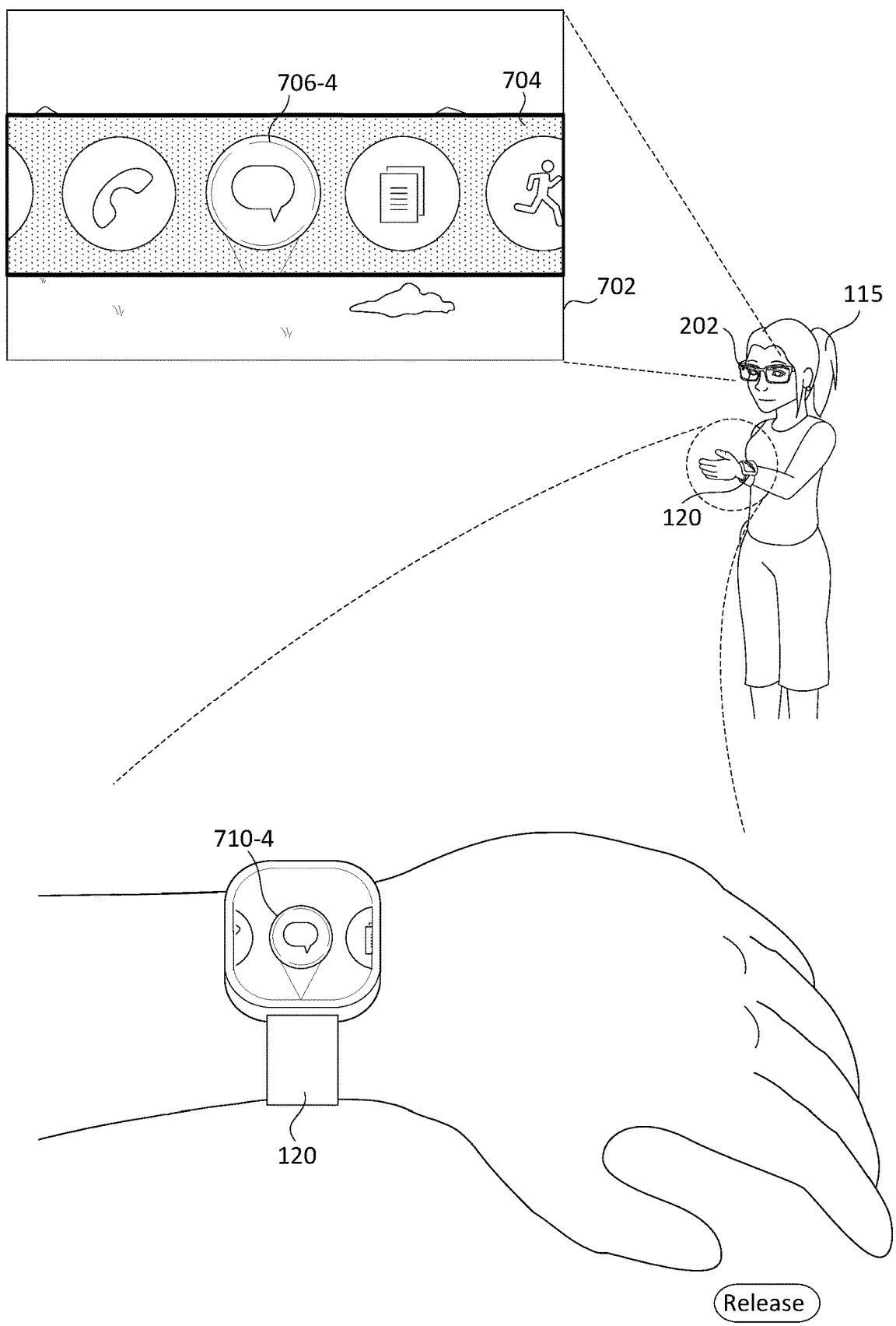
Figure 7G:
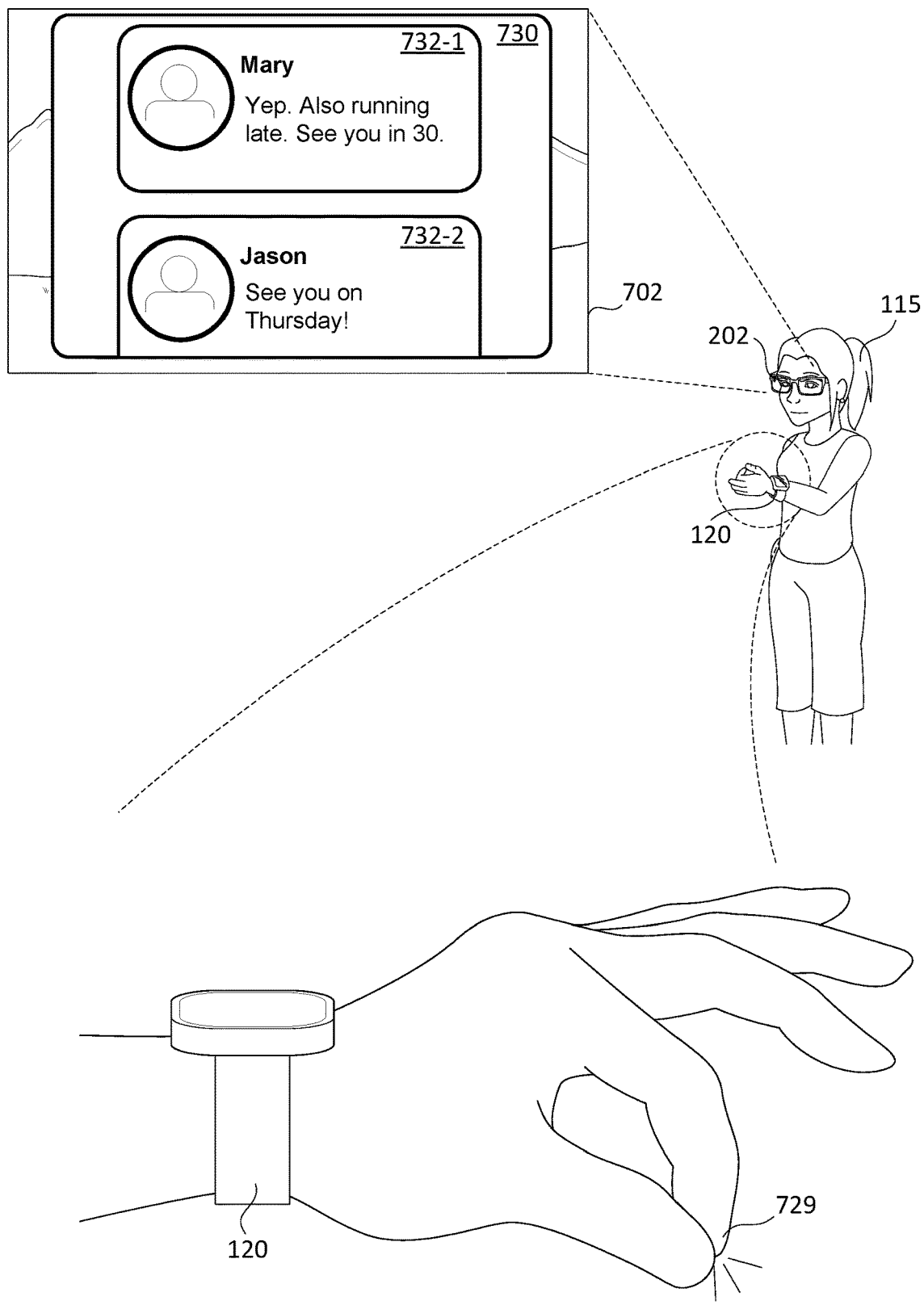
Figure 7H:
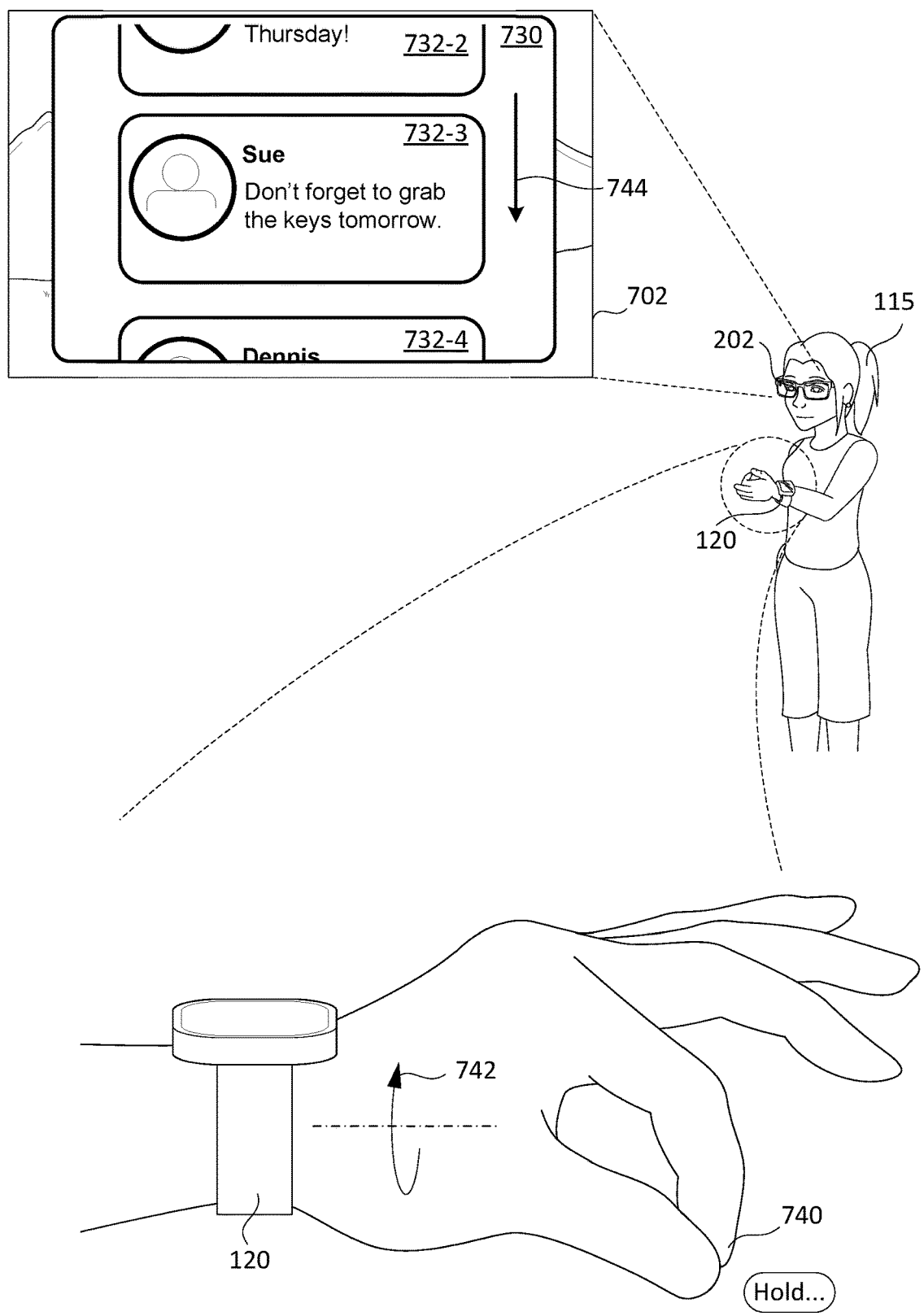
Figure 7I:
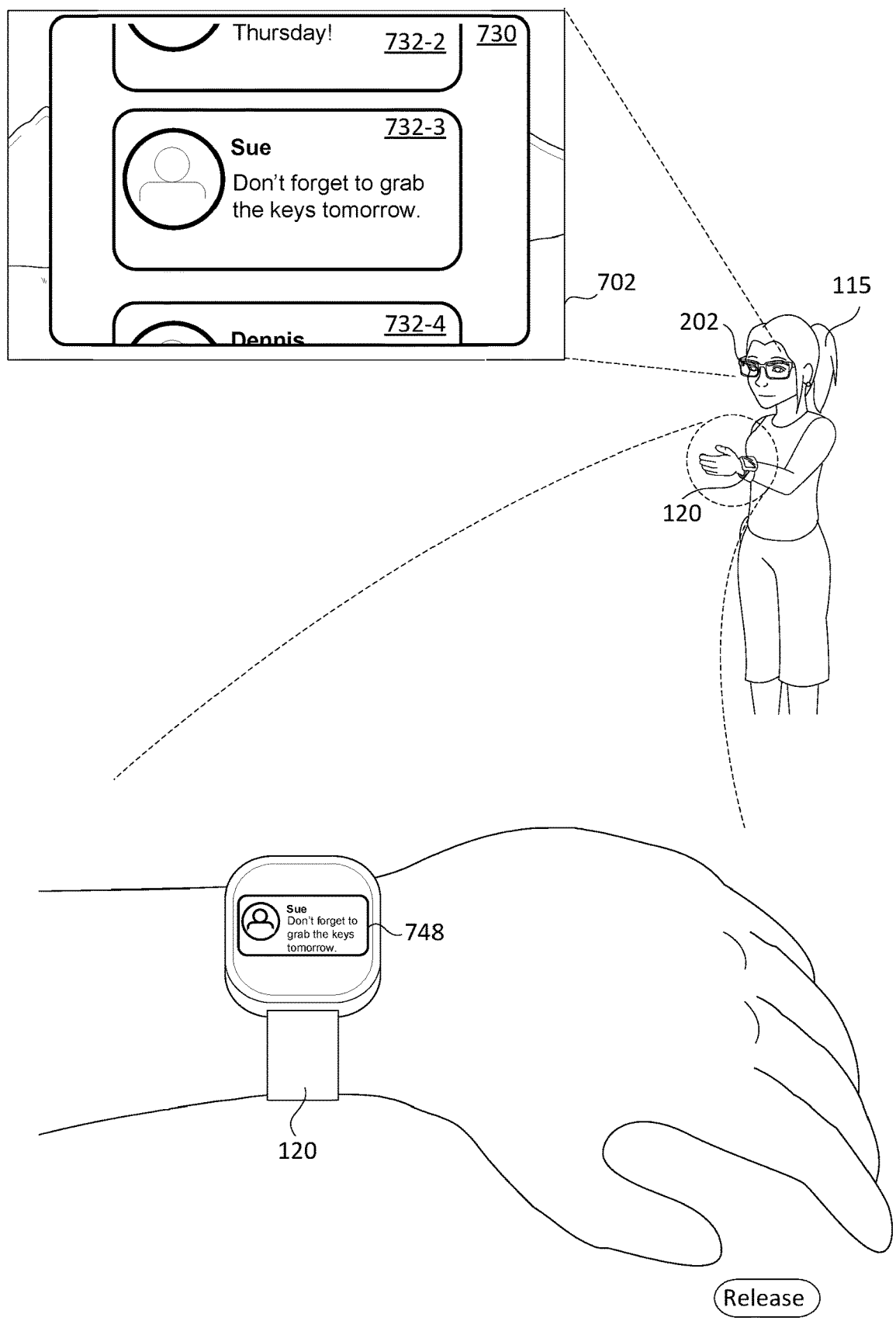
Figure 7J:
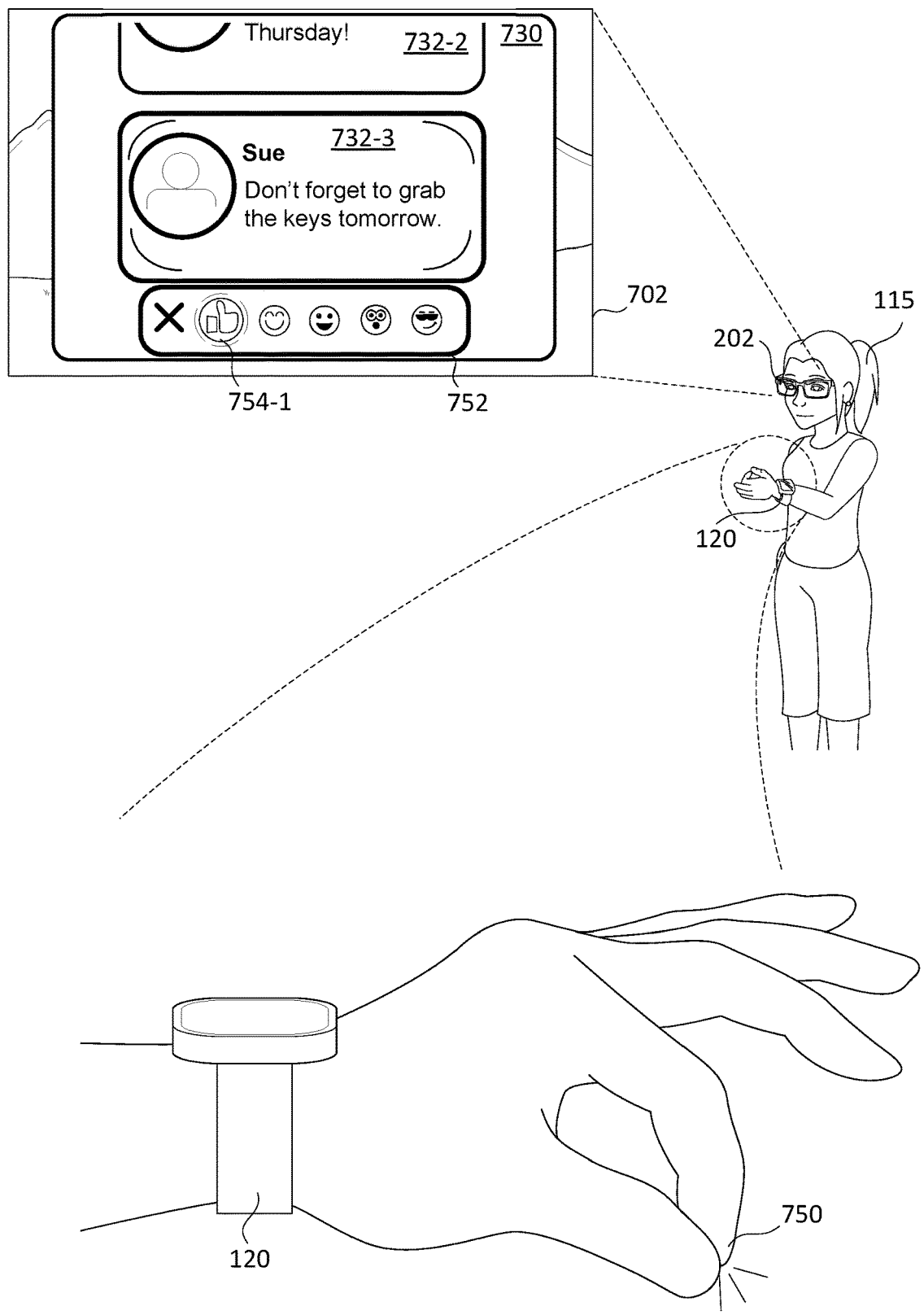
Figure 7K:
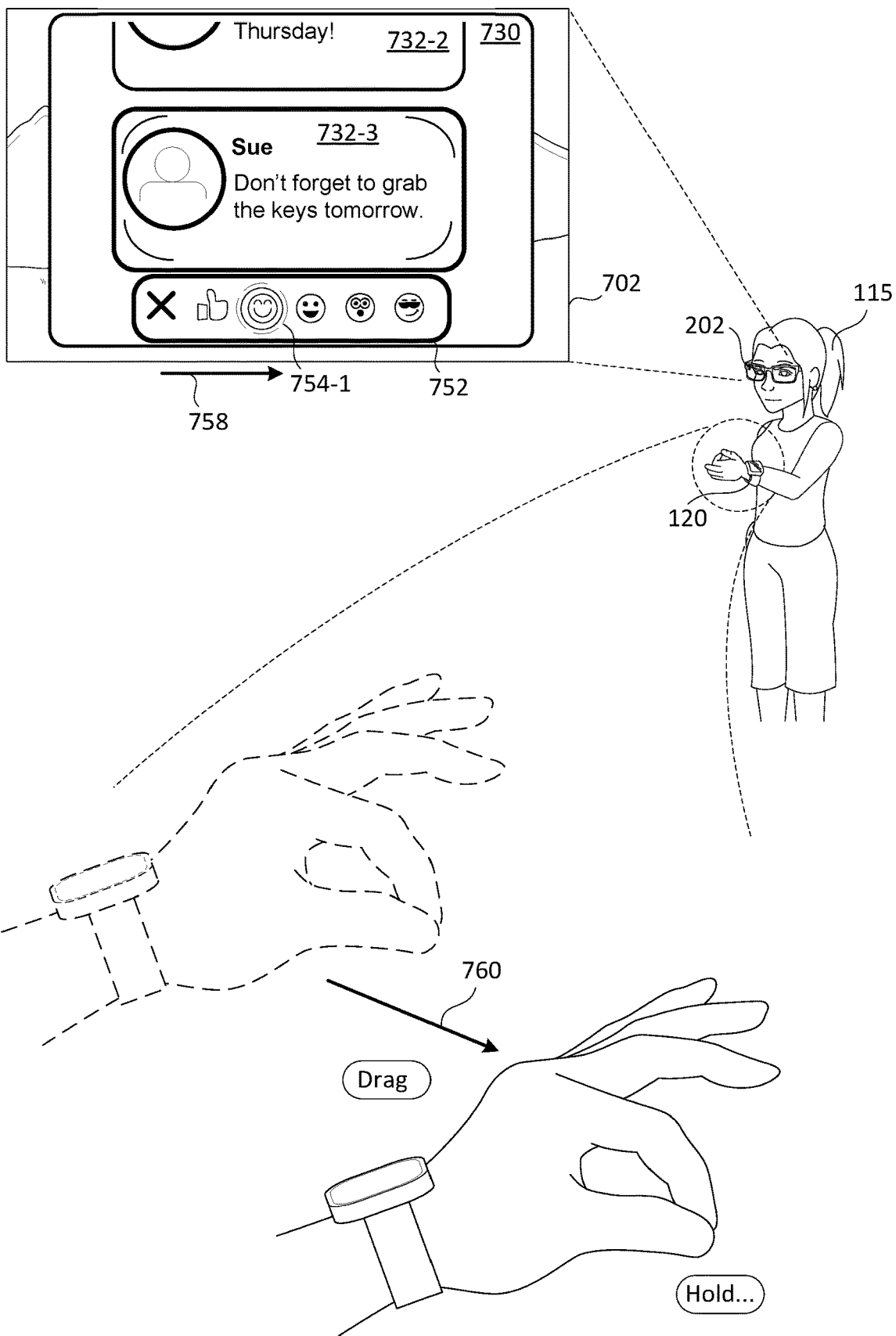
Figure 7L:
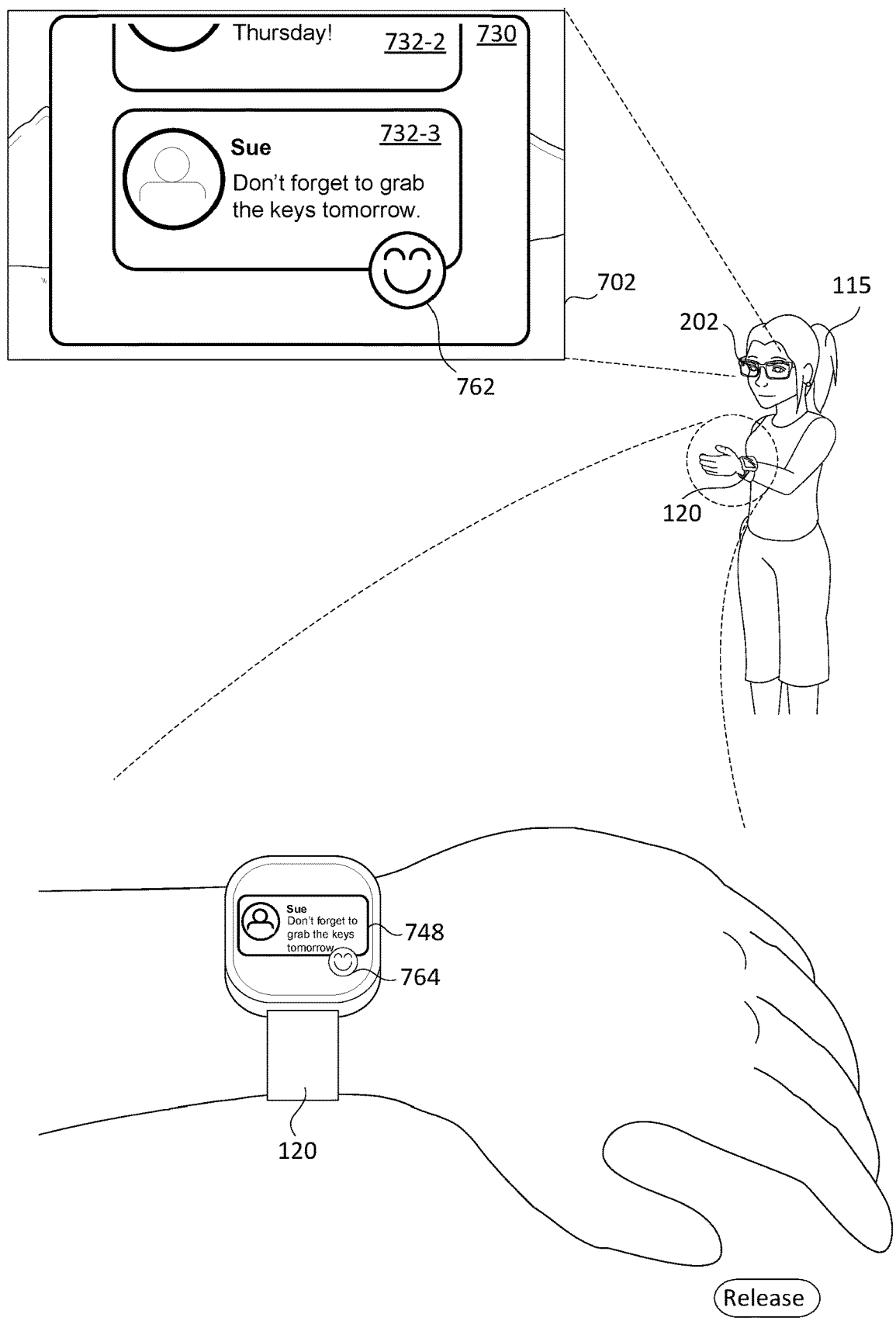
Figure 7M:
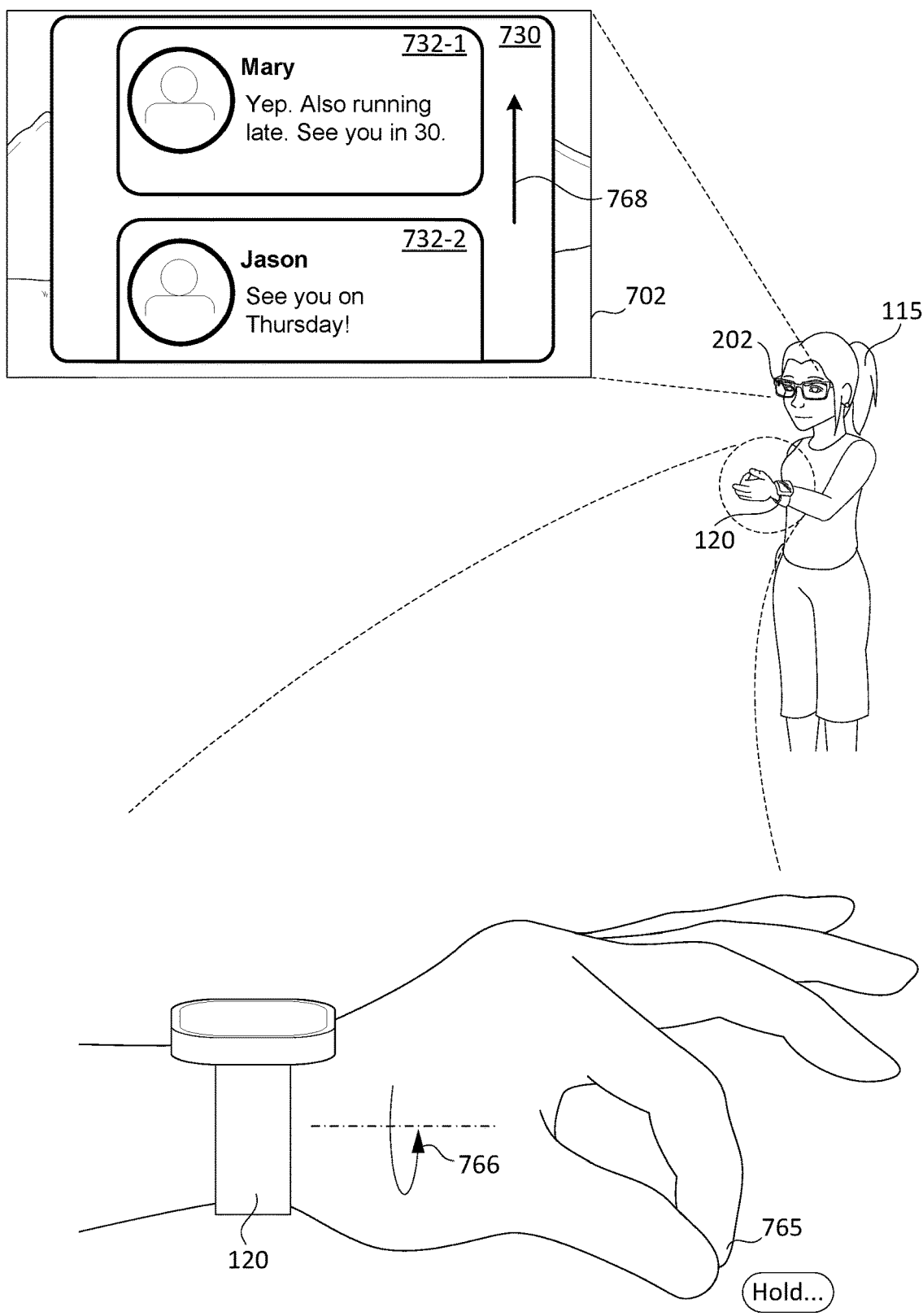
Figure 7N:
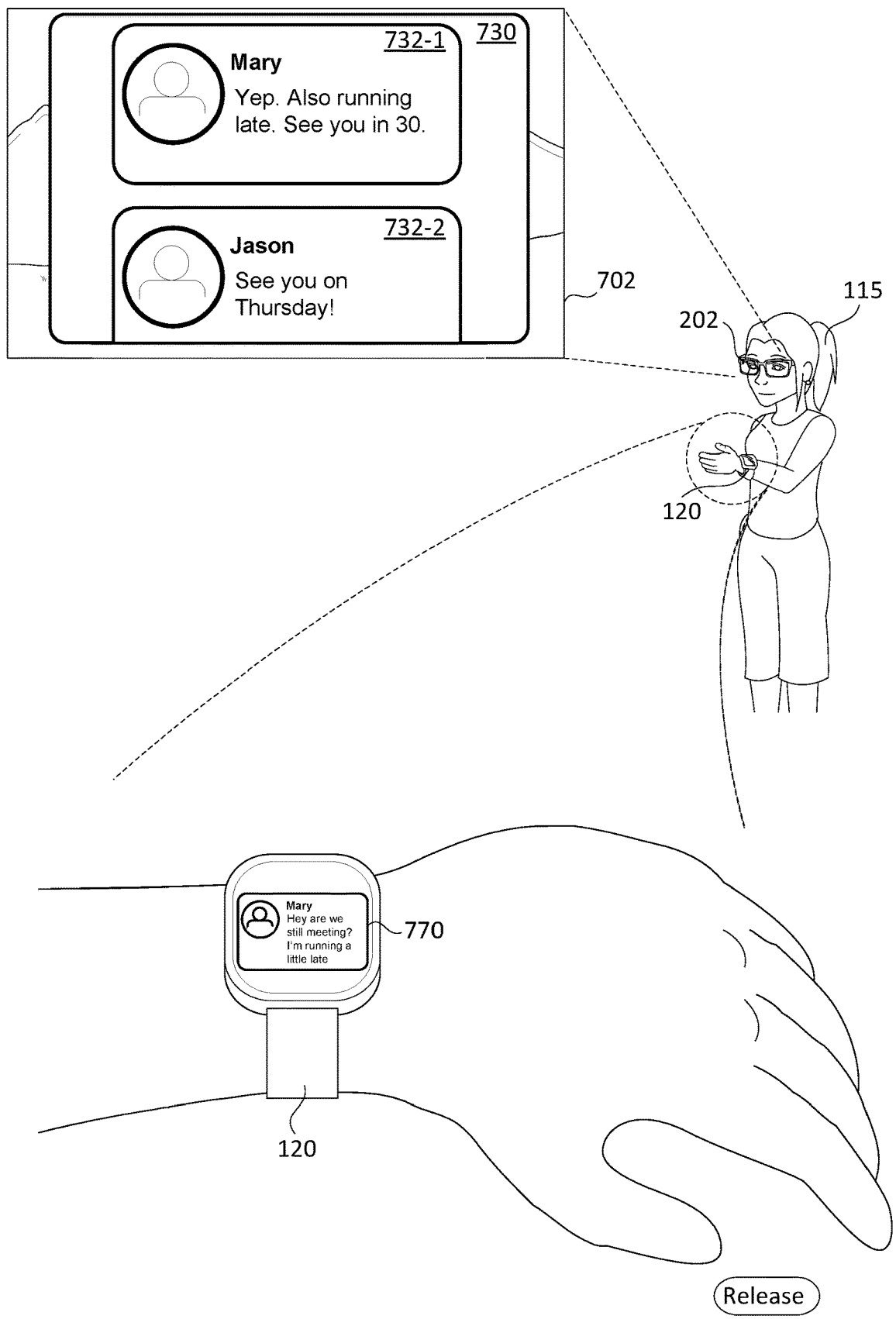
Figure 7O:
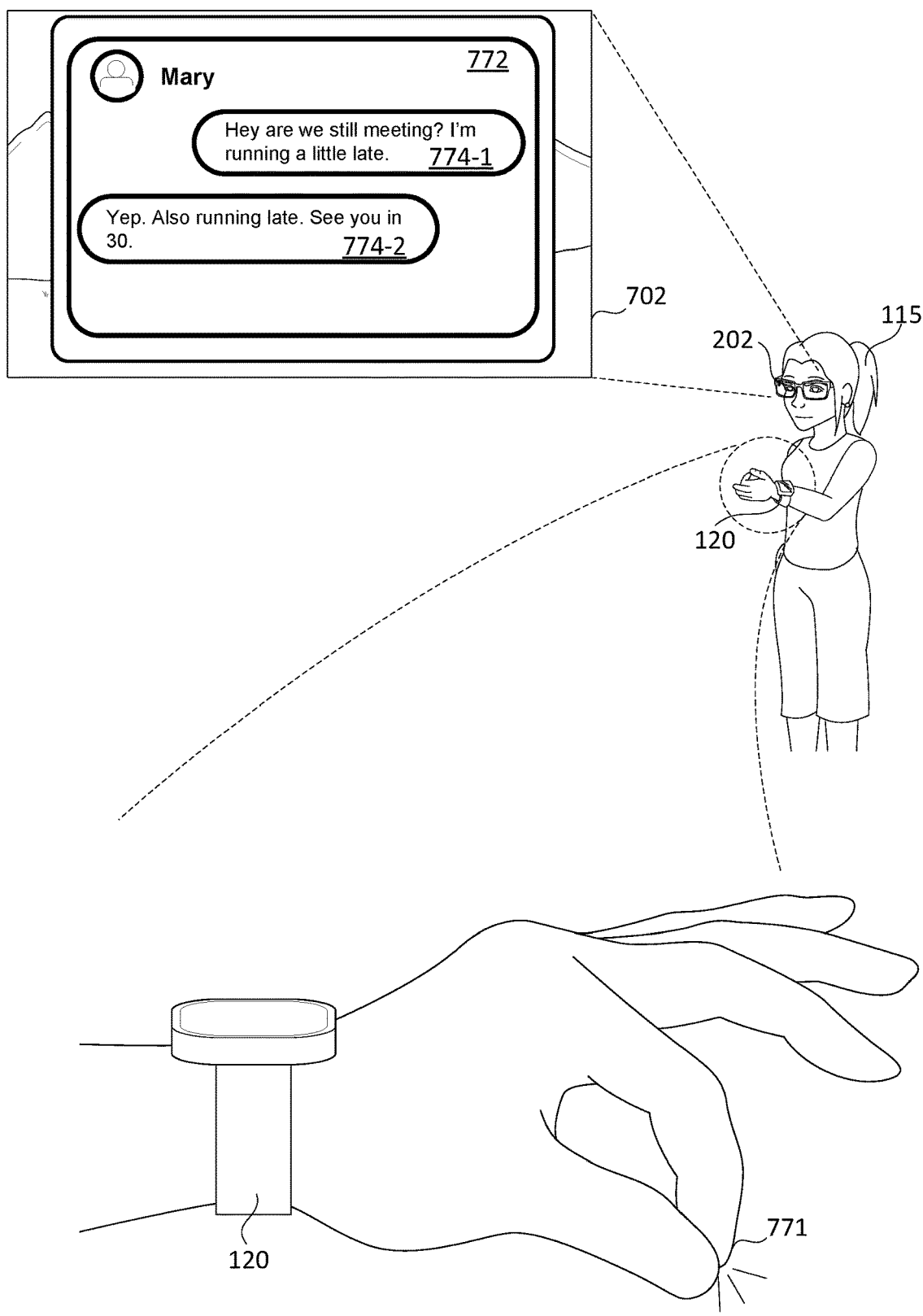
Figure 7P:
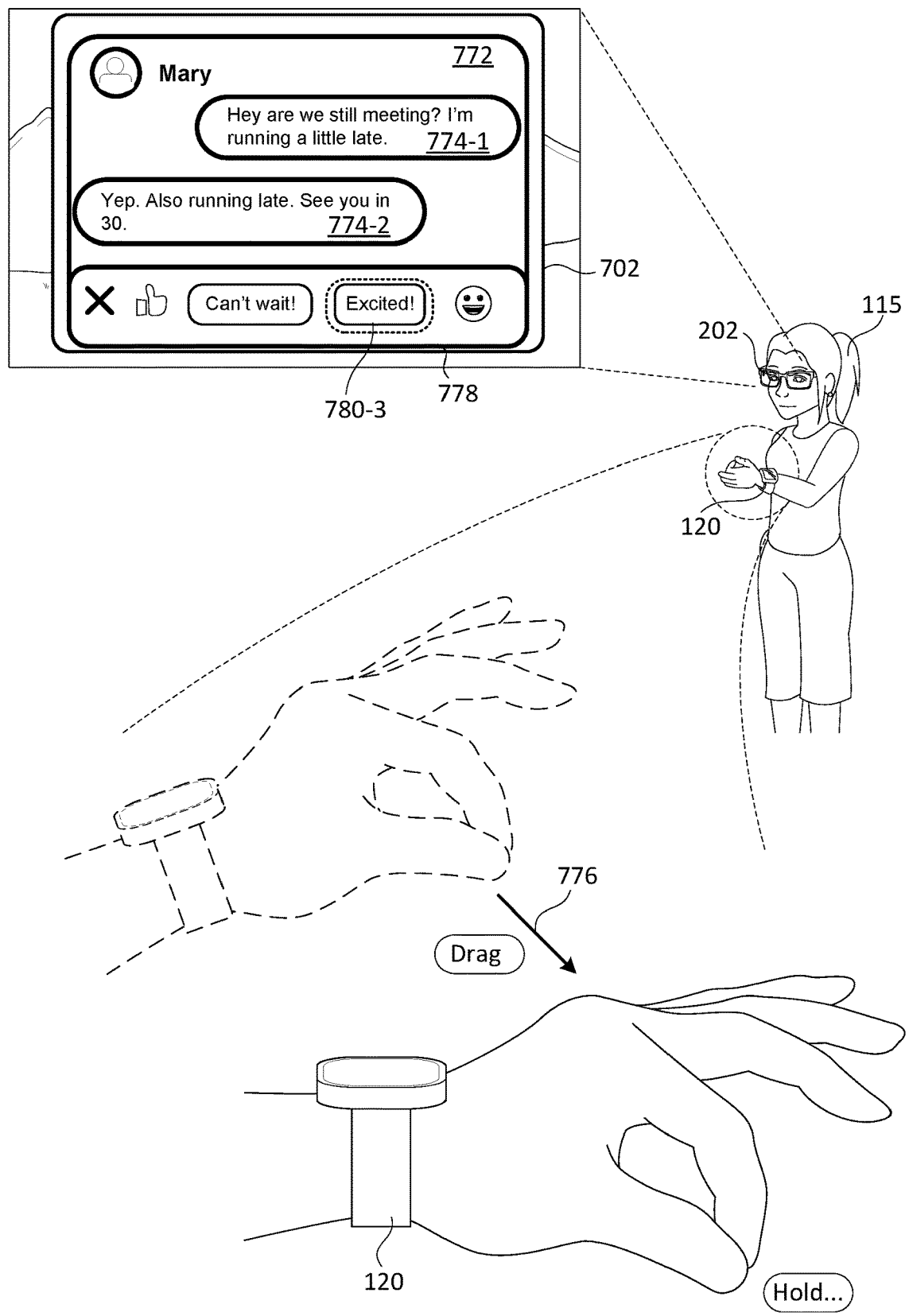
Figure 7Q:
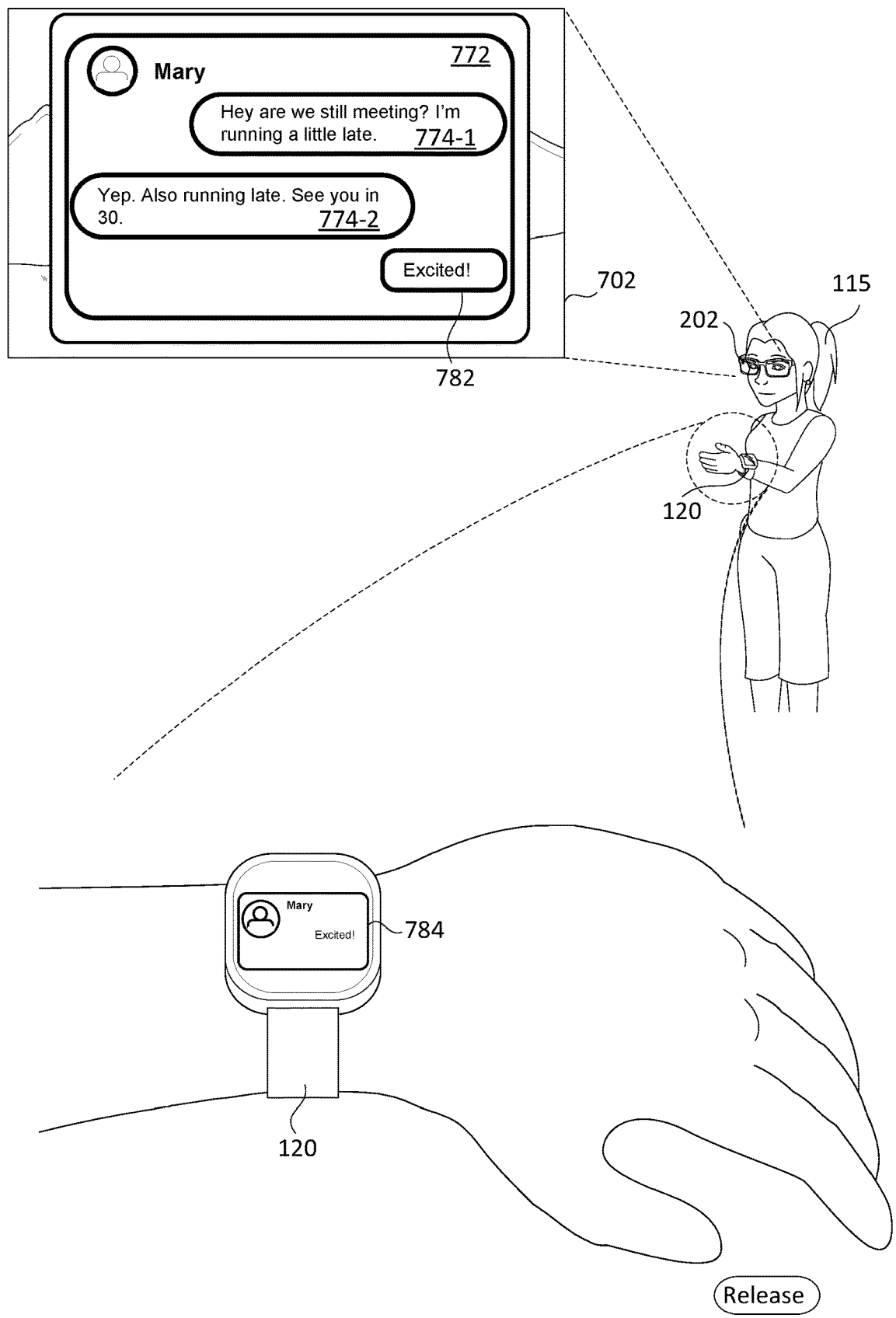
Figure 7R:
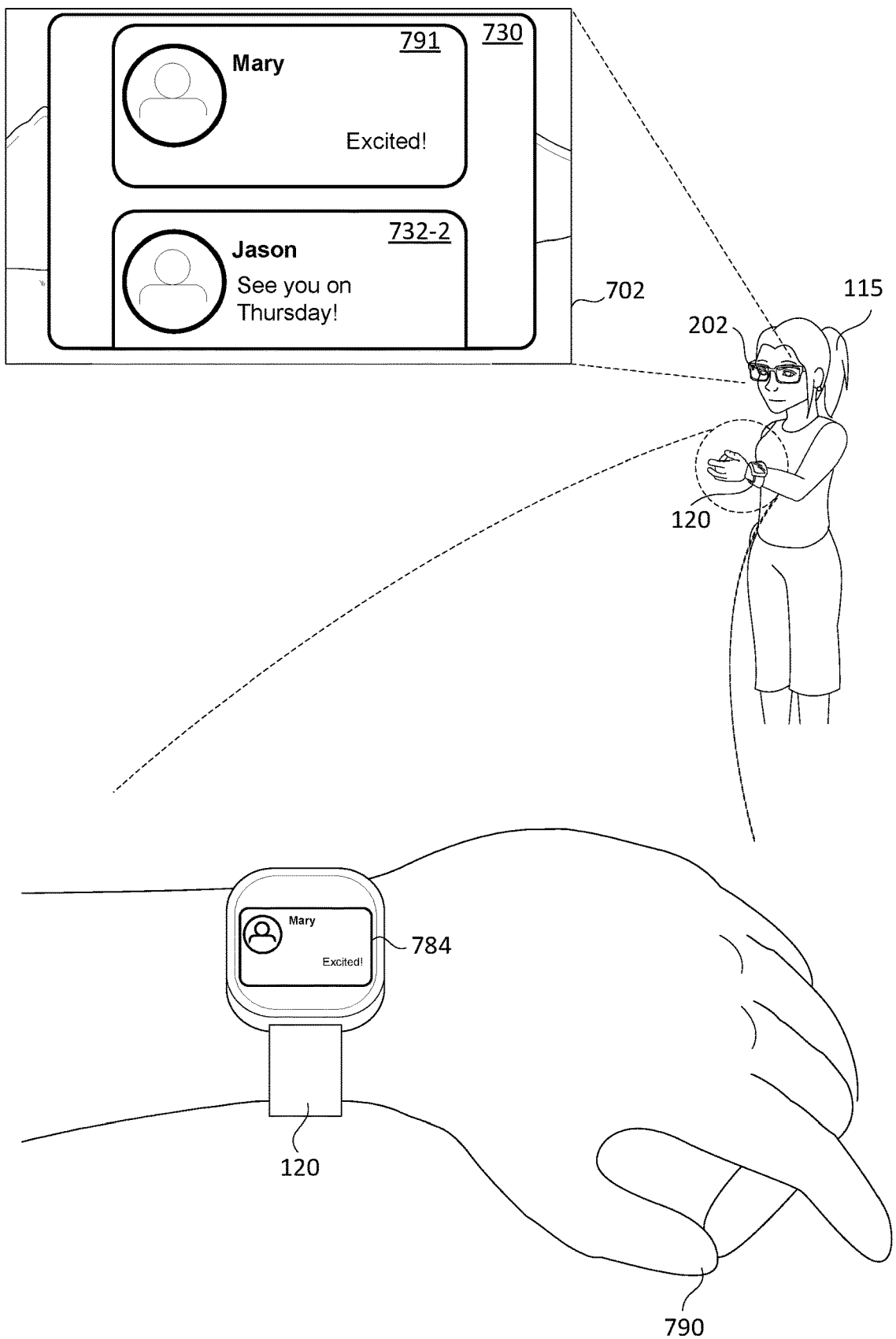
Figure 7S:
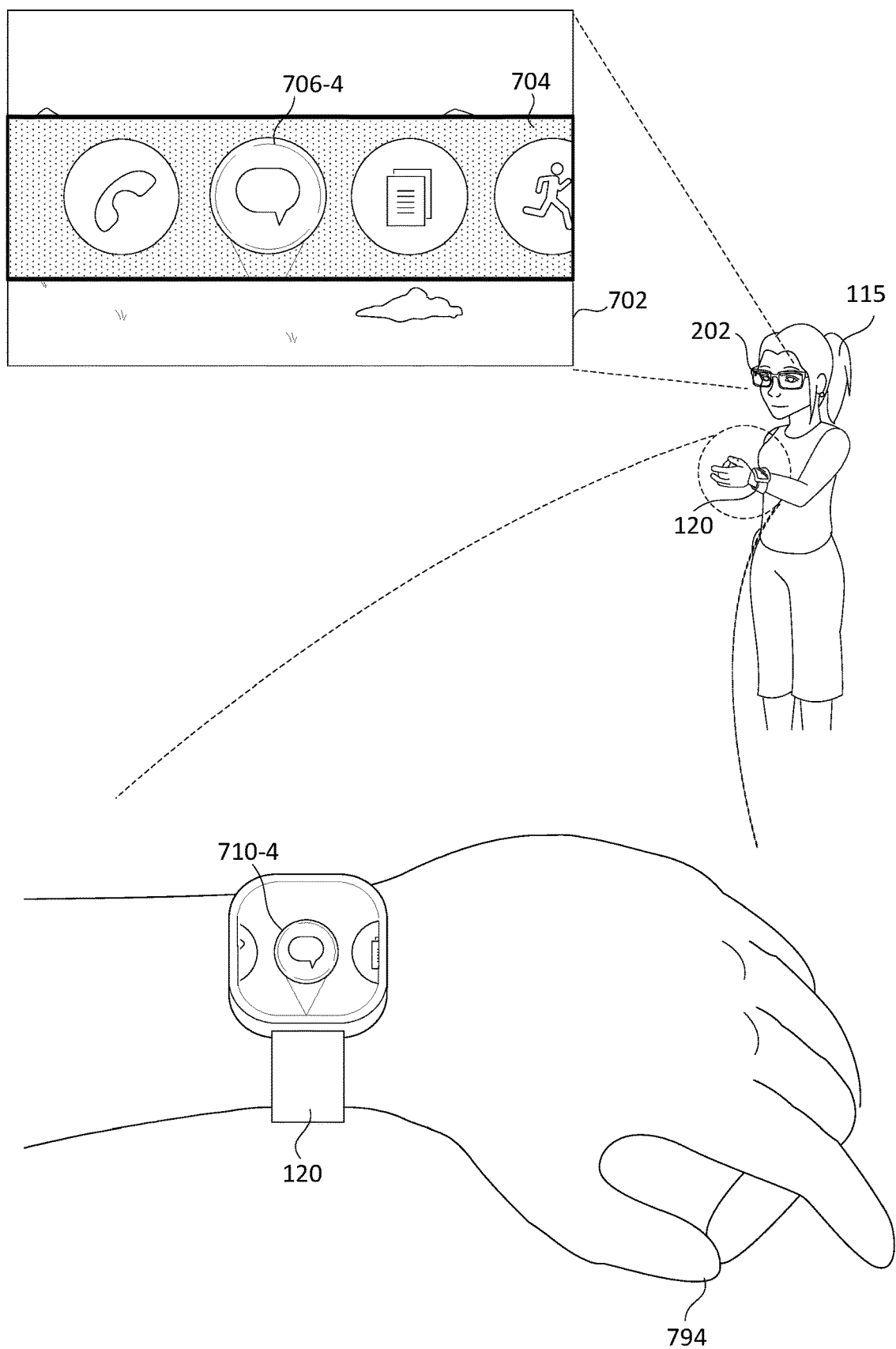

FIGS. 7A-7S illustrate another example user scenario of interacting with a wearable device in accordance with some embodiments. The user 115 in FIG. 7A is wearing a head-wearable device 202 (e.g., augmented reality glasses) and a wrist-wearable device 120 (e.g., a smartwatch). In some embodiments, the head-wearable device 202 is an instance of the augmented-reality system 7000. The user 115 in FIG. 7A is viewing a scene 702 that includes a menu 704. The menu 704 includes multiple user interface elements (icons) that correspond to different applications, including a user interface element 706-1 for a music application that has focus in FIG. 7A. In the example of FIG. 7A, the wrist-wearable device 120 includes a display with a user interface 708 that corresponds to (duplicates) the scene 702 (e.g., the user can view (and optionally interact) with either the scene 702 or the interface 708). The user interface 708 includes a user interface element 710-1 for the music application. The user 115 in FIG. 7A is not performing a gesture.

FIG. 7B shows the user 115 performing a pinch-and-roll gesture 711 (e.g., a navigation gesture) that involves the user's index finger contacting the thumb while the user rotates their wrist in a first direction. In particular, the user's wrist is rotated in FIG. 7B in accordance with the arrow 712. FIG. 7B further shows the scene 702 updating (responsive to the pinch-and-roll gesture) to scroll the menu 704 to give focus to a user interface element 706-2 for a phone application. In some embodiments, the amount of scroll of the menu 704 corresponds to a speed of the user's wrist rotation (e.g., a quick flick motion causes more scroll than a slow turning motion). In some embodiments, the amount of scroll of the menu 704 corresponds to an amount of rotation of the user's wrist (e.g., 90-degrees of rotation causes more scroll than 45-degrees of rotation). In accordance with some embodiments, the pinch-and-roll gesture is a multi-stage gesture where the pinch stage is a priming gesture and the roll stage is a navigation gesture.

FIG. 7C shows the user 115 having ceased to maintain (released) the pinch-and-roll gesture shown in FIG. 7B. As shown in FIG. 7C, releasing the pinch-and-roll gesture does not activate the focused user interface element (user interface element 706-2). In some embodiments, releasing a navigation gesture results in activation of the user interface element that has focus within the menu 704. In some embodiments, whether releasing the navigation gesture results in activation of the user interface element depends on one or more settings (e.g., user preferences). In the example of FIG. 7C, the wrist-wearable device 120 includes focus on a user interface element 710-2 for the phone application.

FIG. 7D shows the user 115 performing a pinch-and-roll gesture (e.g., a navigation gesture) that involves the user's index finger contacting the thumb while the user rotates their wrist in the first direction. In particular, the user's wrist is rotated in FIG. 7D in accordance with the arrow 722. FIG. 7D further shows the scene 702 updating (responsive to the pinch-and-roll gesture) to scroll the menu 704 to give focus to a user interface element 706-3 for an exercise application. FIG. 7D includes an arrow 724 indicating an amount of scroll of the menu 704 in response to the pinch-and-roll gesture (e.g., the longer arrow 724 in FIG. 7D indicates that more scrolling has occurred as compared to the shorter arrow 714 in FIG. 7B).

FIG. 7E shows the user 115 performing a pinch-and-roll gesture (e.g., a navigation gesture) that involves the user's index finger contacting the thumb while the user rotates their wrist in a second direction (e.g., opposite of the first direction in FIG. 7D). In particular, the user's wrist is rotated in FIG. 7E in accordance with the arrow 726. FIG. 7E further shows the scene 702 updating (responsive to the pinch-and-roll gesture) to scroll the menu 704 in accordance with arrow 728 to give focus to a user interface element 706-4 for a messenger application.

FIG. 7F shows the user 115 having ceased to maintain (released) the pinch-and-roll gesture shown in FIG. 7E. As shown in FIG. 7F, releasing the pinch-and-roll gesture does not activate the focused user interface element (user interface element 706-4). In the example of FIG. 7F, the wrist-wearable device 120 includes focus on a user interface element 710-4 for the messenger application.

FIG. 7G shows the user 115 performing a pinch gesture 729 that involves the user's index finger contacting the thumb. FIG. 7G further shows the scene 702 updating (responsive to the pinch gesture) to display the messenger user interface 730 with messages 732-1 and 732-2 (e.g., activation of the user interface element 706-4 for the messenger application in FIG. 7F). In some embodiments, the messenger application is activated in accordance with the pinch gesture 729 having one or more characteristics that are distinct from the pinch-and-roll gesture 711. For example, no roll gesture is detected within a threshold amount of time of detecting the pinch gesture. As another example, the pinch gesture 729 has a duration that is less than a threshold amount of time (e.g., quick pinch corresponds to an activation gesture and a long pinch corresponds to a priming gesture). As another example, the pinch gesture 729 has a force component that meets one or more criteria for an activation gesture (e.g., a deep-press pinch gesture is an activation gesture).

FIG. 7H shows the user 115 performing a pinch-and-roll gesture 740 (e.g., a navigation gesture) that involves the user's index finger contacting the thumb while the user rotates their wrist in the first direction. In particular, the user's wrist is rotated in FIG. 7H in accordance with the arrow 742. FIG. 7H further shows the scene 702 updating (responsive to the pinch-and-roll gesture) to scroll the messenger user interface 730 in accordance with arrow 744 (e.g., scrolling down through messages from various people), such that the message 732-3 has focus.

FIG. 7I shows the user 115 having ceased to maintain (released) the pinch-and-roll gesture 740 shown in FIG. 7H. As shown in FIG. 7I, releasing the pinch-and-roll gesture does not activate the focused message 732-3. In the example of FIG. 7I, the wrist-wearable device 120 includes focus on a message 748 (e.g., corresponding to focused message 732-3) in the messenger application.

FIG. 7J shows the user 115 performing a pinch gesture 750 that involves the user's index finger contacting the thumb. FIG. 7J further shows the scene 702 updating (responsive to the pinch gesture) to activate a function associated with the message 732-3. For example, in response to the pinch gesture 750 an emoji menu 752 is displayed and an emoji 754-1 is given focus. In some embodiments, the message function is activated in accordance with the pinch gesture 750 having one or more characteristics that are distinct from a pinch-and-roll gesture.

FIG. 7K shows the user 115 performing a pinch-and-drag gesture (e.g., a navigation gesture) that involves the user horizontally translating their arm in a first direction while maintaining the pinch gesture 750. In particular, the user's arm moves in a horizontal translation in FIG. 7K in accordance with the arrow 760. FIG. 7K further shows the scene 702 updating (responsive to the pinch-and-drag gesture) to move focus from the emoji 754-1 (in FIG. 7J) to the emoji 754-2 in the emoji menu 752 in accordance with arrow 758 (e.g., scrolling right through the emoji response options). In some embodiments, a pinch-and-roll gesture can be replaced with a pinch-and-drag gesture (and vice versa). For example, the system is responsive (in the same way) to both navigation gestures. In some embodiments, each pinch-and-roll gesture is replaced with a pinch-and-drag gesture. In some embodiments, each pinch-and-drag gesture is replaced with a pinch-and-roll gesture.

FIG. 7L shows the user 115 having ceased to maintain (released) the pinch-and-drag gesture shown in FIG. 7K. As shown in FIG. 7L, releasing the pinch-and-drag gesture selects the focused emoji (e.g., the emoji 754-2 in FIG. 7K). As shown in FIG. 7L the emoji 754-2 is sent in response to the message 732-3 (as illustrated by emoji 762) in accordance with the user releasing the pinch-and-drag gesture while the emoji 754-2 has focus. In some embodiments, the emoji 754-2 is not selected in accordance with the pinch-and-drag gesture being released (e.g., selection of the emoji 754-2 requires a separate gesture or gesture stage, such as a deep press). In the example of FIG. 7L, the wrist-wearable device 120 displays the focused message 748 with the emoji response 764 (corresponding to the emoji 762).

FIG. 7M shows the user 115 performing a pinch-and-roll gesture 765 (e.g., a navigation gesture) that involves the user's index finger contacting the thumb while the user rotates their wrist in the second direction (opposite the first direction in FIG. 7H). In particular, the user's wrist is rotated in FIG. 7M in accordance with the arrow 766. FIG. 7M further shows the scene 702 updating (responsive to the pinch-and-roll gesture) to scroll the messenger user interface 730 in accordance with arrow 768 (e.g., scrolling up through the messages from various people), such that the message 732-1 has focus.

FIG. 7N shows the user 115 having ceased to maintain (released) the pinch-and-roll gesture 765 shown in FIG. 7M. As shown in FIG. 7N, releasing the pinch-and-roll gesture does not activate the focused message 732-1. In the example of FIG. 7N, the wrist-wearable device 120 includes focus on a message 770 (e.g., corresponding to focused message 732-1) in the messenger application.

FIG. 7O shows the user 115 performing a pinch gesture 771 that involves the user's index finger contacting the thumb. FIG. 7O further shows the scene 702 updating (responsive to the pinch gesture 771) to display the messenger user interface 772 with messages 774-1 and 774-2 (e.g., corresponding to activation of the message 732-1 in FIG. 7N). For example, the messages 774 are messages between the user 115 and a person named Mary. In some embodiments, a function associated with the message 732-1 is activated in accordance with the pinch gesture 771 having one or more characteristics that are distinct from a pinch-and-roll gesture and distinct from the pinch gesture 750 in FIG. 7J. For example, the pinch gesture 771 has an associated force that is greater than a preset force threshold (e.g., a deep press) and the pinch gesture 750 has an associated force that is less than the preset force threshold (e.g., a light press).

FIG. 7P shows the user 115 performing a pinch-and-drag gesture (e.g., a navigation gesture) that involves the user horizontally translating their arm in the first direction while maintaining the pinch gesture 771. In particular, the user's arm moves in a horizontal translation in FIG. 7P in accordance with the arrow 776. FIG. 7P further shows the scene 702 updating (responsive to the pinch-and-drag gesture) to move focus to a quick response option 780-3 in a quick response menu 778 (e.g., scrolling right through quick response options).

FIG. 7Q shows the user 115 having ceased to maintain (released) the pinch-and-drag gesture shown in FIG. 7P. As shown in FIG. 7Q, releasing the pinch-and-drag gesture selects the focused quick response option (e.g., the quick response option 780-3 in FIG. 7P). As shown in FIG. 7Q the quick response 782 is sent in response to the message 774-2 in accordance with the user releasing the pinch-and-drag gesture while the quick response option 780-3 has focus. In some embodiments, the quick response option 780-3 is not selected in accordance with the pinch-and-drag gesture being released (e.g., selection of the quick response option 780-3 requires a separate gesture or gesture stage, such as a deep press). In the example of FIG. 7Q, the wrist-wearable device 120 displays the focused message 784 corresponding to the quick response 782.

FIG. 7R shows the user 115 performing a pinch gesture 790 that involves the user's middle finger contacting the thumb. FIG. 7R further shows the scene 702 updating (responsive to the pinch gesture 790) to display the messenger user interface 730 (e.g., corresponding to an 'exit' and/or 'go back' command) with message 791 (e.g., corresponding to quick response 782) and message 732-2.

FIG. 7S shows the user 115 performing a pinch gesture 794 that involves the user's middle finger contacting the thumb (e.g., corresponding to the 'exit' and/or 'go back' command). FIG. 7S further shows the menu 704 that includes the multiple user interface elements (icons) that correspond to different applications, including the user interface element 706-4 for the messenger application. In the example of FIG. 7S, the wrist-wearable device 120 includes display of the user interface element 710-4 for the messenger application.

Although the user scenarios described previously with respect to the series of FIGS. 1 through 7 describe operations being performed by the wrist-wearable device 120 and head-wearable devices 110 and 202, in some embodiments, at least a subset of the operations are performed by an intermediary device, such as a smartphone or personal computer, that is in communication with the wearable devices. For example, detection of user movement may occur at the wearable devices, but interpretation of the movement (e.g., identifying a gesture to which the movement corresponds) optionally occurs at an intermediary device. In some embodiments, the wrist-wearable device 120 and the head-wearable devices 110 and 202 communication with one another via the intermediary device (e.g., each are communicatively coupled to the intermediary device and the intermediary device manages interactions between the devices).

In some embodiments, data from sensors on multiple devices are combined (e.g., at the intermediary device) to detect an in-air gesture. For example, data from one or more optical sensors of a head-wearable device (e.g., the head-wearable device 202) can be combined with EMG and/or IMU data from a wrist-worn device (e.g., the wrist-wearable device 120) to identify a swipe gesture at a location that corresponds to a first scroll bar of a user interface rather than a second scroll bar displayed at a separate location.

Additionally, although the user scenarios described with respect to the series of FIGS. 1 through 7 are described as separate sequences, in some embodiments, the user scenarios are combined with one another. For example, the sequence described with respect to FIGS. 2A-2C could occur before (or after) the sequences described with respect to FIGS. 3A-3D, 4A-4D, and 7A-7S (e.g., all four sequences could occur while the user 115 is on a morning walk).

The user scenarios described with respect to the series of FIGS. 1 through 7 involved specific menus and applications, such as the radial menu 131 in FIG. 1A and the messenger application in FIG. 6A. However, the sequences, gestures, actions, and operations can be used in conjunction with other types of menus and applications, such as web-browsing, note-taking, social media, word processing, data-entry, programming, and the like.

Figure 8A:
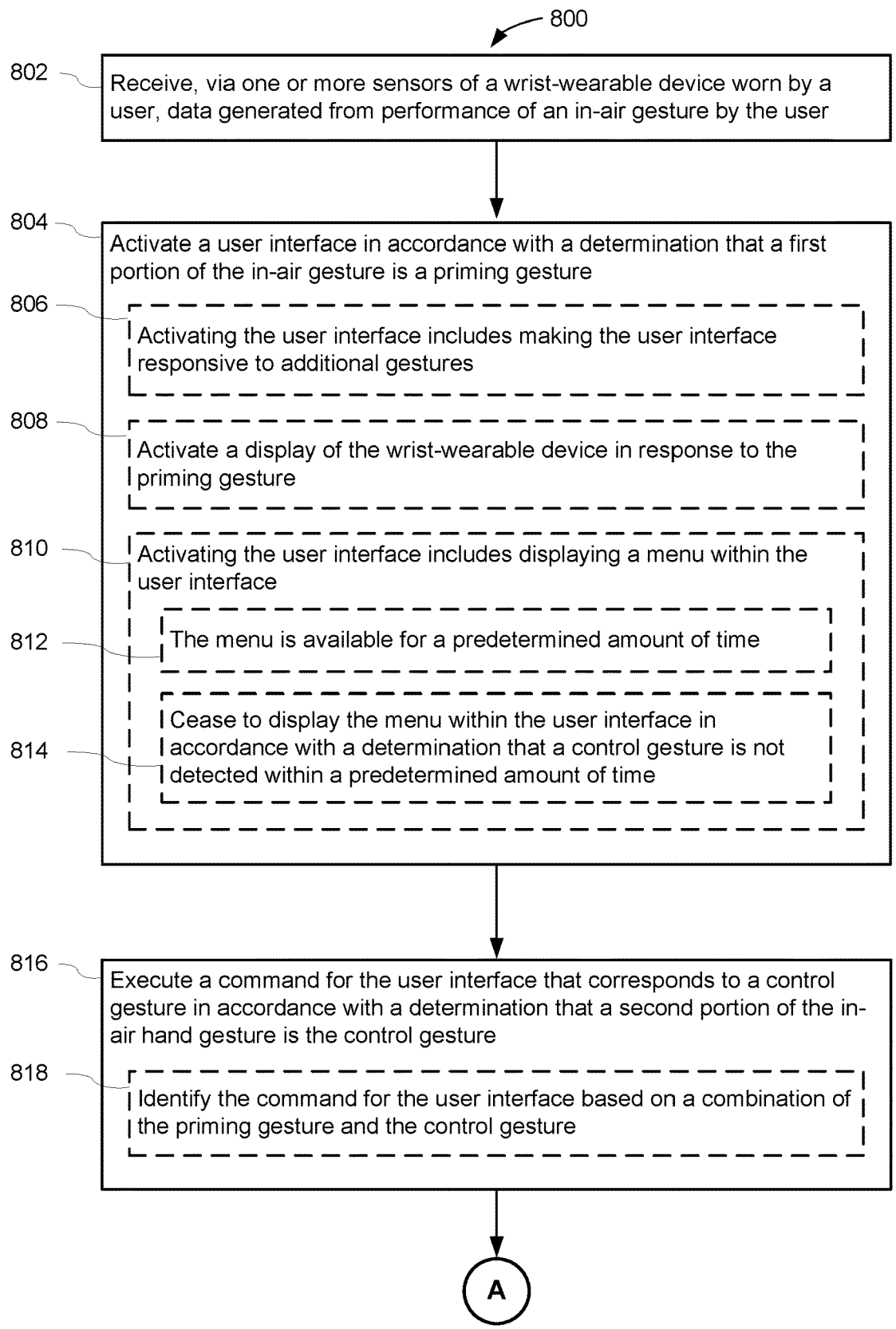
FIGS. 8A-8B are flow diagrams illustrating an example method for activating user-interface interactions in accordance with some embodiments.
Figure 8B:
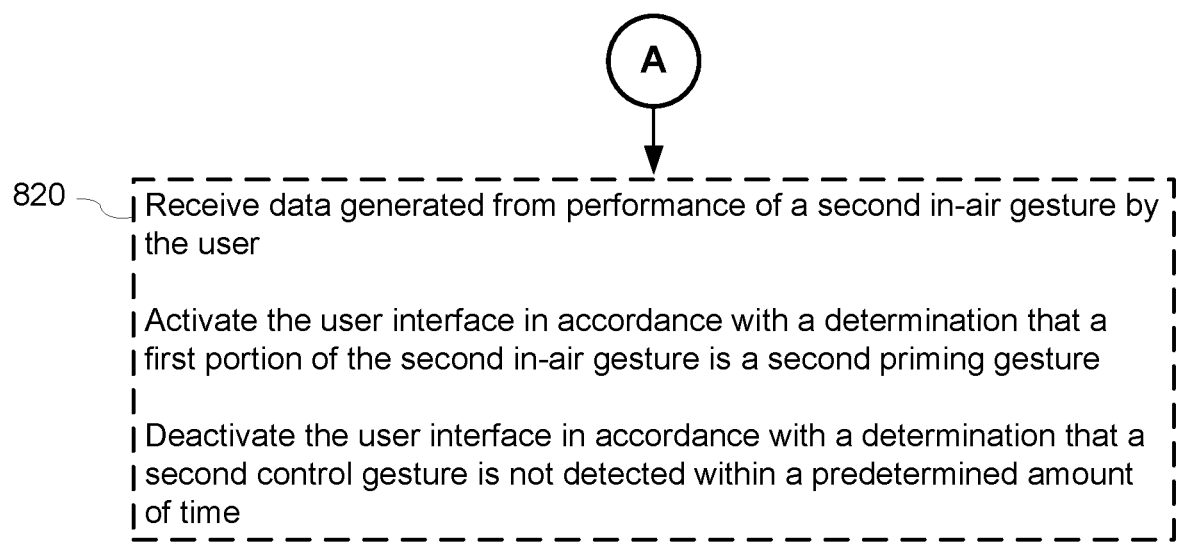

FIGS. 8A-8B are flow diagrams illustrating a method 800 for activating user-interface interactions in accordance with some embodiments. The method 800 is performed at a computing system (e.g., a wearable device or intermediary device) having one or more processors and memory. In some embodiments, the memory stores one or more programs configured for execution by the one or more processors. At least some of the operations shown in FIGS. 8A-8B correspond to instructions stored in a computer memory or computer-readable storage medium (e.g., the memory 6080 or the memory 7050). In some embodiments, the computing system is a wearable device, such as the wrist-wearable device 120 or the head-wearable device 110 or 202. In some embodiments, the computing system is, or includes, an intermediary device such as a smartphone or controller.

The system receives (802), via one or more sensors of a wrist-wearable device (e.g., the wrist-wearable device 120) worn by a user, data generated from performance of an in-air gesture by the user. For example, the one or more sensors include the sensors 6021 (e.g., EMG and/or IMU sensors).

The system activates (804) a user interface (e.g., via processor(s) 6079) in accordance with a determination that a first portion (stage) of the in-air gesture is a priming gesture. In some embodiments, activating the user interface includes making the user interface response to control gestures. In some embodiments, activating the user interface includes presenting at least one element on the user interface that was not presented prior to activation. For example, the options 132 are presented in response to a pinch gesture as illustrated in FIG. 1B.

In some embodiments, activating the user interface includes (806) making the user interface responsive to additional gestures. For example, the pinch gesture in FIG. 2B causes the interface 208 to be responsive to a wrist rotation gesture (to which it was not previously responsive). In some embodiments, activating the user interface includes changing an operating state of the wrist-wearable device or the head-wearable device (e.g., from a display mode to an input-responsive mode).

In some embodiments, the system activates (808) a display of the wrist-wearable device in response to the priming gesture. In some embodiments, the system activates a display of a head-wearable device in response to the priming gesture. In some embodiments, a wearable device (e.g., the wrist-wearable device 120 or the head-wearable device 202) is in a low-power or sleep state prior to receipt of the priming gesture and the wearable device transitions to a full power or awake state in response to the priming gesture. In some embodiments, the display is dimmed or turned off prior to receipt of the priming gesture and is turned on or illumination is increased in response to the priming gesture.

In some embodiments, activating the user interface includes (810) displaying a menu (e.g., the radial menu 131) within the user interface. In some embodiments, the menu is available (812) for only a predetermined amount of time (e.g., as illustrated in FIGS. 5A-5D). In some embodiments, the system ceases (814) to display the menu within the user interface in accordance with a determination that a control gesture is not detected within a predetermined amount of time (e.g., as described previously with reference to FIG. 5D).

The system executes (816) a command (e.g., via the processor(s) 6079) for the user interface that corresponds to a control gesture in accordance with a determination that a second portion (stage) of the in-air hand gesture is the control gesture. For example, the user interface 140 for the camera application is presented in FIG. 1E in response to the user tap gesture (e.g., a control gesture) in FIG. 1D.

In some embodiments, the system identifies (818) the command for the user interface based on a combination of the priming gesture and the control gesture. For example, the multiple commands may be responsive to the same priming gesture with distinct control gestures. As another example, multiple commands may be responsive to the same control gesture with different priming gestures. In these examples, the combination of priming gesture and control gesture is utilized to determine which command to execute.

In some embodiments, the system receives (820) data generated from performance of a second in-air gesture by the user; activates the user interface in accordance with a determination that a first portion of the second in-air gesture is a second priming gesture; and deactivates the user interface in accordance with a determination that a second control gesture is not detected within a predetermined amount of time (e.g., as illustrated in FIGS. 5A-5D). In some embodiments, the system is only responsive to a subset of control gestures that correspond to the priming gesture and deactivates the user interface in accordance with a determination that a control gesture from the subset of control gestures is not detected within the predetermined amount of time. In some embodiments, the subset of control gestures corresponds to an operating state of the system and the priming gesture performed (e.g., the subset of control gestures is based on an active application on the system).

Figure 8C:
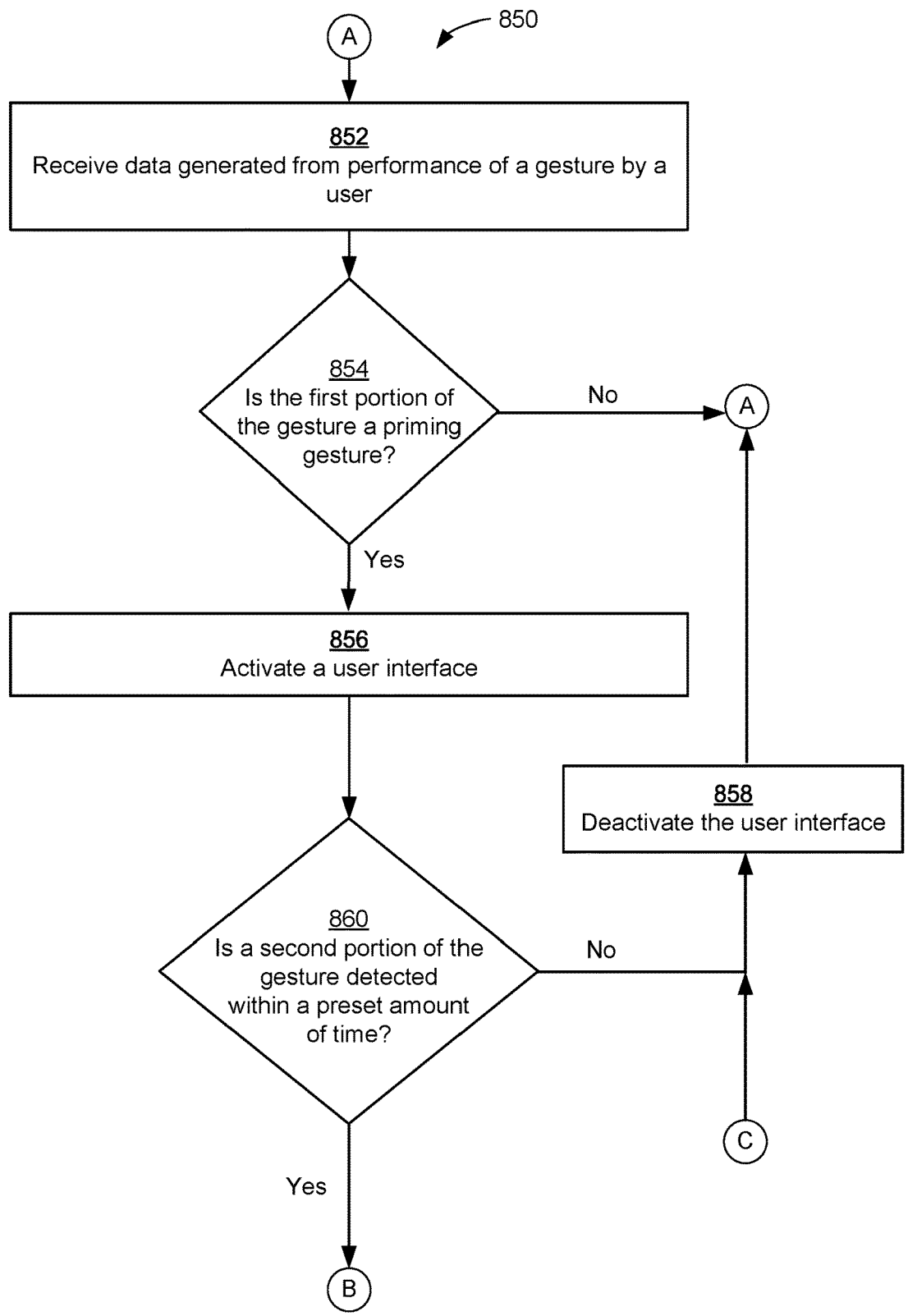
FIGS. 8C-8D are flow diagrams illustrating an example method for activating user-interface interactions in accordance with some embodiments.
Figure 8D:
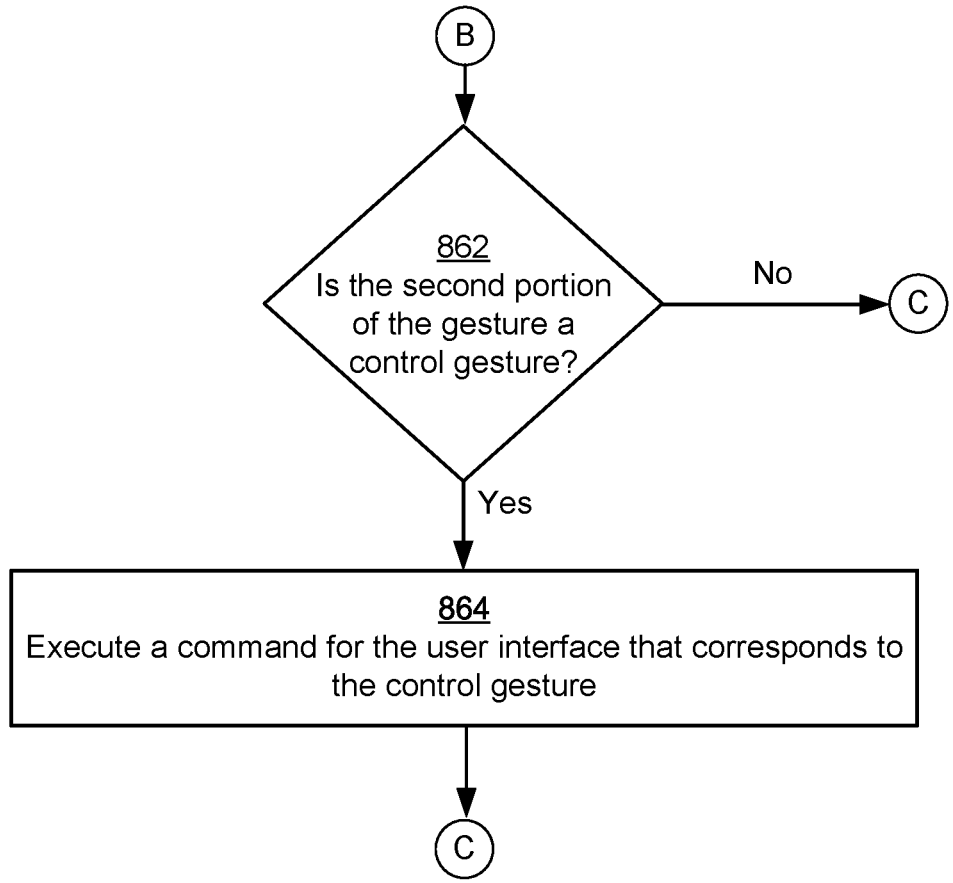

FIGS. 8C-8D are flow diagrams illustrating a method 850 for activating user-interface interactions in accordance with some embodiments. The method 850 is performed at a computing system (e.g., a wearable device or intermediary device) having one or more processors and memory. In some embodiments, the memory stores one or more programs configured for execution by the one or more processors. At least some of the operations shown in FIGS. 8C-8D correspond to instructions stored in a computer memory or computer-readable storage medium (e.g., the memory 6080 or the memory 7050). In some embodiments, the computing system is a wearable device, such as the wrist-wearable device 120 or the head-wearable device 110 or 202. In some embodiments, the computing system is, or includes, an intermediary device such as a smartphone.

The system receives (852) data generated from performance of a gesture by a user. For example, the system receives the data via one or more sensors (e.g., the sensors 6021). In some embodiments, the system receives data from one or more wearable devices (e.g., the wrist-wearable device 120 and/or the head-wearable device 110 or 202).

The system determines (854) whether the first portion of the gesture is a priming gesture. For example, one or more processors 6079 of a wearable device (or an intermediary device) analyzes the data and determines whether the gesture is, or includes, a priming gesture. In some embodiments, prior to determining that the first portion of the gesture is a priming gesture, the system is in a low-power or sleep state and is responsive to only priming gestures (e.g., not responsive to control or navigation gestures).

In accordance with a determination that the first portion of the gesture is a priming gesture, the system activates (856) a user interface. In some embodiments, activating the user interface includes one or more of: making the user interface responsive to more gestures/commands; updating the user interface to include one or more elements not previously shown; and increasing a brightness, opacity, and/or size of the user interface.

In accordance with a determination that the first portion of the gesture is not a priming gesture, the system forgoes activating the user interface (e.g., returns to a state responsive to only priming gestures).

The system determines (860) whether a second portion of the gesture is detected within a preset amount of time. For example, the system initiates a timer (e.g., 5, 15, or 30 seconds) in response to identifying the priming gesture.

In accordance with a determination that the second portion of the gesture is not detected within the preset amount of time, the system deactivates (858) the user interface (e.g., and returns to a state responsive to priming gestures). For example, the system (and user interface) returns to the state it was in prior to receiving the data generated from performance of the gesture by the user.

In accordance with a determination that the second portion of the gesture is detected within the preset amount of time, the system determines (862) whether the second portion of the gesture is a control gesture. In some embodiments, the system determines whether the second portion is part of a same multi-stage gesture as the first portion (e.g., whether the second portion is a valid second stage of a multi-stage gesture given the priming gesture).

In accordance with a determination that the second portion of the gesture is a control gesture, the system executes (864) a command for the user interface that corresponds to the control gesture. In some embodiments, the system identifies the command based on both the priming gesture and the control gesture. In some embodiments, the system identifies the command based on a combination of stages of the multi-stage gesture that includes the priming gesture and the control gesture. In some embodiments, the system deactivates (858) the user interface after executing the command. In some embodiments, the system updates the user interface in accordance with the command.

In accordance with a determination that the second portion of the gesture is not a control gesture, the system deactivates (858) the user interface (e.g., and returns to a state responsive to priming gestures).

In some embodiments, a particular set of gestures detected based on sensed neuromuscular signals (e.g., sensed using neuromuscular-signal sensors, such as EMG-sensing electrodes of a wrist-wearable device) is associated with a respective action (e.g., that can be performed at a device that is the same or different than the wrist-wearable device on which the neuromuscular-signal sensors can be positioned). In one example, at least seven distinct gestures are each associated with a different respective action, in particular, (i) a double index tap (e.g., an in-air hand gesture in which the user's thumb and index finger make contact twice) is associated with a first action (e.g., taking a photo); (ii) an index finger press and hold (e.g., an in-air hand gesture in which the user's thumb and index finger make contact and then maintain that contact for at least 0.15 seconds) is associated with a second action (e.g., starting or stopping a video); (iii) a double middle pinch (e.g., an in-air hand gesture in which the user's thumb makes contact with the user's middle finger twice) is associated with a third action (e.g., playing or pausing music); (iv) a thumb swipe in an upward direction (e.g., an in-air hand gesture in which the user's thumb moves in an upward direction away from the user's body across a part of the user's index finger) is associated with a fourth action (e.g., increasing volume); (v) a thumb swipe in a downward direction (e.g., an in-air hand gesture in which the user's thumb moves in a downward direction toward the user's body across a part of the user's index finger) is associated with a fifth action (e.g., decreasing volume); (vi) a thumb swipe in a leftward direction (e.g., an in-air hand gesture in which the user's thumb moves in a right-to-left direction across a part of the user's index finger) is associated with a sixth action (e.g., switching to a previously-played song, or switching to a prior content item such as a previously-viewed webpage or photo); and (vii) a thumb swipe in a rightward direction (e.g., an in-air hand gesture in which the user's thumb moves in a left-to-right direction across a part of the user's index finger) is associated with a seventh action (e.g., switching to a next song, or switching to a next content item such as a next webpage or photo). This example gesture space can also be made available only after a wake gesture is received and that wake gesture can be detected using sensors other than the neuromuscular-signal sensors, such as using sensors from an inertial measurement unit. Often, the IMU-based sensors can be less power-intensive and thus, gating the EMG gesture space until after the IMU-based wake gesture is received can help to ensure that the device makes efficient use of limited power and computing resources.

As one of skill in the art will appreciate, aspects of the method 800 can be combined and/or replaced with aspects of the method 850. For example, the method 800 can be performed prior to (or after) the method 850. The method 800 can include the operations of method 850, e.g., operations from method 800 can be performed after operation 862. As another example, the operation 804 can be replaced with the operation 854.

Figure 9A:
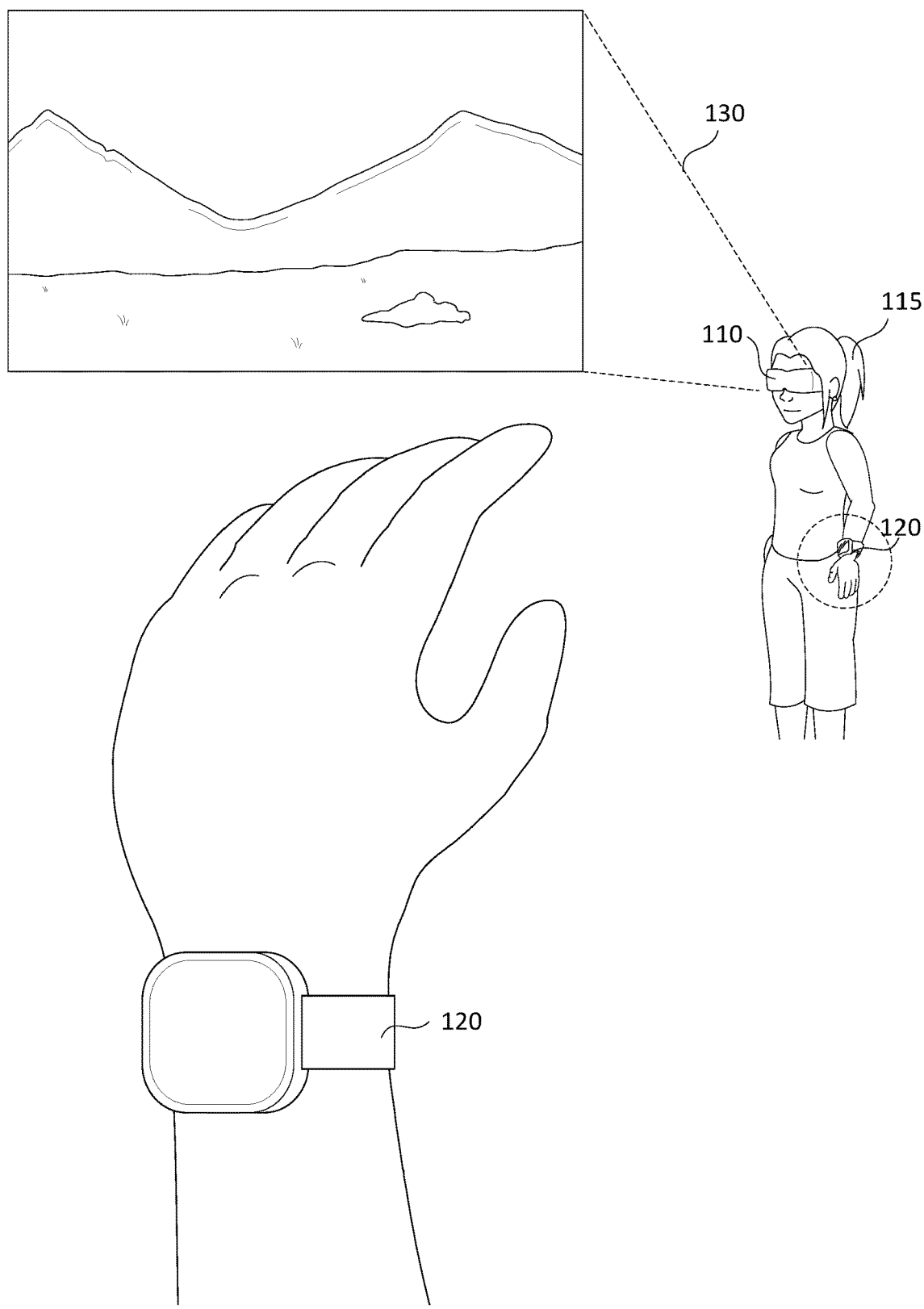
FIGS. 9A-9E illustrate another example user scenario of interacting with a wearable device in accordance with some embodiments.

FIGS. 9A-9E illustrate another example user scenario of interacting with a wearable device in accordance with some embodiments. The user 115 in FIG. 9A is wearing a head-wearable device 110 (e.g., a virtual reality headset) and a wrist-wearable device 120 (e.g., a smartwatch). In FIG. 9A, the user 115 is viewing a scene 130 via the head-wearable device 110 and the user 115 is not performing a gesture.

Figure 9B:
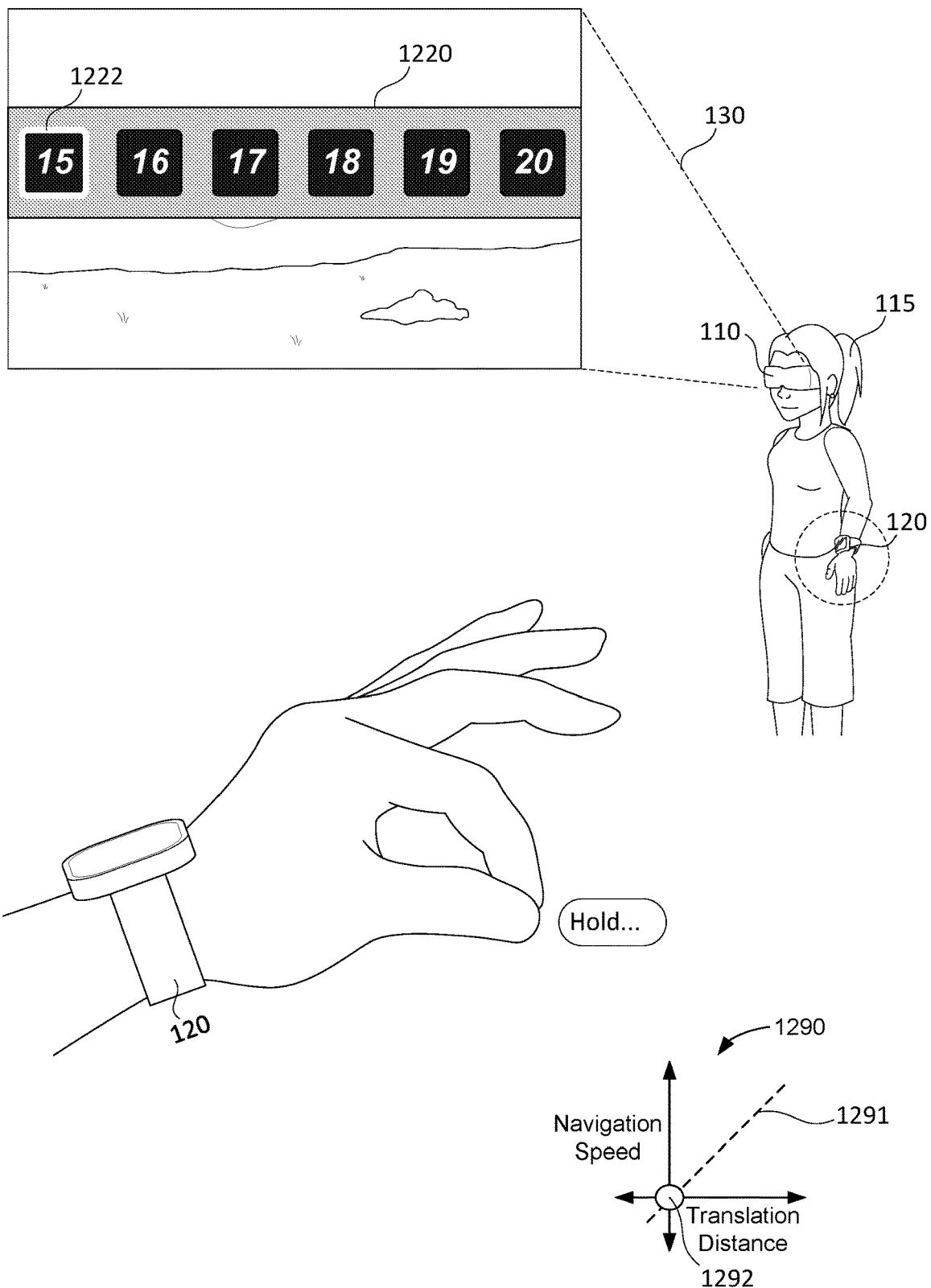

In FIG. 9B, the user 115 is performing a priming gesture (e.g., a pinch gesture) using the user's pointer finger contacting the thumb. FIG. 9B further shows the scene 130 having updated in response to the pinch gesture. The scene 130 in FIG. 9B includes a user interface 1220 (e.g., a list of numbers the user 115 can scroll through). The user interface 1220 includes one or more numbers and a focus 1222 which highlights the currently selected number (the number 15). In some embodiments, the focus 1222 appears on a number that was previously selected in response to detecting the priming gesture. In some embodiments, the focus 1222 appears on the start of the list of numbers (e.g., the leftmost number). In some embodiments, as the user 115 performs one or more hand gestures, the focus 1222 moves in accordance with the performed hand gesture (e.g., further described in FIGS. 9B-9E). In some embodiments, the focus 1222 is a cursor. In some embodiments, the user interface 1220 is displayed while the priming gesture is maintained. In some embodiments, the user interface 1220 is displayed for a predetermined amount of time after the priming gesture is performed. In some embodiments, the focus 1222 is displayed (and manipulable) while the priming gesture is maintained. In some embodiments, the focus 1222 is displayed (and manipulable) for a predetermined amount of time after the priming gesture is performed. In some embodiments, a first predetermined amount of time after the priming gesture is performed the focus 1222 ceases to be manipulable and/or displayed. In some embodiments, a second predetermined amount of time after the priming gesture is performed the user interface 1220 ceases to be displayed. In some embodiments, the second predetermined amount of time is longer than the first predetermined amount of time.

FIG. 9B further illustrates a graph 1290 showing a relationship between a translation distance of a navigation gesture and a navigation speed for the focus 1222. The graph 1290 in FIG. 9B corresponds to a first point in time (e.g., a point in time before the user 115 has performed a navigation gesture) and indicator 1292 indicates that the navigation speed is zero (e.g., no navigation is occurring at the first point in time). In some embodiments, the navigation speed of the focus 1222 corresponds to a translation distance of a navigation gesture from an initial. In some embodiments, the relationship between the navigation speed and the translation distance is a linear relationship, as indicated by dotted line 1291. In some embodiments, the position of the hand of the user 115 when the priming gesture is performed is set as an initial position (e.g., for use with subsequent navigation gestures).

Figure 9C:
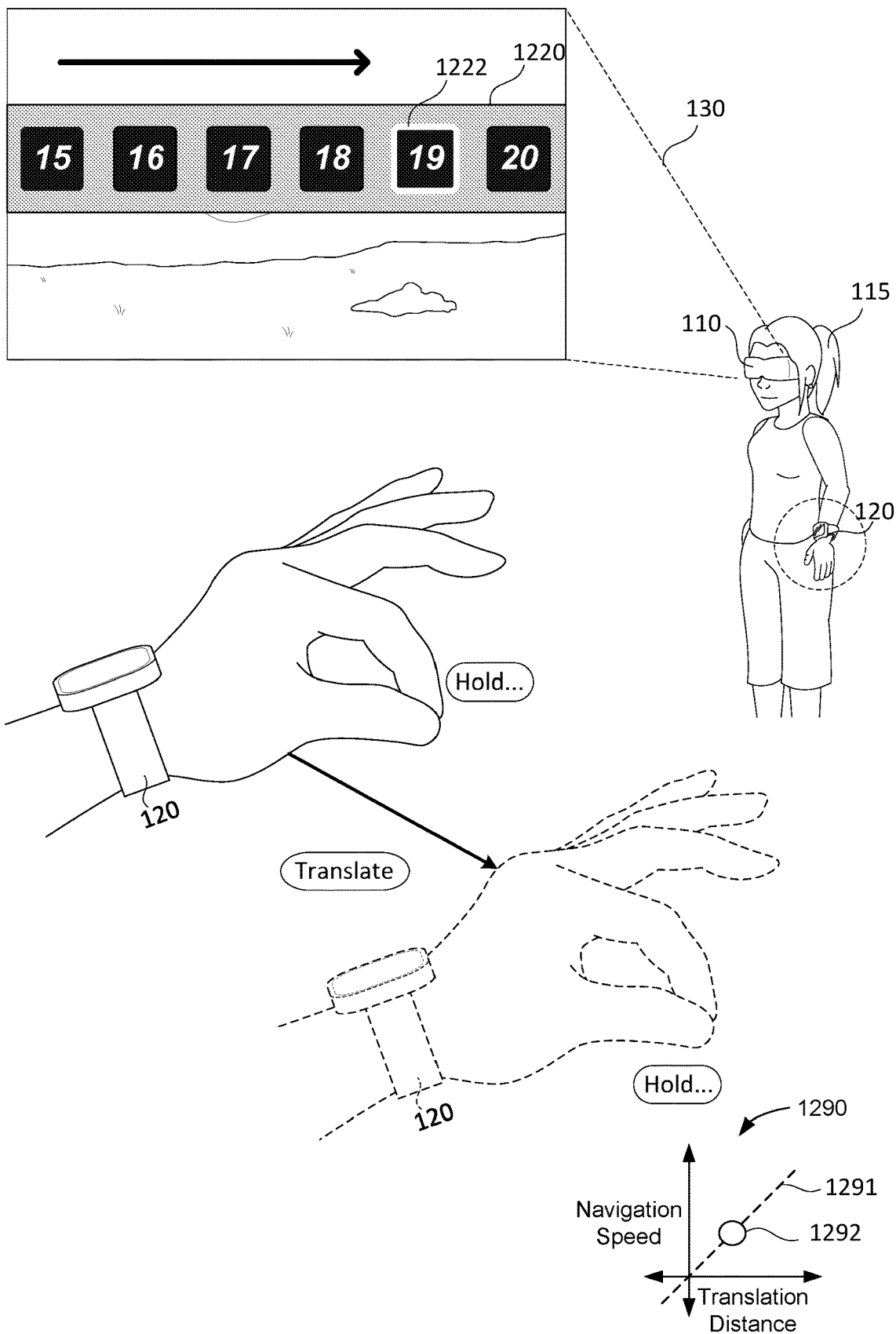

FIG. 9C illustrates the user 115 performing a navigation gesture (e.g., a drag gesture which is a horizontal translation, also shown and described in FIG. 7K). In the example of FIG. 9C the priming gesture (e.g., the pinch gesture) is maintained during the navigation gesture. FIG. 9C also illustrates the scene 130 updating responsive to the navigation gesture by scrolling through the user interface 1220 at a first speed and moving the focus 1222 from the number "15" to the number "19." In some embodiments, the distance of the translation corresponds to a speed of the navigation, as indicated by the graph 1290 in FIG. 9C. In some embodiments, the navigation speed is based on one or more settings (e.g., set by the user 115 or set as a default by the system). For example, the user 115 may adjust a setting that adjusts the slope of the dotted line 1291.

The graph 1290 in FIG. 9C illustrates a navigation speed of the focus 1222 at a second point in time, as indicated by indicator 1292. The navigation speed of the focus 1222 is based on the translation distance of the navigation gesture in accordance with some embodiments. The indicator 1292 illustrates that the user 115 has translated their hand a first distance and is scrolling through the user interface elements 1220 at a corresponding first speed. For example, as the user 115 translates their hand farther, they are able to scroll more quickly and if the user 115 holds their hand at a set distance from the initial distance the focus 1222 will scroll at a constant speed based on the set distance.

Figure 9D:
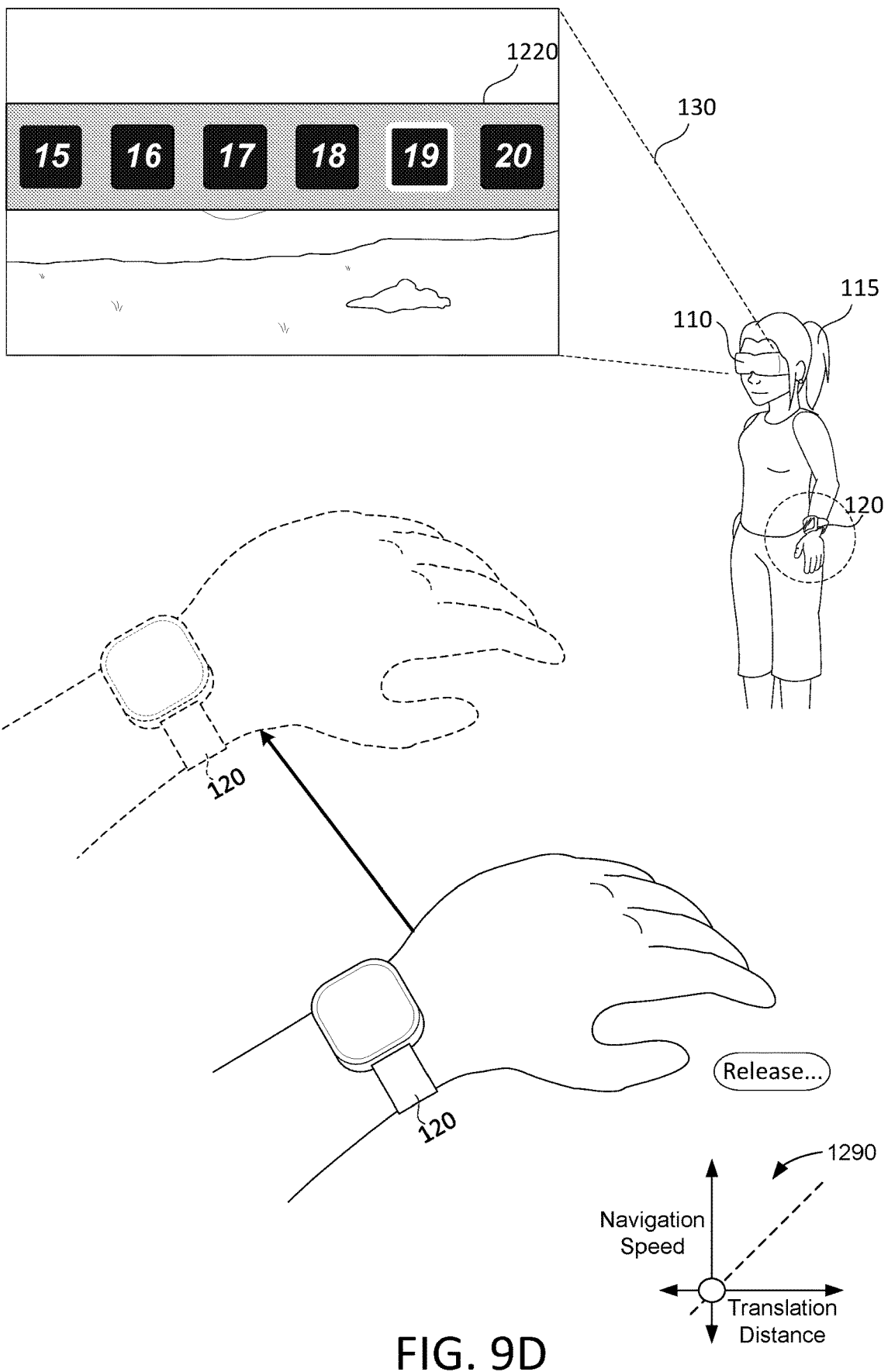

FIG. 9D illustrates the user 115 releasing the pinch gesture (e.g., the priming gesture) and returning their hand to the initial starting position. In some embodiments, the release of the pinch gesture causes the navigation gesture to end and subsequent movement back to the initial position does not cause the navigation of the user interface 1220. In some embodiments, the system does not detect and/or respond to navigation gestures in the absence of a priming gesture, as indicated by the graph 1290 in FIG. 9D. Accordingly, the system does not respond to the user 115 moving their hand after releasing the pinch gesture in FIG. 9D. In some embodiments, the user 115 performs an additional priming gesture and a subsequent navigation gesture to resume scrolling through the user interface 1220. For example, the user 115 can continue performing the actions illustrated in FIGS. 9B-9C to continue scrolling through the user interface 1220.

Figure 9E:
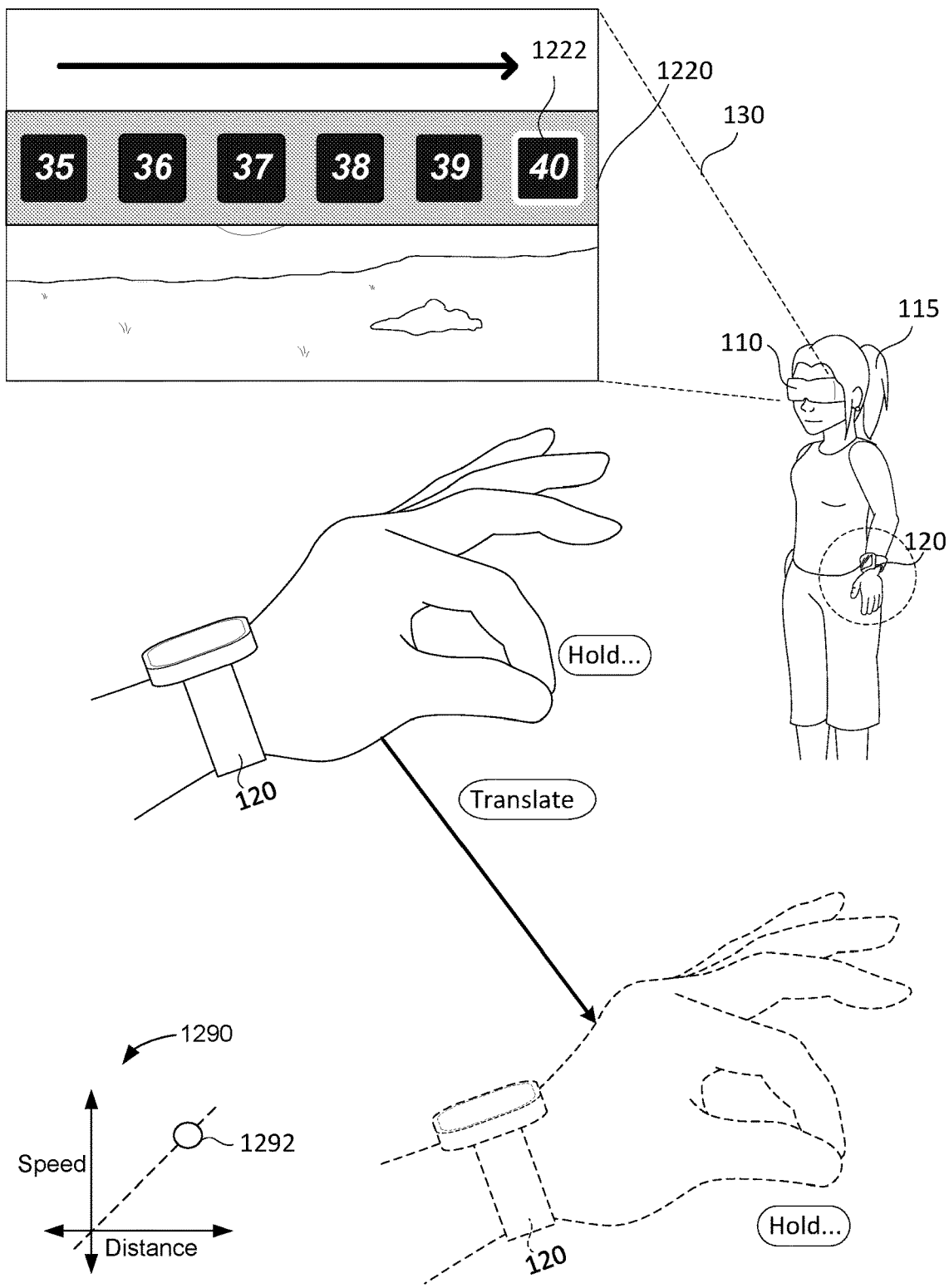

FIG. 9E illustrates the user 115 performing a priming gesture (e.g., a pinch gesture) and a subsequent navigation gesture (e.g., an additional horizontal translation of their hand) at a third point in time. In the example of FIG. 9E, the user 115 is translating their hand a further distance than the previous translation shown in FIG. 9C. The graph 1290 in FIG. 9E illustrates a navigation speed of the focus 1222 at the third point in time, as indicated by the position of the indicator 1292. FIG. 9E further shows the focus 1222 moving from the number 19 (in FIG. 9E) to the number 40 in accordance with the subsequent navigation gesture. In some embodiments, the navigation speed of the focus 1222 is based on a distance of the translation. In some embodiments, the navigation speed of the focus 1222 is independent of a speed of the translation. In some embodiments, the navigation distance through the user interface 1220 is based on a distance, speed, and/or duration of the navigation gesture. The indicator 1292 in FIG. 9E indicates that the user 115 translated their hand a second distance and is scrolling through the user interface 1220 at a corresponding second speed. In some embodiments, as the user 115 continues to translate their hand farther, the speed of the navigation increases.

FIGS. 9A-9E illustrate examples of a user navigating horizontally. In some embodiments, the user navigates vertically using the gestures shown and described in FIGS. 9A-9E. In some embodiments, the gesture translations are horizontal and/or vertical. FIGS. 9A-9E illustrate examples of a user translating their arm in particular directions. In some embodiments, the user navigates by translating their hand, but not their arm (e.g., a translation associated with bending of the user's wrist), in a similar manner as shown and described in FIGS. 9A-9E. In some embodiments, the user is able to navigate a two-dimensional user interface by translating their hand and/or arm along two different axes. In some embodiments, the user navigates by rotating their wrist (e.g., as shown in FIGS. 10A-10H). In some embodiments, the navigation includes controlling movement of a cursor between elements (e.g., icons) on a user interface. In some embodiments, the navigation includes moving a focus from one element to another (e.g., without moving the focus to a position that does not corresponds to an element).

Figure 10A:
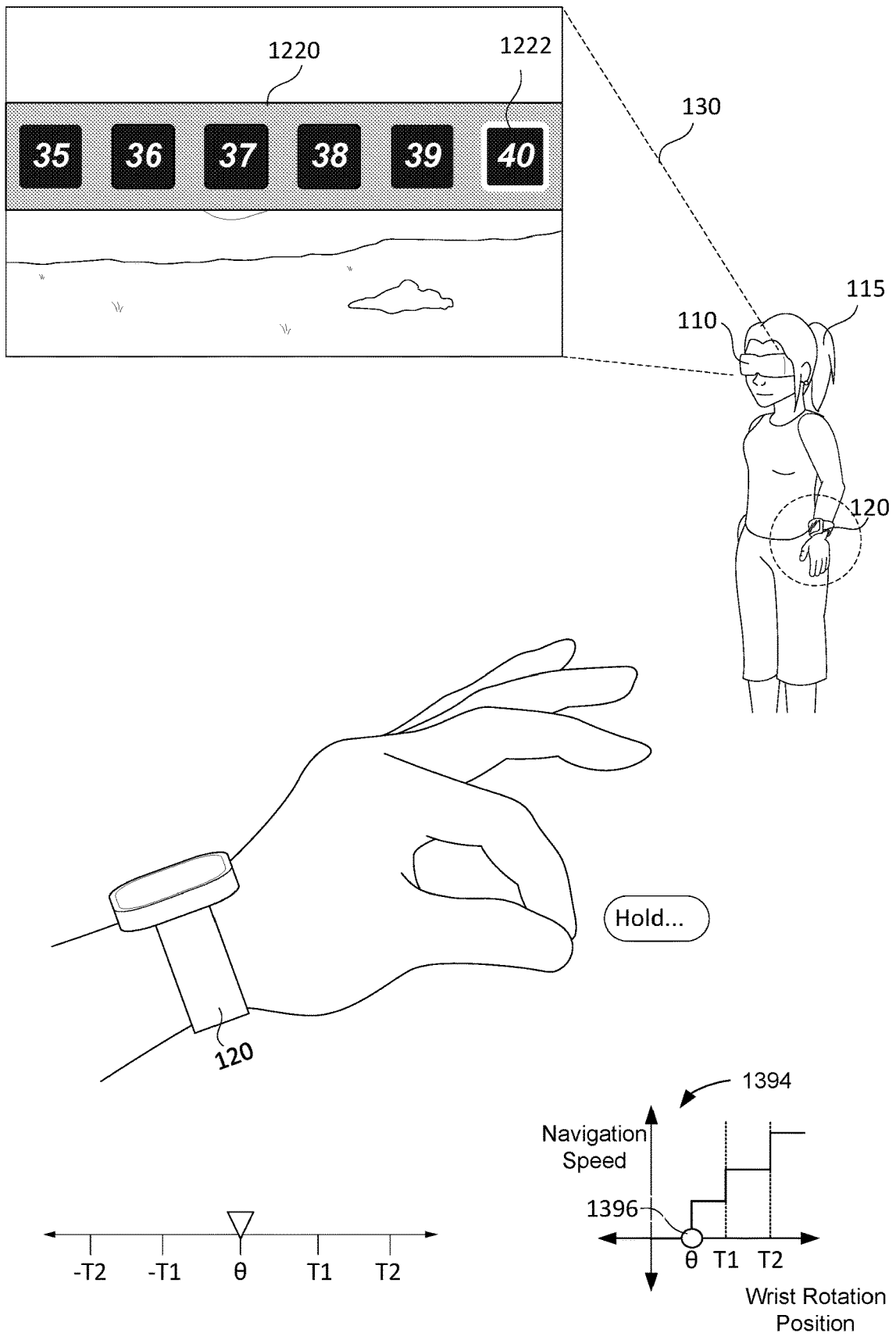
FIGS. 10A-10H illustrate another example user scenario of interacting with a wearable device in accordance with some embodiments.

FIG. 10A illustrates the user 115 performing a pinch-and-hold gesture to perform a priming gesture and assign an initial position θ for a subsequent hand gesture. In the example of FIG. 10A, the focus 1222 is on the number 40 of the user interface 1220 (e.g., as a result of the sequence of FIGS. 9A-9E). As illustrated in FIGS. 9A-9E, while the priming gesture is maintained, the user interface 1220 is displayed in the scene 130. FIG. 10A further illustrates graph 1394 which shows the speed of scrolling versus position of the user's hand gesture with reference to the assigned initial position, at a first point in time (e.g., before the user 115 has performed a navigation gesture). For example, FIG. 10A illustrates the user's hand gesture still maintained at the initial position and thus no scrolling has occurred. The indicator 1396 in FIG. 10A indicates that the hand gesture is still at the initial position θ and thus the scrolling speed is zero. In the example of FIGS. 10A-10H, the relationship between navigation speed and hand position is a step function with steps at a first threshold, T1, and a second threshold, T2. In some embodiments, the first and second thresholds are evenly spaced (e.g., the steps have a same size). In some embodiments, the first and second thresholds are not evenly spaced (e.g., the steps have different sizes). In some embodiments, the focus 1222 starts moving when the navigation gesture leaves the initial position (e.g., a non-zero speed corresponds to the distance between the initial position and the first threshold, T1).

In some embodiments, the step function contains a dead zone (in which no scrolling occurs) such that the focus 1222 move while the hand position is within the dead zone. For example, there may be a third threshold, T0, between the initial position θ and the first threshold T1. In this example, a navigation gesture with a distance from the initial position (e.g., a wrist rotation distance or hand translation distance) that is less than the third threshold, T0, does not cause movement of the focus 1222.

Figure 10B:
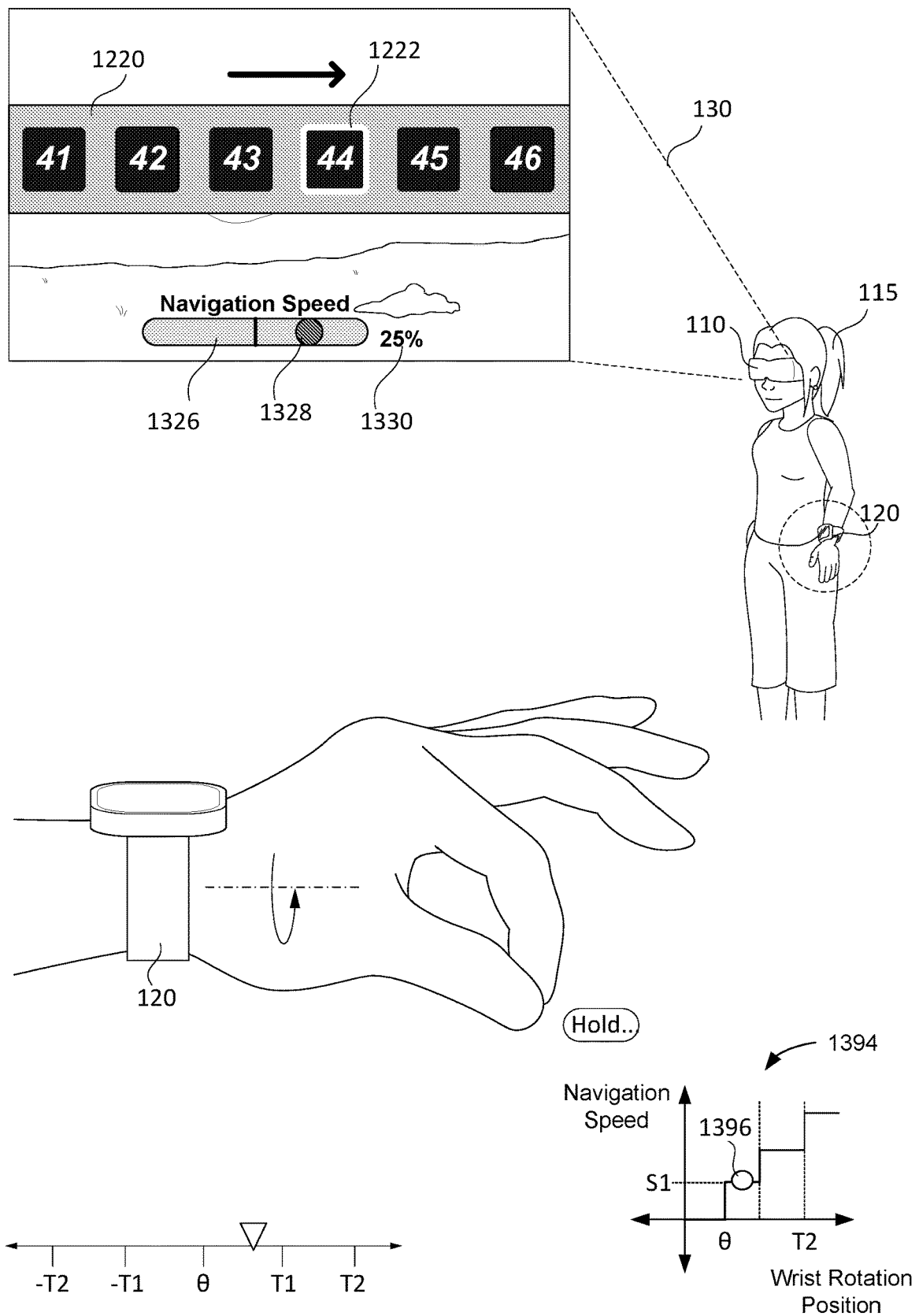

FIG. 10B illustrates the user 115 rotating their wrist (e.g., a navigation gesture) in a first direction past the initial position θ while maintaining the pinch gesture from FIG. 10A. In some embodiments, as the user 115 rotates their wrist past the initial position θ, the focus 1222 scrolls through the numbers in the user interface 1220 at a first speed (e.g., 25% of a maximum speed) corresponding to the step between the initial position θ and the first threshold, T1. FIG. 10B further shows the focus 1222 moving from the number 40 (in FIG. 10A) to the number 44 in accordance with the navigation gesture (the wrist rotation). In the example of FIG. 10B a scrolling speed user interface element 1326 is displayed. In some embodiments, the scrolling speed user interface element 1326 is displayed in response to detecting the navigation gesture. In some embodiments, the scrolling speed user interface element 1326 is displayed in response to detecting the priming gesture. In some embodiments, the scrolling speed user interface element 1326 is displayed in accordance with a corresponding setting being enabled (e.g., the user 115 may set a preference to toggle display of the scrolling speed user interface element 1326). In some embodiments, the scrolling speed user interface element 1326 is displayed at a different location in the scene 130 (e.g., a top or lateral side of the scene 130). In some embodiments, the position of the scrolling speed user interface element 1326 is based on a user preference and/or a device setting (e.g., a device setting set by an active application or function of the head-wearable device 110).

The scrolling speed user interface element 1326 provides a visual indicator 1328 and a numerical indicator 1330 indicating to the user 115 their current navigation (scrolling) speed. In some embodiments, the scrolling speed user interface element 1326 includes a different type of speed indication (e.g., a raw speed number and/or a color indicator). In some embodiments, as the user 115 rotates their hand clockwise passing the initial position θ, the focus 1222 moves from left to right through the numbers of the user interface 1220. Furthermore, as the user 115 scrolls through the numbers in the user interface 1220 by rotating their hand from the initial position θ in the first direction (e.g., clockwise), the numbers increase in value. In some embodiments, as the user 115 rotates their hand from the initial position θ in the second direction (e.g., counter-clockwise), the focus 1222 moves from left to right through the numbers in the user interface 1220. The graph 1394 in FIG. 10B illustrates a navigation speed versus a wrist rotation angle at a second point in time. For example, as illustrated in FIG. 10B, the user 115 has rotated their wrist past the initial position θ but not past the first threshold T1. Thus, the user 115 is scrolling through the numbers in the user interface 1220 at a first speed (S1) in FIG. 10B.

Figure 10C:
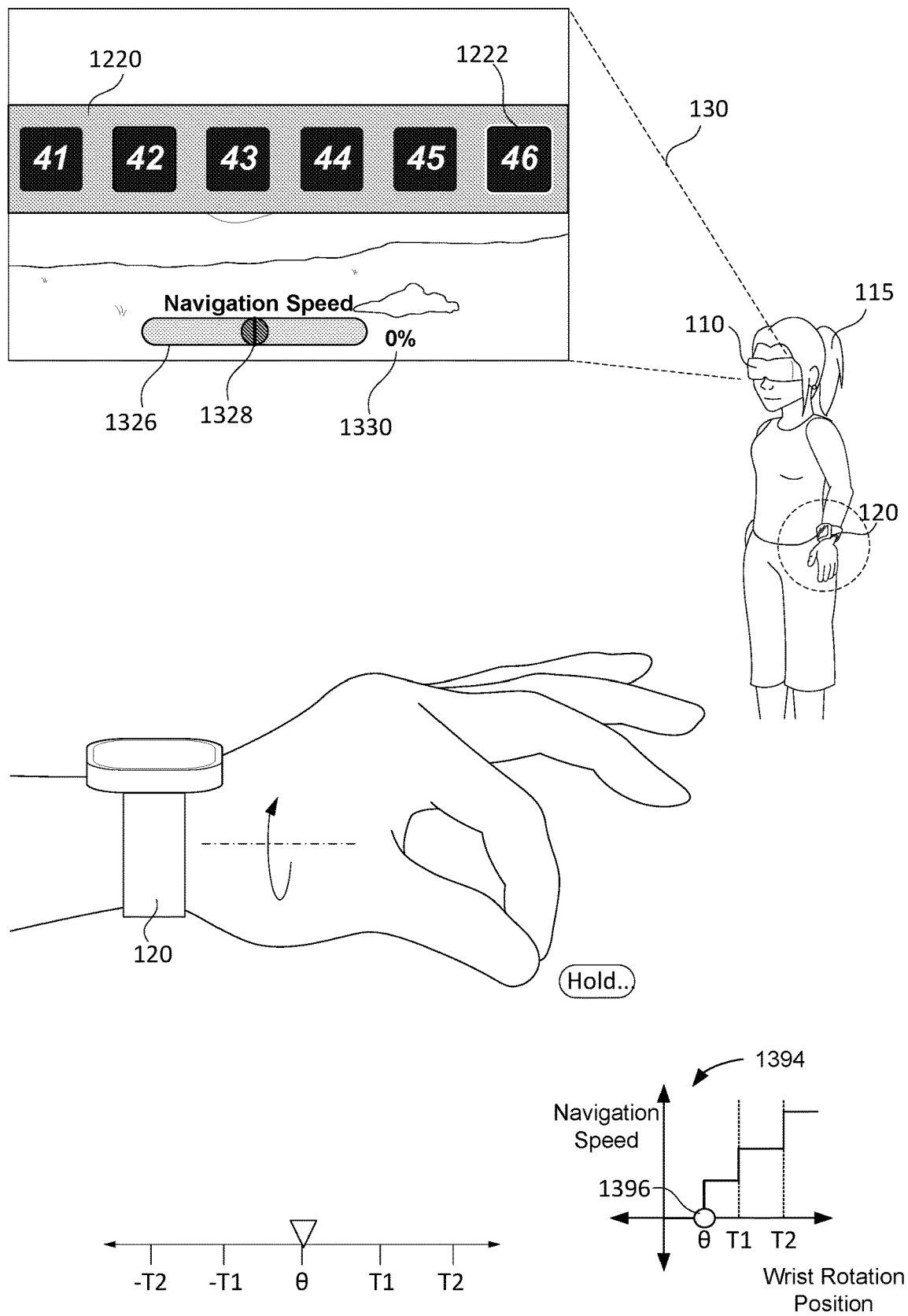

FIG. 10C illustrates the user 115 rotating their wrist in the second direction back to the initial position θ while maintaining the pinch gesture from FIG. 10B. In some embodiments, when the user 115 rotates their wrist back to the initial position θ, the navigation speed returns to zero (e.g., the navigation gesture ends). FIG. 10C further shows the focus 1222 moving from the number 44 (in FIG. 10B) to the number 46 in accordance with the navigation gesture (e.g., the wrist rotation). For example, the focus 1222 continues to move to the right as the user 115 rotates their wrist back toward the initial position θ and stops moving once the user 115 returns their wrist to the initial position θ. As illustrated in FIG. 10C the relative position of the wrist of the user 115 determines the direction of movement of the focus 1222. For example, the direction of movement of the wrist of the user 115—counter-clockwise back to the initial position in FIG. 10C does not change the direction of movement of the focus 1222 while the relative position is clockwise of the initial position. In some embodiments, a subsequent rotation of the wrist away from the initial position θ (while maintaining the pinch gesture) corresponds to a continuation of the navigation gesture or a start of a new navigation gesture. The indicator 1396 on the graph 1394 shows the user 115 has returned their wrist to the initial position θ and the scrolling speed has decreased to zero, at a third point in time. Accordingly, the visual indicator 1328 and the numerical indicator 1330 on the scrolling speed user interface element 1326 indicate that the navigation speed is zero in FIG. 10C.

Figure 10D:
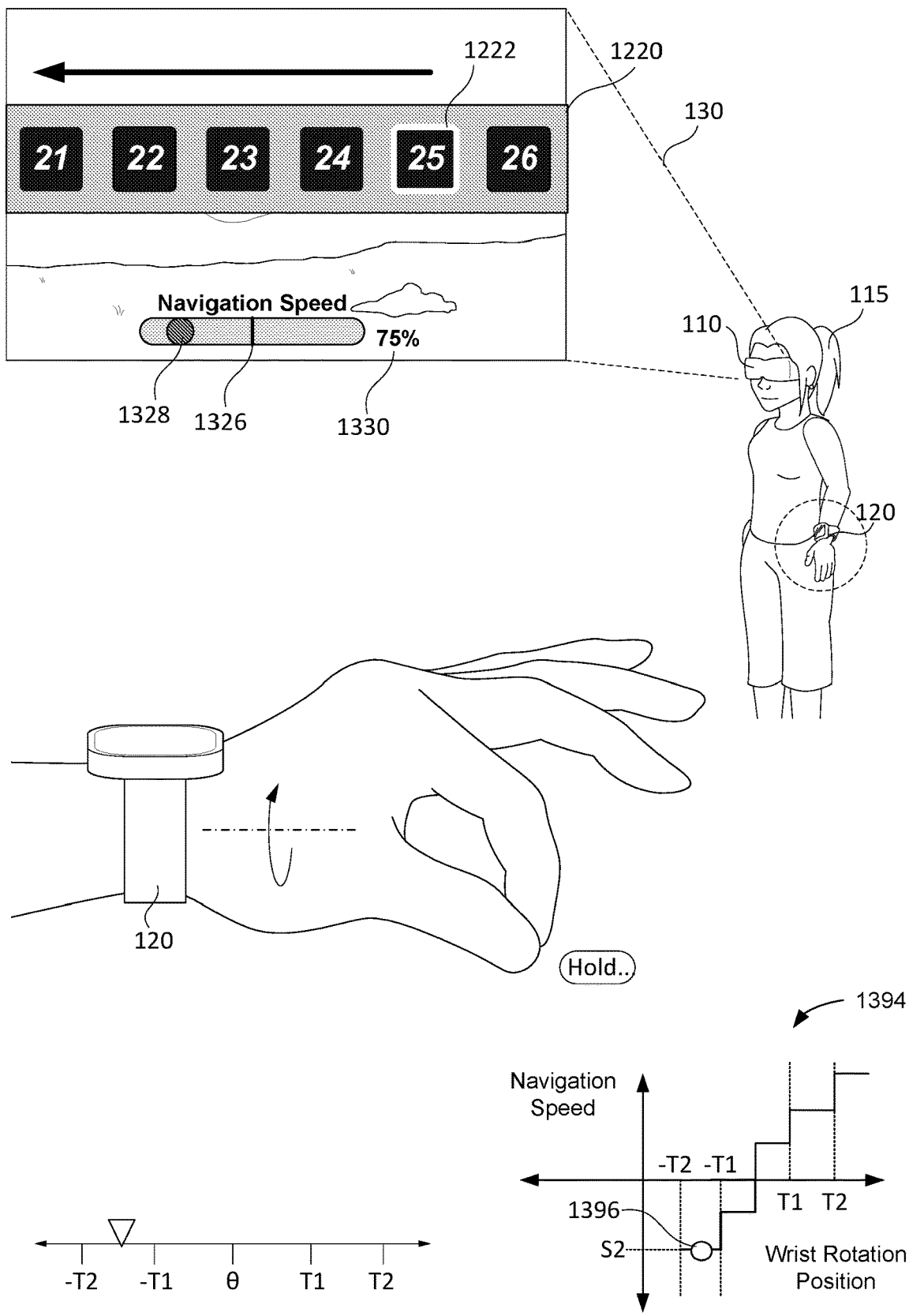

FIG. 10D illustrates the user 115 rotating their wrist in the second direction past a third threshold, denoted −T1, while maintaining the pinch gesture from FIG. 10B at a fourth point in time. In some embodiments, as the navigation gesture passes the third threshold, −T1, the focus 1222 navigates (e.g., scrolls through the numerals) at a second speed, denoted S2, faster than the first speed. In some embodiments, the third threshold, −T1, corresponds to a same distance as the first threshold, T1, in an opposite direction (e.g., a counter-clockwise rotation rather than a clockwise rotation). In some embodiments, the third threshold, −T1, corresponds to a difference distance than the first threshold, T1. The speed S2 in FIG. 10D is in the second direction (e.g., has a negative angular velocity as compared to the speed S1 in FIG. 10B). FIG. 10D further shows the focus 1222 moving from the number 46 (in FIG. 10C) to the number 25 in accordance with the navigation gesture (e.g., the counter-clockwise wrist rotation). The indicator 1396 on the graph 1394 in FIG. 10D indicates that the rotational position of the wrist of the user 115 is between the third threshold, −T1, and a fourth threshold, denoted −T2, and the navigation speed of the focus 1222 corresponds to a second step in the counter-clockwise direction. Additionally, the numerical indicator 1330 and the visual indicator 1328 have updated to indicate that the navigation speed is 75% of the maximum speed in a leftward direction.

Figure 10E:
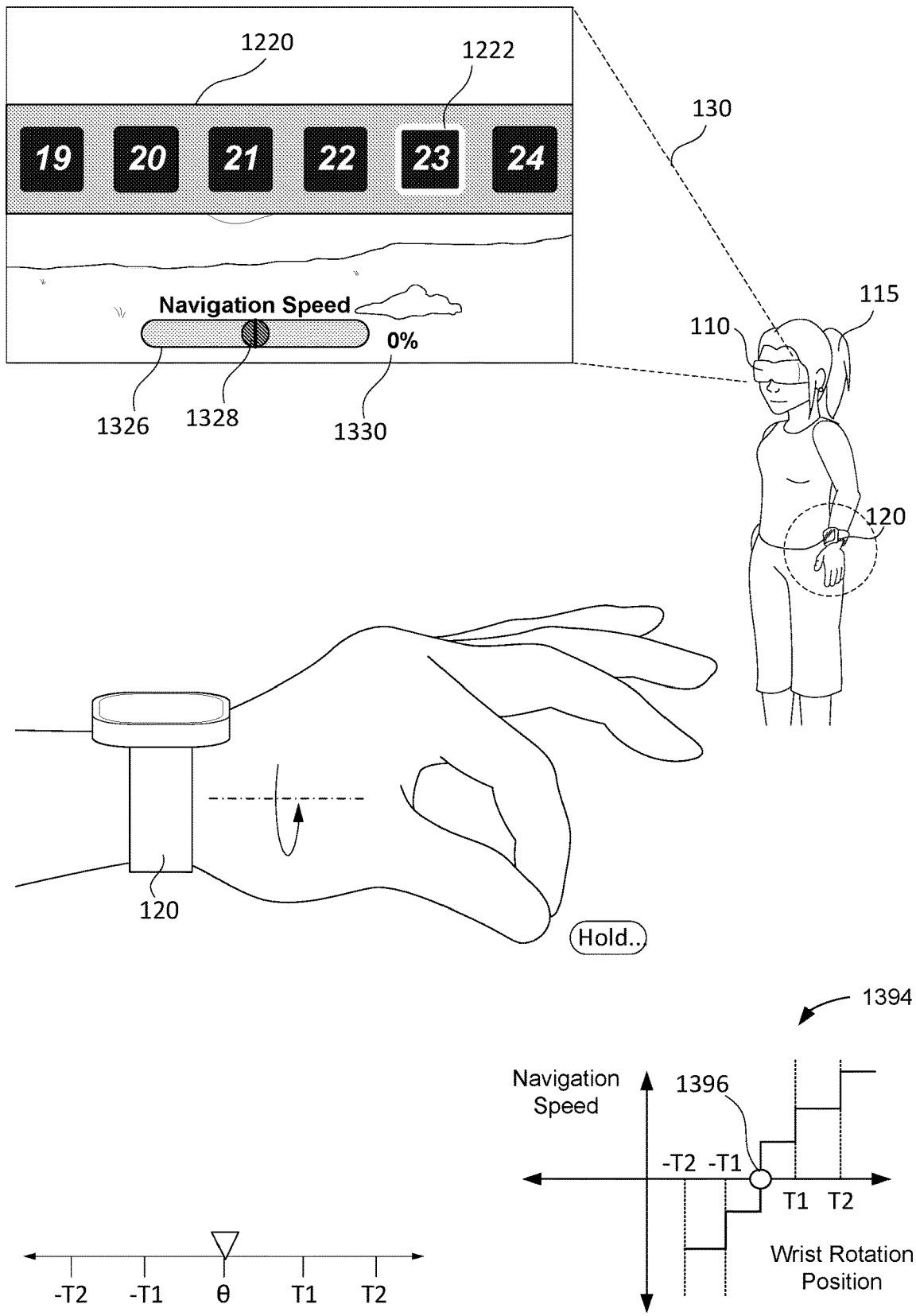

FIG. 10E illustrates the user 115 rotating their wrist in the first direction back to the initial position θ (e.g., similar to FIG. 10C) while maintaining the pinch gesture from FIG. 10B. In some embodiments, when the user 115 rotates their wrist back to the initial position θ, the navigation speed returns to zero (e.g., the navigation gesture ends). FIG. 10E further shows the focus 1222 moving from the number 25 (in FIG. 10D) to the number 23 in accordance with the navigation gesture (e.g., the wrist rotation). For example, the focus 1222 continues to move to the left as the user 115 rotates their wrist back toward the initial position θ and stops moving once the user 115 returns their wrist to the initial position θ. As illustrated in FIG. 10E the relative position of the wrist of the user 115 determines the direction of movement of the focus 1222. For example, the direction of movement of the wrist of the user 115—clockwise back to the initial position in FIG. 10E does not change the direction of movement of the focus 1222 while the relative position is clockwise of the initial position.

In some embodiments, a subsequent rotation of the wrist away from the initial position θ (while maintaining the pinch gesture) corresponds to a continuation of the navigation gesture or a start of a new navigation gesture. The indicator 1396 on the graph 1394 shows the user 115 has returned their wrist to the initial position θ and the scrolling speed has decreased to zero, at a fifth point in time. Accordingly, the visual indicator 1328 and the numerical indicator 1330 on the scrolling speed user interface element 1326 indicate that the navigation speed is zero in FIG. 10E.

Figure 10F:
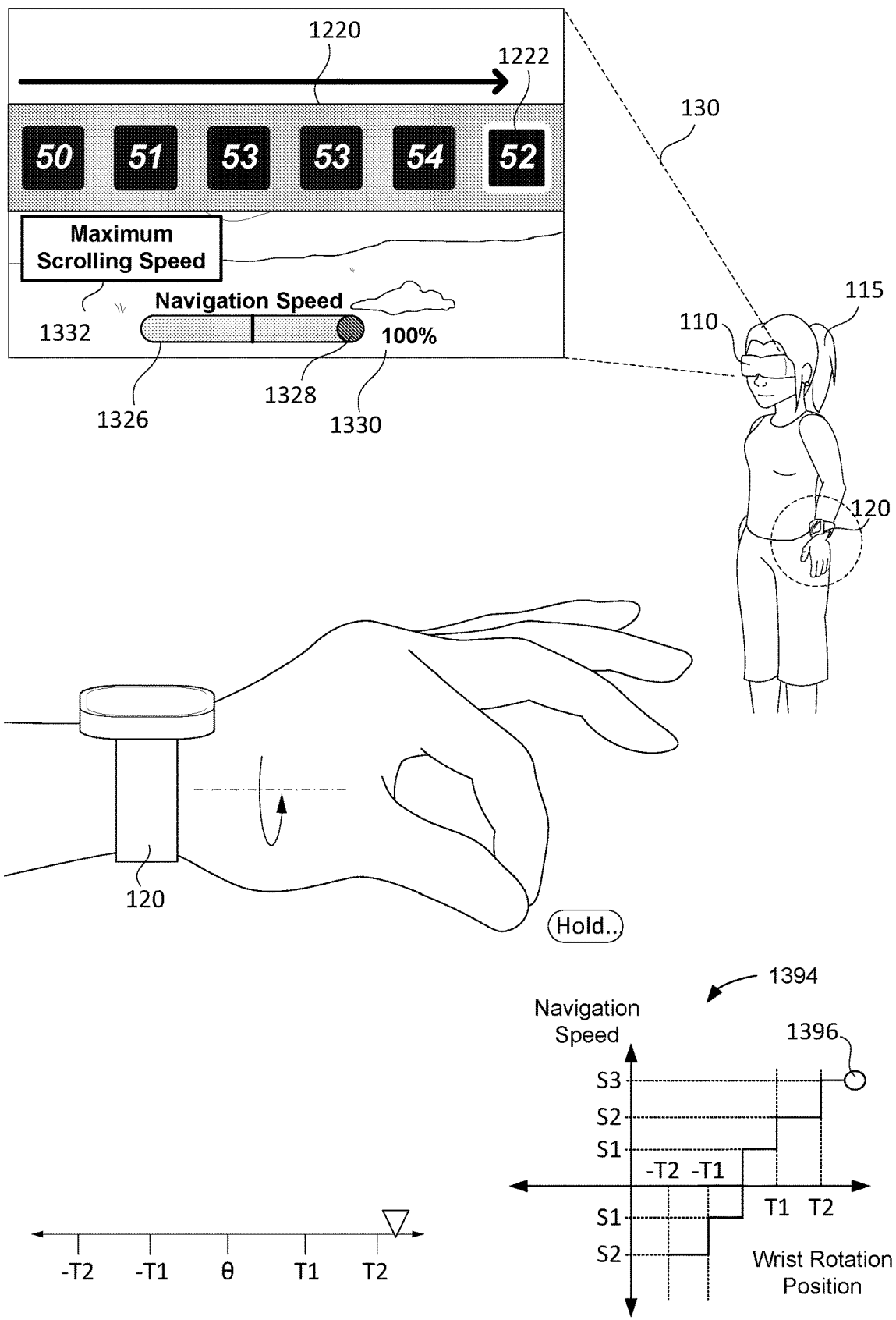

FIG. 10F illustrates the user 115 rotating their wrist in the first direction past the second threshold, T2, while maintaining the pinch gesture from FIG. 10B at a sixth time. In some embodiments, as the navigation gesture passes the second threshold, T2, the focus 1222 navigates (e.g., scrolls through the numerals) at a third speed, denoted S3, faster than the first speed (shown in FIG. 10B), and faster than the second speed, S2. The speed S3 in FIG. 10F is in the first direction (e.g., has a negative angular velocity as compared to the speed S2 in FIG. 10D). FIG. 10E further shows the focus 1222 moving from the number 23 (in FIG. 10E) to the number 52 in accordance with the navigation gesture (e.g., the clockwise wrist rotation). The indicator 1396 on the graph 1394 in FIG. 10F indicates that the rotational position of the wrist of the user 115 is beyond the second threshold, T2, and the navigation speed of the focus 1222 corresponds to a second step in the clockwise direction. In some embodiments, the second speed is the maximum scrolling speed. For example, if the user continues to rotate their wrist in the first direction, the navigation (scrolling) speed does not increase beyond the second speed. In some embodiments, in accordance with the user 115 scrolling at the maximum speed, a user interface element 1332 is displayed, e.g., visually indicating to the user 115 they have achieved the maximum speed. In some embodiments, other feedback is provided to the user 115 (e.g., haptics or auditory feedback) in addition to, or alternatively to, providing the user interface element 1332. Additionally, the numerical indicator 1330 and the visual indicator 1328 have updated to indicate that the navigation speed is 100% of the maximum speed in a rightward direction.

Figure 10G:
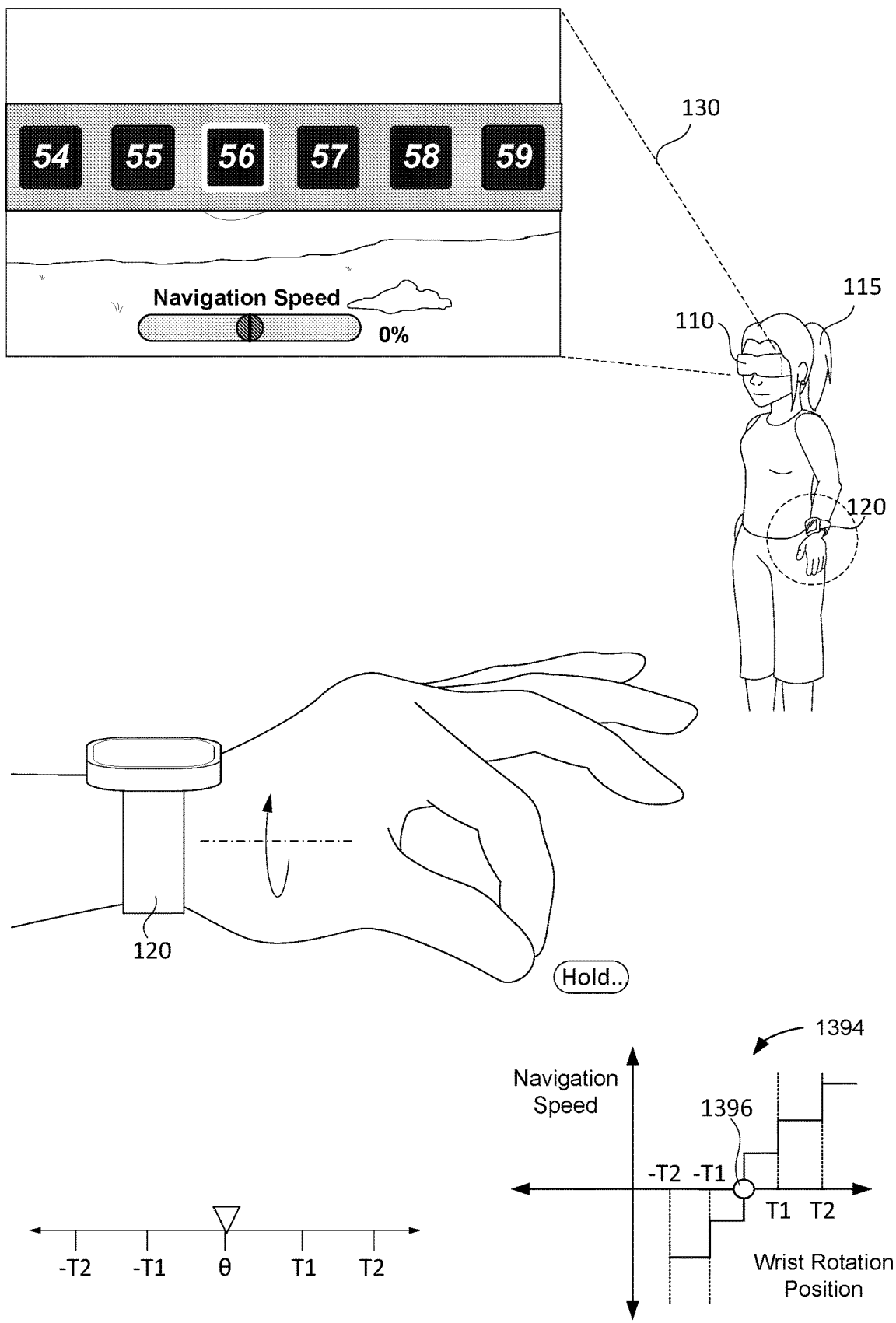

FIG. 10G illustrates the user 115 rotating their wrist in the second direction back to the initial position θ while maintaining the pinch gesture from FIG. 10B at a seventh time. In some embodiments, when the user 115 rotates their wrist back to the initial position θ, the navigation speed returns to zero (e.g., the navigation gesture ends). FIG. 10G further shows the focus 1222 moving from the number 52 (in FIG. 10F) to the number 56 in accordance with the navigation gesture (e.g., the wrist rotation). For example, the focus 1222 continues to move to the right as the user 115 rotates their wrist back toward the initial position θ and stops moving once the user 115 returns their wrist to the initial position θ. As illustrated in FIG. 10G the relative position of the wrist of the user 115 determines the direction of movement of the focus 1222. For example, the direction of movement of the wrist of the user 115—counter-clockwise back to the initial position in FIG. 10G does not change the direction of movement of the focus 1222 while the relative position is clockwise of the initial position. In some embodiments, a subsequent rotation of the wrist away from the initial position θ (while maintaining the pinch gesture) corresponds to a continuation of the navigation gesture or a start of a new navigation gesture. The indicator 1396 on the graph 1394 shows the user 115 has returned their wrist to the initial position θ and the scrolling speed has decreased to zero, at the seventh point in time. Accordingly, the visual indicator 1328 and the numerical indicator 1330 on the scrolling speed user interface element 1326 indicate that the navigation speed is zero in FIG. 10G.

Figure 10H:
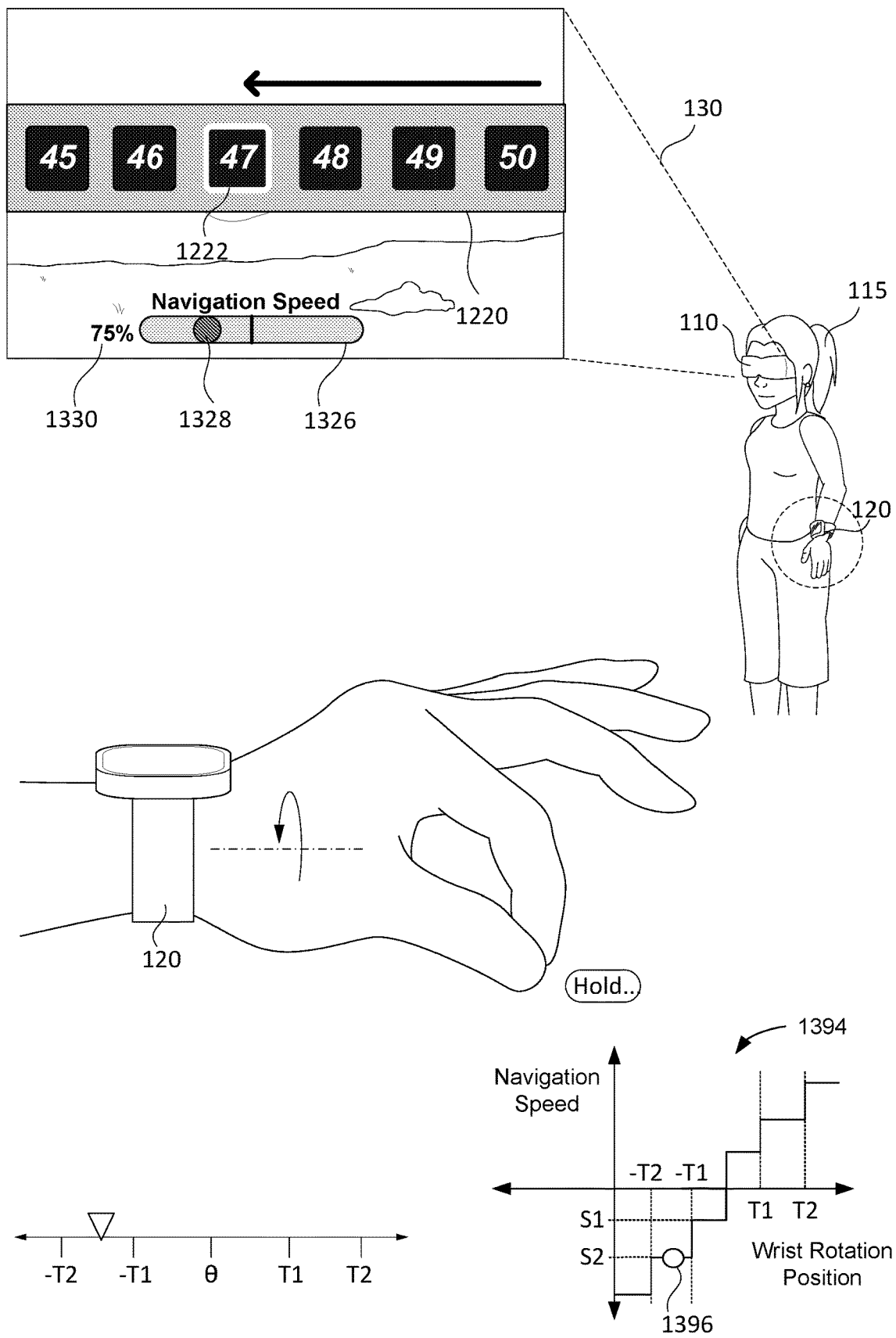

FIG. 10H illustrates the user 115 rotating their wrist in the second direction past the third threshold, −T1, in the second direction while maintaining the pinch gesture from FIG. 10B. In some embodiments, as the navigation gesture passes the third threshold, −T1, the focus 1222 navigates (e.g., scrolls through the numerals) at a second speed, denoted S2, faster than the first speed. The speed S2 in FIG. 10H is in the second direction (e.g., has a negative angular velocity as compared to the speed S3 in FIG. 10F). FIG. 10H further shows the focus 1222 moving from the number 56 (in FIG. 10G) to the number 47 in accordance with the navigation gesture (e.g., the counter-clockwise wrist rotation). The indicator 1396 on the graph 1394 in FIG. 10H indicates that the rotational position of the wrist of the user 115 is between the third threshold, −T1, and the fourth threshold, denoted −T2, and the navigation speed of the focus 1222 corresponds to the second step in the counter-clockwise direction. Additionally, the numerical indicator 1330 and the visual indicator 1328 have updated to indicate that the navigation speed is 75% of the maximum speed in a leftward direction. In some embodiments, in response to the user 115 rotating their wrist in the second direction past the fourth threshold, −T2, in the second direction, a maximum navigation speed in the second direction is achieved (e.g., corresponding to S3).

FIGS. 10A-10H illustrate examples of a user navigating horizontally. In some embodiments, the user navigates vertically using the gestures shown and described in FIGS. 10A-10H. In some embodiments, the navigation includes controlling movement of a cursor between elements (e.g., icons) on a user interface. In some embodiments, the navigation includes moving a focus from one element to another (e.g., without moving the focus to a position that does not corresponds to an element).

Figure 11A:
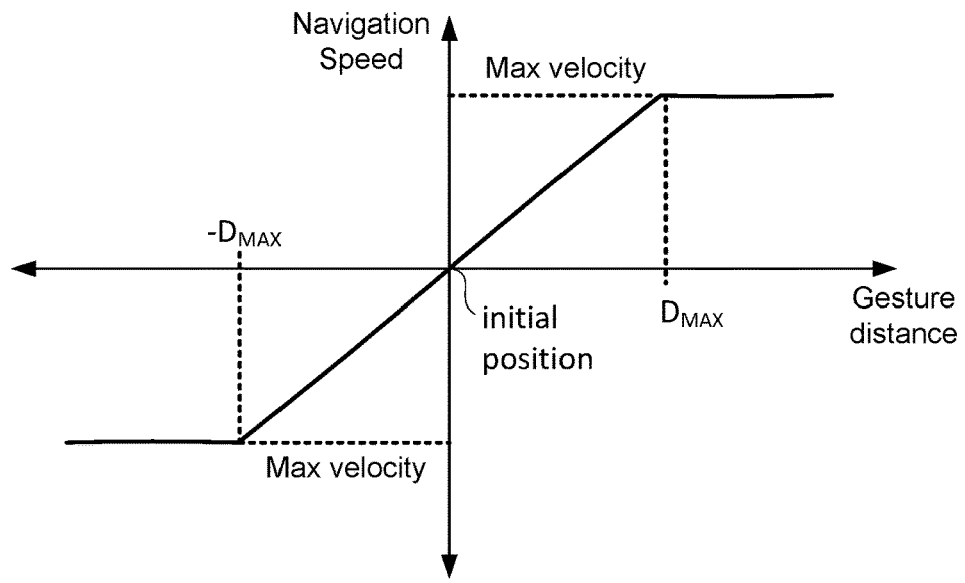
FIGS. 11A-11C illustrate graphs representing example relationships between navigation speed and gesture distance in accordance with some embodiments.
Figure 11B:
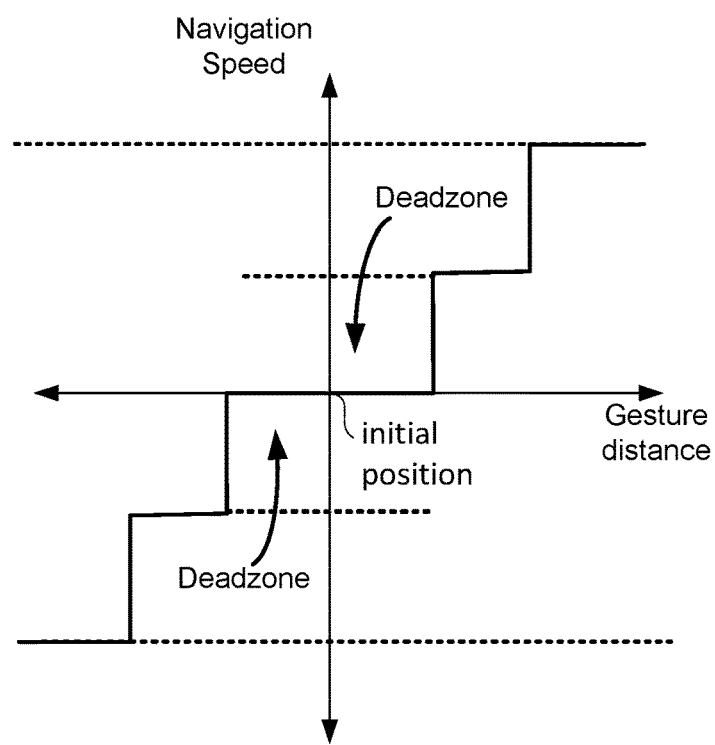
Figure 11C:
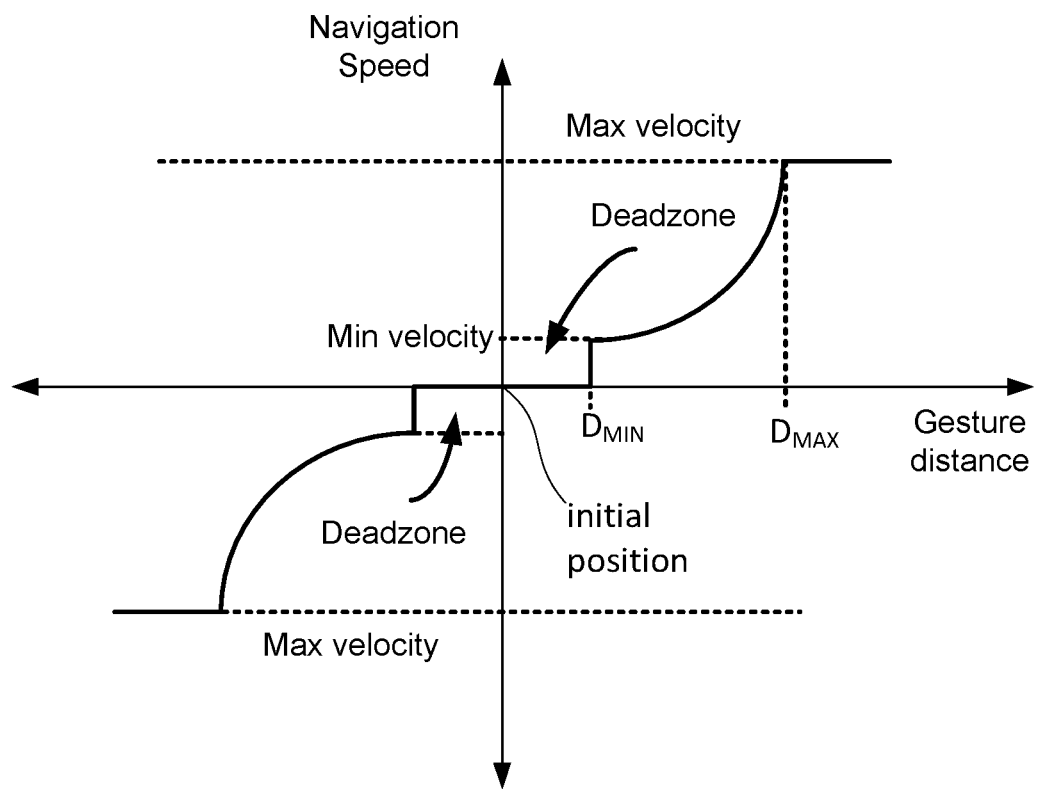

FIGS. 11A-11C illustrate graphs representing example relationships between navigation speed and gesture distance in accordance with some embodiments. Each graph shows a relationship between a navigation speed and a gesture distance (e.g., representing different functions that can be used by the system). In some embodiments, the different functions are selectable by active applications and/or system functions. For example, a first application may select a linear function and a second application may select a step function.

FIG. 11A illustrates a linear function between navigation speed and gesture distance from an initial position (e.g., an initial position set by a priming gesture). The linear function in FIG. 11A is bounded by a maximum velocity in each direction. For example, the user translates their hand or arm a distance $D_{MAX}$ in a first direction (e.g., to the right of the user) and, in response, a focus moves at a corresponding maximum velocity in a first navigation direction (e.g., toward the right of a display). As another example, the user rotates their wrist a distance $-D_{MAX}$ in a second direction (e.g., counter-clockwise) and, in response, a focus moves at a corresponding maximum velocity in a second navigation direction (e.g., toward the bottom of a display). In some embodiments, the linear function is unbounded. Applying the linear function allows the user 115 to scroll through user interface elements at a speed proportional to their movement. For example, as the user 115 increases rotation of their wrist, the speed of navigation increases (or decreases) proportionally. Using a linear function may provide a smooth and responsive scrolling experience. For example, the user 115 is able to speed up and slow down quickly in a manner similar to using a throttle on a motorcycle, e.g., throttling up to increase the speed of the motorcycle and throttling down to decrease the speed.

FIG. 11B illustrates a step function between navigation speed and gesture distance. In some embodiments, such as illustrated in FIGS. 10A-10H, there are one or more thresholds (e.g., steps) along the gesture distance, and each threshold is associated with an increase (or decrease) in the navigation speed. In some embodiments, the distance between the initial position and the first threshold operates as a dead zone (e.g., as illustrated in FIG. 11B), in which the navigation speed stays at zero. For example, for a user 115 to start navigating through user interface elements, they gesture past the first threshold before any navigation movement occurs. Including a dead zone may benefit the user 115 by preventing unintentional movements from causing inadvertent navigation. A step function similar to the one shown in FIG. 11B can be beneficial by providing consistent scrolling while requiring less precision from the user (e.g., consistent scrolling even if the user has small unintentional movements). In some embodiments, the step function is symmetric in both directions (e.g., when the user 115 rotates their wrist in either the first or second direction, they receive similar results with the direction being different). In some embodiments, the step function has equal steps. In some embodiments, the step function includes one or more steps that are a different size than other steps (e.g., correspond to a greater change in distance and/or a greater change in speed). In some embodiments, the step function contains different values depending on an application or user preference. For example, the user 115 may want to scroll quickly in one direction and have finer tuning when scrolling the opposite direction (e.g., to more quickly and precisely select a particular element). In some embodiments, the step between the first and second threshold corresponds to more fine-tuning movement and the step after the second threshold corresponds to quicker scrolling. For example, the user 115 may rotate past the second threshold to scroll through multiple pages of a document, then rotate between the first and second thresholds to select a particular element on a particular page.

FIG. 11C illustrates a cubic function between navigation speed and gesture distance. The cubic function in FIG. 11C includes a dead zone and is bounded by a maximum velocity in each direction. For example, the user translates their hand or arm a distance $D_{MIN}$ in a first direction (e.g., to the right of the user) and, in response, a focus moves at a corresponding minimum velocity in a first navigation direction (e.g., toward the right of a display). As the user continues to translate their hand or arm toward $D_{MAX}$ in the first direction, the speed of the focus increases cubically until the maximum velocity is reached at a distance of $D_{MAX}$. In some embodiments, the linear function is unbounded. In some embodiments, the cubic function does not include a dead zone. The cubic function shown in FIG. 11C may benefit a user who wants to navigate quickly without large gesture distances.

The functions illustrated in FIGS. 11A-11C are examples of functions that may be used by a system for navigation. In some embodiments, other functions are used (e.g., a quadratic or exponential function). In some embodiments, a function includes a combination of the functions shown in FIGS. 11A-11C (e.g., a function that is linear between the initial position and a first threshold distance and is cubic between the first threshold and a second threshold).

Figure 12A:
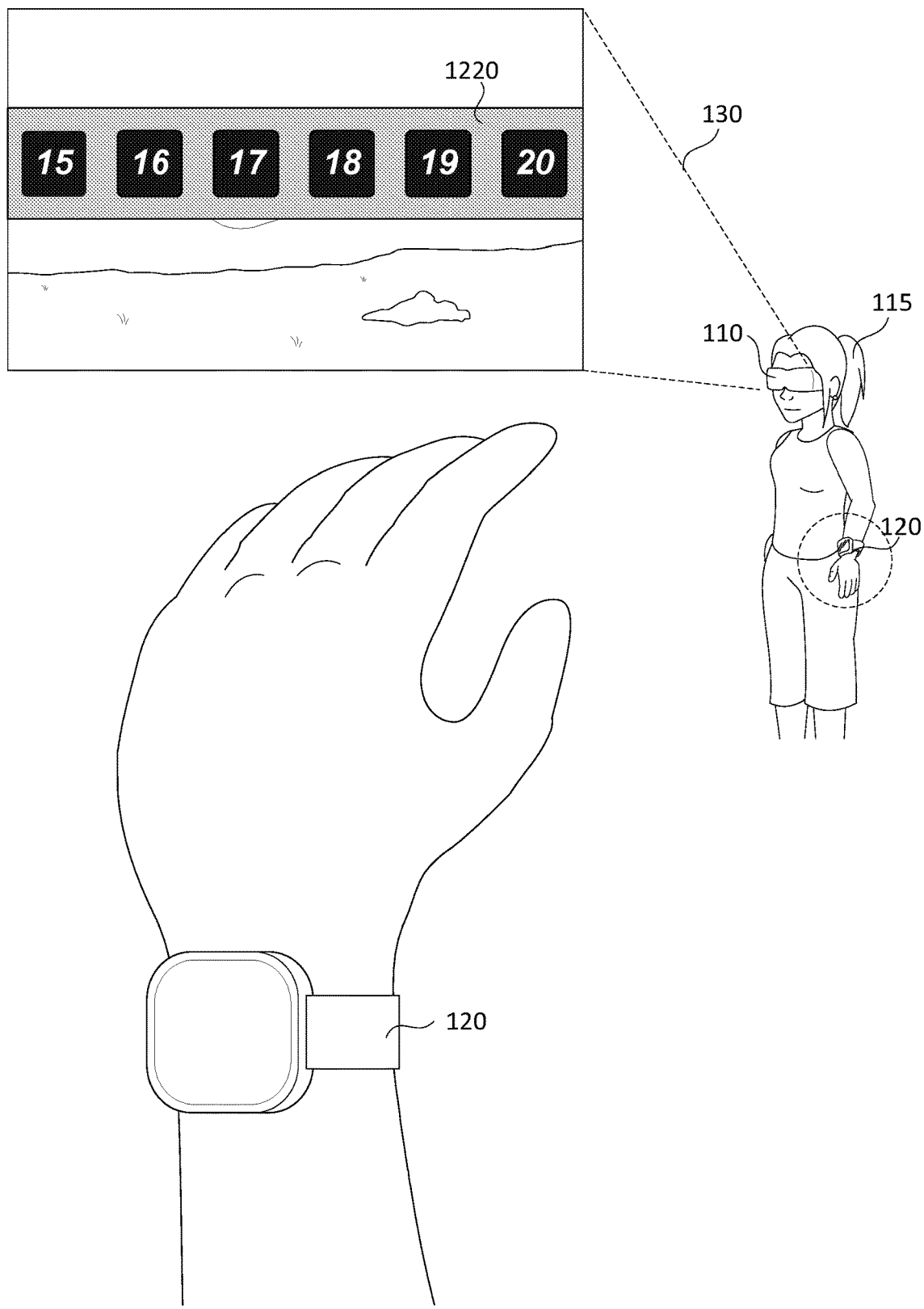
FIGS. 12A-12D illustrate another example user scenario of interacting with a wearable device in accordance with some embodiments.

FIGS. 12A-12D illustrate another example user scenario of interacting with a wearable device in accordance with some embodiments. The user 115 in FIG. 12A is wearing a head-wearable device 110 (e.g., a virtual-reality headset) and a wrist-wearable device 120 (e.g., a smartwatch). The user 115 in FIG. 12A is viewing a scene 130 via the head-wearable device 110 and the user 115 is not performing a gesture in FIG. 12A. In accordance with some embodiments the user interface 1220 is displayed in the scene 130 (e.g., is displayed prior to the user 115 performing a priming gesture). In some embodiments, the user interface 1220 is displays in accordance with a first application being active on the head-wearable device 110.

Figure 12B:
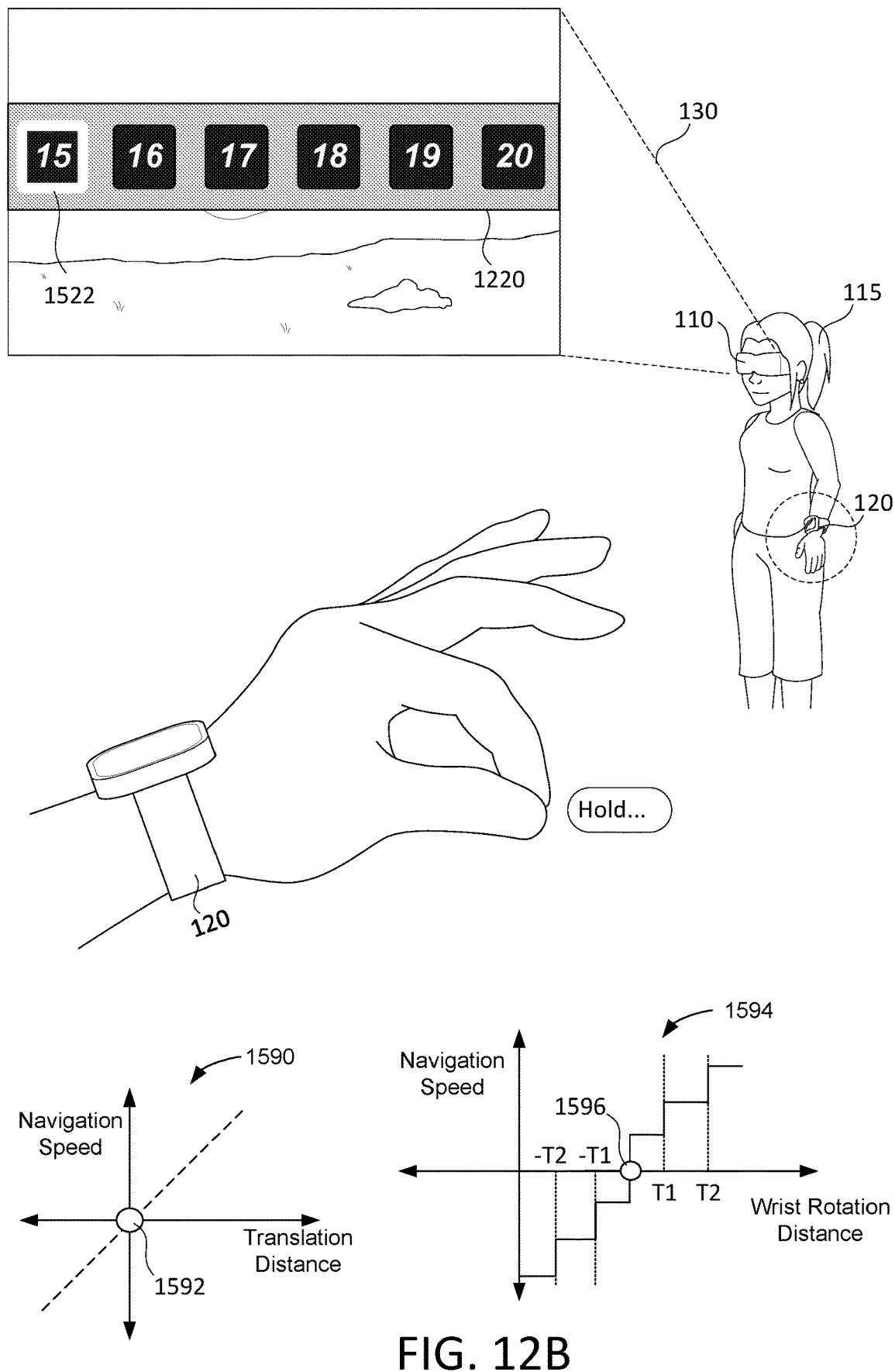

FIG. 12B illustrates the user 115 performing a priming gesture (e.g., a pinch gesture) using the user's pointer finger contacting the thumb. FIG. 12B further shows the scene 130 update in response to the pinch gesture to include display of focus 1522 (e.g., a highlight of the number 15 to indicate that it is the active/selected element). In some embodiments, the number 15 is given focus based on a previous gesture (e.g., a previous navigation gesture resulted in the number 15 being given the focus). In some embodiments, the number 15 is given focus in accordance with one or more system settings. For example, the system may be configured to give the leftmost element focus in response to detecting a priming gesture.

FIG. 12B further illustrates graph 1590 which shows a linear relationship between a gesture translation distance and navigation speed (e.g., corresponding to a second type of navigation gesture) and graph 1594 which shows a step function relationship between a gesture wrist rotation distance and navigation speed (e.g., corresponding to a first type of navigation gesture). In the example of FIG. 12B, an indicator 1592 indicates that the user 115 has not translated their hand/arm from an initial translation position at a first point in time, and an indicator 1596 indicates that the user has not rotated their wrist from an initial rotation position at the first point in time.

Figure 12C:
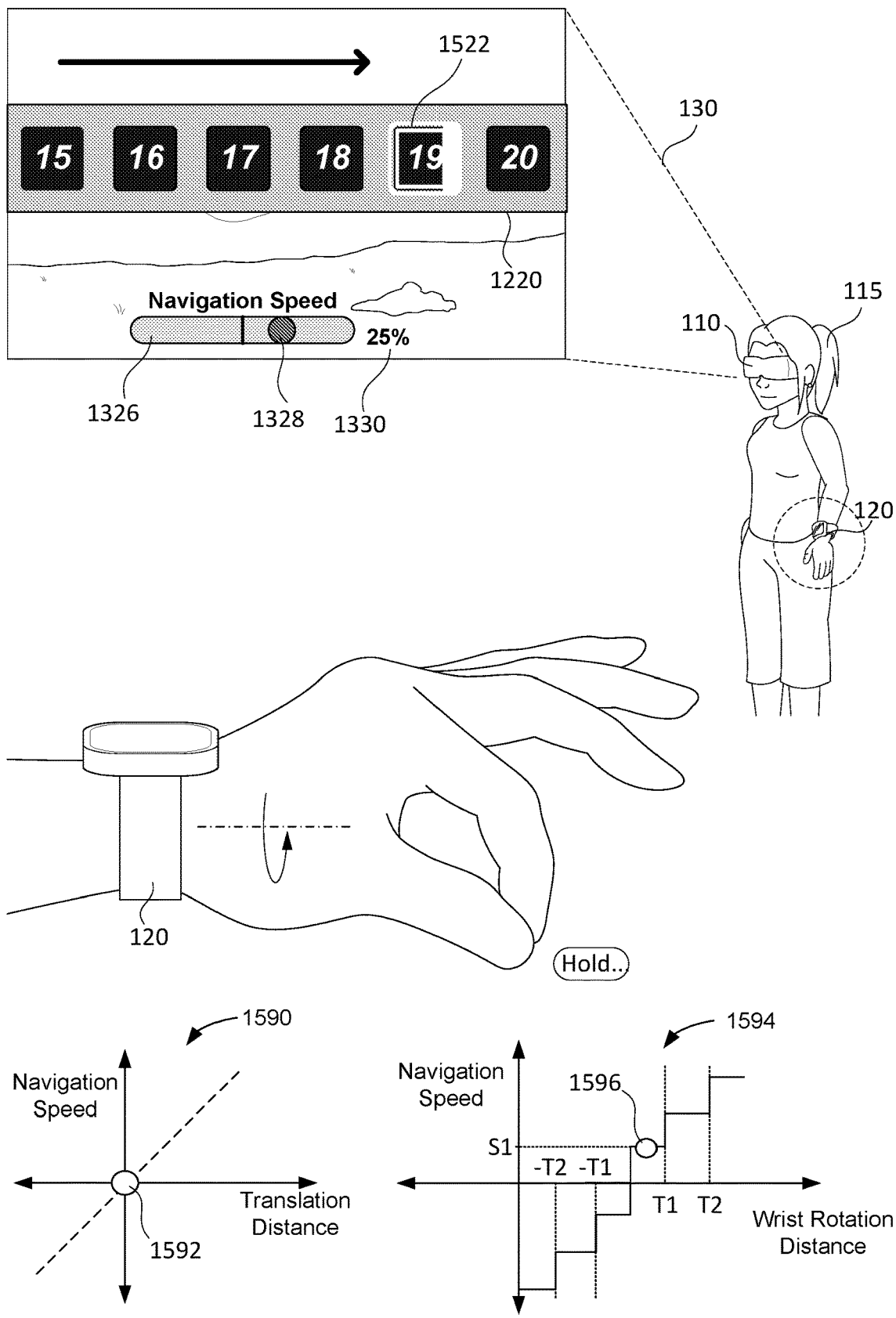

FIG. 12C illustrates the user 115 performing a navigation gesture by rotating their wrist (e.g., performing a first type of navigation gesture). In the example of FIG. 12C, the user has rotated their wrist in a clockwise direction. FIG. 12C illustrates the focus 1522 moving from the number 15 in FIG. 12B to the number 19 in response to the user 115 performing the navigation gesture. In addition, the visual appearance of the focus 1522 has updated in FIG. 12C to indicate the direction of navigation (e.g., thicker on the right than on the left to indicate navigation to the right). For example, the focus 1522 includes a thicker white border to indicate which direction the user 115 is navigating. In some embodiments, the visual appearance of the focus 1522 is based on a direction of navigation and/or a speed of navigation. In some embodiments, the edge of the focus on the respective side that is the same direction as the navigation is visually different than other edges of the focus. FIG. 12C illustrates the user 115 rotating their wrist between the first and second thresholds (e.g., corresponding to a speed, S1). In FIG. 12C, the navigation speed assigned to the wrist rotation navigation gesture is 25% of a maximum navigation speed. In some embodiments, the user interface element 1326 and/or the numerical indicator 1330 are not displayed (e.g., the focus visual appearance is used to indicate navigation speed rather than the user interface element 1326 and/or the numerical indicator 1330). In some embodiments, the system is responsive to the user 115 performing other types of navigation gestures (e.g., as illustrated in FIG. 12D).

The graph 1594 in FIG. 12C shows the distance of the rotational navigation gesture and the navigation speed through the user interface 1220, at a second point in time.

The indicator 1596 in FIG. 12C indicates that the user 115 has rotated their wrist between the first and second threshold. The graph 1590 in FIG. 12C indicates that the translation distance is zero (e.g., the user has not performed a translation-based navigation gesture).

Figure 12D:
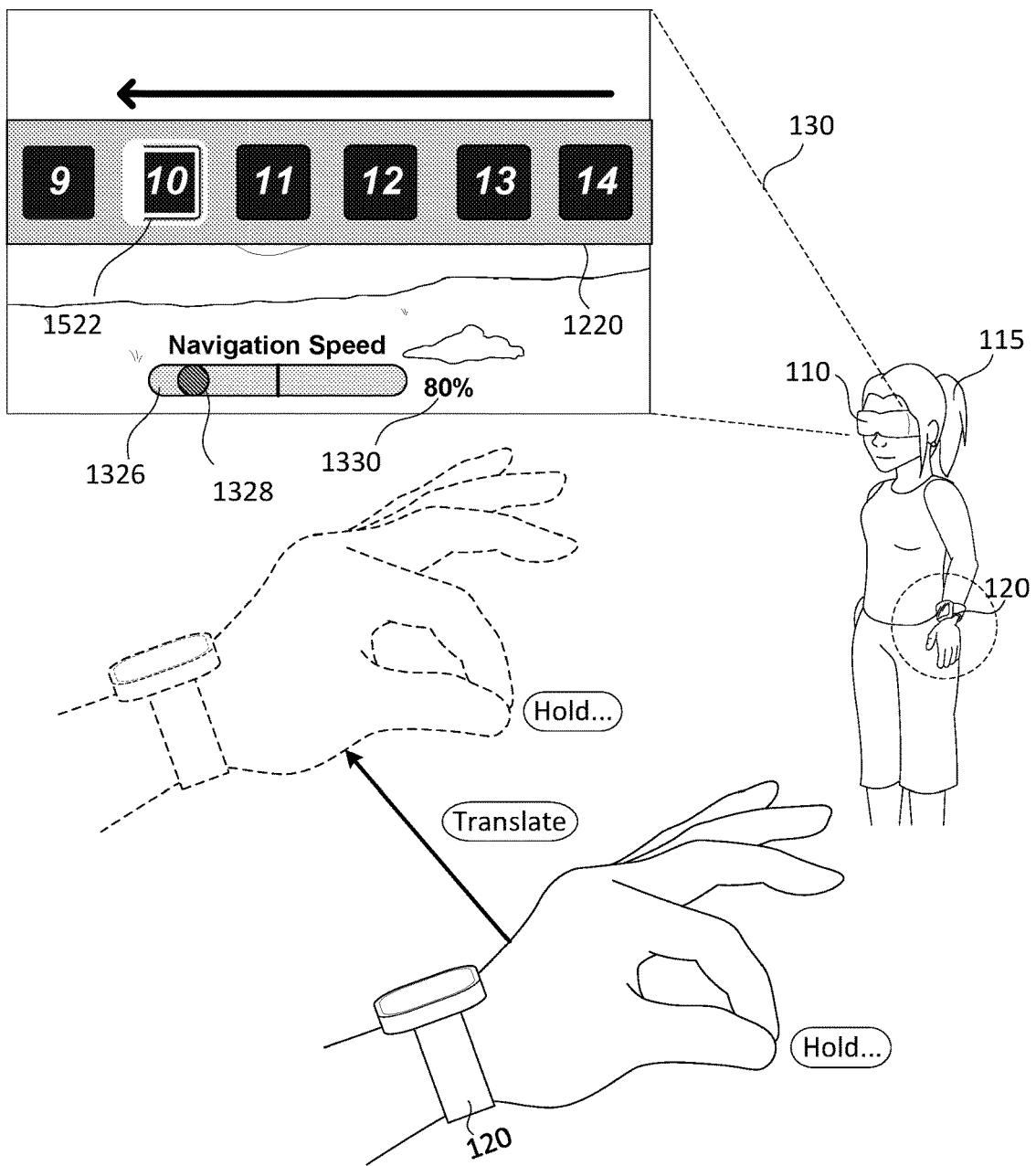
Figure 12D:
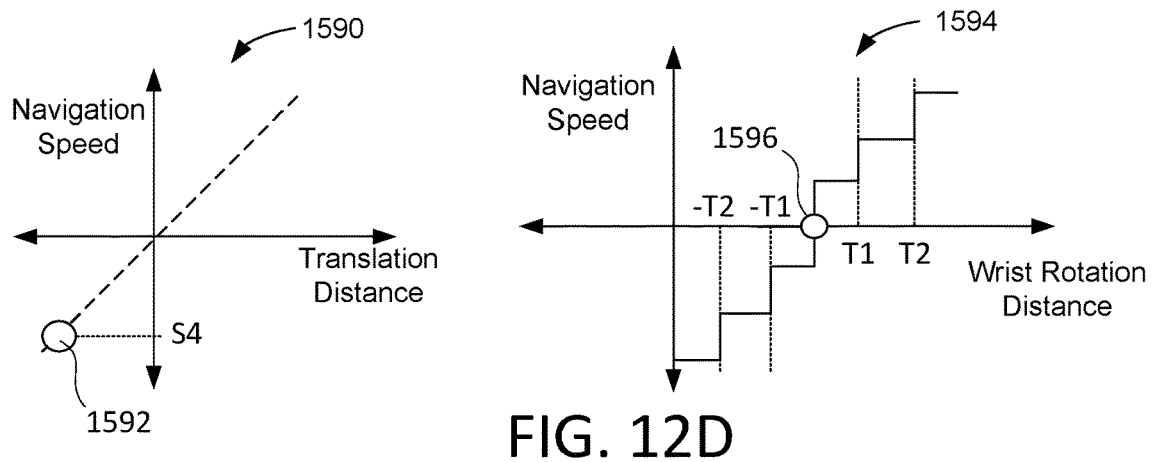

FIG. 12D illustrates the user 115 performing a navigation gesture by translating their hand a first distance (e.g., performing a second type of navigation gesture). FIG. 12D illustrates the focus 1522 moving from the number 19 in FIG. 12C to the number 10 in response to the user 115 performing the translation-based navigation gesture. In addition, the visual appearance of the focus 1522 has updated in FIG. 12D to indicate the direction of navigation (e.g., thicker on the left than on the right to indicate navigation to the left). FIG. 12D illustrates the translation distance corresponding to a speed, S4 (e.g., 80% of a maximum translation-based navigation speed). In FIG. 12D, the navigation speed assigned to the translation-based navigation gesture is 80% of a maximum (translation-based) navigation speed. The graph 1594 in FIG. 12D shows the distance of the rotational navigation gesture and corresponding the navigation speed (e.g., zero), at a third point in time. The indicator 1596 in FIG. 12D indicates that the user 115 has returned their wrist to the initial position and the corresponding navigation speed is therefore zero. The indicator 1592 in the graph 1590 in FIG. 12D indicates that the translation distance corresponds to a speed of S4.

Thus, FIGS. 12A-12D illustrate an example where the user 115 uses different types of navigation gestures to move the focus 1522 within the user interface 1220. In some embodiments, the navigation speed and/or the navigation acceleration is different for different types of navigation gestures. For example, a translation-based navigation gesture is used to navigate between pages in a document and a rotational navigation gesture is used to navigate between sentences in the document. In some embodiments, the function that sets the relationship between distance and navigation speed is different for different types of navigation gestures (e.g., a step function is used for one type of gesture and a linear or cubic function is used for another type of gesture). In some embodiments, a first type of navigation gesture is used to navigate along a first axis and a second type of navigation gesture is used to navigate along a second axis.

Figure 13:
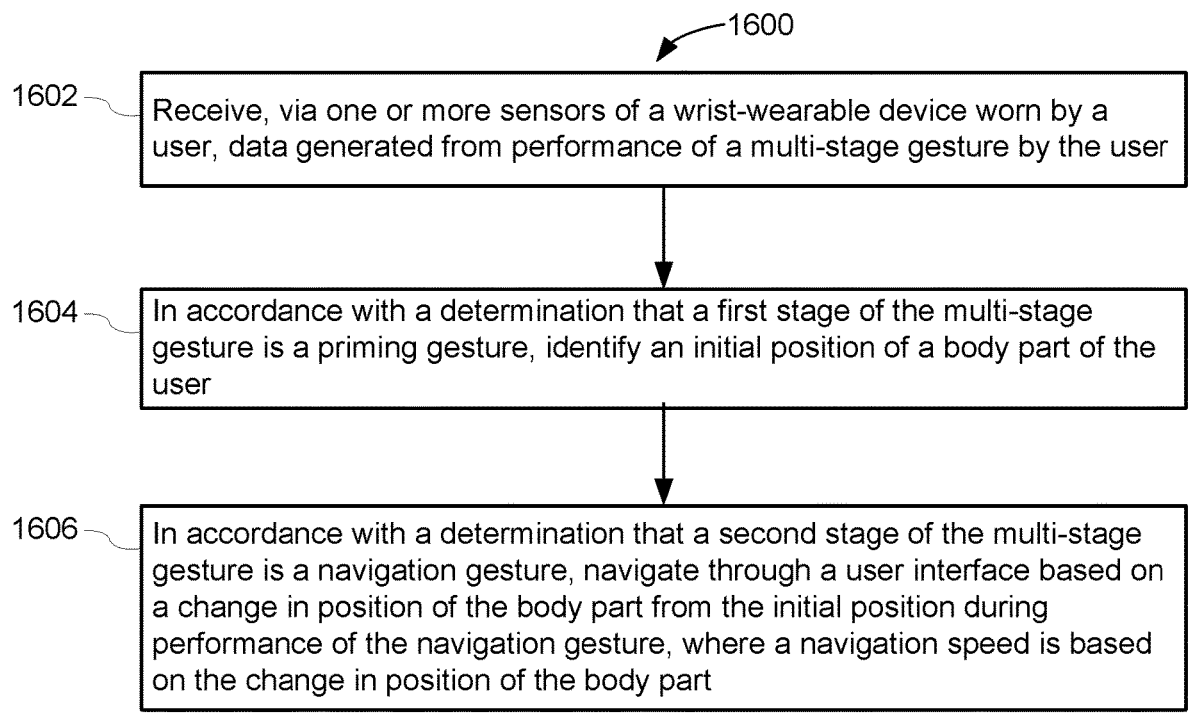
FIG. 13 is a flow diagram illustrating an example method for using a multi-stage in-air hand gesture for user-interface interactions in accordance with some embodiments.

FIG. 13 is a flow diagram illustrating a method 1600 for using a multi-stage in-air hand gesture for user interface interactions in accordance with some embodiments. The method 1600 is performed at a computing system (e.g., a wearable device, a mobile device, and/or intermediary device) having one or more processors and memory. In some embodiments, the memory stores one or more programs configured for execution by the one or more processors. At least some of the operations shown in FIG. 13 correspond to instructions stored in a computer memory or computer-readable storage medium (e.g., the memory 6080 and/or the memory 7050). In some embodiments, the computing system is, or includes, a wearable device, such as the wrist-wearable device 120 or the head-wearable device 110 or 202. In some embodiments, the computing system is, or includes, an intermediary device such as a smartphone.

The system receives (1602) via one or more sensors of a wrist-wearable device worn by a user, data generated from performance of a multi-stage gesture by the user. For example, the one or more sensors include the sensors 6021 (e.g., EMG and/or IMU sensors). In some embodiments, the multi-stage gesture is a multi-stage in-air hand gesture. In some embodiments, the multi-stage gesture is a hand gesture that has a component in the air and a component on a surface.

In some embodiments, the system identifies (1604) an initial position of a body part of the user in accordance with a determination that a first stage of the multi-stage gesture is a priming gesture. For example, the system detects the user performing a pinch-and-hold gesture and the pinch-and-hold gesture is designated as a priming gesture (e.g., FIGS. 9B, 10A, and 12B). In some embodiments, multiple types of gestures are designated as priming gestures (e.g., a pointer-finger-based pinch gesture, a middle-finger-based pinch gesture, a double-tap gesture, and/or a fist-clench gesture). In some embodiments, the priming gesture is a maintained gesture performed by at least two phalanges of the user.

In some embodiments, the system navigates (1606) through a user interface based on a change in position of the body part from the initial position during performance of the navigation gesture in accordance with a determination that a second stage of the multi-stage gesture is a navigation gesture, where a navigation speed is based on the change in position of the body part. For example, when the user rotates their wrist past a specific threshold or translates their hand a certain distance, the user is able to navigate through user interface elements as illustrated in FIGS. 9A-9E, 10A-10H, and 12A-12D. In some embodiments, navigating through the user interface based on the change in the position of the body part includes navigating in a first manner.

In some embodiments, in accordance with the determination that the first stage of the multi-stage in-air hand gesture is a priming gesture, the system displays a plurality of selectable user interface elements (e.g., displays the numbers within user interface 1220) within the user interface and/or provides feedback to the user indicating the user can perform additional gestures (e.g., displays command options 606).

In some embodiments, in accordance with a determination that a third stage of the multi-stage in-air hand gesture is another navigation gesture, the system navigates through the user interface in a second manner based on a change in position of the body part from the initial position during performance of the another navigation gesture. In some embodiments, in accordance with a determination that a fourth stage of the multi-stage in-air hand gesture is a control gesture, the system executes a command for the user interface that corresponds to the control gesture. For example, the system executes a function that corresponds to a user interface element that has focus when the control gesture is detected. In some embodiments, the navigation gesture is distinct from the another navigation gesture. In some embodiments, the navigation gesture is a first type of gesture (e.g., a wrist rotation gesture) and the another navigation gesture is a second type of gesture (e.g., a translational gesture).

In some embodiments, the priming gesture is a maintained gesture (e.g., a pinch-and-hold gesture or a maintained fist-clench gesture). In some embodiments, in response to the priming gesture, the system activates a user interface; and, in accordance with a determination that a third stage of the multi-stage in-air hand gesture includes a release of the maintained gesture, deactivates the user interface. In some embodiments, a release of a maintained gesture is interpreted by the system as a control gesture (e.g., activating a function of a selected user interface element).

In some embodiments, the system: (i) receives via the one or more sensors of the wrist-wearable device, data generated from performance of a second multi-stage in-air hand gesture; (ii) in accordance with a determination a first stage of the second multi-stage in-air hand gesture is another priming gesture, determines a second initial position of the body part of the user and activating the user interface; and, (iii) in accordance with a determination that a second stage of the second multi-stage in-air hand gesture is another navigation gesture, navigates through the user interface based on a change in position of the body part from the second initial position during performance of the navigation gesture, where a navigation speed for the another navigation gesture is based on the change in position of the body part from the second initial position.

In some embodiments, the navigation gesture includes translation of a hand of the user from the initial position to a second position. In some embodiments, a navigation speed through the user interface is proportional to a speed and/or distance in which the user translates their hand from the initial position to the second position. In some embodiments, the navigation gesture comprises a rotation of a wrist of the user in a first or second direction. In some embodiments, the navigation speed is proportional to a rotation angle of the wrist of the user. In some embodiments, the navigation speed is based on a cubic function of the change in position of the body part. In some embodiments, the navigation speed is based on a step function of the change in position of the body part. In some embodiments, the navigation speed is based on a linear function of the change in position of the body part.

In some embodiments, navigating through the user interface includes: (i) while detecting the navigation gesture, forgoing navigating through the user interface in accordance with the change in position of the body part being less than a first threshold; and (ii) navigating through the user interface in accordance with the change in position of the body part being greater than the first threshold.

In some embodiments, navigating through the user interface further includes: (i) in accordance with a determination that the change in position of the body part is greater than the first threshold and less than a second threshold, navigating through the user interface at a first speed; and (ii) in accordance with a determination that the change in position of the body part is greater than the second threshold, navigating through the user interface at a second speed greater than the first speed.

In some embodiments, in accordance with a determination that the second stage of the multi-stage in-air hand gesture is the navigation gesture, the system causes display of a navigation indicator in the user interface, where the navigation indicator indicates the navigation speed.

In some embodiments, in accordance with a determination the change in position of the body part meets one or more criteria, the system ceases to increase the navigation speed and providing feedback to the user indicating that the navigation speed is at an upper limit.

In some embodiments, in accordance with a determination that the first stage of the multi-stage in-air hand gesture is the priming gesture, the system starts a predetermined window of time for detecting one or more subsequent multi-stage gestures. In some embodiments, detecting a subsequent gesture (e.g., a navigation gesture or a control gesture) resets the predetermined window of time for detecting another subsequent gesture. In some embodiments, certain types of subsequent gestures reset the predetermined window of time (e.g., navigation gesture reset the predetermined window of time, but control gesture do not).

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device, in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

Artificial-reality systems may be implemented in a variety of different form factors and configurations. Some artificial-reality systems include a near-eye display (NED), which provides visibility into the real world (e.g., the augmented-reality system 7000 in FIG. 16A) or that visually immerses a user in an artificial reality (e.g., the virtual-reality system 7010 in FIG. 16B). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., the wearable device 6000 in FIG. 15A), devices worn by one or more other users, and/or any other suitable external system.

Example Systems

Figure 14A:
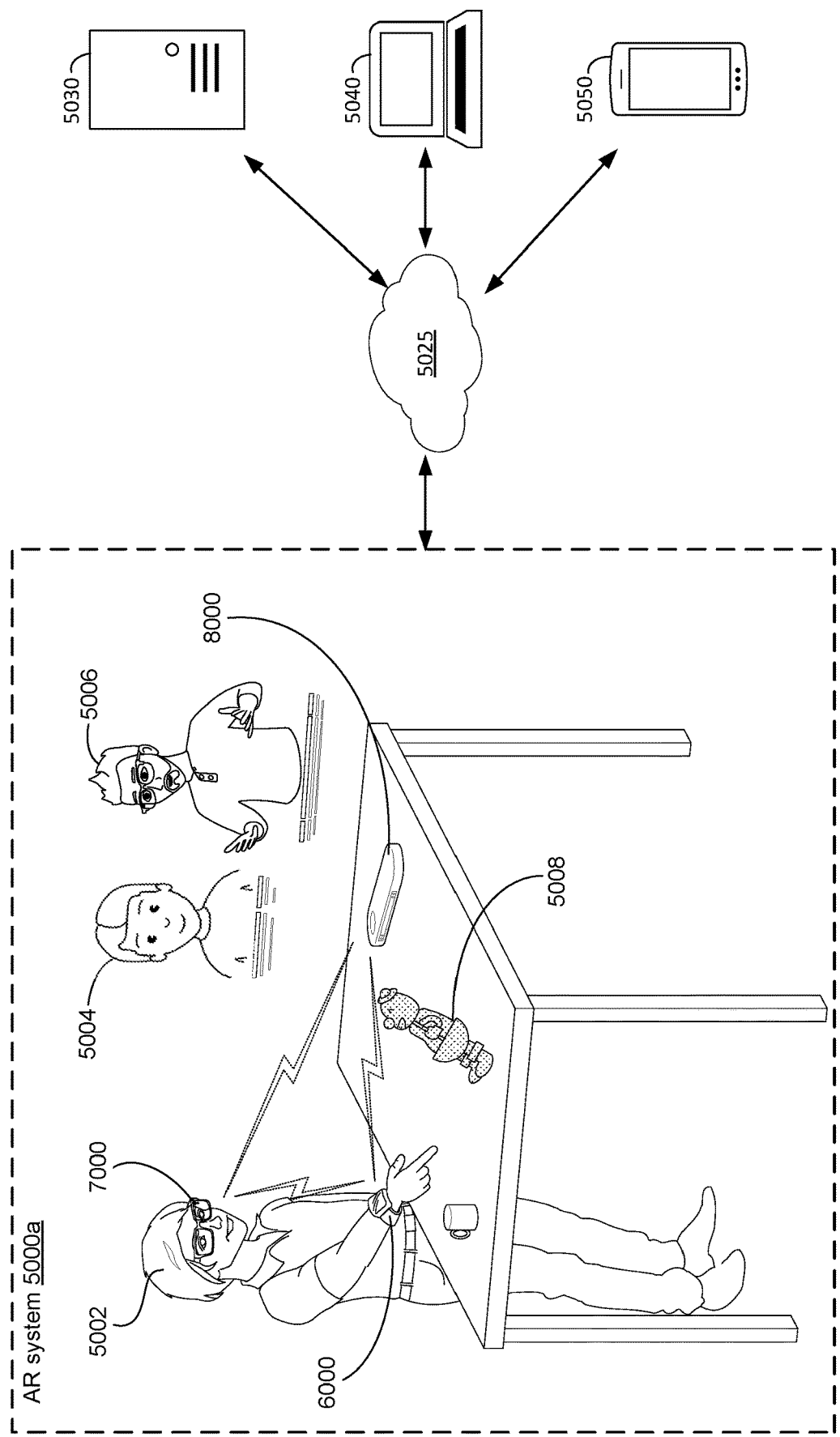
FIGS. 14A, 14B, 14C-1, 14C-2, 14D-1, and 14D-2 illustrate example AR systems in accordance with some embodiments.
Figure 14B:
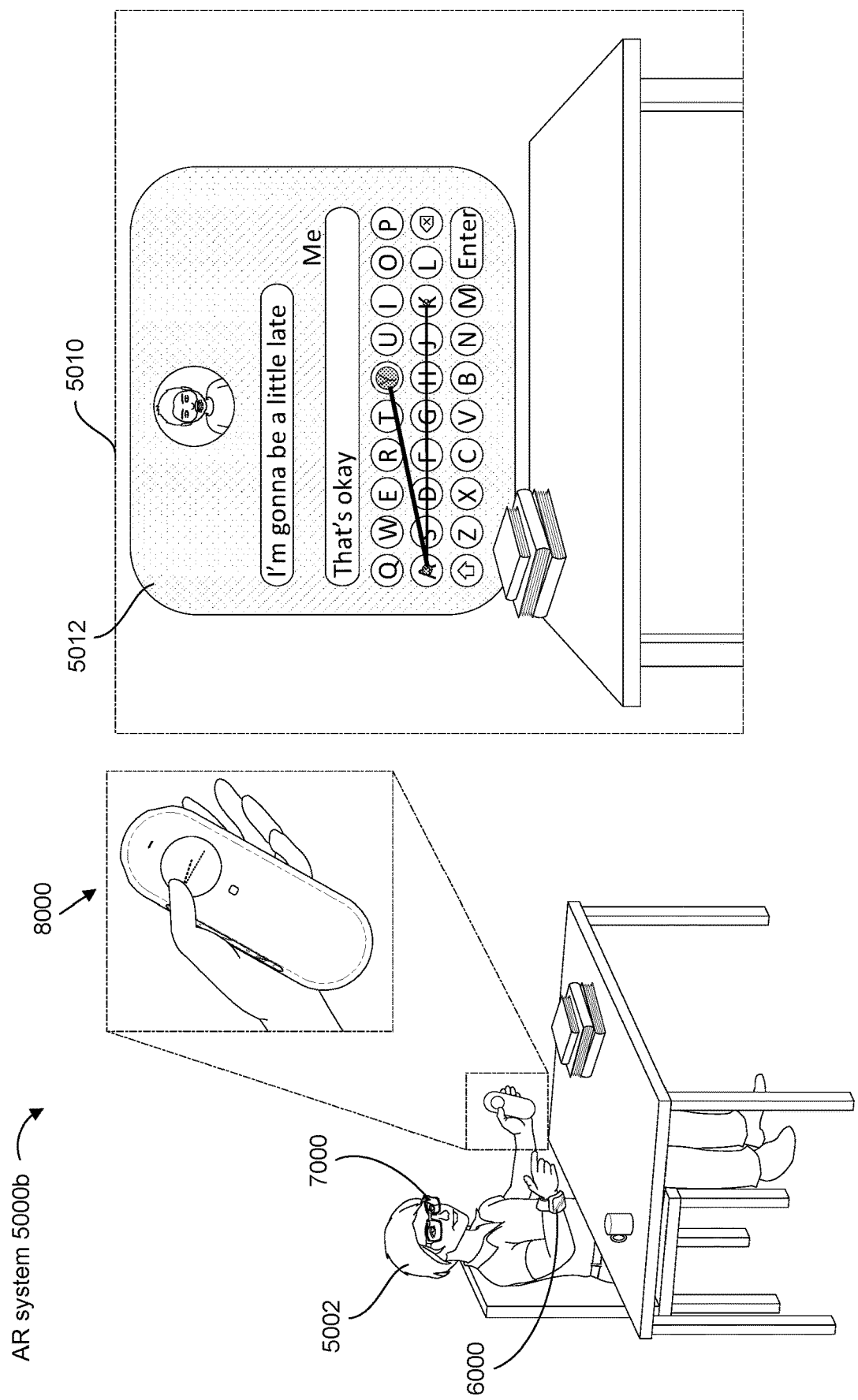
Figures 1, 14C:
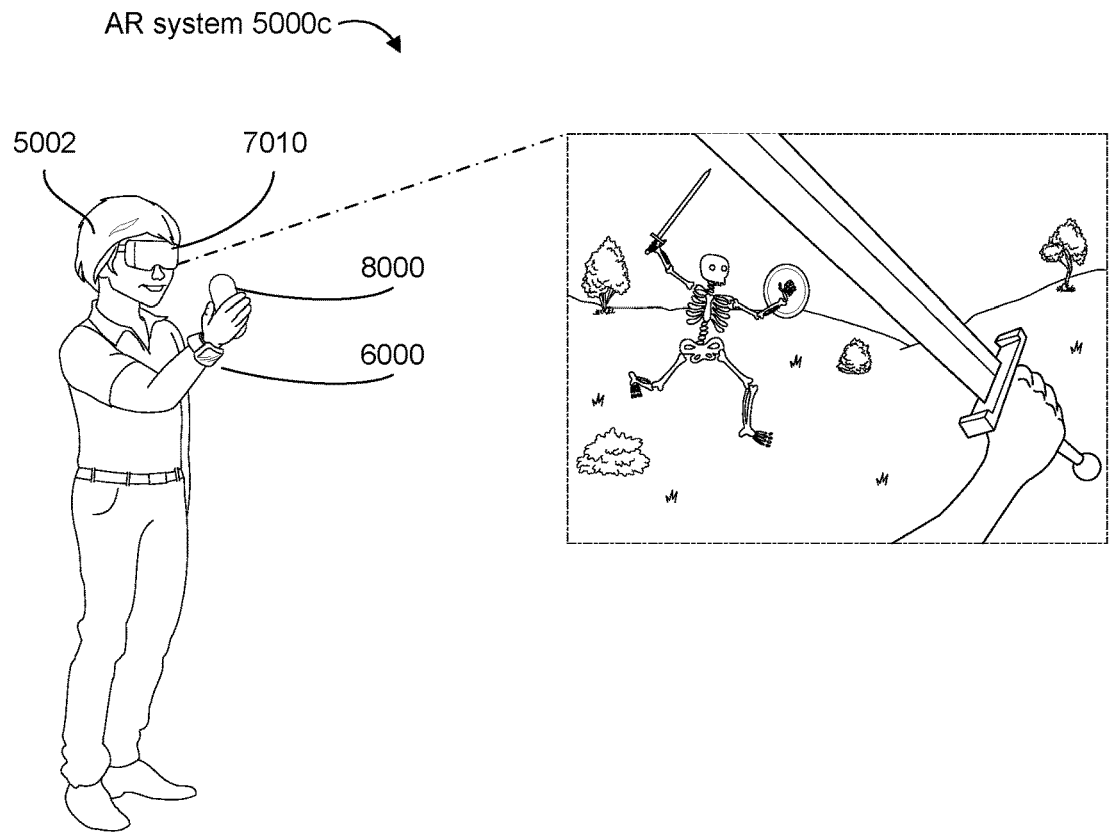
Figures 2, 14C:
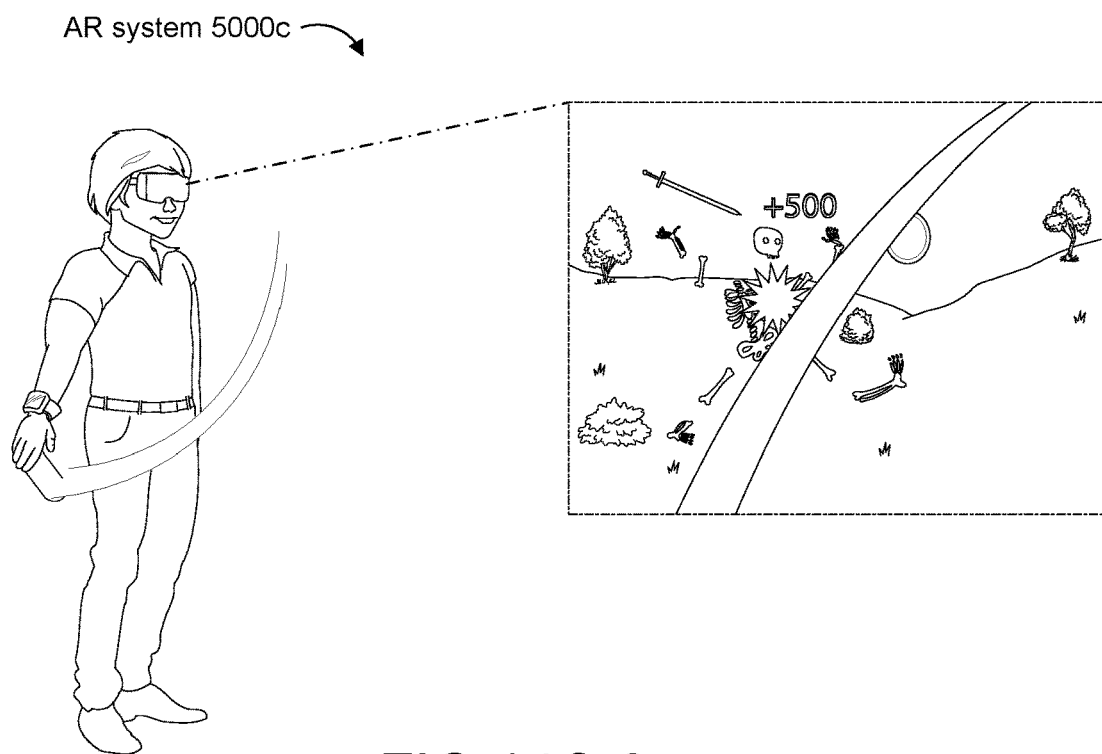
Figures 1, 14D:
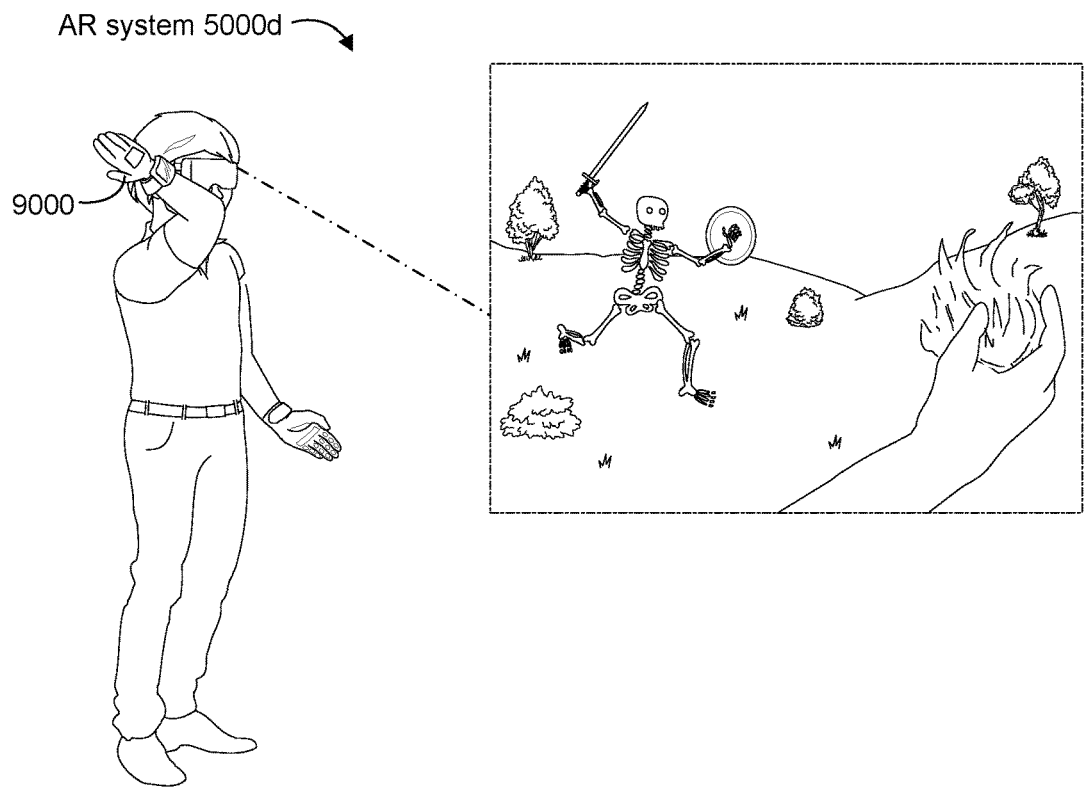
Figures 2, 14D:
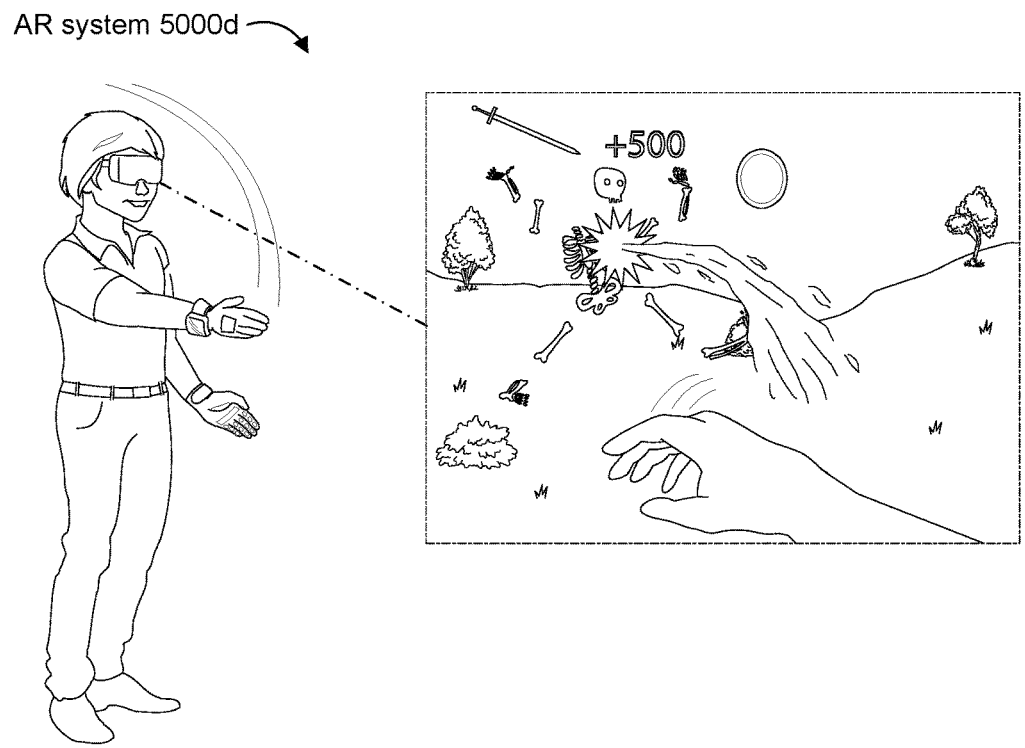

FIGS. 14A-14D illustrate example AR systems in accordance with some embodiments. FIG. 14A shows an AR system 5000a and first example user interactions using a wrist-wearable device 6000, a head-wearable device (e.g., AR system 7000), and/or a handheld intermediary processing device (HIPD) 8000. FIG. 14B shows an AR system 5000b and second example user interactions using the wrist-wearable device 6000, the AR system 7000, and/or an HIPD 8000. FIGS. 14C-1 and 14C-2 show an AR system 5000c and third example user interactions using a wrist-wearable device 6000, a head-wearable device (e.g., VR headset 7010), and/or an HIPD 8000. FIGS. 14D-1 and 14D-2 show a fourth AR system 5000d and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1-13.

The wrist-wearable device 6000 and its components are described below in reference to FIGS. 15A-15B; the head-wearable devices and their components are described below in reference to FIGS. 16A-16D; and the HIPD 8000 and its components are described below in reference to FIGS. 17A-17B. Wearable gloves and their components are described below in reference to FIGS. 18A-18C. As shown in FIG. 14A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops, computers, etc.), mobile devices 5050 (e.g., smartphones, tablets, etc.), and/or other electronic devices via the network 5025 (e.g., cellular, near field, Wi-Fi, personal area network, wireless LAN, etc.) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 14A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000a, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 15A-15B) and/or AR system 7000 (e.g., using one or more image sensor or camera, described below in reference to FIGS. 16A-16B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 17A-17B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000a, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information.

This allows the user 5002 to be generally aware of where information is presented. For example, as shown in the AR system 5000*a*, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within 5 meters). For example, as shown in the AR system 5000*a*, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 14B shows the user 5002 wearing the wrist-wearable device 6000 and the AR system 7000 and holding the HIPD 8000. In the AR system 5000*b*, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000*b* the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application; initiate and run the messaging application; and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); light sensors (e.g., time-of-flight sensors, infrared light sensors, visible light sensors, etc.); . . . . As described herein biopotential-signal-sensing components are devices used to measure electrical activity within the body (e.g., biopotential-signal sensors).

Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 15A:
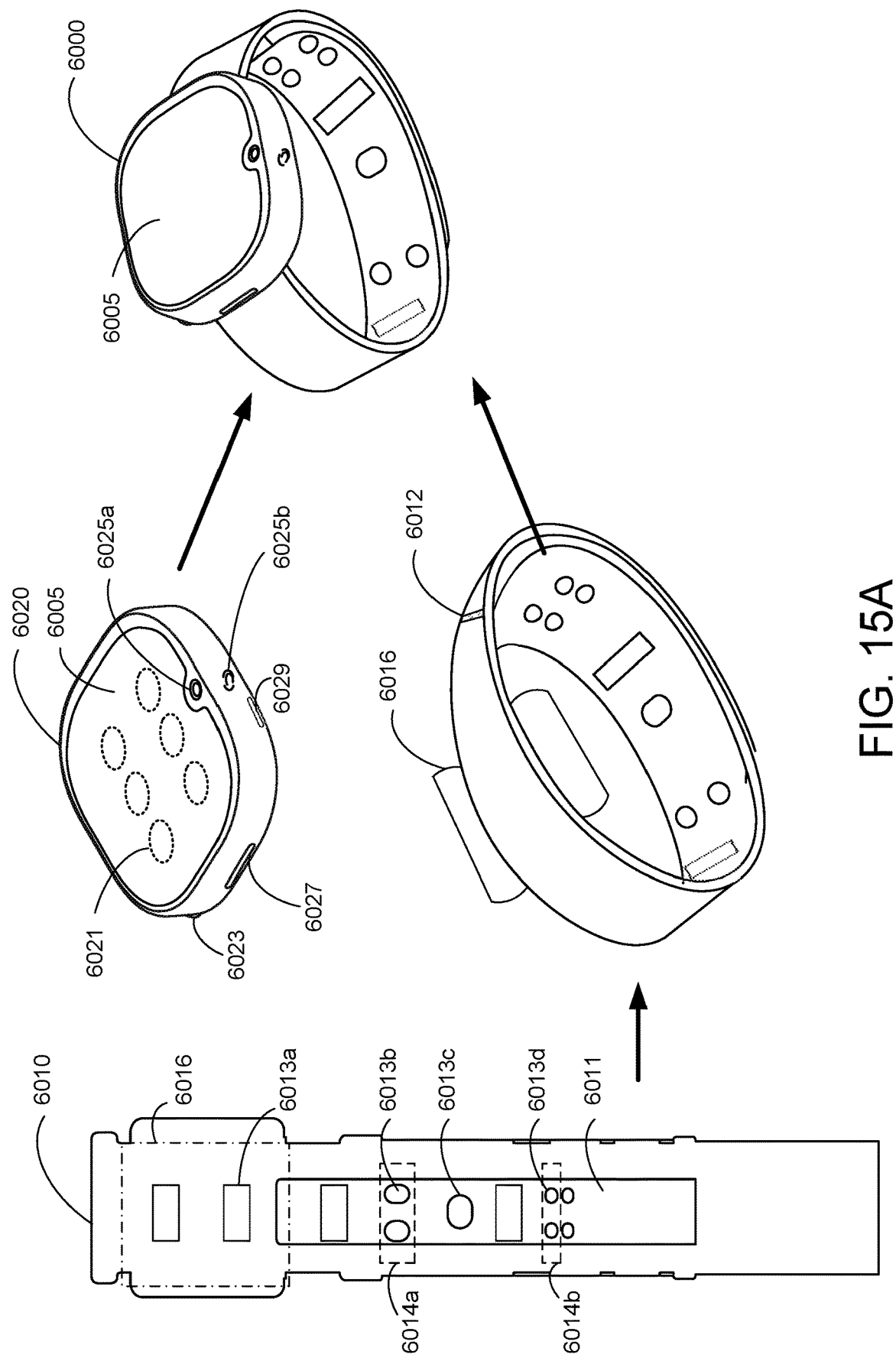
FIGS. 15A-15B illustrate an example wrist-wearable device in accordance with some embodiments.
Figure 15B:
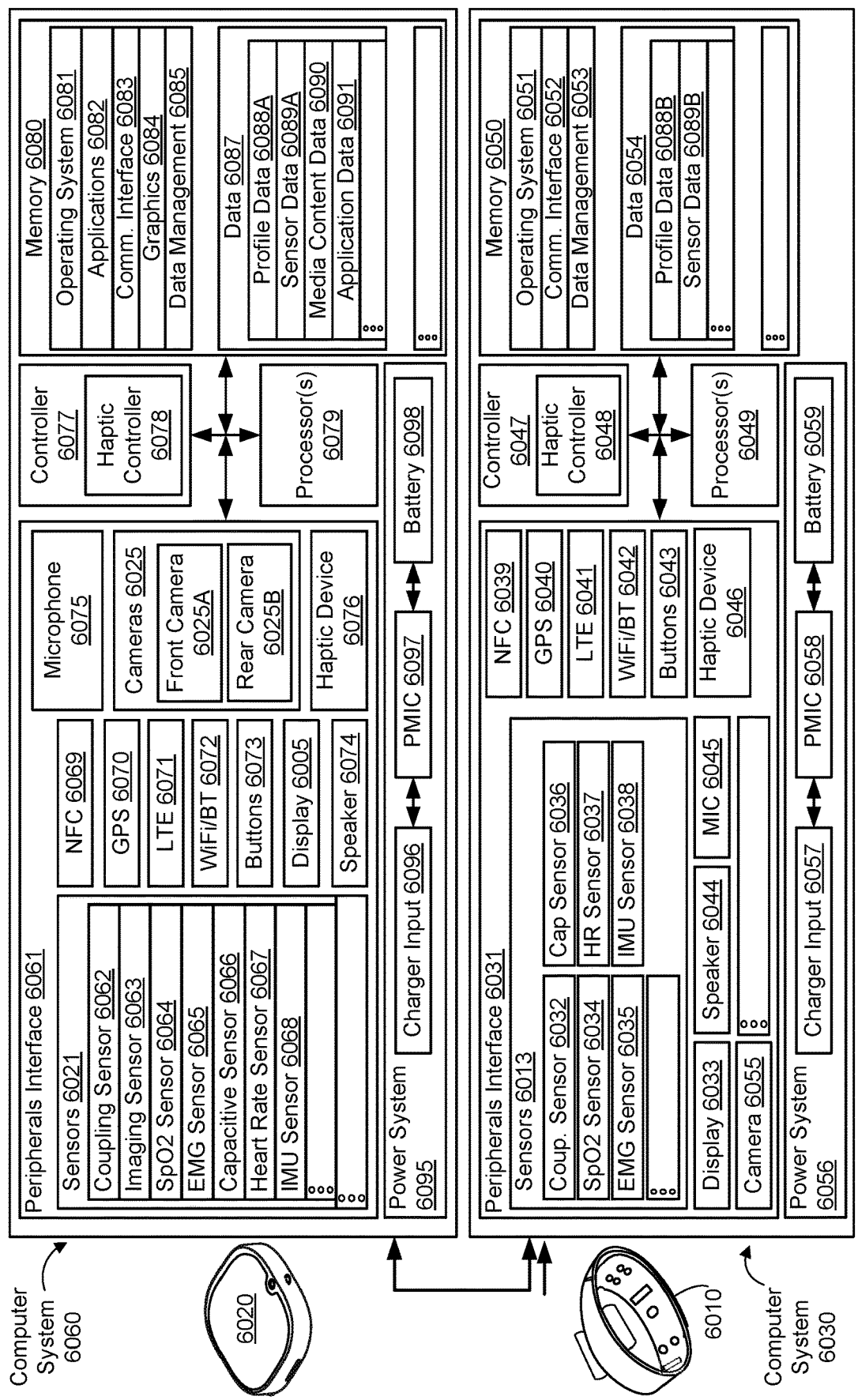

FIGS. 15A and 15B illustrate the wrist-wearable device 6000 in accordance with some embodiments. FIG. 15A illustrates components of the wrist-wearable device 6000, which can be used individually or in combination, including combinations that include other electronic devices and/or electronic components.

FIG. 15A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; sleep monitoring; etc.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000a to 5000d). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment including a user's motion, altitude, location, orientation, gait, acceleration, position, or a combination thereof. In some embodiment, the sensors 6013 are configured to track a position and/or motion of the wearable band 6010. The one or more sensors 6013 can include any of the sensors defined above and/or discussed below with respect to FIG. 15B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 15A, the one or more sensors 6013 can be the same or distinct. For example, in some embodiments, the one or more sensors 6013 can be shaped as a pill (e.g., sensor 6013a), an oval, a circle a square, an oblong (e.g., sensor 6013c) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013b is aligned with an adjacent sensor to form sensor pair 6014a and sensor 6013d aligned with an adjacent sensor to form sensor pair 6014b. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiments, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material, elastomers, etc. configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series woven strands of fabric)).

The wearable structure 6011 can include flexible electronic connectors that interconnect the sensors 6013, the electronic circuitry, and/or other electronic components (described below in reference to FIG. 15B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 15B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, adding additional sensors to improve sensed data, etc.). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiment, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications, output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 15B), a touch sensor, a sweat sensor, etc.). In some embodiments, the watch body 6020 can include one or more haptic devices 6076 (FIG. 15B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health monitoring applications, social media applications, game applications, and artificial reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 17A-17B).

As described below with reference to the block diagram of FIG. 15B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

FIG. 15B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6057, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensor 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held).

In some embodiments, the peripherals interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 15A), which, when selected by a user, cause operation to be performed at the watch body 6020. In some embodiments, the peripherals interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can includes one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensor 6034, one or more EMG sensors 6035, one or more capacitive sensor 6036, one or more heart rate sensor 6037, and one or more IMU sensor 6038.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, firmware, including one or more signal processing and/or application-specific integrated circuits.

The wrist-wearable device 6000 with respect to FIG. 15A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIG. 15A-15B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 18A-18C. Having thus described example wrist-wearable device, attention will now be turned to example head-wearable devices, such AR system 7000 and VR headset 7010.

Example Head-Wearable Devices

Figure 16A:
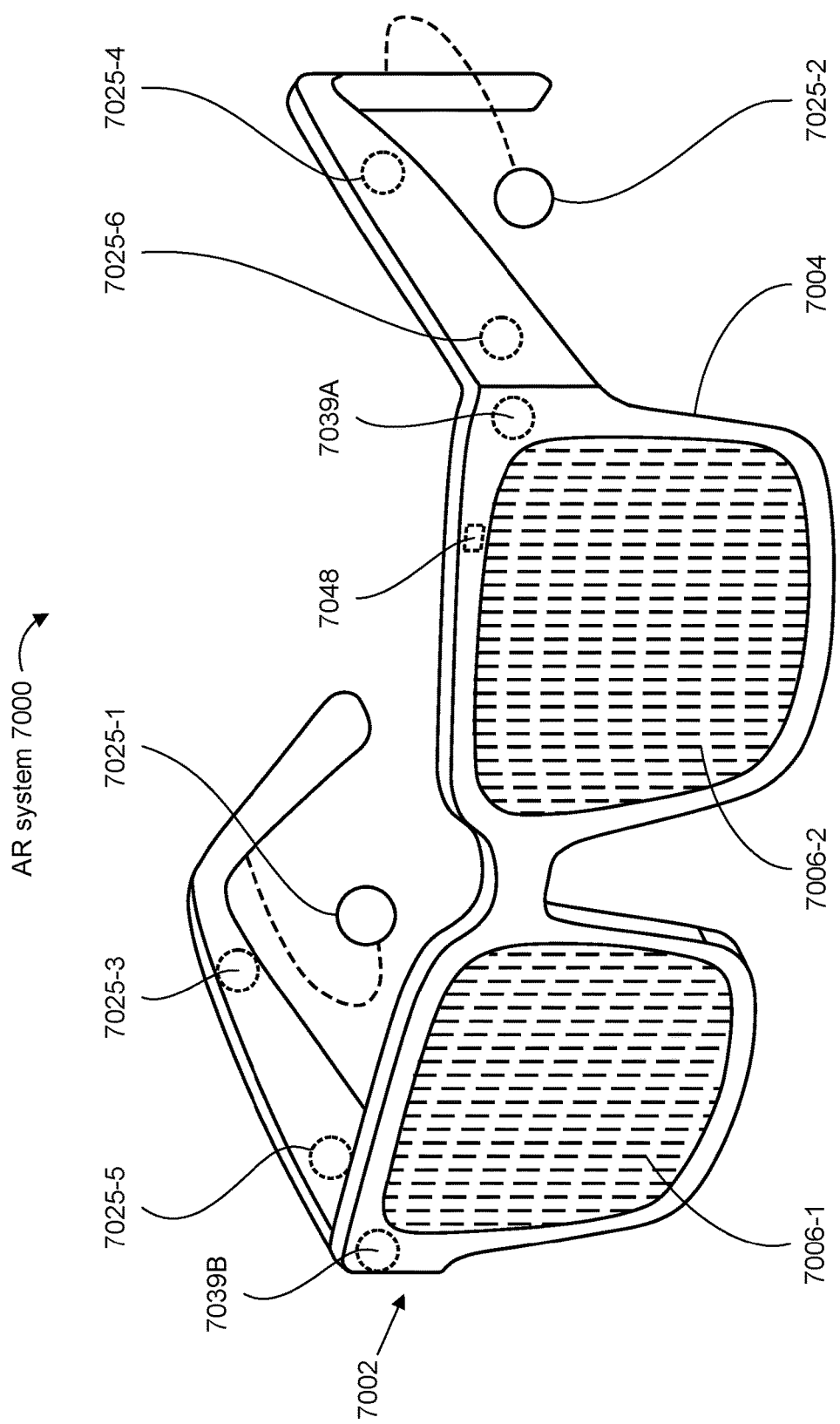
Figures 1, 16B:
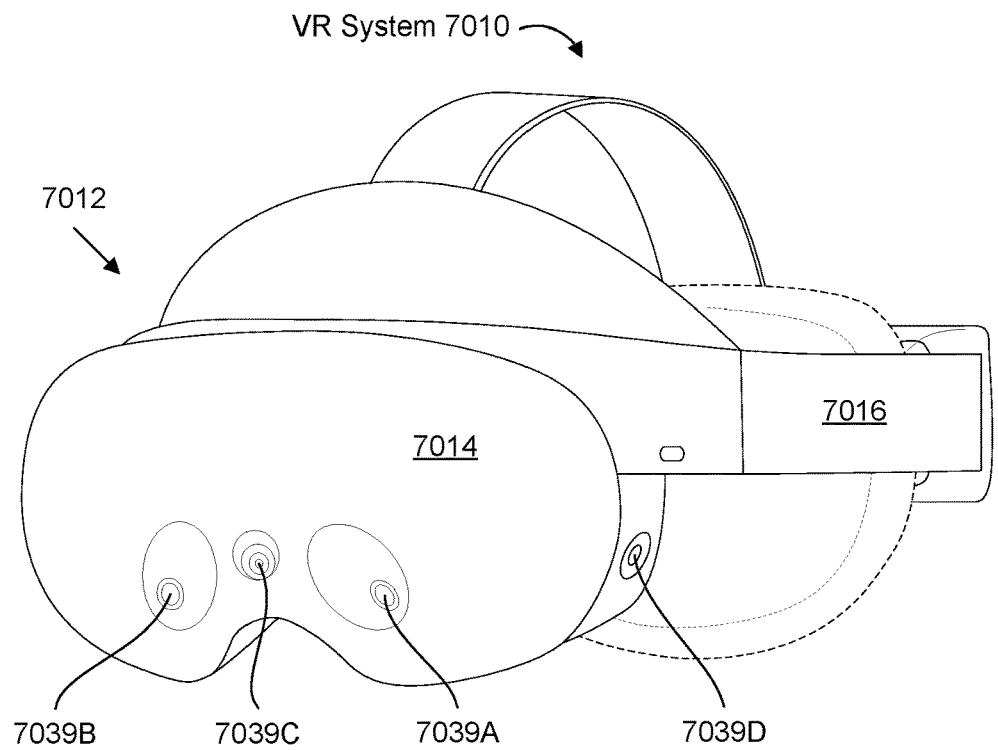
Figures 2, 16B:
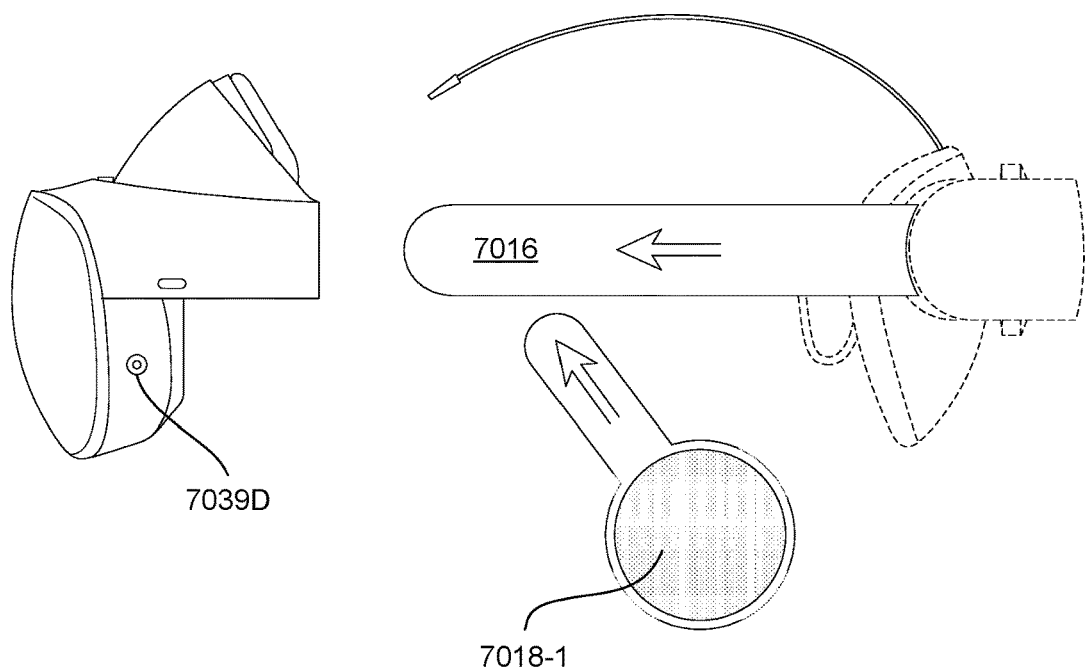
Figure 16C:
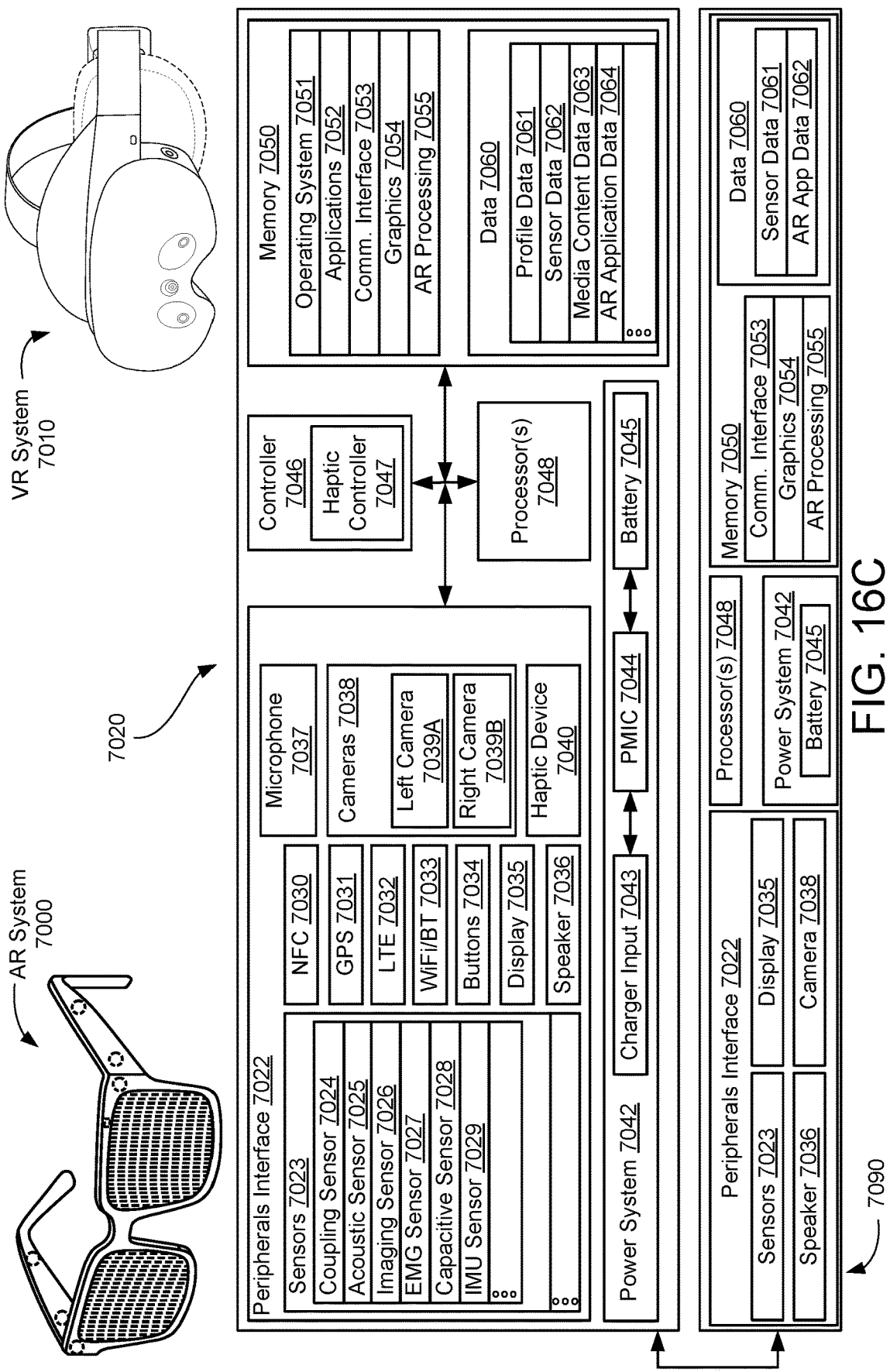

FIGS. 16A to 16C show example artificial-reality systems, including the AR system 7000. In some embodiments, the AR system 7000 is an eyewear device as shown in FIG. 16A. In some embodiments, the VR system 7010 includes a head-mounted display (HMD) 7012, as shown in FIGS. 16B-1 and 16B-2. In some embodiments, the AR system 7000 and the VR system 7010 include one or more analogous components (e.g., components for presenting interactive artificial-reality environments, such as processors, memory, and/or presentation devices, including one or more displays and/or one or more waveguides), some of which are described in more detail with respect to FIG. 16C. As described herein, a head-wearable device can include components of the eyewear device 7002, and/or the head-mounted display 7012. Some embodiments of head-wearable devices do not include any displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 16A show an example visual depiction of the AR system 7000 (which may also be described herein as augmented-reality glasses, and/or smart glasses). The AR system 7000 can include additional electronic components that are not shown in FIGS. 16A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 16A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 16C. Some example electronic components are illustrated in FIG. 16A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 16B-1 and 16B-2 show a VR system 7010 that includes a head-mounted display (HMD) 7012 (e.g., also referred to herein as an artificial-reality headset, a head-wearable device, or a VR headset), in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000c and 5000d).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 16B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 16B-2. In some embodiments, coupling a detachable component to the HMD 7012 causes the detachable component to come into electronic communication with the HMD 7012.

FIG. 16B-1 to 16B-2 also show that the VR system 7010 one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 16C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 15A and 15B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040; and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some artificial-reality systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 16C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 16B-1 and 16B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 18A to 18C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 17A:
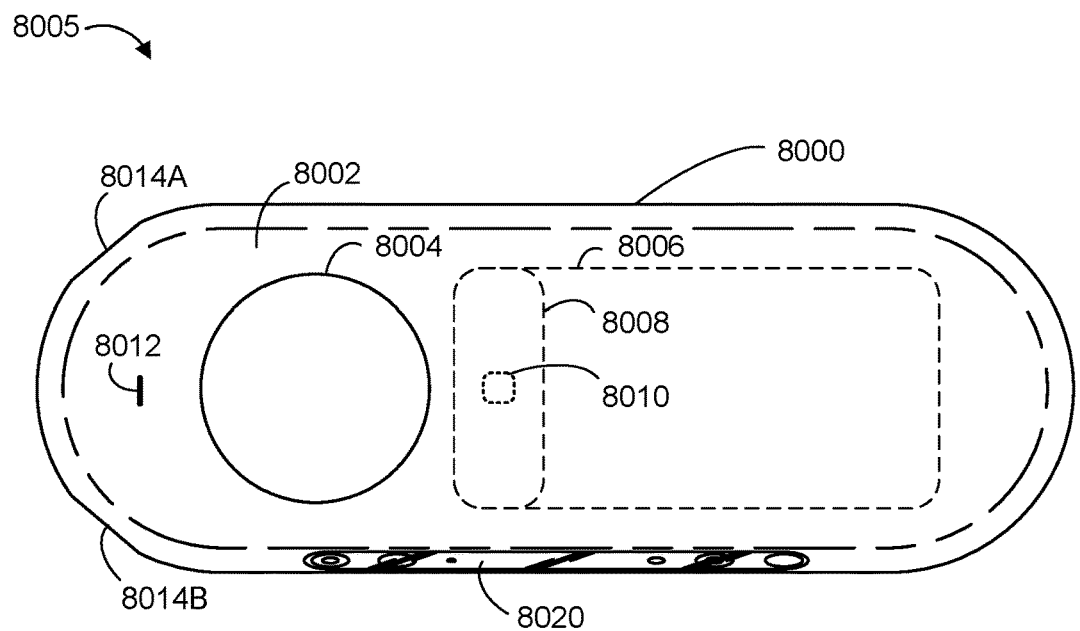
FIGS. 17A-17B illustrate an example handheld device in accordance with some embodiments.
Figure 17A:
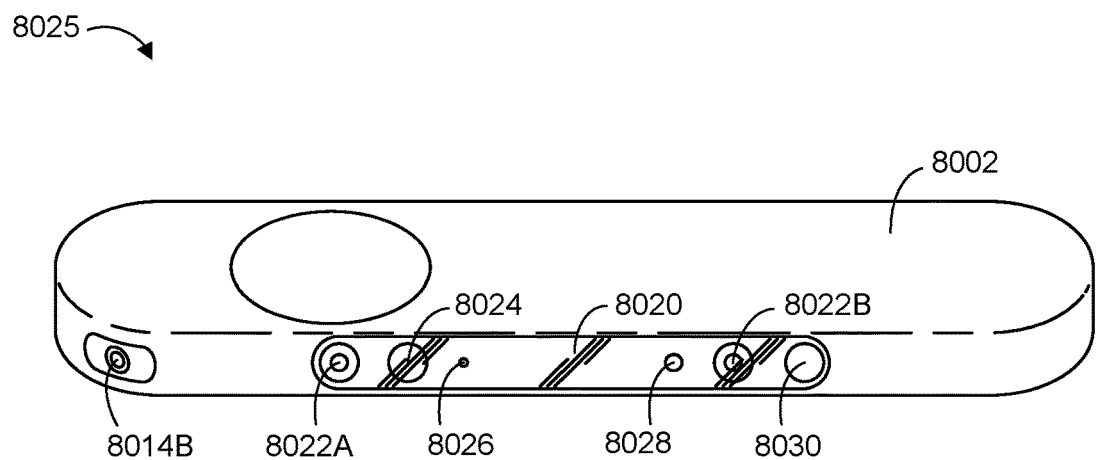
Figure 17B:
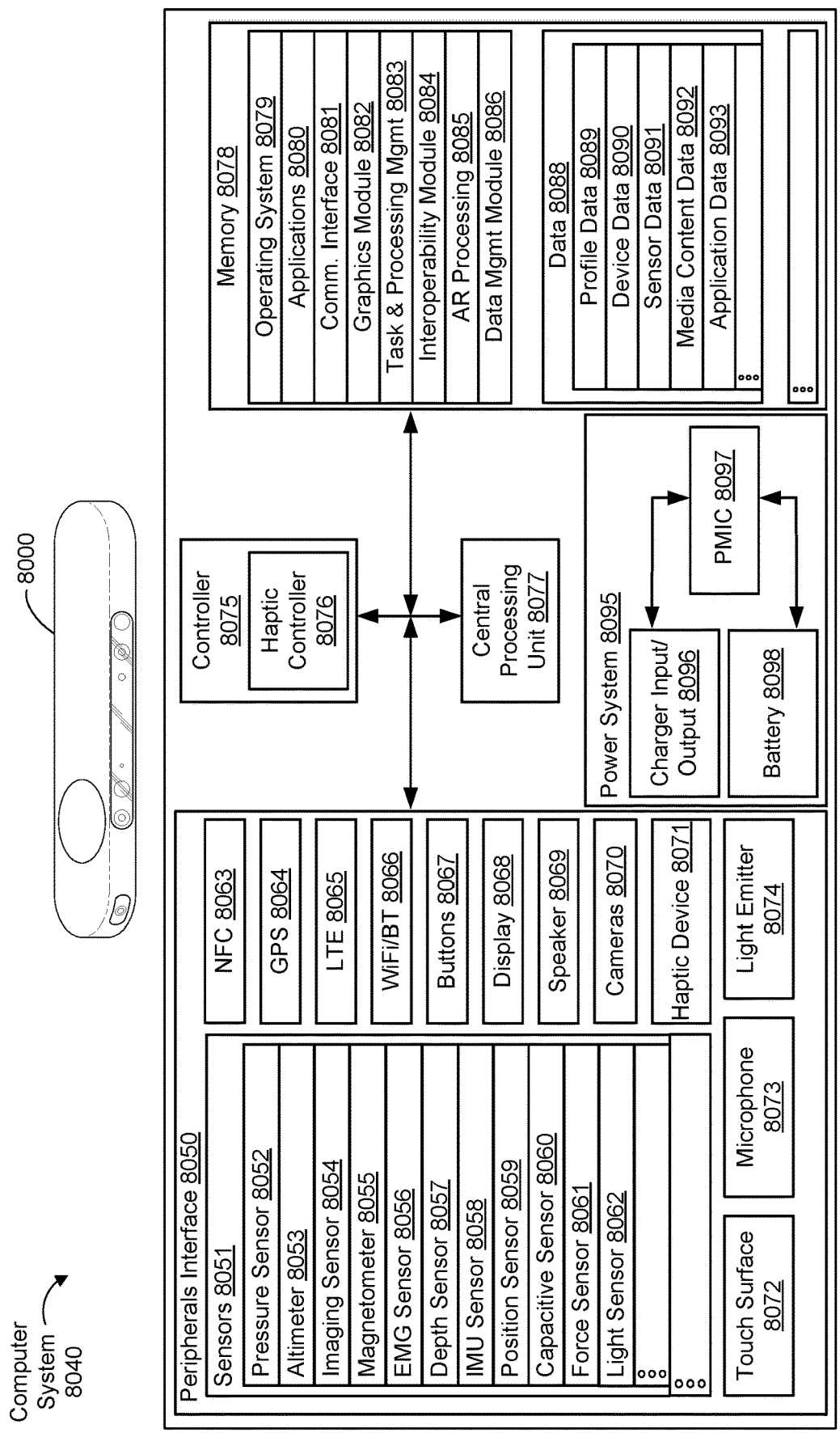

FIGS. 17A and 17B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 17A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; 6 degrees of freedom (6DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input surface 8006 defined by a substantially planar portion. The touch-input surface 8004 can be disposed adjacent to the touch-input surface 8006. In some embodiments, the touch-input surface 8004 and the touch-input surface 8006 can be different dimensions, shapes, and/or cover different portions of the multi-touch input surface 8002. For example, the touch-input surface 8004 can be substantially circular and the touch-input surface 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input surface 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 17B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change red when the HIPD 8000 is out of power, operate as a progress bar (e.g., a light ring that is closed when a task is completed (e.g., 0% to 100%)), operates as a volume indicator, etc.).

In some embodiments, the HIPD 8000 includes one or more additional sensors on another surface. For example, as shown FIG. 17A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 17B). The HIPD 8000 can also income one or more optional peripheral buttons 8067 (FIG. 17B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 include one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 17B). The HIPD 8000 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 17B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all, or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 15B. For example, the sensors 8051 can include imaging sensors 8054, (optional) EMG sensors 8056, IMU sensors 8058, and capacitive sensors 8060. In some embodiments, the sensors 8051 can include one or more pressure sensor 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 17B.

Analogous to the peripherals described above in reference to FIGS. 15B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 17A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 17A is an example of touch surface 8072. The light emitters 8074 can be one or more LEDs, lasers, etcetera, and can be used to project or present information to a user. For example, the light emitters 8074 can include light indicators 8012 and 8026 described above in reference to FIG. 17A. The cameras 8070 (e.g., cameras 8014 and 8022 described above in FIG. 17A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; facial recognition and facial expression recognition, etc.

Similar to the watch body computing system 6060 and the watch band computing system 6030 described above in reference to FIG. 15B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, one or more data management modules 8086, which are analogous to the software components described above in reference to FIG. 15B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIG. 17A-17B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 18A-18C. Having thus described example HIPD 8000, attention will now be turned to example feedback devices, such as device 9000.

Example Feedback Devices

Figure 18B:
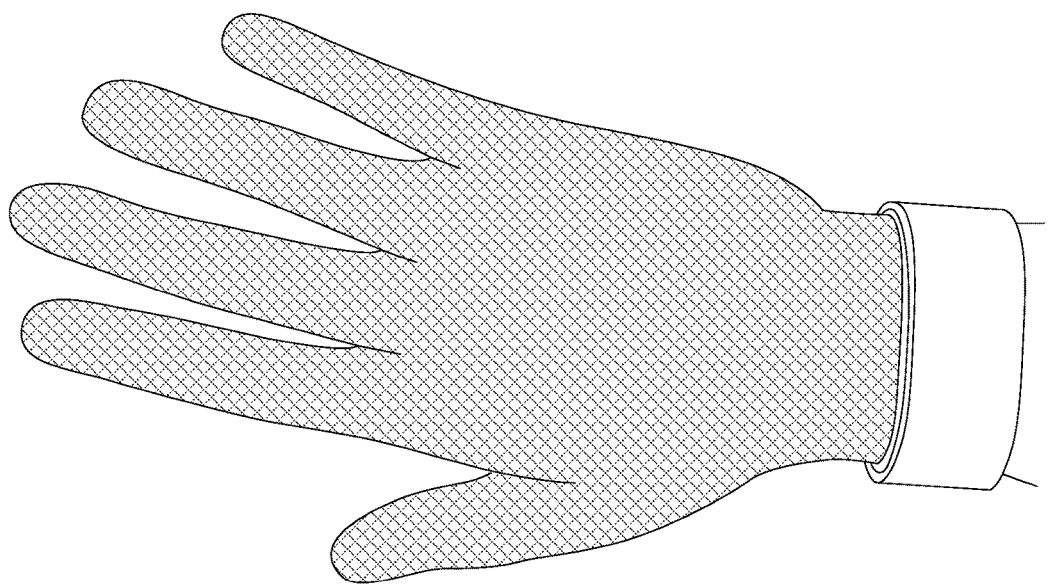
FIGS. 18A-18C illustrate example wearable gloves in accordance with some embodiments.
Figure 18A:
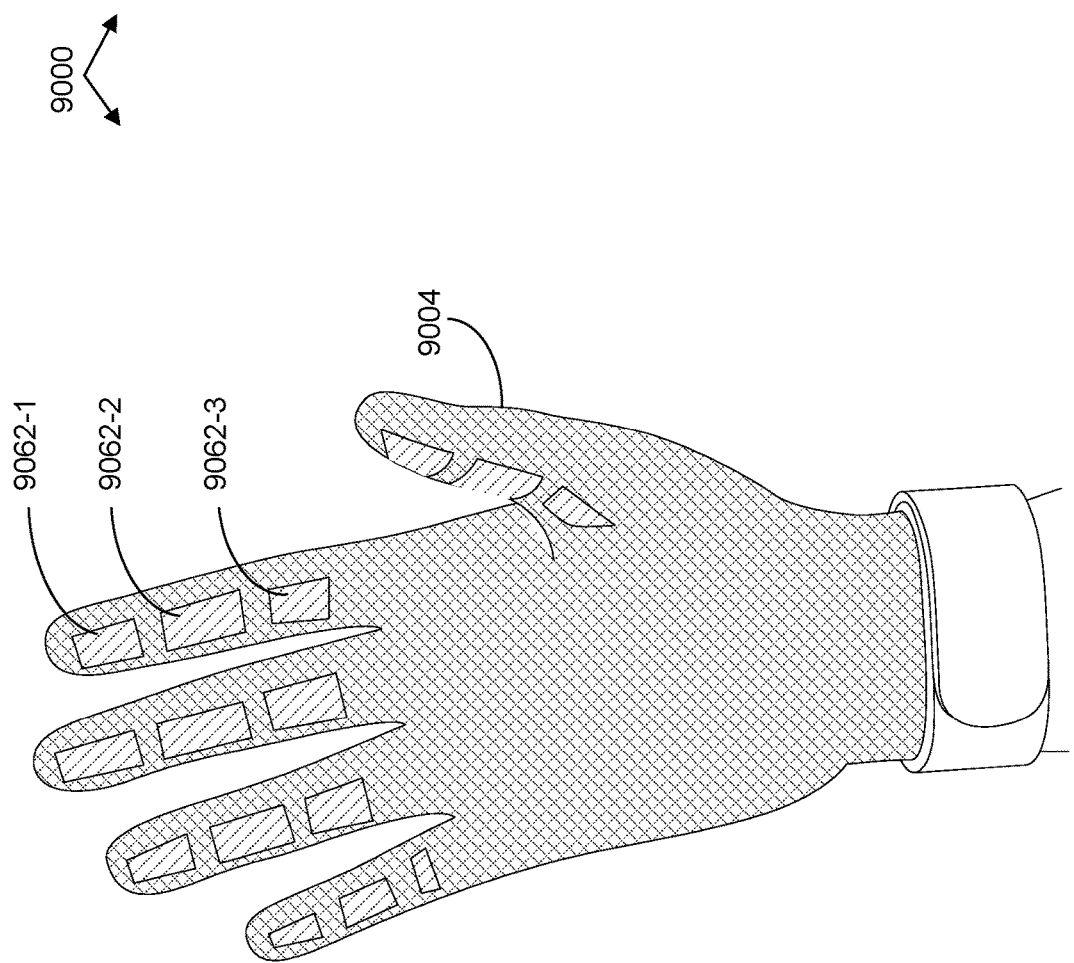

FIGS. 18A and 18B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000*d*) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands of times, during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 15A-15B. Each of which can include a garment component (e.g., a garment 9004) and one or more haptic assemblies coupled (e.g., physically coupled) to the garment component. For example, each of the haptic assemblies 9062-1, 9062-2, 9062-3, . . . 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 18C:
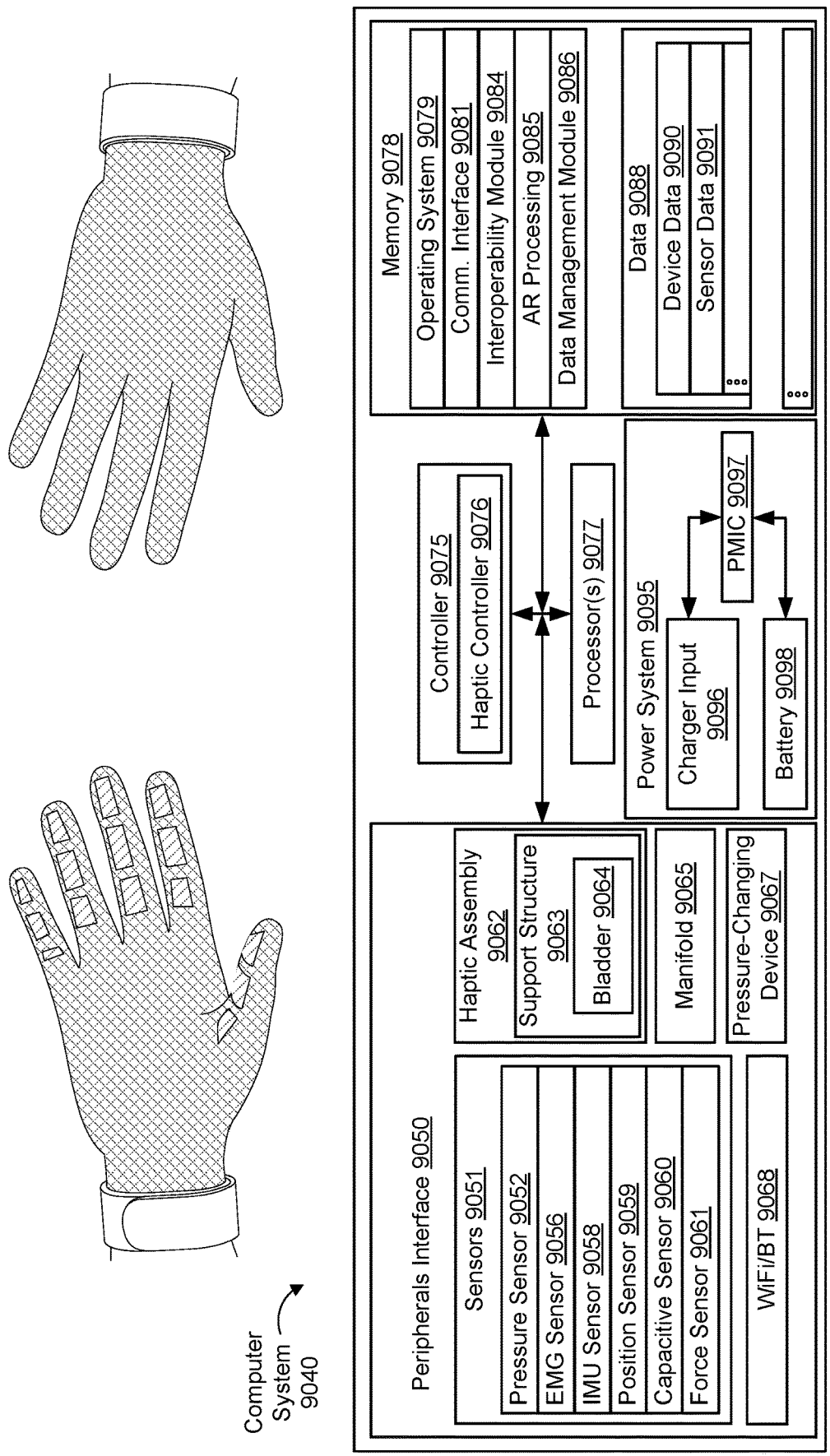

FIG. 18C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 15A and 15B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061; and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 14A and 14B. For example, the one or more signals may cause the pressure-changing device 9067 to increase the pressure (e.g., fluid pressure) inside a haptic assembly 9062 at a first time, based on the information collected by the sensors in FIGS. 14A and 14B (e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 18A to 18C may be coupled via a wired connection (e.g., via busing). Alternatively, one or more of the devices shown in FIGS. 18A to 18C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Having thus described system-block diagrams and then example devices, attention will now be directed to certain example embodiments.

EXAMPLE EMBODIMENTS

Turning now to some example embodiments of the methods, devices, systems, and computer-readable storage media described earlier.

(A1) In one aspect, some embodiments include a method (e.g., the method 800) of using a multi-stage in-air hand gesture to activate user-interface interactions. In some embodiments, the method is performed at a wearable device (e.g., the wrist-wearable device 120) having memory (e.g., memory 6080) and one or more processors (e.g., the processor(s) 6079). The method includes: (i) receiving, via one or more sensors (e.g., the sensors 6021) of a wrist-wearable device worn by a user (e.g., the user 115), data generated from performance of a multi-stage in-air hand gesture by the user (e.g., the sensor data 6089A); (ii) in accordance with a determination that a first stage of the multi-stage in-air hand gesture is a priming gesture (e.g., the pinch gesture in FIG. 1B), activating a user interface (e.g., presenting the radial menu 131); and (iii) in accordance with a determination that a last stage of the multi-stage in-air hand gesture is a control gesture (e.g., the tap gesture of FIG. 1D) received within a predefined threshold amount of time of the priming gesture, executing a command for the user interface that corresponds to the control gesture.

In some embodiments, the wearable device is a wrist-wearable device, such as a smartwatch (e.g., the wrist-wearable device 120). In some embodiments, the wearable device includes an inertial measuring unit (IMU). In some embodiments, the wearable device is a head-wearable wearable device, such as smart glasses (e.g., the head-wearable device 202). The methods described herein, in addition to being performed at a wearable device, can also be performed at an artificial-reality system (e.g., the system 5000*a*) that includes both a wrist-wearable device and a head-wearable wearable device, among other hardware accessories or components.

In some embodiments, by using the data from the one or more neuromuscular-signal sensors, an in-air hand gesture described herein is detected before its performance has been completed by the user, such as detecting an intention to perform the in-air hand gesture followed by completion of the in-air hand gesture, which can either be separately detected or determined based on the user's intention to perform the in-air hand gesture.

In some embodiments, the in-air hand gestures described herein include movement of a user's wrist, elbow, and shoulder (e.g., an arm lift or wave gesture). In some embodiments, the in-air gesture is a gesture that does not contact the wearable device.

In some situations, the requirement for both a priming gesture and a control gesture reduces false positives (e.g., from the user inadvertently performing a gesture). In some embodiments, the priming gesture and the control gesture are identified from data collected by one or more EMG sensors. In some embodiments, the priming gesture is identified from data collected by an IMU sensor and in response an EMG sensor is activated (e.g., to detect a subsequent control gesture). In some embodiments, each stage of the multi-stage gesture is detected by an EMG sensor, and IMU sensor, or a combination of both sensors. In some embodiments, other types of sensors are used to detect at least one stage of the multi-stage gesture (e.g., a stage of the gesture is detected via optical and EMG sensors).

(A2) In some embodiments of A1: (i) the priming gesture includes maintaining a pinch-and-hold gesture in which at least two phalanges of the user's hand remain in contact for at least a preset amount of time; and (ii) activating the user interface includes displaying a plurality of selectable user interface elements within the user interface while the pinch-and-hold gesture is maintained (e.g., as illustrated in FIGS. 1B-1D). In some embodiments, the pinch-and-hold gesture uses two phalanges (e.g., a middle finger and thumb). In some embodiments, each stage of a multi-stage gesture has a corresponding gesture force (e.g., that is detected via an EMG sensor), where the gesture type for each stage is based on the corresponding amount of gesture force.

In some embodiments, gestures that are unlikely to be performed by the user inadvertently are designated as priming gestures. For example, a middle finger and thumb pinch gesture is designated as a priming gesture, whereas an index finger and thumb pinch gesture is not designated as a priming gesture.

(A3) In some embodiments of A2, the method further includes ceasing to display the plurality of selectable user interface elements in accordance with a determination, based on data from the one or more sensors of the wrist-wearable device, that the pinch-and-hold gesture is no longer maintained. In some embodiments, activating the user interface further includes ceasing to display the plurality of selectable user interface elements in accordance with the pinch-and-hold gesture being released. For example, in FIG. 1E the user 115 has released the pinch gesture shown in FIG. 1D and the radial menu 131 is no longer displayed.

(A4) In some embodiments of A2 or A3, the pinch-and-hold gesture is performed with a finger and thumb on a hand of the user wearing the wrist-wearable device (e.g., a middle finger and thumb pinch).

(A5) In some embodiments of any of A2-A4: (i) the multi-stage in-air hand gesture further includes a navigation stage; (ii) the navigation stage includes a rotation of a wrist of the user to navigate through a plurality of user interface elements in the user interface and select a selected user interface element from the plurality of user interface elements (e.g., FIG. 1C shows the user navigating the radial menu 131 via rotation of the wrist); and (iii) the control gesture comprises a release of the pinch-and-hold gesture to execute a command for the selected user interface element (e.g., as illustrated in FIG. 1E).

(A6) In some embodiments of any of A2-A4: (i) the multi-stage in-air hand gesture further includes a navigation stage; and (ii) the navigation stage includes a sliding movement of a first phalange of the at least two phalanges across a surface of a second phalange of the at least two phalanges, the first and second phalanges being located on different fingers of the hand of the user. For example, the priming stage includes a pinch gesture, the navigation stage includes sliding movement of one phalange in the pinch across the surface of the phalange in the pinch gesture, and the control stage includes a deep pinch where the force of the pinch exceeds a preset threshold.

(A7) In some embodiments of any of A2-A4 or A6: (i) the pinch-and-hold gesture is maintained via a pressing force between the at least two phalanges of the user's hand, the pressing force not meeting a preset activation criterion; (ii) the control gesture comprises an increase in the pressing force between the at least two phalanges of the user's hand, such that the pressing force becomes an increased pressing force; and (iii) the command is executed in accordance with the increased pressing force meeting the preset activation criterion. In some embodiments, (i) the pinch-and-hold gesture has a corresponding force between the fingers, the corresponding force not meeting a preset activation criterion; (ii) the control gesture comprises an increase in the force between the fingers; and (iii) the command is executed in accordance with the force meeting the preset activation criterion (e.g., as described previously with respect to FIGS. 1D and 1F).

In some embodiments, there are multiple thresholds for force of a gesture. For example, a priming gesture comprises a pinch with a force below a first threshold; a first control gesture comprises a pinch with a force above the first threshold, but below a second threshold; and a second control gesture comprises a pinch with a force above the second threshold. In this example, the priming gesture may cause a menu to be displayed, the first control gesture may update the menu to include one or more elements not initially displayed in response to the priming gesture, and the second control gesture may select (activate) a highlighted element in the menu.

(A8) In some embodiments of any of A1-A7, the method further comprises identifying the command for the user interface based on a combination of the priming gesture and the control gesture. For example, the user interface is responsive to multiple priming gestures for priming different types of commands. In this example, for each priming gesture there are multiple command gestures to identify the command from among multiple commands of the particular type. In this way, the specific command to be executed is identified based on both the priming gesture and the control gesture.

(A9) In some embodiments of any of A1-A8, activating the user interface includes presenting a user interface element that was not presented prior to activating the user interface. For example, activating commands for the user interface, where the commands correspond to the additional gestures. In some embodiments, activating the user interface further includes activating one or more sensors of the wrist-wearable device. In some embodiments, activating the user interface includes enabling display of the user interface. In some embodiments, activating the user interface includes updating display of the user interface (e.g., to display a menu that was not previously displayed).

(A10) In some embodiments of any of A1-A9, the method further comprises activating a display of the wrist-wearable device in response to the priming gesture. In some embodiments, activating the display includes increasing power supplied to the display and/or increasing illumination of the display. In some embodiments, the wrist-wearable device does not include a display and, in response to the priming gesture, the wrist-wearable device transitions to a state that is response to control gestures (e.g., by powering on additional sensors and/or additional sensor logic). In some embodiments, the wrist-wearable device includes a display, and activating the user interface includes supplying power to the display of the wrist-wearable device. In some embodiments, the priming gesture activates a display separate from the wrist-wearable device (e.g., a display of a head-wearable device, a television, or a monitor). In some embodiments, activating the display comprises sending instructions to a remote display to cause it to activate. For example, the wrist-wearable device sends an instruction to a head-wearable device instructing the head-wearable device to activate its display.

(A11) In some embodiments of any of A1-A10, the method further comprises activating a display of a head-wearable device in response to the priming gesture. In some embodiments, activating the display includes increasing power supplied to the display and/or increasing illumination of the display.

(A12) In some embodiments of any of A1-A11, the method further comprises: (i) receiving data generated from performance of a second multi-stage in-air hand gesture by the user; (ii) in accordance with a determination that a first portion of the second in-air hand gesture is the priming gesture, activating the user interface; and (iii) in accordance with a determination that the control gesture is not detected within a predetermined amount of time of the priming gesture, deactivating the user interface (e.g., as described above with respect to FIGS. 5A-5D).

In some situations, the priming gesture could be a false positive and thus if no control gestures are performed within a short time afterwards the user interface is deactivated to prevent execution of undesirable commands. Additionally, if a second in-air hand gesture is performed but that it is not a control gesture that corresponds to the priming gesture, the user interface may be deactivated (e.g., if the user interface is specific to the priming gesture). In some embodiments, the user interface is deactivated in accordance with executing the command. In some embodiments, the user interface is deactivated after a set amount of time (e.g., a set amount of time from executing the command or a set amount of time from activation).

(A13) In some embodiments of any of A1-A3, A5, or A7-A12, the control gesture includes a rotational movement of a wrist on which the wrist-wearable device is worn. For example, wrist rotation is used to confirm which UI element the user desires to activate. As an example, when sending a message to a remote user, the send action is gated by a wrist roll to confirm. In some embodiments, rotation of the user's wrist is detected using a type of sensor (e.g., an IMU sensor) that can be distinct from a type of sensor used to detect the priming gesture (e.g., a neuromuscular-signal sensor). In this way, data from an EMG sensor can be used to prime EMG-controlled actions, which can help to reduce false positives as the IMU wrist-roll gesture may be erroneously performed during daily use but priming it with an intentional EMG gesture helps to ensure the IMU gesture is correctly detected with a lower false positive rate (e.g., rate of false positives reduced to less than 5%). The rotational movement can be a rotational movement within a roll axis of the wrist-wearable device (e.g., an axis extending circumferentially around the user's wrist).

(A14) In some embodiments of any of A1-A13, activating the user interface includes causing a plurality of user interface elements to be displayed within the user interface. In some embodiments, the menu displayed is a radial menu or a grid menu. In some embodiments, the plurality of user interface elements are displayed within a menu, a window, or an application interface.

(A15) In some embodiments of A14, activating the user interface includes causing the plurality of user interface elements to be displayed for a preset amount of time, and the plurality of user interface elements cease to be displayed automatically, without further instructions from the user, when a control gesture is not detected within the predefined threshold amount of time. In some embodiments, activating the user interface includes causing the plurality of user interface elements to be displayed for a preset amount of time, and the plurality of user interface elements cease to be displayed automatically when a control gesture is not detected within the predetermined amount of time.

In some embodiments: (i) a second in-air hand gesture is detected at the wrist-wearable device; (ii) in accordance with a determination that the second in-air hand gesture is a priming gesture, a menu is caused to be displayed; and (iii) in accordance with a determination that the second in-air hand gesture does not include a control gesture, ceasing to display the menu. In some embodiments, the menu is displayed for a preset amount of time after ceasing to detect the priming gesture.

(A16) In some embodiments of A14 or A15, the method further comprises, in accordance with (or in conjunction with) executing the command, deactivating the user interface including ceasing to display the plurality of user interface elements. In some embodiments, the user interface is closed (or deactivated), but the display is not in accordance with executing the command. In some embodiments, the display and the user interface are deactivated in accordance with executing the command. In some embodiments, whether the display and/or the user interface are deactivated depends on the type of command activated.

(A17) In some embodiments of any of A1 or A8-A16: (i) the priming gesture comprises a double tap gesture in which at least one digit of the user's hand contacts at least a part of the user's hand twice in succession; (ii) the control gesture comprises a snapping gesture in which at least two digits of the user's hand touch and slide against one another; and (iii) the command, which is identified based on the priming gesture and the control gesture, comprises capturing a video with an imaging device communicatively coupled to the wrist-wearable device. A double tap gesture in which at least one digit of the user's hand contacts at least a part of the user's hand twice in succession comprises two taps being detected within a preset time threshold of one another (e.g., the two taps are detected within 10, 20, or 30 milliseconds of one another). In some embodiments, the double tap gesture is performed using the pointer finger on top of a middle finger. However, the double tap gesture can be performed using other fingers. In some embodiments, the imaging device is a component of a smartphone, a head-wearable device, or a wrist-wearable device.

(A18) In some embodiments of A17, the method further comprises: (i) receiving data generated from performance of a second multi-stage in-air hand gesture by the user, where:

(a) a priming gesture of the second multi-stage in-air hand gesture comprises a single tap gesture; (b) a control gesture of the second multi-stage in-air hand gesture comprises the snapping gesture; and (ii) in accordance with the priming and control gestures of the second multi-stage in-air hand gesture, executing a new command, distinct from the command, the new command including capturing an image with the imaging device. In some embodiments, the image comprises a static image. In some embodiments, multiple images are captured (e.g., at multiple exposures) and are fused to create a finished image. For example, capturing the image comprises capturing a high dynamic range (HDR) image.

(A19) In some embodiments of any of A1-A18, activating the user interface includes causing one or more options to be presented to the user, the one or more options corresponding to available control gestures, including the control gesture that is the last stage of the multi-stage in-air hand gesture. In some embodiments, activating the user interface includes causing one or more options to be presented to the user, the one or more options corresponding to available control gestures (e.g., the options 606 shown in FIG. 6C).

(A20) In some embodiments of any of A1-A19, the method further includes, after determining that the last stage of the multi-stage in-air hand gesture is the control gesture and prior to executing the command, causing a confirmation to be presented to the user, the confirmation requesting that the user confirm that execution of the command is intended by the user, wherein the command is executed in response to the user confirming that execution of the command is intended. For example, in response to a multi-stage gesture being detected, the wearable device causes a notification to be display to the user, the notification indicating the command to be executed in response to the multi-stage gesture and providing the user with an option to confirm or deny the execution of the command. In some embodiments, the method further comprises, after determining that the last stage of the multi-stage in-air hand gesture is the control gesture and prior to executing the command, causing a confirmation to be presented to the user, the confirmation requesting that the user confirm that execution of the command is intended by the user, where the command is executed in response to the user confirming that execution of the command is intended.

(A21) In some embodiments of any of A1-A20: (i) the priming gesture is performed while a first user interface element is in focus within the user interface, and (ii) the method further includes: (a) in conjunction with activating the user interface, causing display of a plurality of options for interacting with the first user interface element, each of the plurality of options associated with a respective command for the user interface; and (b) in accordance with a determination that a second stage of the multi-stage in-air hand gesture, detected before the last stage of the multi-stage in-air hand gesture, is a navigation gesture, navigating through the plurality of options for interacting with the first user interface element until a respective option of the plurality of options is in focus within the user interface, the respective option of the plurality of options associated with the command, and (iii) where the control gesture is performed while the respective option remains in focus within the user interface, thereby causing the executing of the command that is associated with the respective option. In some embodiments, (i) activating the user interface includes giving focus to a first user interface element of the user interface; and (ii) the method further includes: (a) in accordance with giving focus to the first user interface element, causing display of a first plurality of options for interacting with the first user interface element; (b) in accordance with a determination that a second stage of the multi-stage in-air hand gesture is a navigation gesture, moving the focus to a second user interface element of the user interface; and (c) in accordance with moving the focus to the second user interface element, causing display of a second plurality of options for interacting with the second user interface element, where the second plurality of options is different than the first plurality of options.

For example, which element is currently in focus can also cause changes to the radial menu of options. If focus is at a first UI object when the priming gesture is detected, then the plurality of user interface elements is a first plurality of user interface elements associated with the first UI object. If focus is at a second UI object, distinct from the first UI object, when the priming gesture is detected, then the plurality of user interface elements is a second plurality of user interface elements associated with the second UI object. For example, the available commands and corresponding control gestures is based on which user interface element has focus.

(A22) In some embodiments of any of A1-A21, the one or more sensors of the wrist-wearable device include one or more of an inertial measurement unit (IMU) sensor and an electromyography sensor.

(B1) In another aspect, some embodiments include a method for gating adjustment gestures. The method includes: (i) while a gating in-air hand gesture is maintained (e.g., the pinch gesture in FIG. 7B), receiving a first indication of performance of an adjustment in-air hand gesture (e.g., a wrist-roll gesture, such as shown in FIG. 7D) of a first magnitude (e.g., a velocity and/or distance travelled by the wrist during the wrist-roll gesture), the adjustment in-air hand gesture of the first magnitude being directed to a user interface object (e.g., the menu 704 in FIG. 7D) presented via a head-wearable device (e.g., the head-wearable device 202), the user interface object associated with a plurality of values (e.g., corresponding to user interface elements 706); (ii) in response to receiving the first indication of the performance of the adjustment in-air hand gesture of the first magnitude, adjusting the user interface object to have a first state after moving through some of the plurality of values based on the first magnitude (e.g., scrolling the menu 704 as illustrated in FIG. 7D); (iii) after receiving an indication of a release of the gating in-air hand gesture, in response to receiving a second indication of performance of the adjustment in-air hand gesture, forgoing adjusting the user interface object such that the user interface object continues to have the first state; (iv) while the gating in-air hand gesture is again maintained, receiving a third indication of performance of the adjustment in-air hand gesture of a second magnitude, distinct from the first magnitude, the adjustment in-air hand gesture of the second magnitude being directed to the user interface object while it has the first state; and (v) in response to receiving the third indication of the performance of the adjustment in-air hand gesture of the second magnitude, adjusting the user interface object to move through more of the plurality of values based on the second magnitude such that the user interface object has a second state, distinct from the first state (e.g., scrolling the menu 704 to the user interface element 706-4 as shown in FIG. 7E).

As an example, once the gating gesture is released, the user can return their wrist to its original position, then perform the gating gesture again with the adjustment in-air hand gesture to cause a continuous navigation/adjustment to the user interface element. In some embodiments, the first state is the state in which the UI object appears after the adjustment (and it is different from the state of that UI object before the adjustment occurred).

In some embodiments, the first indication includes data regarding performance of the adjustment in-air hand gesture from a different device, such as a wrist-wearable device that includes neuromuscular-signal sensors. In some embodiments, the plurality of values correspond to selectable options of a menu, positions within an application such as a photo application or messaging application, volume levels for a volume slider bar, or the like.

(B2) In some embodiments of B1, the gating in-air hand gesture is an in-air pinch gesture in which a user's finger contacts a thumb of the user for at least a predetermined threshold amount of time (e.g., for at least 500 ms, 1 second, or 1.5 seconds).

(B3) In some embodiments of B2, the method further includes, after receiving an indication of a release of the gating in-air hand gesture while the user interface object has the second state, causing a selection of an option from within the user interface object in response to receiving an indication that the gating in-air hand gesture includes contact between the user's finger and the thumb of the user that lasts for less than the predetermined threshold amount of time. For example, the gating gesture, e.g., a thumb-to-index finger pinch, can be recognized as a gating gesture if it is maintained for at least the predetermined threshold amount of time, but is instead recognized as a selection gesture if it is lasts for a shorter period of time. For example, FIG. 7G shows the pinch gesture 729 causing selection of the user interface element 706-4 (shown in FIG. 7F).

(B4) In some embodiments of any of B1-B3: (i) the adjustment in-air hand gesture of the first magnitude is an in-air wrist roll gesture in which a wrist of the user is rotated in a rotational direction substantially around a center point (e.g., within 5, 10, or 15 degrees of the center point), and (ii) the adjusting of the user interface object to have the first state is also based on moving through the some of the plurality of values in accordance with the rotational direction (e.g., the pinch-and-roll gesture shown in FIG. 7H). For example, if the menu is a vertical menu, then rotational direction to the left can cause the vertical menu to scroll up, and vice versa. For example, if the menu is a horizontal menu, then rotational direction to the left can cause moving through the horizontal menu in a leftward direction, and vice versa. The same behavior/relationship may be used for UI objects with a slide scale of values (e.g., a volume slider bar).

(B5) In some embodiments of any of B1-B3, the adjustment in-air hand gesture is a translation movement of a hand of the user in which the user's hand moves a distance between distinct first and second spatial positions (e.g., the translation gesture shown in FIG. 7K).

(B6) In some embodiments of any of B1-B5, the user interface object is a volume slider, and the plurality of values correspond to respective volume levels of the volume slider.

(B7) In some embodiments of any of B1-B5, the user interface object is a chat thread having messages displayed in a vertical direction, and each of the plurality of values corresponds to a respective vertical position within the chat thread (e.g., the messages 732 shown in FIG. 7H and/or the messages 774 shown in FIG. 7O).

(B8) In some embodiments of any of B1-B5, the user interface object is a menu that includes a plurality of selectable options, and each of the plurality of values corresponds to a respective selectable option of the plurality of selectable options (e.g., the menu 704 in FIG. 7A and/or the menu 778 in FIG. 7P).

(B9) In some embodiments of B8, the menu is associated with a messaging application, and the plurality of selectable options include emojis and quick-response messages (e.g., the menu 778 in FIG. 7P).

(B10) In some embodiments of any of B1-B9: (i) the first magnitude of the adjustment in-air hand gesture corresponds to one or both of a velocity and a distance associated with the performance of the adjustment of the in-air hand gesture of the first magnitude, and (ii) the second magnitude of the adjustment in-air hand gesture corresponds to one or both of a velocity and a distance associated with the performance of the adjustment of the in-air hand gesture of the second magnitude (e.g., the first magnitude is indicated in FIG. 7B by the arrow 714 and the second magnitude is indicated in FIG. 7D by the arrow 724).

(B11) In some embodiments of any of B1-B10, the performance of the adjustment in-air hand gesture of the first magnitude, the gating in-air hand gesture, the release of the gating in-air hand gesture, and the performance of the adjustment in-air hand gesture of the second magnitude are all detected using one or more sensors of a wrist-wearable device (e.g., the wrist-wearable device 120) is in communication with the head-wearable device (e.g., the head-wearable device 202). For example, an intermediary device (e.g., the HIPD 8000) can be used to assist with processing the sensor signals (e.g., EMG signals) to help with detecting the gestures. As another example, data from the wrist-wearable device and/or an intermediary device can be communicated to the head-wearable device to allow it to make appropriate UI adjustments.

(B12) In some embodiments of B11, the one or more sensors of the wrist-wearable device include a plurality of neuromuscular-signal sensors (e.g., the sensors 6013 in FIG. 15A).

(B13) In some embodiments of B11 or B12, the wrist-wearable device does not include a display (e.g., the wrist-wearable device 6000). For example, the wrist-wearable device is used as a gesture-detection device for EMG and/or IMU (and/or other sensor signals) based gestures used with the head-wearable device, and the wrist-wearable device does not have its own display.

(B14) In some embodiments of any of B1-B13, the method further includes: (i) determining, based on one or more sensors the head-wearable device (e.g., gaze-tracking sensors and/or an IMU tracking head position), that a user's focus has shifted from the user interface object to a new user interface object presented via the head-wearable device; and (ii) while the user's focus remains on the new user interface object, performance of the gating in-air hand gesture that is maintained while the adjustment in-air hand gesture is performed causes an adjustment to the new user interface object and not to the user interface object.

(B15) In some embodiments of B14, the adjustment to the new user interface object is distinct from the adjusting the user interface object to have the first state. For example, different UI adjustments are available/activated for different types of UI elements (e.g., scrolling through menus as opposed to adjusting values for a slide bar).

(C1) In one aspect, some embodiments include a method of using a multi-stage in-air hand gesture for user-interface interactions. In some embodiments, the method is performed at a wearable device (e.g., the wrist-wearable device 120) having memory (e.g., memory 6080) and one or more processors (e.g., the processor(s) 6079). In some embodiments, the method is performed at a computing system (e.g., composed of a plurality of devices, such as wearable devices and intermediary devices). The method includes: (i) receiving, via one or more sensors of a wrist-wearable device worn by a user, data generated from performance of a multi-stage in-air hand gesture by the user, (ii) in accordance with a determination that a first stage of the multi-stage in-air hand gesture is a priming gesture, identifying an initial position of a body part of the user, and (iii) in accordance with a determination that a second stage of the multi-stage in-air hand gesture is a navigation gesture, navigating through a user interface based on a change in position of the body part from the initial position during performance of the navigation gesture, wherein a navigation speed is based on the change in position of the body part. For example, in response to detecting a rotation of a wrist of the user 115 in a first direction (e.g., clockwise), the system causes a navigation toward the right (e.g., a focus moves to the right within the user interface and/or user interface elements move to the left). FIG. 10B shows a clockwise wrist rotation gesture and a corresponding navigation to the right within the user interface 1220. To continue the example, in response to detecting a rotation of a wrist of the user 115 in a second direction (e.g., counter-clockwise), the system causes a navigation toward the left (e.g., a focus moves to the left within the user interface and/or user interface elements move to the right). FIG. 10H shows a counter-clockwise wrist rotation gesture and a corresponding navigation to the left within the user interface 1220. In some embodiments, a speed of the navigation is based on a speed and/or distance of movement of the body part during performance of the navigation gesture (e.g., in accordance with the graphs shown in FIGS. 11A-11C). For example, the navigation is based on a speed and/or amount of wrist rotation, lateral arm movement, and/or other body part movement.

(C2) In some embodiments of C1, the method further includes, in accordance with the determination that the first stage of the multi-stage in-air hand gesture is a priming gesture, displaying a plurality of selectable user interface elements within the user interface and/or providing feedback to the user indicating the user can perform additional gestures. In some embodiments, the priming gesture causes the user interface to become responsive to additional gestures from the user (e.g., while the priming gesture is maintained and/or for a set amount of time after the priming gesture is released).

(C3) In some embodiments of C1 or C2, navigating through the user interface based on the change in the position of the body part includes navigating in a first manner (e.g., navigating pages and/or chapters of a document). In some embodiments, the method further includes, in accordance with a determination that a third stage of the multi-stage in-air hand gesture is another navigation gesture, navigating through the user interface in a second manner (e.g., navigating sentences of a document) based on a change in position of the body part from the initial position during performance of the another navigation gesture. In some embodiments, the multi-stage in-air gesture includes a first navigation gesture (e.g., while maintaining the priming gesture) and a second navigation gesture (e.g., another type of navigation gesture) subsequent to the first navigation gesture (e.g., as described previously with respect to FIGS. 12A-12D). For example, the user can perform a translation from one location to another to scroll through a plurality of user interface elements, stop the translation and then rotate their wrist to further scroll through the plurality of user interface elements.

(C4) In some embodiments of C3, the method further includes, in accordance with a determination that a fourth stage of the multi-stage in-air hand gesture is a control gesture, executing a command for the user interface that corresponds to the control gesture. In some embodiments, the control gesture causes activation of a function associated with the user interface element that has focus when the control gesture is detected.

(C5) In some embodiments of C3 or C4, the navigation gesture is distinct from the another navigation gesture. In some embodiments, the navigation gesture is a hand translation gesture (e.g., as described previously with respect to FIGS. 10B-10H) and the another navigation gesture is a wrist rotation gesture (e.g., as described previously with respect to FIGS. 9B-9E). In some embodiments, the navigation gesture and the another navigation gesture are a same type of navigation gesture (e.g., two instances of a rotational gesture or a translational gesture).

(C6) In some embodiments of any of C1-C5, the priming gesture is a maintained gesture and the method further includes: (i) in response to the priming gesture, activating a user interface and (ii) in accordance with a determination that a third stage of the multi-stage in-air hand gesture includes a release of the maintained gesture, deactivating the user interface. For example, the user interface is only activated while a priming gesture is maintained (and optionally a preset amount of time after it is released). In some embodiments, when the user releases the priming gesture (e.g., as described previously with respect to FIG. 9D), the user interface is deactivated and the multi-stage in-air hand gesture is also ended (e.g., ending the navigation gesture associated with the second stage of the multi-stage in-air hand gesture). In some embodiments, the release of a maintained gesture is interpreted by the system as a control gesture followed by an end of the multi-stage gesture.

(C7) In some embodiments of any of C1-C6, the method further includes: (i) receiving via the one or more sensors of the wrist-wearable device, data generated from performance of a second multi-stage in-air hand gesture, (ii) in accordance with a determination a first stage of the second multi-stage in-air hand gesture is another priming gesture, determining a second initial position of the body part of the user and activating the user interface, and (iii) in accordance with a determination that a second stage of the second multi-stage in-air hand gesture is another navigation gesture, navigating through the user interface based on a change in position of the body part from the second initial position during performance of the navigation gesture, where a navigation speed for the another navigation gesture is based on the change in position of the body part from the second initial position. In some embodiments, the priming gesture and the another priming gesture are instances of a same gesture (e.g., a pinch gesture). In some embodiments, the priming gesture and the another priming gesture are instances of different gestures (e.g., one is a pinch gesture and the other is a first clench gesture). In some embodiments, the navigation gesture and the another navigation gesture are instances of a same gesture (e.g., a wrist-roll gesture). In some embodiments the navigation gesture and the another navigation gesture are instances of different gestures (e.g., one is a wrist-roll gesture and the other is a hand-translation gesture, as described previously with respect to FIGS. 12A-12D).

(C8) In some embodiments of any of C1-C7, the navigation gesture includes translation of a hand of the user from the initial position to a second position. For example, while the user is maintaining the priming gesture (e.g., a pinchand-hold gesture) the user moves their hand across a plane to navigate through one or more user interface elements (e.g., as described previously with respect to FIGS. 9C-9E). In some embodiments, the speed of navigation is based on the distance between the initial position and the second position.

(C9) In some embodiments of C8, a navigation speed through the user interface is proportional to a speed and/or distance in which the user translates their hand from the initial position to the second position. For example, the more quickly the user moves their hand, the faster the system navigates through user interface elements in the user interface (e.g., as described previously with respect to FIGS. 9B-9E). For example, if the user is attempting to select a calendar date, the user can have precision selection abilities while moving their hand slowly. In this example, if they want to skip through multiple dates, they can move their hand more quickly to scroll through more dates while moving a same distance. For example, the farther the user slides their hand, a larger range of numbers is available, and the faster the user slides their hand for a similar distance, more numbers will be scrolled through.

(C10) In some embodiments of any of C1-C9, the navigation gesture includes a rotation of a wrist of the user in a first or second direction. For example, the user rotates their wrist to navigate through a plurality of user interface elements (e.g., as described previously with respect to FIGS. 10A-10H).

(C11) In some embodiments of C10, the navigation speed is proportional to a rotation angle of the wrist of the user. For example, if the user rotates their wrist slightly, navigation through the user interface elements is slower (e.g., more controlled), and if the user rotates their wrist more dramatically, navigation through the user interface elements is faster (e.g., to move through the items more quickly).

(C12) In some embodiments of any of C1-11, the navigation speed is based on a cubic function of the change in position of the body part. In some embodiments, different curves (e.g., linear (FIG. 11A), step function (FIG. 11B), and cubic (FIG. 11C)) are used to determine how fast to navigate through user interface elements. In some embodiments, different curves are selected depending on the active application and/or what type of element has focus.

(C13) In some embodiments of any of C1-C11, the navigation speed is based on a step function of the change in position of the body part. For example, FIGS. 10B-10H illustrate examples of navigating in accordance with a step function.

(C14) In some embodiments of any of C1-C11, the navigation speed is based on a linear function of the change in position of the body part. For example, FIGS. 9B-9E illustrate examples of navigating in accordance with a linear function.

(C15) In some embodiments of any of C1-C14, navigating through the user interface includes, while detecting the navigation gesture: (i) forgoing navigating through the user interface in accordance with the change in position of the body part being less than a first threshold and (ii) navigating through the user interface in accordance with the change in position of the body part being greater than the first threshold. In some embodiments, the speed of navigation is zero below the first threshold (e.g., there is a deadzone as illustrated by the graph in FIG. 10B). In some embodiments, the speed of navigation is proportional to the change in position of the body part while beyond the first threshold (e.g., as illustrated in FIGS. 12B-12E). In some embodiments, the speed is based on a step function, a linear function, a cubic function, and/or another function while the change in position is beyond the first threshold.

(C16) In some embodiments of C15, navigating through the user interface further includes: (i) in accordance with a determination that the change in position of the body part is greater than the first threshold and less than a second threshold, navigating through the user interface at a first speed, and (ii) in accordance with a determination that the change in position of the body part is greater than the second threshold, navigating through the user interface at a second speed greater than the first speed. For example, when a user rotates their wrist past the initial position, the user navigates through the user interface at a first speed (e.g., as illustrated in FIG. 10D). For example, the first speed slowly and individually scrolls through numbers at a pace so that the user has very fine control over which number they intend to select. To continue the example, when the user rotates their wrist past a first threshold, the user navigates through the user interface at a second speed, distinct from the first speed. For example, in a scenario where a user is rotating through several numbers and wants to skip from 1 to 20, they can scroll through at a greater speed in order to skip additional numbers.

In some embodiments, a dead zone is defined between the initial position and the first threshold. For example, in the dead zone the user can rotate their wrist without navigating in the user interface. In some embodiments, once the user rotates their wrist past the first threshold (the dead zone) the user navigates through the user interface on a cubic scale (e.g., as illustrated by FIG. 11C).

(C17) In some embodiments of any of C1-C16, the method further includes, in accordance with a determination that the second stage of the multi-stage in-air hand gesture is the navigation gesture, causing display of a navigation indicator (e.g., user interface element 1326) in the user interface, where the navigation indicator indicates the navigation speed. For example, a navigation indicator provides the user with information about a navigation speed, a rotation angle, a navigation distance, and/or a navigation direction. For example, when the user rotates their wrist past an initial position after performing a priming gesture, an indicator indicating how far the user has rotated their wrist in reference to the initial position is displayed. Therefore, as the user rotates their wrist to navigate through user interface items, the user has a visual cue as to how they are currently navigating. The navigation indicator can improve clarity and efficiency by helping to ensure that users understand how their gestures affects the user interface.

(C18) In some embodiments of any of C1-C17, the method further includes, in accordance with a determination that the change in position of the body part meets one or more criteria, ceasing to increase the navigation speed and providing feedback (e.g., the user interface element 1332) to the user indicating that the navigation speed is at an upper limit. In some embodiments, feedback is provided to the user via the user interface (e.g., as an indicator and/or icon). In some embodiments, the feedback is provided to the user via haptic feedback (e.g., at the wrist-wearable device and/or the head-wearable device). In some embodiments, providing feedback includes providing audio feedback, haptic feedback, and/or visual feedback. Providing feedback that the navigation speed is at an upper limit notifies the user that they can stop moving the body part as further movement would not increase speed. As an example, as a user is navigating through user interface items, once the change in position of the body part meets the one or more criteria (e.g., a maximum distance threshold), the navigation speed is capped, and the corresponding navigation is at the maximum speed. For example, if the user continues to move the body part past the distance threshold, the speed is maintained at the maximum navigation speed. In some embodiments, the maximum speed is independent of the direction of navigation. For example, the maximum speed when navigating in a first direction (e.g., scrolling right) is the same as the maximum speed when navigating in a second direction (e.g., scrolling left).

(C19) In some embodiments of any of C1-C18, the priming gesture is a maintained gesture performed by at least two phalanges of the user. In some embodiments, the priming gesture is a maintained pinch gesture performed by the user. For example, the user interface is activated while the priming gesture is being maintained and deactivated when the priming gesture is released.

(C20) In some embodiments of any of C1-C18, the method further includes, in accordance with a determination that the first stage of the multi-stage in-air hand gesture is the priming gesture, starting a predetermined window of time (e.g., 1 second, 2 seconds, 5 seconds, or 10 seconds) for detecting one or more subsequent multi-stage gestures. For example, the system is responsive to subsequent navigation/control gestures detected within the predetermined window of time, but is not responsive to subsequent navigation/control gestures performed after the predetermined window of time has elapsed (unless proceeded by a separate priming gesture). In some embodiments, the priming gesture is not maintained, but rather starts a predefined window for detecting subsequent multi-stage in-air gestures.

In some embodiments, one or more of the gestures described above (e.g., with respect to A1-A22, B1-B15, and C1-C20) are detected with an optical sensor (e.g., a camera) or sensors associated with an inertial measurement unit (IMU) rather than (or in addition to, via fusing the sensor inputs to detect the various in-air hand gestures described herein) the one or more neuromuscular-signal sensors. In some embodiments, the one or more gestures described above (e.g., with respect to A1-A22, B1-B15, and C1-C20) are replaced with gestures performed by other parts of the user's body (e.g., head gestures, leg gestures, or torso gestures). As one example, an in-air priming gesture can be detected using one or more of neuromuscular-signal sensors, data from an IMU, and cameras; as another example, a control gesture can be a shaking of the user's head (as if the user is indicating "No") or a nodding of the user's head (as if the user is indicating "Yes").

In some embodiments, the wearable device detects neuromuscular signals travelling through the user's neck or back, which can be done using neuromuscular-signal sensors coupled with the VR goggles or the AR glasses in some example embodiments. In some embodiments, the one or more gestures described above (e.g., with respect to A1-A22, B1-B15, C1-C20) are replaced with (or performed using) in-air hand gestures on a controller (e.g., a handheld controller or foot pedal controller). In some embodiments, the one or more in-air hand gestures described above (e.g., with respect to A1-A22, B1-B15, C1-C20) are replaced with audio commands (e.g., spoken word commands or non-word commands such as a tongue click).

In another aspect, some embodiments include a computing system including one or more processors and memory coupled to the one or more processors, the memory storing one or more programs configured to be executed by the one or more processors, the one or more programs including instructions for performing any of the methods described herein (e.g., methods 800, 850, 1600 and A1-A22, B1-B15, C1-C20 above).

In yet another aspect, some embodiments include a non-transitory computer-readable storage medium storing one or more programs for execution by one or more processors of a computing system, the one or more programs including instructions for performing any of the methods described herein (e.g., methods 800, 850, 1600 and A1-A22, B1-B15, C1-C20 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of using multi-stage in-air hand gestures to perform interactions, the method comprising:
    receiving, via one or more sensors of a wrist-wearable device worn by a user, data generated from performance of a multi-stage in-air hand gesture by the user;
    in accordance with a determination that a first stage of the multi-stage in-air hand gesture is a priming gesture, activating a user interface and one or more additional sensors of the wrist-wearable device;
    in accordance with a determination that a last stage of the multi-stage in-air hand gesture is a control gesture received within a predefined threshold amount of time after the priming gesture, executing a command for the user interface that corresponds to the control gesture, wherein the control gesture is detected using at least the one or more additional sensors;
deactivating the user interface and the one or more additional sensors;
after deactivating the user interface and the one or more additional sensors, receiving, via the one or more sensors of the wrist-wearable device worn by the user, additional data generated from performance of another multi-stage in-air hand gesture by the user;
in accordance with a determination that a first stage of the other multi-stage in-air hand gesture is another priming gesture, activating the user interface and the one or more additional sensors; and
in accordance with a determination that the control gesture is not detected within the predefined threshold amount of time of the other priming gesture, deactivating the user interface and the one or more additional sensors.

2. The method of claim 1, wherein:
the priming gesture includes maintaining a pinch-and-hold gesture in which at least two phalanges of a hand of the user remain in contact for at least a preset amount of time; and
activating the user interface includes displaying a plurality of selectable user interface elements within the user interface while the pinch-and-hold gesture is maintained.

3. The method of claim 2, further comprising ceasing to display the plurality of selectable user interface elements in accordance with a determination, based on data from the one or more sensors of the wrist-wearable device, that the pinch-and-hold gesture is no longer maintained.

4. The method of claim 2, wherein:
the multi-stage in-air hand gesture further includes a navigation stage;
the navigation stage includes a rotation of a wrist of the user to navigate through a plurality of user interface elements in the user interface and select a selected user interface element from the plurality of user interface elements; and
the control gesture comprises a release of the pinch-and-hold gesture to execute a command for the selected user interface element.

5. The method of claim 2, wherein:
the multi-stage in-air hand gesture further includes a navigation stage; and
the navigation stage includes a sliding movement of a first phalange of the at least two phalanges across a surface of a second phalange of the at least two phalanges, the first and second phalanges being located on different fingers of the hand of the user.

6. The method of claim 2, wherein:
the pinch-and-hold gesture is maintained via a pressing force between the at least two phalanges of the hand of the user, the pressing force not meeting a preset activation criterion;
the control gesture comprises an increase in the pressing force between the at least two phalanges of the hand of the user, such that the pressing force becomes an increased pressing force; and
the command is executed in accordance with the increased pressing force meeting the preset activation criterion.

7. The method of claim 1, further comprising identifying the command for the user interface based on a combination of the priming gesture and the control gesture.

8. The method of claim 1, wherein activating the user interface includes presenting a user interface element that was not presented prior to activating the user interface.

9. The method of claim 1, further comprising activating, in response to the priming gesture, a display of the wrist-wearable device or a head-wearable device.

10. The method of claim 1, wherein activating the user interface includes causing a plurality of user interface elements to be displayed within the user interface.

11. The method of claim 10, wherein:
activating the user interface includes causing the plurality of user interface elements to be displayed for a preset amount of time, and
the plurality of user interface elements cease to be displayed automatically, without further instructions from the user, when a control gesture is not detected within the predefined threshold amount of time.

12. The method of claim 10, further comprising, in conjunction with executing the command, deactivating the user interface including ceasing to display the plurality of user interface elements.

13. The method of claim 1, wherein:
the priming gesture comprises a double tap gesture in which at least one digit of a hand of the user contacts at least a part of the hand of the user twice in succession;
the control gesture comprises a snapping gesture in which at least two digits of a hand of the user touch and slide against one another; and
the command, which is identified based on the priming gesture and the control gesture, comprises capturing a video with an imaging device communicatively coupled to the wrist-wearable device.

14. The method of claim 1, wherein activating the user interface includes causing one or more options to be presented to the user, the one or more options corresponding to available control gestures, including the control gesture that is the last stage of the multi-stage in-air hand gesture.

15. The method of claim 1, further comprising:
after determining that the last stage of the multi-stage in-air hand gesture is the control gesture and prior to executing the command, causing a confirmation to be presented to the user, the confirmation requesting that the user confirm that execution of the command is intended by the user, wherein the command is executed in response to the user confirming that execution of the command is intended.

16. The method of claim 1, wherein:
the priming gesture is performed while a first user interface element is in focus within the user interface, and
the method further includes:
in conjunction with activating the user interface, causing display of a plurality of options for interacting with the first user interface element, each of the plurality of options associated with a respective command for the user interface; and
in accordance with a determination that a second stage of the multi-stage in-air hand gesture, detected before the last stage of the multi-stage in-air hand gesture, is a navigation gesture, navigating through the plurality of options for interacting with the first user interface element until a respective option of the plurality of options is in focus within the user interface, the respective option of the plurality of options associated with the command, and
wherein the control gesture is performed while the respective option remains in focus within the user interface, thereby causing the executing of the command that is associated with the respective option.

17. The method of claim 1, wherein the one or more sensors of the wrist-wearable device include an inertial measurement unit (IMU) sensor and the one or more additional sensors of the wrist-wearable device include an electromyography sensor.

18. The method of claim 1, wherein the one or more sensors of the wrist-wearable device and the one or more additional sensors of the wrist-wearable device comprise neuromuscular sensors.

19. A system comprising:
one or more processors; and
memory coupled to the one or more processors, the memory comprising instructions for:
receiving, via one or more sensors of a wrist-wearable device worn by a user, data generated from performance of a multi-stage in-air hand gesture by the user;
in accordance with a determination that a first stage of the multi-stage in-air hand gesture is a priming gesture, activating a user interface and one or more additional sensors of the wrist-wearable device;
in accordance with a determination that a last stage of the multi-stage in-air hand gesture is a control gesture received within a predefined threshold amount of time after the priming gesture, executing a command for the user interface that corresponds to the control gesture, wherein the control gesture is detected using at least the one or more additional sensors;
deactivating the user interface and the one or more additional sensors;
after deactivating the user interface and the one or more additional sensors, receiving, via the one or more sensors of the wrist-wearable device worn by the user, additional data generated from performance of another multi-stage in-air hand gesture by the user;
in accordance with a determination that a first stage of the other multi-stage in-air hand gesture is another priming gesture, activating the user interface and the one or more additional sensors; and
in accordance with a determination that the control gesture is not detected within the predefined threshold amount of time of the other priming gesture, deactivating the user interface and the one or more additional sensors.

20. A non-transitory computer-readable storage medium including instructions that, when executed by a wearable device, cause the wearable device to:
receive, via one or more sensors of a wrist-wearable device worn by a user, data generated from performance of a multi-stage in-air hand gesture by the user;
in accordance with a determination that a first stage of the multi-stage in-air hand gesture is a priming gesture, activate a user interface and one or more additional sensors of the wrist-wearable device;
in accordance with a determination that a last stage of the multi-stage in-air hand gesture is a control gesture received within a predefined threshold amount of time after the priming gesture, execute a command for the user interface that corresponds to the control gesture, wherein the control gesture is detected using at least the one or more additional sensors;
deactivate the user interface and the one or more additional sensors;
after deactivating the user interface and the one or more additional sensors, receive, via the one or more sensors of the wrist-wearable device worn by the user, additional data generated from performance of another multi-stage in-air hand gesture by the user;
in accordance with a determination that a first stage of the other multi-stage in-air hand gesture is another priming gesture, activate the user interface and the one or more additional sensors; and
in accordance with a determination that the control gesture is not detected within the predefined threshold amount of time of the other priming gesture, deactivate the user interface and the one or more additional sensors.

* * * * *